United States Patent
Wheeler et al.

(10) Patent No.: US 7,028,185 B2
(45) Date of Patent: *Apr. 11, 2006

(54) MANAGING DATABASE FOR IDENTIFYING TO RECIPIENTS SECURITY FEATURES OF DEVICES GENERATING DIGITAL SIGNATURES

(75) Inventors: Lynn Henry Wheeler, Greenwood Village, CO (US); Anne M. Wheeler, Greenwood Village, CO (US)

(73) Assignee: First Data Corporation, Greenwood Village, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 10/248,624

(22) Filed: Feb. 1, 2003

(65) Prior Publication Data

US 2003/0097570 A1 May 22, 2003

Related U.S. Application Data

(63) Continuation of application No. PCT/US01/41587, filed on Aug. 6, 2001.
(60) Provisional application No. 60/223,076, filed on Aug. 4, 2000.

(51) Int. Cl.
*H04L 9/00* (2006.01)

(52) U.S. Cl. .................. 713/170; 713/176; 713/200; 380/282; 380/285; 705/64; 705/68; 705/71

(58) Field of Classification Search ............. 713/170, 713/176, 200, 189, 193; 380/282, 285; 705/64, 705/68, 71; 708/135; 710/36; 711/150, 163; 709/229
See application file for complete search history.

(56) References Cited

U.S. PATENT DOCUMENTS

| | | | |
|---|---|---|---|
| 3,962,539 A | 6/1976 | Ehrsam et al. | |
| 4,200,770 A | 4/1980 | Hellman et al. | |
| 4,218,582 A | 8/1980 | Hellman et al. | |
| 4,405,829 A | 9/1983 | Rivest et al. | |
| 4,408,203 A | 10/1983 | Campbell | |
| 4,424,414 A | 1/1984 | Hellman et al. | |
| 4,734,564 A | 3/1988 | Boston et al. | |
| 4,748,668 A | 5/1988 | Shamir et al. | |
| 4,797,920 A | 1/1989 | Stein | |
| 4,823,388 A | 4/1989 | Mizutani | |
| 4,825,050 A | 4/1989 | Griffith | |
| 4,850,017 A | 7/1989 | Matyas | |
| 4,868,877 A | 9/1989 | Fischer | |
| 4,885,788 A | 12/1989 | Takaragi et al. | |
| 5,018,196 A | 5/1991 | Takaragi et al. | |
| 5,029,208 A * | 7/1991 | Tanaka ...................... 380/279 | |
| 5,097,504 A | 3/1992 | Camion et al. | |
| 5,140,634 A | 8/1992 | Guillou | |
| 5,214,703 A | 5/1993 | Massey | |

(Continued)

OTHER PUBLICATIONS

Donal O'Mahony; Electronic payment systems 1961; Artech House Inc.; pp. 51 and 77–80.*

*Primary Examiner*—Kambiz Zand
(74) *Attorney, Agent, or Firm*—Morris, Manning & Martin

(57) ABSTRACT

Managing a database for identification of security features of a device that generates digital signatures includes (a) recording in the database for each of a plurality of devices, (i) a public key of a pair of public-private keys of the device, and (ii) information including security features of the device, the security features being associated with the public key in the database, and (b) identifying security features from the database to a recipient of an electronic message for which a digital signature was originated utilizing a private key of the public-private key pair of a particular one of the devices, the security features being for the particular device.

20 Claims, 85 Drawing Sheets

U.S. PATENT DOCUMENTS

| | | | |
|---|---|---|---|
| 5,225,978 A | | 7/1993 | Petersen et al. |
| 5,231,668 A | | 7/1993 | Kravitz |
| 5,422,953 A | * | 6/1995 | Fischer ........................ 713/172 |
| 5,453,601 A | | 9/1995 | Rosen |
| 5,455,865 A | * | 10/1995 | Perlman ..................... 713/153 |
| 5,502,766 A | * | 3/1996 | Boebert et al. ............. 713/193 |
| 5,509,071 A | | 4/1996 | Petrie, Jr. |
| 5,534,855 A | | 7/1996 | Shockley et al. |
| 5,539,828 A | | 7/1996 | Davis |
| 5,557,518 A | * | 9/1996 | Rosen ......................... 705/69 |
| 5,563,946 A | | 10/1996 | Cooper et al. |
| 5,577,120 A | | 11/1996 | Penzias |
| 5,586,036 A | * | 12/1996 | Pintsov ..................... 705/408 |
| 5,590,197 A | | 12/1996 | Chen et al. |
| 5,604,801 A | | 2/1997 | Dolan et al. |
| 5,606,609 A | | 2/1997 | Houser |
| 5,615,266 A | | 3/1997 | Altschuler |
| 5,619,574 A | | 4/1997 | Johnson et al. |
| 5,623,637 A | | 4/1997 | Jones et al. |
| 5,625,690 A | | 4/1997 | Michel et al. |
| 5,636,280 A | | 6/1997 | Kelly |
| 5,659,616 A | | 8/1997 | Sudia |
| 5,671,279 A | | 9/1997 | Elgamal |
| 5,671,285 A | | 9/1997 | Newman |
| 5,677,953 A | | 10/1997 | Dolphin |
| 5,677,955 A | | 10/1997 | Doggett et al. |
| 5,694,471 A | | 12/1997 | Chen et al. |
| 5,708,780 A | | 1/1998 | Levergood |
| 5,715,314 A | | 2/1998 | Payne |
| 5,721,779 A | | 2/1998 | Funk |
| 5,724,424 A | | 3/1998 | Gifford |
| 5,745,886 A | | 4/1998 | Rosen |
| 5,751,813 A | | 5/1998 | Dorenbos |
| 5,778,072 A | | 7/1998 | Samar |
| 5,781,723 A | | 7/1998 | Yee et al. |
| 5,790,677 A | | 8/1998 | Fox et al. |
| 5,796,840 A | | 8/1998 | Davis |
| 5,812,666 A | | 9/1998 | Baker et al. |
| 5,825,884 A | * | 10/1998 | Zdepski et al. ............... 705/78 |
| 5,848,161 A | | 12/1998 | Laneau et al. |
| 5,862,327 A | | 1/1999 | Kwang et al. |
| 5,870,475 A | * | 2/1999 | Allan et al. .................. 380/282 |
| 5,878,142 A | | 3/1999 | Caputo |
| 5,883,810 A | * | 3/1999 | Franklin et al. ............. 700/232 |
| 5,887,131 A | | 3/1999 | Angelo |
| 5,903,882 A | | 5/1999 | Asay |
| 5,910,988 A | | 6/1999 | Ballard |
| 5,910,989 A | | 6/1999 | Naccache |
| 5,928,298 A | | 7/1999 | Matsuoka et al. |
| 5,943,423 A | | 8/1999 | Muftic |
| 5,949,881 A | | 9/1999 | Davis |
| 5,956,404 A | | 9/1999 | Schneier et al. |
| 5,963,648 A | | 10/1999 | Rosen |
| 5,970,147 A | | 10/1999 | Davis |
| 6,000,522 A | | 12/1999 | Johnson |
| 6,000,832 A | | 12/1999 | Franklin |
| 6,009,177 A | | 12/1999 | Sudia |
| 6,021,202 A | * | 2/2000 | Anderson et al. .............. 705/54 |
| 6,023,509 A | | 2/2000 | Herbert et al. |
| 6,029,150 A | | 2/2000 | Kravitz |
| 6,044,154 A | | 3/2000 | Kelly |
| 6,061,794 A | * | 5/2000 | Angelo et al. ............... 713/200 |
| 6,061,799 A | * | 5/2000 | Eldridge et al. ............. 713/202 |
| 6,070,154 A | | 5/2000 | Tavor et al. |
| 6,084,969 A | | 7/2000 | Wright |
| 6,092,202 A | | 7/2000 | Veil et al. |
| 6,102,287 A | | 8/2000 | Matyas |
| 6,104,815 A | * | 8/2000 | Alcorn et al. ................ 380/251 |
| 6,105,012 A | | 8/2000 | Chang |
| 6,108,644 A | | 8/2000 | Goldschlag |
| 6,111,956 A | | 8/2000 | Field |
| 6,134,325 A | | 10/2000 | Vanstone |
| 6,144,949 A | * | 11/2000 | Harris .......................... 705/38 |
| 6,154,543 A | | 11/2000 | Balzley |
| 6,161,180 A | | 12/2000 | Matyas et al. |
| 6,161,181 A | | 12/2000 | Haynes et al. |
| 6,167,518 A | | 12/2000 | Padgett et al. |
| 6,189,096 B1 | | 2/2001 | Havety |
| 6,192,130 B1 | | 2/2001 | Otway |
| 6,192,405 B1 | | 2/2001 | Bunnell |
| 6,199,052 B1 | | 3/2001 | Mitty et al. |
| 6,202,151 B1 | | 3/2001 | Musgrave |
| 6,205,437 B1 | | 3/2001 | Gifford |
| 6,213,391 B1 | * | 4/2001 | Lewis ......................... 235/380 |
| 6,230,269 B1 | | 5/2001 | Spies |
| 6,233,565 B1 | | 5/2001 | Lewis et al. |
| 6,240,091 B1 | | 5/2001 | Ginzboorg |
| 6,243,812 B1 | | 6/2001 | Matyas et al. |
| 6,253,027 B1 | * | 6/2001 | Weber et al. ................ 380/287 |
| 6,263,447 B1 | | 7/2001 | French |
| 6,279,112 B1 | | 8/2001 | O'Toole, Jr. et al. |
| 6,282,522 B1 | | 8/2001 | Davis et al. |
| 6,285,991 B1 | | 9/2001 | Powar |
| 6,299,062 B1 | | 10/2001 | Hwang |
| 6,314,519 B1 | * | 11/2001 | Davis et al. ................. 713/200 |
| 6,324,525 B1 | | 11/2001 | Kramer et al. |
| 6,373,950 B1 | | 4/2002 | Rowney |
| 6,510,516 B1 | * | 1/2003 | Benson et al. ............... 713/167 |
| 6,523,067 B1 | * | 2/2003 | Mi et al. ..................... 709/229 |
| 6,532,451 B1 | * | 3/2003 | Schell et al. ................... 705/54 |
| 6,565,000 B1 | * | 5/2003 | Sehr ............................ 235/384 |
| 6,571,339 B1 | * | 5/2003 | Danneels et al. ............ 713/201 |
| 6,587,837 B1 | * | 7/2003 | Spagna et al. ................. 705/26 |

\* cited by examiner

| Account Identifier (acctID) (216) | Account Information (240) | Public Key Information (218) |
|---|---|---|
| #-####-####-### (281) | Customer-specific information<br>Account-specific information | PuK |
| #-####-####-### (282) | Customer-specific information<br>Account-specific information | PuK |
| #-####-####-### (283) | Account-specific information | PuK |
| #-####-####-### (284) | Account-specific information | Customer-specific information |
| #-####-####-### (285) | | Customer-specific information |
| | | Customer-specific information |
| ... | ... | ... |
| #-####-####-### (288) | Customer-specific information<br>Account-specific information | PuK n |

| Account Identifier (acID) (216) | Account Information (240) | | Public Key Information (218) | Device Profile Information (270) |
|---|---|---|---|---|
| #-####-####-### (281) | Customer-specific information Account-specific information | | PuK | Security Characteristics Authentication Capabilities Manufacturing History Transactional History |
| #-####-####-### (282) | Customer-specific information Account-specific information | | PuK | Security Characteristics Authentication Capabilities Manufacturing History Transactional History |
| #-####-####-### (283) | Account-specific information | Customer-specific Information | PuK | Security Characteristics Authentication Capabilities Manufacturing History Transactional History |
| #-####-####-### (284) | Account-specific information | Customer-specific information | PuK | Security Characteristics Authentication Capabilities Manufacturing History Transactional History |
| #-####-####-### (285) | Account-specific Information | Customer-specific information | PuK | Security Characteristics Authentication Capabilities Manufacturing History Transactional History |
| | | | | Security Characteristics Authentication Capabilities Manufacturing History Transactional History |
| #-####-####-### n (288) | Customer-specific information Account-specific information | | PuK $_m$ | Security Characteristics Authentication Capabilities Manufacturing History Transactional History |

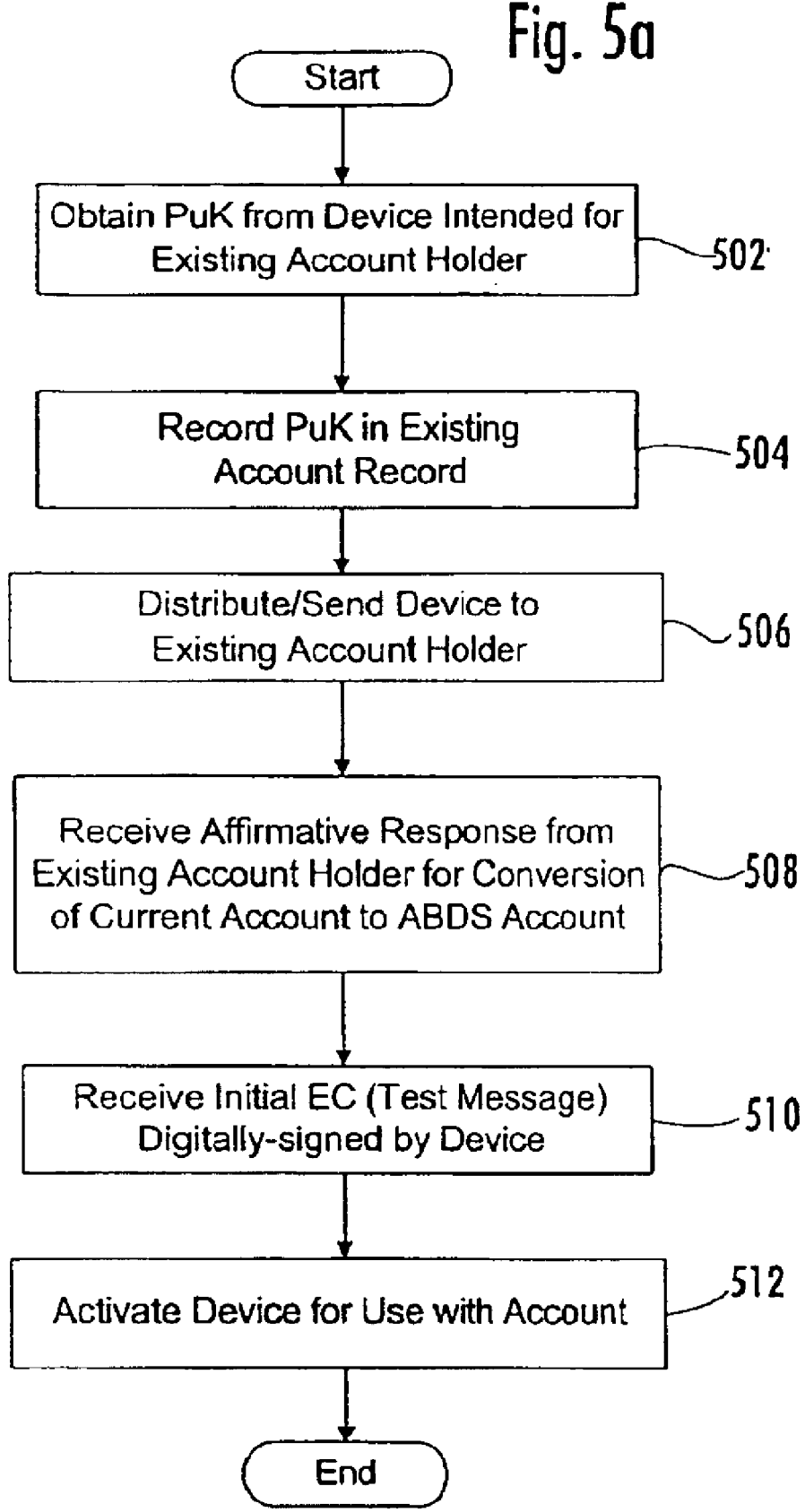

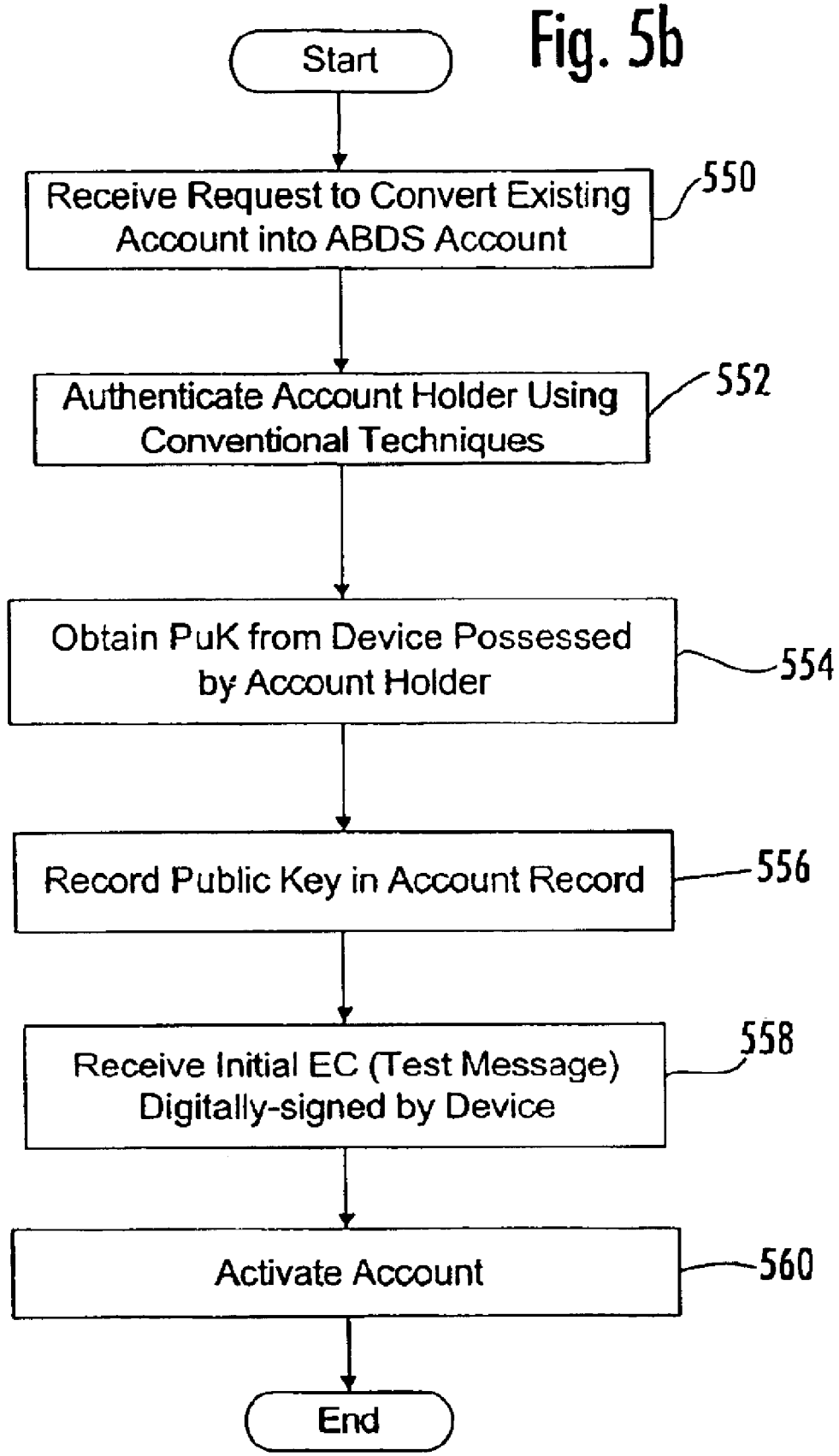

| Account Identifier (actID) (716) | Account Information (740) | | Pub Tir Key Information (718) | Device Profile Information (770) |
|---|---|---|---|---|
| | Customer - Specific (742) | Account - Specific (744) | | |
| #-####-####-### | Name<br>Address<br>SSN/Tax-ID number<br>etc. | Account Balance<br>Available Credit<br>Current Statement<br>Associated Accounts<br>etc. | PuK | Security Characteristics<br>Authentication Capabilities<br>Manufacturing History<br>Transactional History |
| #-####-####-### | Name<br>Address<br>SSN/Tax-ID number<br>etc. | Account Balance<br>Available Credit<br>Current Statement<br>Associated Accounts<br>etc. | PuK | Security Characteristics<br>Authentication Capabilities<br>Manufacturing History<br>Transactional History |
| ... | ... | ... | ... | ... |
| #-####-####-### | Name<br>Address<br>SSN/Tax-ID number<br>etc. | Account Balance<br>Available Credit<br>Current Statement<br>Associated Accounts<br>etc. | PuK | Security Characteristics<br>Authentication Capabilities<br>Manufacturing History<br>Transactional History |

| Account Identifier (actID) (1116) | Account Information (1140) | | Public Key Information (1118) | Device Profile Information (1170) |
|---|---|---|---|---|
| | Customer - Specific (1142) | Account - Specific (1144) | | |
| #-####-####-### | Name<br>Address<br>SSN/Tax-ID number<br>etc. | Account Status<br>Account Balance<br>Available Credit<br>Asset Holdings<br>Pending Transactions<br>Capitol Gains<br>Associated Accounts<br>etc. | PuK | Security Characteristics<br>Authentication Capabilities<br>Manufacturing History<br>Transactional History |
| #-####-####-### | Name<br>Address<br>SSN/Tax-ID number<br>etc. | Account Status<br>Account Balance<br>Available Credit<br>Asset Holdings<br>Pending Transactions<br>Capitol Gains<br>Associated Accounts<br>etc. | PuK | Security Characteristics<br>Authentication Capabilities<br>Manufacturing History<br>Transactional History |
| ⋮ | ⋮ | ⋮ | ⋮ | ⋮ |
| #-####-####-### | Name<br>Address<br>SSN/Tax-ID number<br>etc. | Account Status<br>Account Balance<br>Available Credit<br>Asset Holdings<br>Pending Transactions<br>Capitol Gains<br>Associated Accounts<br>etc. | PuK | Security Characteristics<br>Authentication Capabilities<br>Manufacturing History<br>Transactional History |

Fig. 11

| Account Identifier (acctID) (1516) | Account Information (1540) | | Public Key Information (1518) | Device Profile Information (1570) |
|---|---|---|---|---|
| | Customer - Specific (1542) | Account - Specific (1544) | | |
| #-###-###-### | Name<br>Address<br>SSN/Tax-ID number<br>etc. | List of Payment Accounts & Account Balances<br>Credit Card Number(s)<br>Available Credit<br>Current Statement<br>Status Report<br>Registered Payees<br>• (Cust. Acct. #,<br>• Billing Address,<br>• Current Billing Information)<br>etc. | PuK | Security Characteristics<br>Authentication Capabilities<br>Manufacturing History<br>Transactional History |
| #-###-###-### | Name<br>Address<br>SSN/Tax-ID number<br>etc. | List of Payment Accounts & Account Balances<br>Credit Card Number(s)<br>Available Credit<br>Current Statement<br>Status Report<br>Registered Payees<br>• (Cust. Acct. #,<br>• Billing Address,<br>• Current Billing Information)<br>etc. | PuK | Security Characteristics<br>Authentication Capabilities<br>Manufacturing History<br>Transactional History |
| ⋮ | ⋮ | | ⋮ | ⋮ |

| Account Identifier (acctID) (1916) | Account Information (1940) | | Public Key Information (1918) | Device Profile Information (1970) |
|---|---|---|---|---|
| | Customer-Specific (1942) | Account-Specific (1944) | | |
| #-####-####-### | Name<br>Address<br>SSN/Tax-ID number<br>etc. | List of Accounts<br>Payment History<br>Past Due Amount<br>Total Debt<br>Credit Score<br>etc. | PuK | Security Characteristics<br>Authentication Capabilities<br>Manufacturing History<br>Transactional History |
| #-####-####-### | Name<br>Address<br>SSN/Tax-ID number<br>etc. | List of Accounts<br>Payment History<br>Past Due Amount<br>Total Debt<br>Credit Score<br>etc. | PuK | Security Characteristics<br>Authentication Capabilities<br>Manufacturing History<br>Transactional History |
| ⋮ | ⋮ | ⋮ | ⋮ | ⋮ |
| #-####-####-### | Name<br>Address<br>SSN/Tax-ID number<br>etc. | List of Accounts<br>Payment History<br>Past Due Amount<br>Total Debt<br>Credit Score<br>etc. | PuK | Security Characteristics<br>Authentication Capabilities<br>Manufacturing History<br>Transactional History |

| Account Identifier (acctID) (2316) | Account Information (2340) | | Public Key Information (2318) | Device Profile Information (2370) |
|---|---|---|---|---|
| | Customer - Specific (2342) | Account - Specific (2344) | | |
| #-####.####-### | Name<br>Address<br>SSN/Tax - ID number<br>etc. | Current list of doctors<br>Insurance information<br>Medical profile and history<br>Known allergies<br>Major medical conditions<br>Organ donor information<br>etc. | PuK | Security Characteristics<br>Authentication Capabilities<br>Manufacturing History<br>Transactional History |
| #-####.####-### | Name<br>Address<br>SSN/Tax - ID number<br>etc. | Current list of doctors<br>Insurance information<br>Medical profile and history<br>Known allergies<br>Major medical conditions<br>Organ donor information<br>etc. | PuK | Security Characteristics<br>Authentication Capabilities<br>Manufacturing History<br>Transactional History |
| ... | ... | ... | ... | ... |
| #-####.####-### | Name<br>Address<br>SSN/Tax - ID number<br>etc. | Current list of doctors<br>Insurance information<br>Medical profile and history<br>Known allergies<br>Major medical conditions<br>Organ donor information<br>etc. | PuK | Security Characteristics<br>Authentication Capabilities<br>Manufacturing History<br>Transactional History |

| Account (Entity) Identifier (accID) (2710) | Account Information (2700) | | Public Key Information (2718) | Device Profile Informaton (2770) |
|---|---|---|---|---|
| | Entity - Specific Information (2712) | Accessible Databases (2714) | | |
| A-1234-5678-910 | Name<br>Position<br>Field of Practice<br>Member of Groups | Group Calendar<br>Personal Calendar<br>Group Contact List<br>Personal Contact List<br>Group Patient List<br>Personal Patient List<br>Insurance List | PK | Security Characteristics<br>Authentication Capabilities<br>Manufacturing History<br>Transactional History |
| A-1234-5678-911 | Name<br>Position<br>Field of Practice<br>Member of Groups | Group Calendar<br>Personal Calendar<br>Group Contact List<br>Personal Contact List<br>Group Patient List<br>Personal Patient List<br>Insurance List | PK | Security Characteristics<br>Authentication Capabilities<br>Manufacturing History<br>Transactional History |
| ... | ... | ... | ... | ... |
| A-1234-5678-919 | Name<br>Position<br>Field of Practice<br>Member of Groups | Group Calendar<br>Personal Calendar<br>Group Contact List<br>Personal Contact List<br>Group Patient List<br>Personal Patient List<br>Insurance List | PK | Security Characteristics<br>Authentication Capabilities<br>Manufacturing History<br>Transactional History |

| Account Identifier (acctID) (3116) | Account Information (3140) | | Public Key Information (3118) | Device Profile Information (3170) |
|---|---|---|---|---|
| | Citizen-Specific (3142) | Account-Specific (3144) | | |
| #-####-###-### | Name<br>Address<br>SSN<br>Tax-ID number<br>Occupation<br>Place of Birth<br>Age<br>etc. | Social Security Benefits<br>Welfare Benefits<br>Medicare/Medicaid Benefits<br>Prescription Benefits<br>Universal Health Care Benefits<br>Tax Returns (last 5 years)<br>Bank Account Information<br>etc. | PuK | Security Characteristics<br>Authentication Capabilities<br>Manufacturing History<br>Transactional History |
| #-####-###-### | Name<br>Address<br>SSN<br>Tax-ID number<br>Occupation<br>Place of Birth<br>Age<br>etc. | Social Security Benefits<br>Welfare Benefits<br>Medicare/Medicaid Benefits<br>Prescription Benefits<br>Universal Health Care Benefits<br>Tax Returns (last 5 years)<br>Bank Account Information<br>etc. | PuK | Security Characteristics<br>Authentication Capabilities<br>Manufacturing History<br>Transactional History |
| ... | | | ... | |
| #-####-###-### | Name<br>Address<br>SSN<br>Tax-ID number<br>Occupation<br>Place of Birth<br>Age<br>etc. | Social Security Benefits<br>Welfare Benefits<br>Medicare/Medicaid Benefits<br>Prescription Benefits<br>Universal Health Care Benefits<br>Tax Returns (last 5 years)<br>Bank Account Information<br>etc. | PuK | Security Characteristics<br>Authentication Capabilities<br>Manufacturing History<br>Transactional History |

| Account Identifier (acctID) (3516) | Account Information (3540) | | Public Key Information (3518) | Device Profile Information (3570) |
|---|---|---|---|---|
| | Customer - Specific (3542) | Account - Specific (3544) | | |
| #-####-### | Name<br>Billing Address<br>EMail Address<br>Credit Card Information | ISP Connection Means & Speed<br>Internet Hours Used<br>Internet Hours Available<br>EMail accounts (aliases)<br>Web page address<br>etc. | PuK | Security Characteristics<br>Authentication Capabilities<br>Manufacturing History<br>Transactional History |
| #-####-### | Name<br>Billing Address<br>EMail Address<br>Credit Card Information | ISP Connection Means & Speed<br>Internet Hours Used<br>Internet Hours Available<br>EMail accounts (aliases)<br>Web page address<br>etc. | PuK | Security Characteristics<br>Authentication Capabilities<br>Manufacturing History<br>Transactional History |
| ... | ... | ... | ... | ... |
| #-####-### | Name<br>Billing Address<br>EMail Address<br>Credit Card Information | ISP Connection Means & Speed<br>Internet Hours Used<br>Internet Hours Available<br>EMail accounts (aliases)<br>Web page address<br>etc. | PuK | Security Characteristics<br>Authentication Capabilities<br>Manufacturing History<br>Transactional History |

| Account (Employee) Identifier (acctID) (3916) | Account Information (3940) | | Public Key Information (3918) | Device Profile Information (3970) |
|---|---|---|---|---|
| | Employee-Specific Information (3942) | Accessible Databases (3944) | | |
| #-###-###-### | Name<br>Email Address<br>Department<br>Supervisor<br>Project(s)<br>Building Location<br>Room Location<br>Computer Number | Project 1<br>Project 2<br>Project 3<br>...<br>Project n | PuK | Security Characteristics<br>Authentication Capabilities<br>Manufacturing History<br>Transactional History |
| #-###-###-### | Name<br>Email Address<br>Department<br>Supervisor<br>Project(s)<br>Building Location<br>Room Location<br>Computer Number | Project 1<br>Project 2<br>Project 3<br>...<br>Project n | PuK | Security Characteristics<br>Authentication Capabilities<br>Manufacturing History<br>Transactional History |
| ... | ... | ... | ... | ... |
| #-###-###-### | Name<br>Email Address<br>Department<br>Supervisor<br>Project(s)<br>Building Location<br>Room Location<br>Computer Number | Project 1<br>Project 2<br>Project 3<br>...<br>Project n | PuK | Security Characteristics<br>Authentication Capabilities<br>Manufacturing History<br>Transactional History |

| Account (Employee) Identifier (acctID) (4316) | Account Information (4340) | | | Public Key Information (4318) | Device Profile Information (4370) |
|---|---|---|---|---|---|
| | Employee-Specific Information (4342) | Secured Spaces (4344) | Access Requirements (4346) | | |
| #-####-####-### | Name<br>Email Address<br>Department<br>Supervisor<br>Project(s)<br>Building Location<br>Room Location<br>Computer Number | Parking Lot<br>Main Bldg.<br>Floors 1-6<br>Floors 7-10<br>Room 610<br>Other secure rooms<br>Space n | Device<br>Device+PIN<br>Device+PIN<br>Dev.+PIN+BIO<br>Device+BIO<br>None<br>None | PuK | Security Characteristics<br>Authentication Capabilities<br>Manufacturing History<br>Transactional History |
| #-####-####-### | Name<br>Email Address<br>Department<br>Supervisor<br>Project(s)<br>Building Location<br>Room Location<br>Computer Number | Parking Lot<br>Main Bldg.<br>Floors 1-6<br>Floors 7-10<br>Room 610<br>Other secure rooms<br>Space n | Device<br>Device+PIN<br>Device+PIN<br>Dev.+PIN+BIO<br>Device+BIO<br>None<br>None | PuK | Security Characteristics<br>Authentication Capabilities<br>Manufacturing History<br>Transactional History |
| #-####-####-### | Name<br>Email Address<br>Department<br>Supervisor<br>Project(s)<br>Building Location<br>Room Location<br>Computer Number | Parking Lot<br>Main Bldg.<br>Floors 1-6<br>Floors 7-10<br>Room 610<br>Other secure rooms<br>Space n | Device<br>Device+PIN<br>Device+PIN<br>Dev.+PIN+BIO<br>Device+BIO<br>None<br>None | PuK | Security Characteristics<br>Authentication Capabilities<br>Manufacturing History<br>Transactional History |

4214

| Account Identifier (acctID) (4716) | Account Information (4740) | | Public Key Information (4718) | Device Profile Information (4770) |
|---|---|---|---|---|
| | Account-Specific (4742) | Purchasing Agent - Specific (4744) | | |
| #-####-####-### | Company Name<br>Primary Contact<br>eMail Address<br>Billing Address<br>Billing Information<br>List of Purchasing Agents | Agent Name<br>Purchasing Agent (a)<br>Contact Info<br>Purchasing Restrictions | PuKa | Security Characteristics<br>Authentication Capabilities<br>Manufacturing History<br>Transactional History |
| | | Agent Name<br>Purchasing Agent (b)<br>Contact Info<br>Purchasing Restrictions | PuKb | Security Characteristics<br>Authentication Capabilities<br>Manufacturing History<br>Transactional History |
| | | ... | ... | ... |
| | | Agent Name<br>Purchasing Agent (n)<br>Contact Info<br>Purchasing Restrictions | PuKn | Security Characteristics<br>Authentication Capabilities<br>Manufacturing History<br>Transactional History |

| Account Identifier (acctID) (5116) | Account Information (5140) | | Public Key Information (5118) | Device Profile Information (5170) |
|---|---|---|---|---|
| | Customer-Specific (5142) | Account-Specific (5144) | | |
| #-####-####-### | Name<br>Address<br>SSN/Tax-ID number<br>etc. | Account Balance<br>Available Credit<br>Current Statement<br>Associated Accounts<br>etc. | PuK | Security Characteristics<br>Authentication Capabilities<br>Manufacturing History<br>Transactional History |
| #-####-####-### | Name<br>Address<br>SSN/Tax-ID number<br>etc. | Account Balance<br>Available Credit<br>Current Statement<br>Associated Accounts<br>etc. | PuK | Security Characteristics<br>Authentication Capabilities<br>Manufacturing History<br>Transactional History |
| ⋮ | ⋮ | ⋮ | ⋮ | ⋮ |
| #-###-#-###-### | Name<br>Address<br>SSN/Tax-ID number<br>etc. | Account Balance<br>Available Credit<br>Current Statement<br>Associated Accounts<br>etc. | PuK | Security Characteristics<br>Authentication Capabilities<br>Manufacturing History<br>Transactional History |

| Account Identifier (acctID) (5616) | Account Information (5640) | | Public Key Information (5618) | Device Profile Information (5670) |
|---|---|---|---|---|
| | Customer-Specific (5642) | Account-Specific (5644) | | |
| #-###-####-### | Name<br>Address<br>SSN/Tax-ID number<br>etc. | Account Balance<br>Available Credit<br>Current Statement<br>Alt. Payment Accounts<br>etc. | PuK | Security Characteristics<br>Authentication Capabilities<br>Manufacturing History<br>Transactional History |
| #-###-####-### | Name<br>Address<br>SSN/Tax-ID number<br>etc. | Account Balance<br>Available Credit<br>Current Statement<br>Alt. Payment Accounts<br>etc. | PuK | Security Characteristics<br>Authentication Capabilities<br>Manufacturing History<br>Transactional History |
| ⋮ | ⋮ | ⋮ | ⋮ | ⋮ |
| #-###-####-### | Name<br>Address<br>SSN/Tax-ID number<br>etc. | Account Balance<br>Available Credit<br>Current Statement<br>Alt. Payment Accounts<br>etc. | PuK | Security Characteristics<br>Authentication Capabilities<br>Manufacturing History<br>Transactional History |

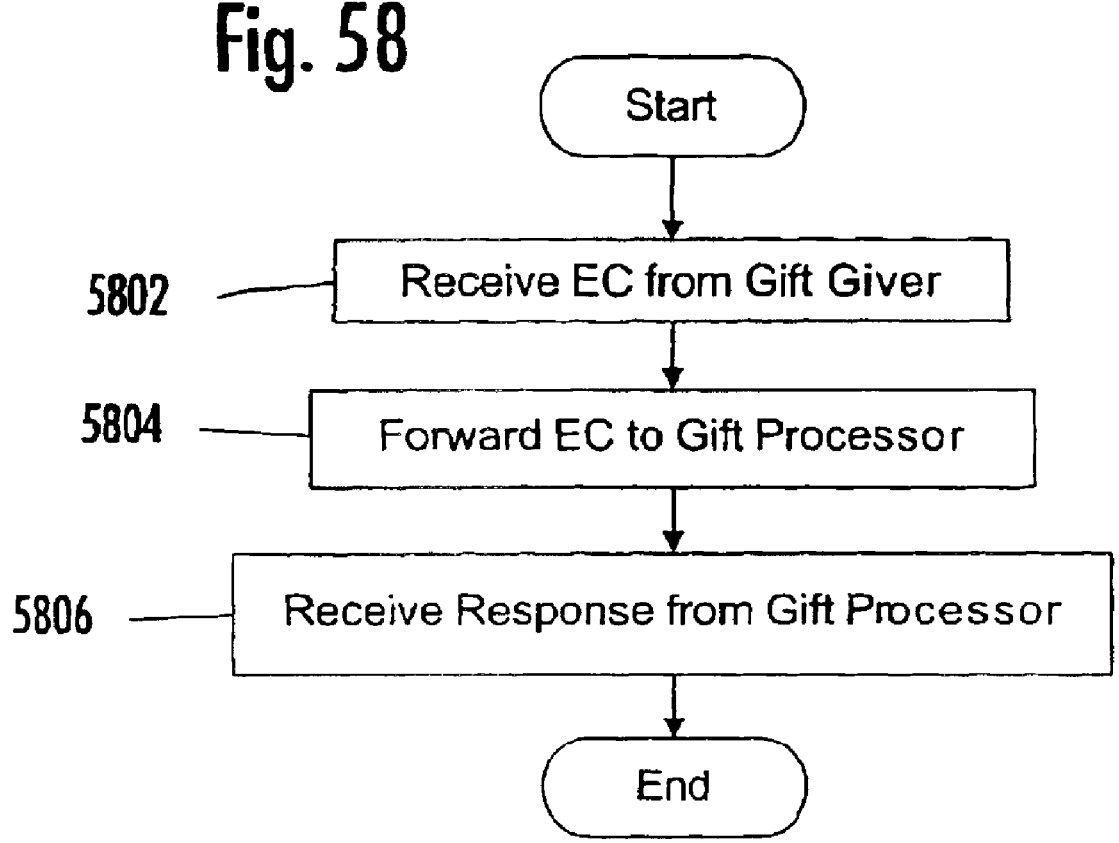

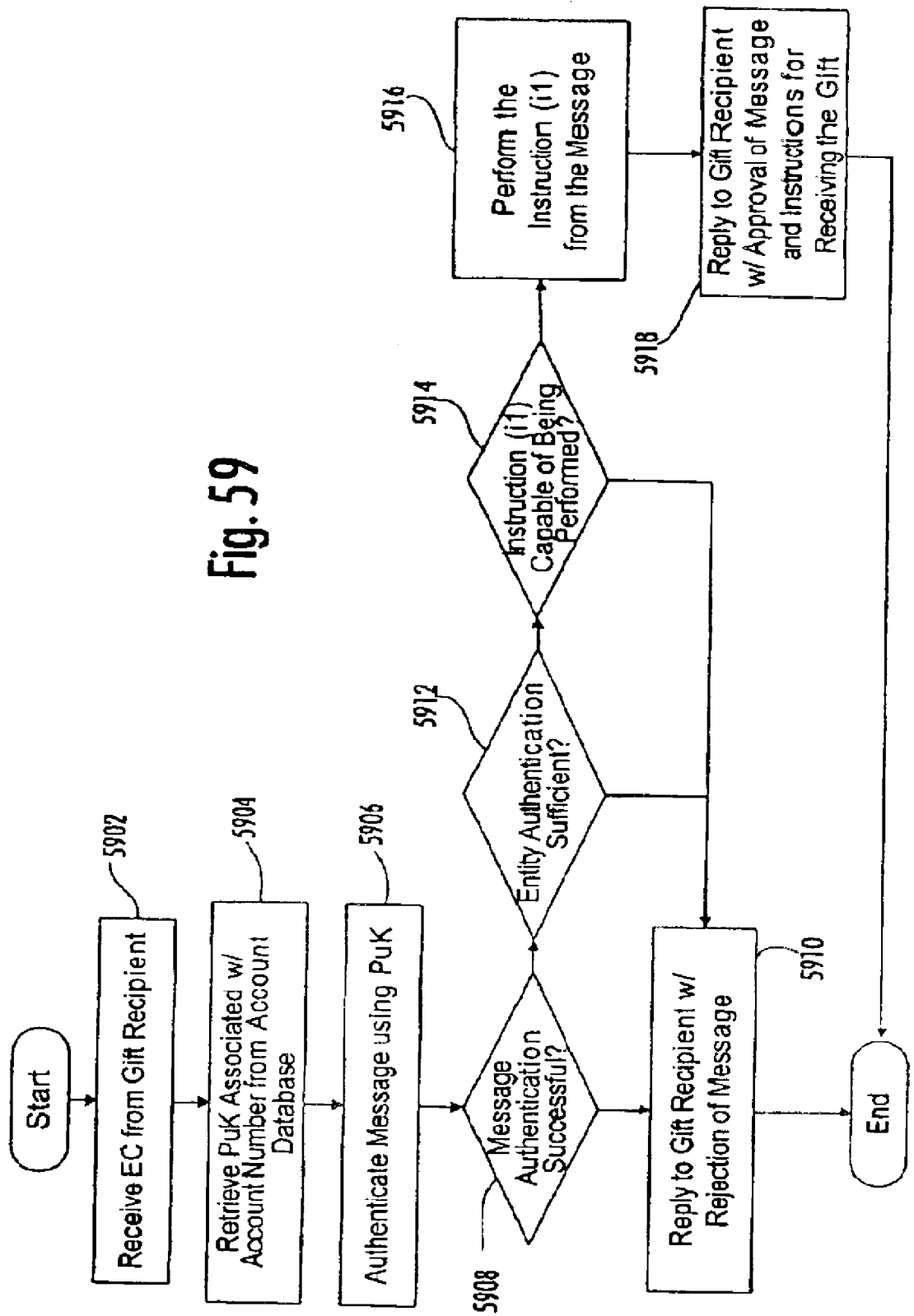

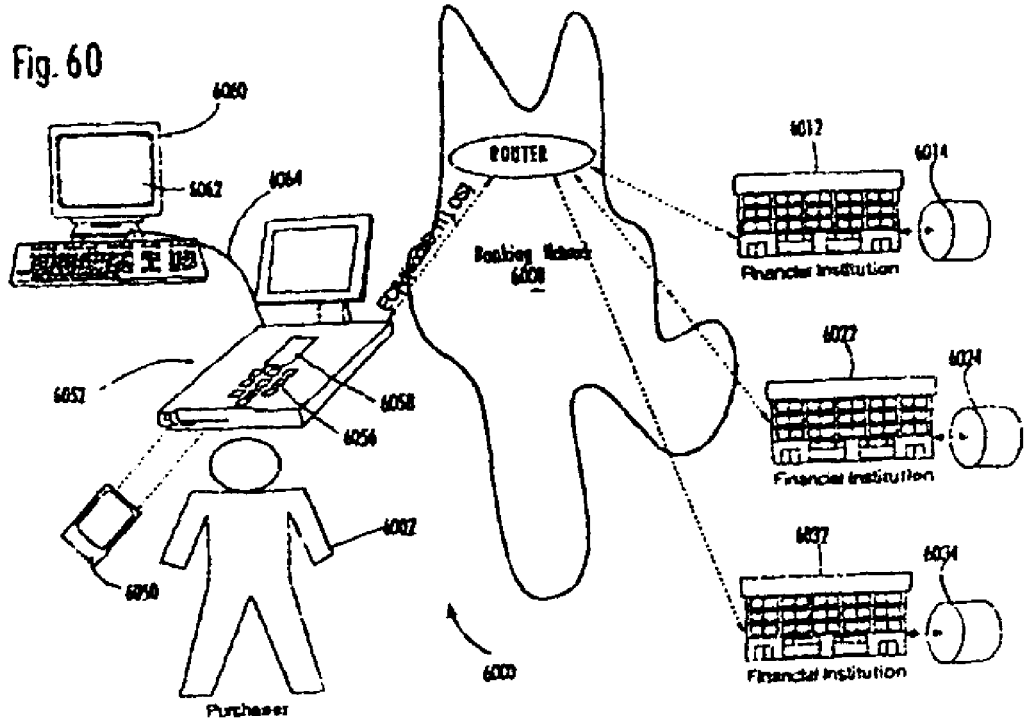

| Account Identifier (acctID) (6116) | Account Information (6140) | | Public Key Information (6118) | Device Profile Information (6170) |
|---|---|---|---|---|
| | Customer-Specific (6142) | Account-Specific (6144) | | |
| #-####-####-### | Name<br>Address<br>SSN/Tax-ID number<br>etc. | Account Balance<br>Available Credit<br>Current Statement<br>Associated Accounts<br>etc. | PuK | Security Characteristics<br>Authentication Capabilities<br>Manufacturing History<br>Transactional History |
| #-####-####-### | Name<br>Address<br>SSN/Tax-ID number<br>etc. | Account Balance<br>Available Credit<br>Current Statement<br>Associated Accounts<br>etc. | PuK | Security Characteristics<br>Authentication Capabilities<br>Manufacturing History<br>Transactional History |
| #-####-####-### | Name<br>Address<br>SSN/Tax-ID number<br>etc. | Account Balance<br>Available Credit<br>Current Statement<br>Associated Accounts<br>etc. | PuK | Security Characteristics<br>Authentication Capabilities<br>Manufacturing History<br>Transactional History |

| Account Identifier (acctID) (6416) | Account Information (6440) | Public Key Information (6418) | Device Profile Information (6470) |
|---|---|---|---|
| acctID(a) | Customer-specific information Account-specific information | PuK | Security Characteristics Authentication Capabilities Manufacturing History Transactional History |

| Account Identifier (acctID) (6416) | Account Information (6440) | Public Key Information (6418) | Device Profile Information (6470) |
|---|---|---|---|
| acctID(b) | Customer-specific information Account-specific information | PuK | Security Characteristics Authentication Capabilities Manufacturing History Transactional History |

| Account Identifier (acctID) (6416) | Account Information (6440) | | Public Key Information (6418) | Device Profile Information (6470) |
|---|---|---|---|---|
| | | Customer-specific information | PuK | Security Characteristics<br>Authentication Capabilities<br>Manufacturing History<br>Transactional History |
| acctID(c1) | Account-specific information | | | |
| acctID(c2) | Account-specific information | | | |

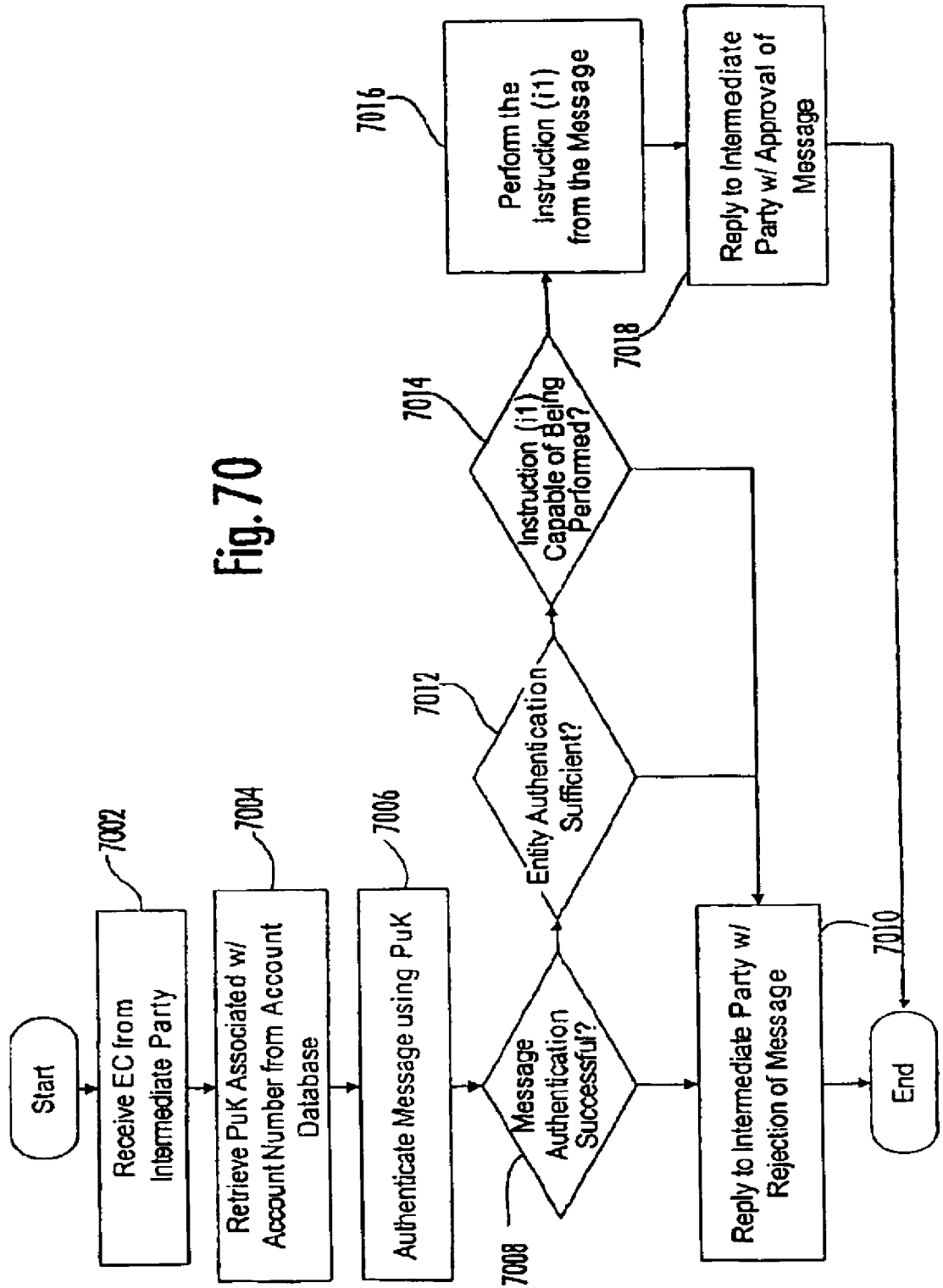

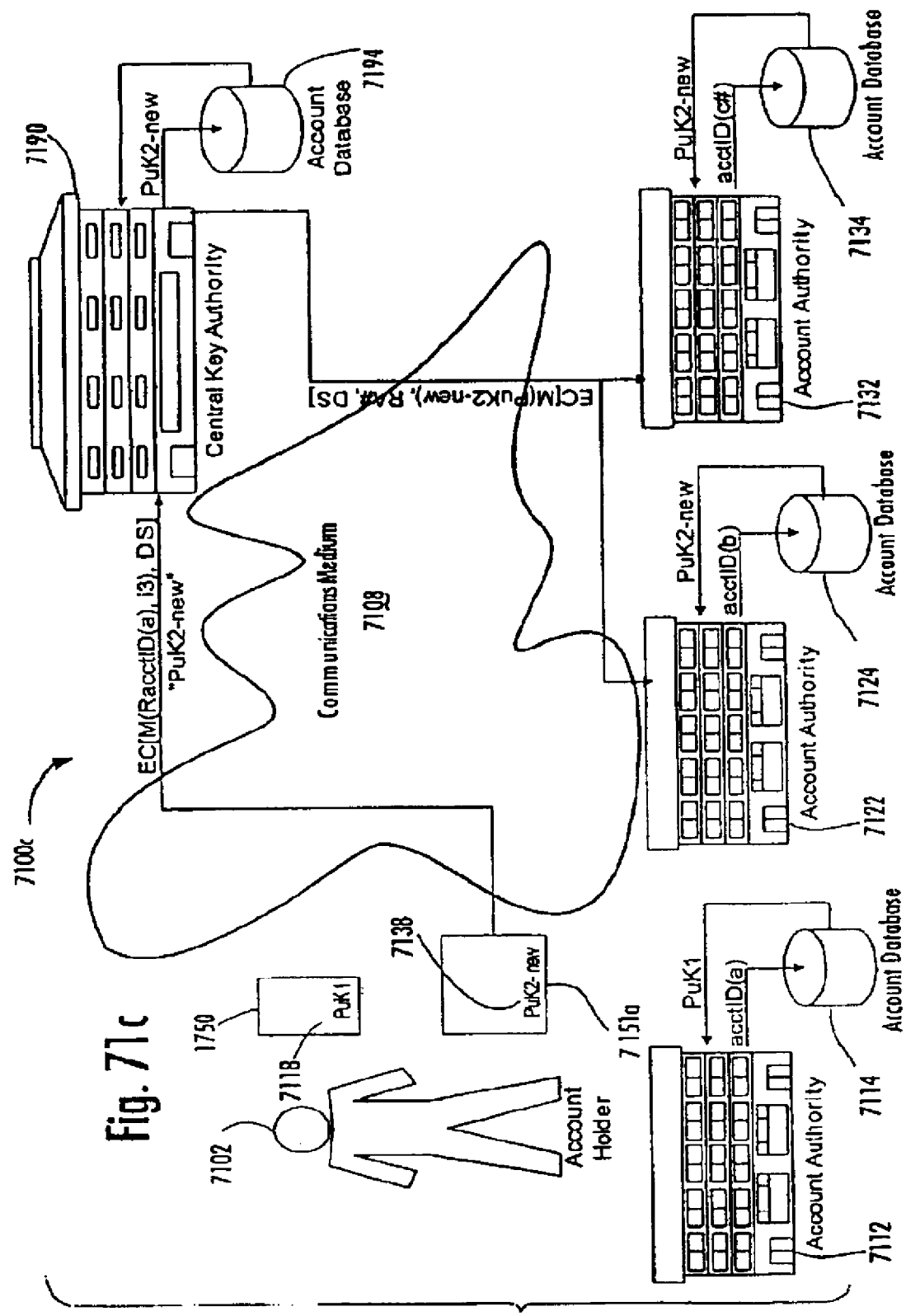

| Reg. AcctID (7230) | Customer-Specific Information (7242) | Public Key Information (7218) | Device Profile Information (7270) | Account-Specific Information (7244) |
|---|---|---|---|---|
| RacctID(a) | Name<br>SSN/Tax-ID number<br>Address<br>Credit Card Info<br>etc. | PuKa1 | Security Characteristics<br>Authentication Capabilities<br>Manufacturing History<br>Transactional History | Account Authority/Unique AcctID/Address/Type<br>(empty)<br>Account Authority/Unique AcctID/Address/Type |
| | | PuKa2 | Security Characteristics<br>Authentication Capabilities<br>Manufacturing History<br>Transactional History | Account Authority/Unique AcctID/Address/Type |
| RacctID(b) | Name<br>SSN/Tax-ID number<br>Address<br>Credit Card Info<br>etc. | PuKa3 | Security Characteristics<br>Authentication Capabilities<br>Manufacturing History<br>Transactional History | Account Authority/Unique AcctID/Address/Type<br>⋮<br>Account Authority/Unique AcctID/Address/Type |
| ⋮ | ⋮ | ⋮ | | |
| RacctID(n) | Name<br>SSN/Tax-ID number<br>Address<br>Credit Card Info<br>etc. | PuKn1 | Security Characteristics<br>Authentication Capabilities<br>Manufacturing History<br>Transactional History | Account Authority/Unique AcctID/Address/Type |
| | | PuKn2 | Security Characteristics<br>Authentication Capabilities<br>Manufacturing History<br>Transactional History | Account Authority/Unique AcctID/Address/Type |

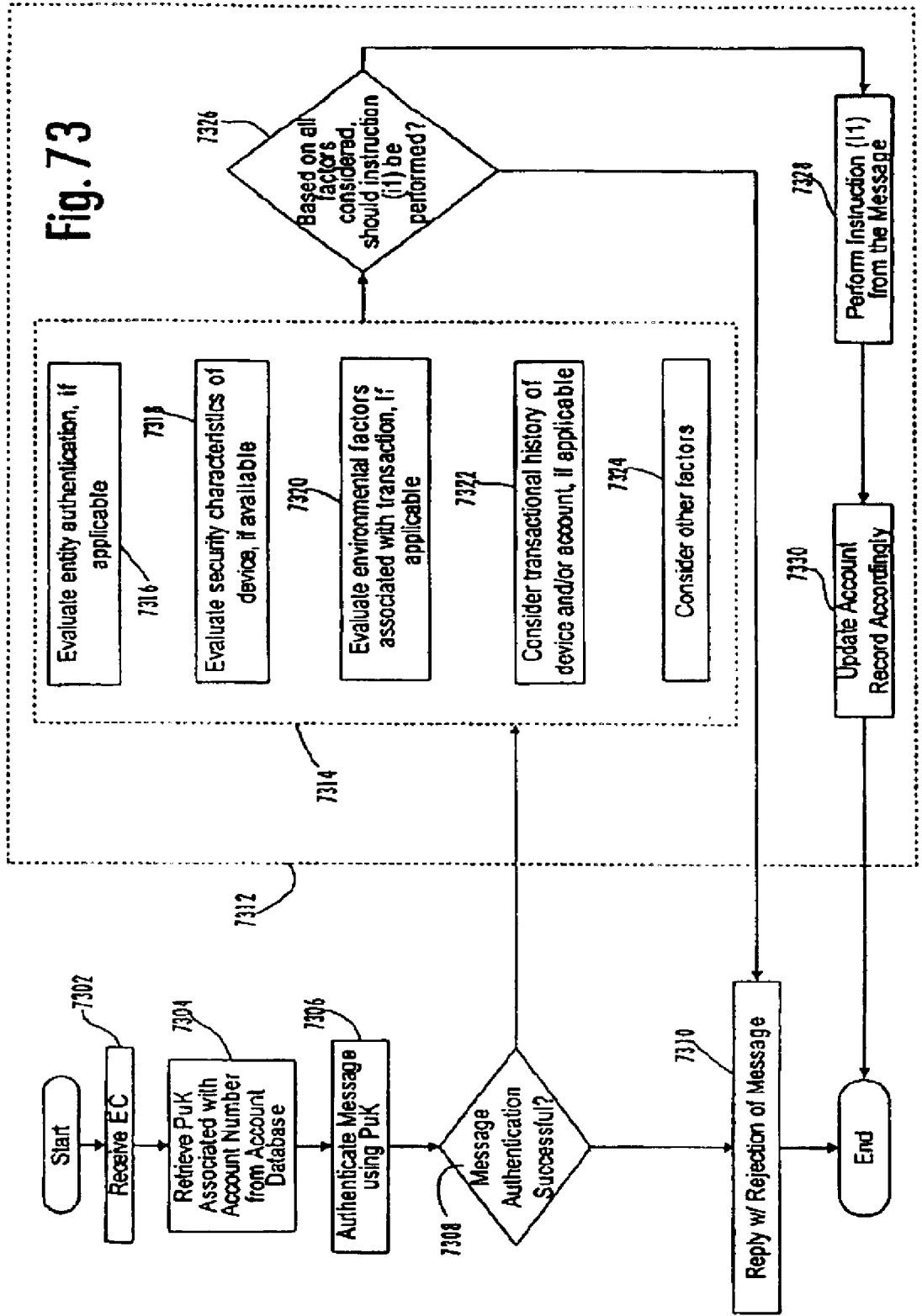

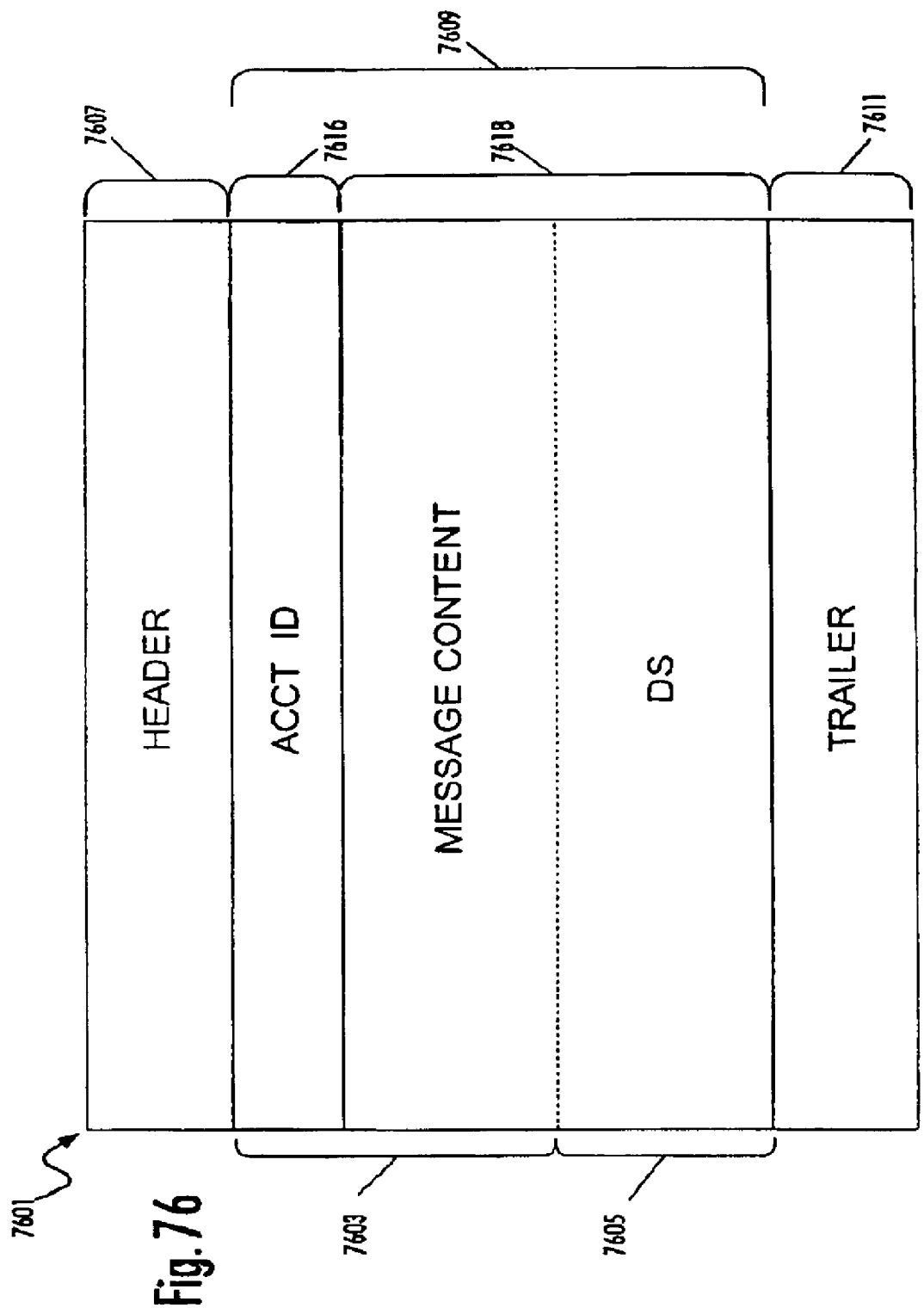

MANAGING DATABASE FOR IDENTIFYING TO RECIPIENTS SECURITY FEATURES OF DEVICES GENERATING DIGITAL SIGNATURES

CROSS REFERENCE TO THE RELATED APPLICATIONS

This patent application claims priority in the United States under 35 U. S. C. 120 to international patent application serial number PCT/US01/41587, filed Aug. 6, 2001, designating the United States and published in English, which, in turn, claims priority under 35 U. S. C. 119(e), and under the Paris Convention worldwide, to the benefit of the filing date of Wheeler et al. U.S. provisional patent application Ser. No. 60/223,076, filed on Aug. 4, 2000, both of which are incorporated herein by reference. This application also incorporates herein by reference each of three international patent applications and three U.S. patent application to Anne and Lynn Wheeler filed concurrently herewith in the U.S. Patent & Trademark Office and bearing Ser. No. 09/923,179 (titled "Account-Based Digital Signature (ABDS) System"); serial number PCT/US01/41562 (titled "Entity Authentication in Electronic Communications by Providing Verification Status of Device") and Ser. No. 09/923,075 (titled "Modifying Message Data and Generating Random Number Digital Signature Within Computer Chip") collectively referred to hereinafter as the "VS Applications"; Ser. No. PCT/US01/24572 (titled "Linking Public Key of Device to Information During Manufacture") and Ser. No. 09/923,213 (titled "Manufacturing Unique Devices That Generate Digital Signatures"); and Ser. No. PCT/US01/24563 (titled "Trusted Authentication Digital Signature (RADS) System").

BACKGROUND OF INVENTION

The present invention relates to an improved communication system in which electronic communications regarding accounts are digitally signed.

As used herein an electronic communication ("EC") is considered to be any communication in electronic form. ECs have become an integral part of transacting business today, especially with the growth of the Internet and e-commerce. An EC can represent, for example, a request for access to information or a physical area, a financial transaction, such as an instruction to a bank to transfer funds, or a legal action, such as the delivery of an executed contract.

Over recent years, digital signatures also have become an important part of e-commerce. The origination of a digital signature generally comprises: (1) the calculation of a message digest-such as a hash value; and (2) the subsequent encryption of the message digest. The message digest is encrypted by an electronic device generally using a private key of a public-private key pair used in asymmetric cryptography. The resulting ciphertext itself usually constitutes the digital signature, which typically is appended to the message to form the EC. The second part of originating the digital signature-encrypting with a private key-is referred to herein as "generating" the digital signature, and the combined two steps (i.e., calculating a message digest and encrypting with a private key) is referred to herein as "originating" the digital signature. Furthermore, while the generation of the digital signature is conventionally understood as the encryption of the message digest, it-is contemplated herein that generating the digital signature also may include simply encrypting the message rather than the message digest. Digital signatures are important because any change whatsoever to the message in an EC is detectable from an analysis of the message and the digital signature. In this regard, the digital signature is used to "authenticate" a message contained within the EC (hereinafter referred to as "Message Authentication").

For example, a message digest may be calculated by applying a hashing algorithm-such as the SHA-1 algorithm-to the message. Such hashing algorithm may be applied either within the device or external to the device with the resulting hash value then being transmitted to the device for generation of the digital signature. In order to perform the Message Authentication in this example, the recipient of the EC must know or be able to obtain both the identity of the hashing algorithm applied to the message as well as the public key ("PuK") corresponding to the private key ("PrK") used to encrypt the message digest. With this knowledge, the recipient applies the appropriate hashing algorithm to the message to calculate a hash value, and the recipient decrypts the digital signature using the public key. If the hash value calculated by the recipient equals the hash value of the decrypted digital signature, then the recipient determines that the content of the message contained in the EC was not altered in transmission, which necessarily would have changed the hash value.

In performing Message Authentication, the recipient also authenticates the sender of the EC, in so much as the recipient thereby confirms that the sender of the EC possessed the private key corresponding to the public key used successfully to authenticate the message. This is one type of entity authentication and is based on what the sender "has" (hereinafter referred to as "Factor A Entity Authentication"). Factor A Entity Authentication is useful when the recipient of the EC has trusted information regarding the identity of the owner of the private key.

This trusted information conventionally is provided based on a digital certificate issued by a trusted third party that accompanies the digital signature and binds the identity (or other attributes) of the private key owner with the public key. A digital certificate (also known as a "digital ID") is a voucher by a third party (commonly referred to as a "Certification Authority") attesting to the identity (or other attributes) of an owner of a public key. Essentially, digital certificates are the electronic counterparts to driver licenses, passports, membership cards, and other paper-based forms of identification. The digital certificate itself comprises an electronic message including a public key and the identity of the owner of the public key. A digital certificate also typically contains an expiration date for the public key, the name of the Certification Authority, a Ser. No. of the digital certificate, and a digital signature of the Certification Authority. One of the reasons for an expiration date is to limit the liability for the Certification Authority due to the likelihood that attributes other than the identity may change over time. The most widely accepted format for digital certificates is defined by the CCITT X.509 international standard; thus, certificates can be read or written by any application complying with X.509. Based on a digital certificate included in an EC, a recipient is able to authenticate the digital certificate using a public key of the Certification Authority and thereby, presumably, confirm the identity of the owner set forth therein.

The system wherein a digital certificate is included in an EC comprises a "public key infrastructure" (PKI) commonly referred to as the "Certification Authority Digital Signature" (CADS) system. A particular implementation 100 of the CADS system in the context of an electronic transaction between a purchaser 102 and an online merchant 110 is illustrated in FIG. 1. Under this system, a purchaser 102 using, for example, a computer 104 creates a purchase order in the form of an electronic message. The purchaser 102 includes in the message relevant account information of a financial institution 112 from which payment is to be made to the merchant 110. The account information includes, for example, a credit card number and expiration date as well as the name on the card. Software on the purchaser's computer 104 then originates a digital signature for the message using a private key of the purchaser 102 safeguarded in the computer 104. The software also maintains a digital certificate on the computer 104 issued by a Certification Authority 106a. The message, digital signature, and digital certificate then are combined into an EC, and the EC is communicated over the Internet 108 to the merchant 110.

Upon receipt, the merchant 110 authenticates the message using the public key in the digital certificate. If successful, the merchant 110 then authenticates the digital certificate using a public key of the Certification Authority 106a. Successful authentication of the digital certificate may satisfy the merchant 110 that the purchaser—the sender of the EC—is the owner identified in the digital certificate. If the merchant 110 is so satisfied, then the merchant 110 submits the account information to the relevant financial Institution 112 for an approval for payment to the merchant 110 from the account. Upon receipt from the financial institution 112 of approval for payment, the merchant 110 fills the purchase order of the purchaser 102. Furthermore, confirmation of approval (or rejection) of the purchase order preferably is sent from the merchant 110 to the purchaser 102.

Unfortunately, while the CADS system enables two parties who otherwise may not have a preexisting relationship with one another to communicate with each other with the confidence of knowing the other's identity, the CADS system does have its drawbacks. For example, a digital certificate typically is issued with an expiration date, and an expired digital certificate generally is not recognized in the industry. Furthermore, if a private key is lost or stolen, then the owner of the private key must notify the Certification Authority to revoke the owner's digital certificate; however, a recipient of an EC with a digital certificate will only know of the revocation of the digital certificate if the recipient cross-references the Ser. No. of the digital certificate against a certificate revocation list (CRL) published by the Certification Authority. Another drawback to the CADS system is that the digital certificate itself is only as good as the particular authority that issues it, and it often is necessary to obtain multiple digital certificates (i.e., from Certificate Authorities 106a, 106b to 106n) in order to create a sufficient "chain" or "network" of trust between the purchaser 104 and merchant 110 for a transaction or communication to be accepted and acted upon. Additionally, the entire CADS system rests upon the secrecy of the private key of the Certification Authority issuing a digital certificate, which, if compromised, collapses the CADS system.

In the context of an EC regarding an account, such as the example of an online purchase set forth above, another drawback of the CADS system is that the account information must be encrypted or otherwise protected if sent over an insecure communications medium, such as the Internet 108. In the example above, a hacker eavesdropping on the communication of the account information could obtain sufficient information to make fraudulent charges to the account of the purchaser, especially as not all merchants require a digital signature and digital certificate to fill a purchase order. Moreover, financial institutions have yet to standardize a requirement that a digital certificate of a purchaser be submitted as a condition precedent to approving a payment request by a merchant; instead, in determining whether a purchaser actually has the authority to effect payment to a merchant, a financial institution relies upon the personal account information provided by the merchant, and whether the account information has been reported lost or stolen. Further, digital certificates raise significant privacy issues in many circumstances.

Accordingly, a need exists for an improved system of communication using digital signatures, especially wherein an EC pertains to an account upon which the person (or device) digitally signing the EC has authority to act.

SUMMARY OF INVENTION

Briefly summarized, a method of communicating electronically over a communications medium regarding accounts includes for each of two separate accounts maintained by separate third parties, the steps of: maintaining information pertaining to the account in an account database such that the information is retrievable based on a unique identifier, associating a public key of a public-private key pair with the unique identifier, generating a digital signature for an electronic message using a private key of the public-private key pair, the electronic message including an instruction and the unique identifier, authenticating the electronic message using the public key associated with the information identified by the unique identifier, and upon the successful authentication of the electronic message, executing the instruction with respect to the account represented by the information that is identified by the unique identifier.

The present Invention also Includes a method of maintaining a Central Key Authority (CKA) database. The CKA database includes account information of users such as a public key of a user device that generates digital signatures, and third-party account identifiers each of which identifies to a third-party an account of the user that is maintained with the third-party and that has been associated with the user's public key by the third-party.

The present invention also encompasses a method of managing a database for identification of security features of a device that generates digital signatures, and includes the steps of recording in the database for each of a plurality of devices a public key of a pair of public-private keys of the device and information including security features of the device, the security features being associated with the public key in the database; and identifying security features from the database to a recipient of an electronic message for which a digital signature was originated utilizing a private key of the public-private key pair of a particular one of the devices, the security features being for the particular device.

BRIEF DESCRIPTION OF DRAWINGS

Further features and benefits of these aspects of the present invention will be apparent from a detailed description of preferred methods thereof taken in conjunction with the following drawings, wherein like references refer to like elements.

FIG. 2a illustrates an account database maintained by an account authority for use with an ABDS system.

FIG. 2b illustrates another account database maintained by an account authority for use with an ABDS system.

FIG. 5a illustrates a flowchart of one embodiment of preferred steps for converting an existing account into an ABDS account in accordance with the first aspect of the present invention.

FIG. 5b illustrates a flowchart of another embodiment of preferred steps for converting an existing account into an ABDS account in accordance with the first aspect of the present invention.

FIG. 7 illustrates an account database maintained by an account authority for use with the business application of FIG. 6.

FIG. 11 illustrates an account database maintained by an account authority for use with the business application of FIG. 10.

FIG. 15 illustrates an account database maintained by an account authority for use with the business application of FIG. 14.

FIG. 19 illustrates an account database maintained by an account authority for use with the business application of FIG. 18.

FIG. 23 illustrates an account database maintained by an account authority for use with the business application of FIG. 22.

FIG. 27 illustrates an account database maintained by an account authority for use with the business application of FIG. 26.

FIG. 31 illustrates an account database maintained by an account authority for use with the business application of FIG. 30.

FIG. 35 illustrates an account database maintained by an account authority for use with the business application of FIG. 34.

FIG. 39 illustrates an account database maintained by an account authority for use with the business application of FIG. 38.

FIG. 43 illustrates an account database maintained by an account authority for use with the business application of FIG. 42.

FIG. 47 illustrates an account database maintained by an account authority for use with the business application of FIG. 46.

FIG. 51 illustrates an account database maintained by an account authority for use with the business application of FIG. 50.

FIG. 56 illustrates an account database maintained by an account authority for use with the business application of FIG. 55.

FIG. 58 illustrates a flowchart of steps performed by an intermediate party in the business application of FIG. 55.

FIG. 59 illustrates a flowchart of steps performed by an account authority in the business application of FIG. 55.

FIG. 60 illustrates a third business/consumer application in accordance with another preferred embodiment of the first aspect of the present invention.

FIG. 61 illustrates an account database maintained by an account authority for use with the business application of FIG. 60.

FIG. 64*a* illustrates an account database maintained by an account authority for use with the system of FIG. 64.

FIG. 64*b* illustrates another account database maintained by an account authority for use with the system of FIG. 64.

FIG. 64*c* illustrates a third account database maintained by an account authority for use with the system of FIG. 64.

FIG. 70 illustrates a flowchart of steps performed by an account authority in the system of FIG. 67.

FIG. 71*c* illustrates yet another preferred ABDS system in accordance with the third aspect of the present invention.

FIG. 72 illustrates an account database maintained by an account authority for use with the system of FIG. 71*a*.

FIG. 73 illustrates a flowchart of steps performed by an account authority in accordance with the fourth aspect of the present invention.

FIG. 76 illustrates an electronic communication format or layout in accordance with the various aspects of the present invention.

DETAILED DESCRIPTION

Figure 1:
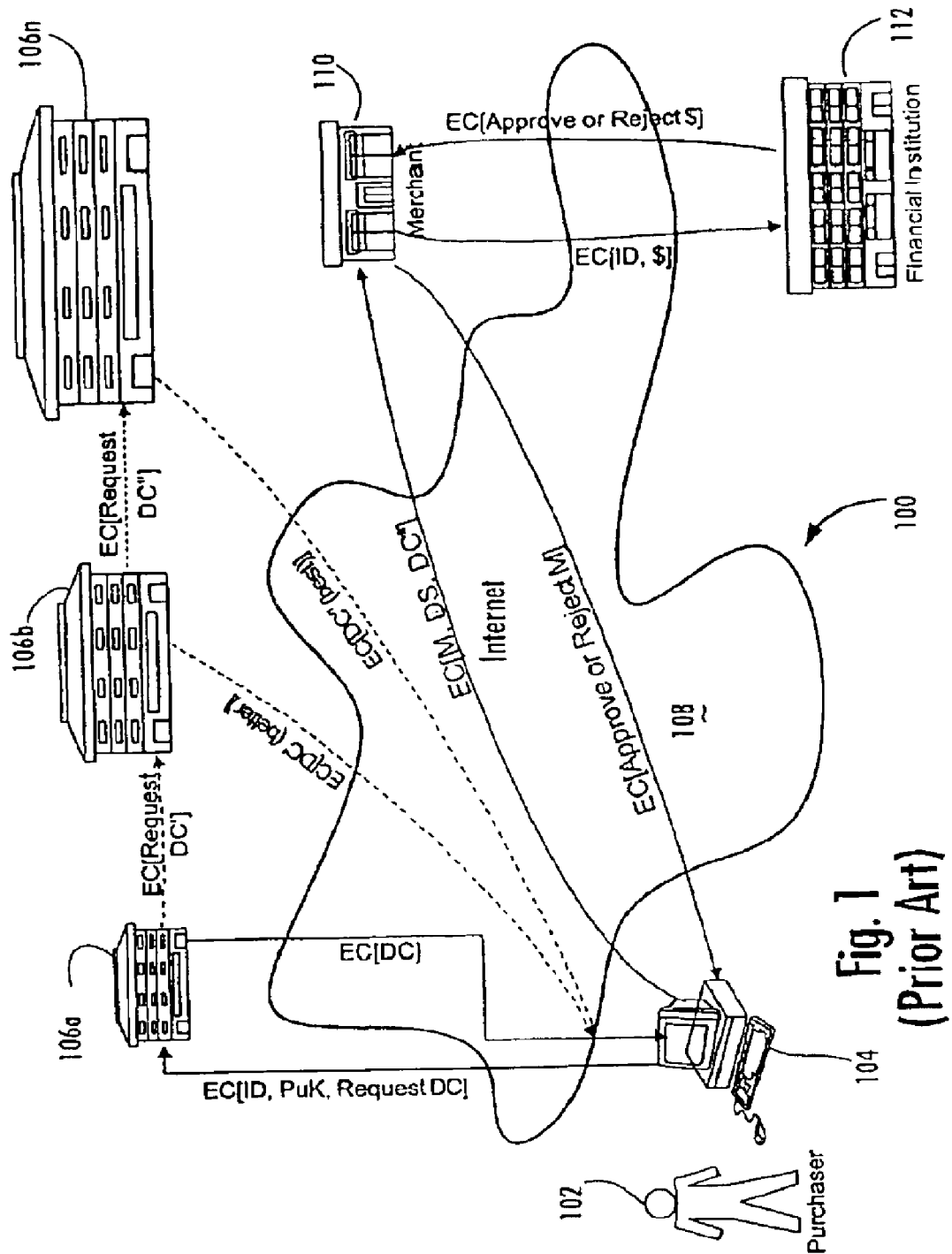
FIG. 1 illustrates a prior art Certification Authority Digital Certificate (CADS) system.

As a preliminary matter, it readily will be understood by those persons skilled in the art that, in view of the following detailed description of the devices, systems, and methods of the present invention, the present invention is susceptible of broad utility and application. Many embodiments and adaptations of the present invention other than those herein described, as well as many variations, modifications, and equivalent arrangements, will be apparent from or reasonably suggested by the present invention and the following detailed description thereof, without departing from the substance or scope of the present invention. Accordingly, while the present invention is described herein in detail in relation to preferred embodiments, it is to be understood that this detailed description only is illustrative and exemplary of the present invention and is made merely for purposes of providing a full and enabling disclosure of the present invention. The detailed description set forth herein is not intended nor is to be construed to limit the present invention or otherwise to exclude any such other embodiments, adaptations, variations, modifications and equivalent arrangements of the present invention, the present invention being limited solely by the claims appended hereto and the equivalents thereof.

Those skilled in the art will understand and appreciate that the sequence(s) and/or temporal order of the steps of various processes described and claimed herein are those considered by the inventors to be the best mode contemplated by them for carrying out the inventions. It should also be understood that, although steps of various processes are shown and described in some cases as being in a preferred sequence or temporal order, the steps of such processes are not limited to being carried out in any particular sequence or order, absent a specific indication that a step or steps should be carried out in a particular sequence or order to achieve a particular intended result. In most cases, the steps of such processes may be carried out in various different sequences and orders, while still falling within the scope of the present inventions.

Accordingly, while much of the present invention is described in detail herein with respect to computers, networks, integrated circuits, computer chips, and devices, no specific software or logic circuit is intended nor is required to be used in the practicing of the present invention. Indeed, it would be a matter of routine skill to select appropriate computers, networks, integrated circuits, computer chips, and devices in implementing the invention in a particular business application.

The present invention broadly comprises the association of a public key of a device that originates digital signatures using asymmetric cryptography to other information in an account database record in general, a method in accordance with the first aspect of the present invention includes electronically communicating a message over a communications medium regarding an account that is associated with a public key, the corresponding private key of which is used to digitally sign the message. A method in accordance with the second aspect of the present invention includes associating multiple accounts with the same public key. A method in accordance with the third aspect of the present invention includes maintaining a central database of information on all accounts associated with the same public key. Finally, a method in accordance with the fourth aspect of the present invention includes applying dynamic risk analysis to a specific message to gauge the risk that the digital signature for the message was fraudulently originated and, thus, to determine whether or not to perform an instruction contained within the message.

As used herein, an "account holder" is generally any person possessing a device that is capable of generating a digital signature using a private key retained therein; the private key corresponding with a public key associated with an account upon which the person is authorized to act. An "account authority" is generally a person, entity, system, or apparatus that maintains such an account on behalf of the account holder in some embodiments, the "account holder" is, itself, a device that is capable of generating a digital signature using a private key retained therein; the private key corresponding with a public key associated with an account upon which the device is authorized to act.

Having briefly described the methodologies of the various aspects of the present invention, general and specific implementations of two-party, three-party, and multiple-party Account-based Digital Signature (ABDS) systems now will be described in greater detail.

Figure 2:
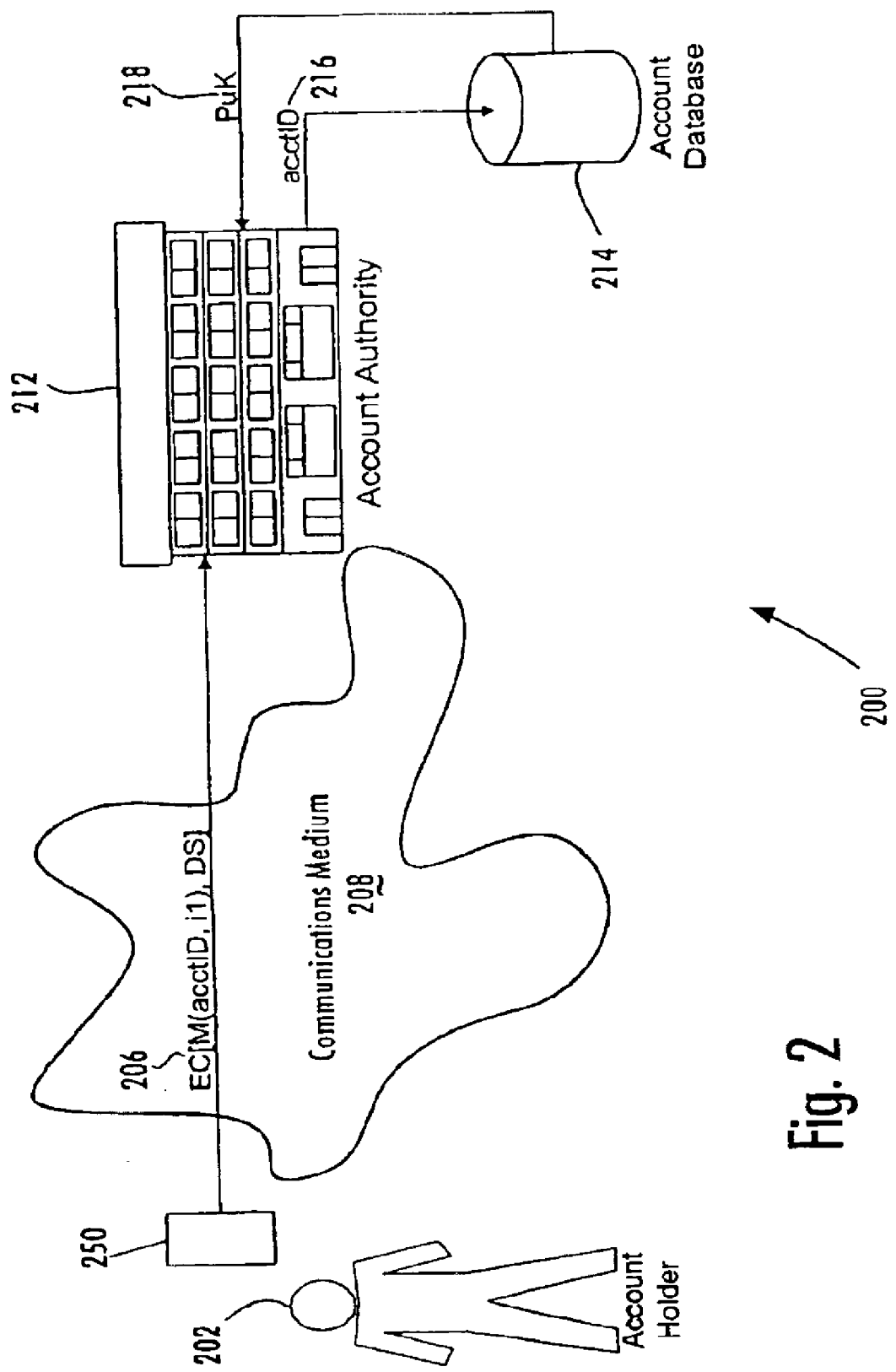
FIG. 2 illustrates a preferred Account-based Digital Signature (ABDS) system in accordance with a first aspect of the present invention.

1. Account-based Digital Signature (ABDS) Systems a. General 2-Party ABDS Systems FIG. 2 illustrates a preferred Account-based Digital Signature (ABDS) system 200 in accordance with a first aspect of the present invention. Specifically, FIG. 2 illustrates a two-party ABDS system that includes an account holder 202 and an account authority 212. As shown, the account holder 202 comprises a person who possesses a device 250, which securely protects a unique private key of a public-private key pair therein. The account authority 212 comprises an entity or system that maintains one or more account databases, collectively referred to and illustrated by account database 214, which includes an account of the account holder 202. Preferably, the account is identifiable within the account database 214 based on a unique identifier (acctID) 216, such as an account number. Further, the account authority 212 maintains an association between the account and the public key 218, which corresponds with the private key that is securely retained within the device 250 of the account holder 202.

Communications between the account holder 202 and account authority 212 regarding the account of the account holder 202 occur through any conventional communications medium 208, such as the Internet, an intranet, a wireless network, a dedicated hardwired network, or the like. Each communication is electronic, and each electronic communication ("EC") 206 from the account holder 202 to the account authority 212 includes an electronic message (M) that is digitally signed by the account holder 202 using the private key retained within the device 250. The means by which the device 250 communicates with the account authority 212 varies by the form factor of the device 250 and whether or not the device 250 is used in conjunction with a separate I/O support element (not shown) to assist in the generation or creation of the message, in the transmission or communication of the EC to the account authority 212, or both.

The message preferably includes the unique identifier (acctID) 216 of the account of the account holder 202 and an instruction (i1) for the account authority 212 to perform in relation to the account. The digital signature of the message also preferably includes a unique random number or session key, such as, for example, a date and time stamp, so that no two digital signatures originated by the device 250 would ever be identical (and also so that any duplicate digital signature received by the account authority 212 could be identified as such and disregarded).

Using the unique identifier (acctID) 216, the account authority 212 is able to retrieve the associated public key 218, which is necessary for authenticating the message and the sender of the EC 206 (i.e., based on Factor A Entity Authentication). In accordance with this first aspect of the present invention, upon the successful authentication of the message and of the sender of the EC 206, the account authority 212 performs (or attempts to perform) the instruction (i1) of the message as if the account holder 202 had presented such instruction (i1) in person.

Advantageously, since the unique identifier (acctID) 216 is all that must be included in the message in order for the account authority 212 to retrieve the appropriate public key 218 from the account database 214 for the purpose of authenticating the message and sender of the EC 206 and for having sufficient authorization from the account holder 202 for performing the instruction (i1) contained in the message, the account holder 202 need not include any "identity" information in the message. In addition, since the account authority 212 preferably will not perform any action on the account of the account holder 202 without a valid digital signature originated by the device 250 (or, alternatively, without the actual, physical presence of the account holder 202) and since no "identity" information needs to be included in electronic communications between the account holder 202 and the account authority 212 regarding the account, such electronic communications, including EC 206, may be transmitted in unencrypted fashion over an insecure communications medium 208 (such as the Internet) without risk of compromising the privacy of the account holder 202. Obviously, if the account holder 202 desires to protect the contents of the information contained within the EC 206 for privacy, confidentiality, or similar reasons, the EC 206 may be encrypted by the account holder 202 in conventional manner, for example, using the public key of the account authority 212 for PGP-type encryption, using secure socket layering (SSL), or other similar encryption techniques; however, encrypting the contents of the EC is not necessary for the functioning of the present invention.

FIG. 2a illustrates a plurality of possible relationships among the information contained within account database 214. Generally, each account within the database 214, for example, is identified by its account identifier (acctID) 216 and has associated therewith account information 240, such as information specific to the account holder (hereinafter "customer-specific information") and information specific to the account (hereinafter "account-specific information"), and public key information 218. At a minimum, the public key information 218 identifies each public key (PuK) associated with each particular account and/or account identifier 216. As shown, database 214 maintains a plurality of specific accounts 281,282,283,284,285,288, with a plurality of accounts (not shown but indicated by the " . . . ") existing between accounts 285 and 288. Accounts 281,288 illustrate a first account setup type in which each account has a single customer or account holder and in which each account has a single public key (PuK) associated for use therewith. Account 282 illustrates a second account setup type in which the account 282 has a single customer or account holder associated therewith, but the account holder has a plurality (two, in this case) of different public keys (PuK) associated for use with the account 282. Such a setup is beneficial, for example, when an account holder uses more than one device of the present invention for access to the same account 282.

A third account setup type is illustrated in association with accounts 283,284. Each of these accounts 283,284 has the same account holder, who uses a single public key to access either or both of these accounts 283,284. Such a setup is beneficial, for example, when an account holder maintains a plurality of accounts (in this case, two) with a single account authority (e.g., primary and secondary bank accounts with the same financial institution). This particular setup is discussed in greater detail in the "person-centric device" section set forth herein with regard to FIGS. 64–70. A fourth account setup type is illustrated in association with account 285. Account 285 has associated therewith a plurality of different customers or account holders (three, in this case), each of whom has a different public key (PuK) for accessing the account 285. Such a setup is beneficial, for example, when an account has two or more authorized users (e.g., husband and wife with access to a joint account; plurality of employees with access to their employer's account). A specific business implementation using this type of account setup is illustrated and discussed in association with FIGS. 46–49.

Although not shown in FIG. 2a, it should be apparent that the above four account setup types may be further combined with each other in a variety of permutations and still fall within the scope and intent of the present invention. As one example of such a combination not shown in FIG. 2a, one of the customers accessing account 285 could, in fact, have more than one public key for accessing the joint account 285.

Turning now to FIG. 2b, in a further feature of the present invention, account database 214 may also include Device Profile Information 270. Each Device Profile includes the Security Profile and transactional history of the device. The Security Profile includes the security features and manufacturing history of the device. The security features include those features of the device that protect the private key and other data within the device from discovery ("Security Characteristics") and features that perform entity authentication ("Authentication Capabilities"). Information contained in the Security Profile is described in greater detail herein in Section VI.4, entitled "Applying Dynamic Risk Analysis to a Transaction." Since it is contemplated that a unique private key associated with the corresponding public key 218 maintained with the account database 214 only exists in a single device of the present invention, there is a one-to-one correspondence between each public key 218 and its respective device profile information 270. Further, additional security is obtained with a device that is incapable of divulging its private key.

b. General 3-Party ABDS Systems

Figure 3:
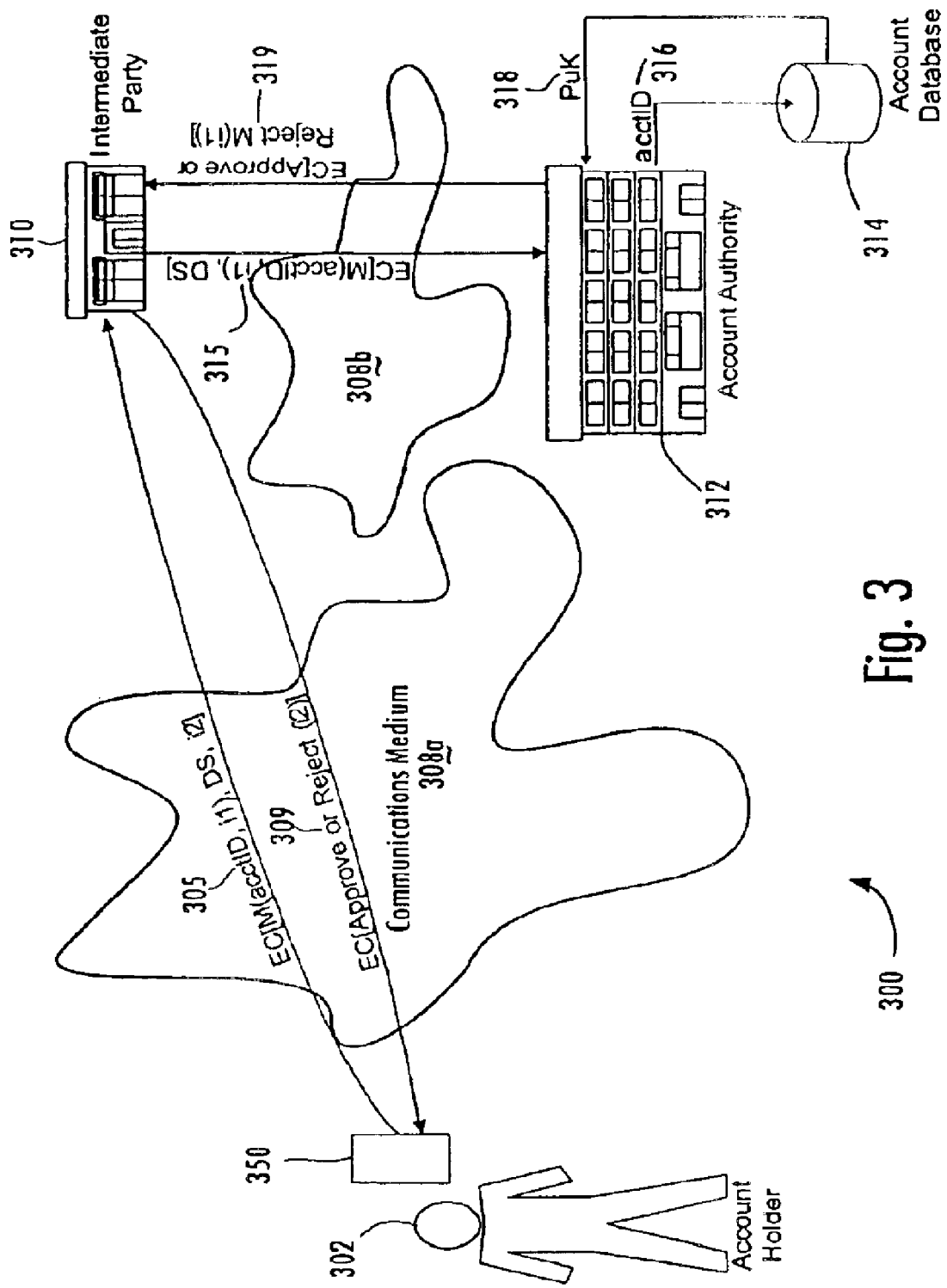
FIG. 3 illustrates another preferred ABDS system in accordance with the first aspect of the present invention.

FIG. 3 illustrates a preferred three-party ABDS system 300 and includes an account holder 302 and account authority 312 as well as an intermediate party 310. The three-party ABDS system 300 differs from the two-party ABOS system 200 (from FIG. 2) in that the message and digital signature from the account holder 302 to the account authority 312 is communicated first to the intermediate party 310 by means of an EC 305. The intermediate party 310 then forwards the same message and digital signature in another EC 315 to the account authority 312.

An instruction (i2) is communicated from the account holder 302 to the intermediate party 310, either as part of the EC 305 or as a separate EC (not shown). The intermediate party 310 does not act upon the instruction (i2) but rather, forwards the EC 315 to the account authority 312 and waits for the account authority 312 to approve or reject the message. As shown, the message and digital signature in EC 315 are the same as the message and digital signature in EC 305.

Upon receipt of the EC 315, the account authority 312 attempts to authenticate the message and the sender of EC 305 using the public key of the public-private key pair, which is retrieved from the account database 314 based on the unique identifier (acctID) 316 from the message. If the authentication is successful, the account authority 312 performs (or attempts to perform) the instruction (i1) of the message as if the account holder 302 were presenting the instruction (i1) in person. Based on the results of the attempted authentication of the message and the sender of the EC and based on the attempted execution of instruction (i1), the account authority 312 provides the intermediate party 310 with notification of approval or rejection of the message by means of a reply EC 319. If reply EC 319 indicates an approval of the message, the intermediate party 310 then executes the instruction (i2) received from the account holder 302. Preferably, the intermediate party 310 then notifies the account holder 302 either of the approval and execution of instruction (i2) or of the rejection of the instruction (i2) by means of reply EC 309.

Again, it should be noted that no "identity" information needs to be included in the EC 305 by the account holder 302 under this system 300. In addition, all of the ECs 305,315, 309,319 may be transmitted in unencrypted fashion over any conventional communications mediums 308a,308b, such as the Internet, an intranet, a wireless network, a dedicated hardwire network, and the like, for the same reasons discussed above with regard to system 200 in FIG. 2. Also, as discussed above, if the parties desire to protect the contents of the information contained within the various ECs 305, 309,315,319 for privacy, confidentiality, or similar reasons, such ECs may be encrypted by the sender of the particular EC in conventional manner, for example, using the public key of the intended recipient(s) of the particular EC for PGP-type encryption, using secure socket layering (SSL), or other similar encryption techniques; however, encrypting the contents of the various ECs Is not necessary for the functioning of the present invention. Further, the communication mediums 308a,308b may be different from each other (as illustrated) or part of the same medium.

c. Multiple-Party ABDS Systems

Although not shown specifically in FIGS. 2 and 3, it should be understood that one or more additional parties or entities may be introduced along the communication route between the account holder, intermediate party, and account authority within the scope of the present invention. Among other things, such additional parties may be useful for expediting, screening, and correctly routing electronic communications between the various account holders, intermediate parties, and account authorities.

d. General Account Set-up in ABDS Systems

Of course, before either ABDS system 200,300 is utilized in practice, the account holder 202,302 first must establish an ABDS account with the appropriate account authority 212,312. The steps involved in establishing a new ABDS account are set forth in FIGS. 4a and 4b. The steps involved in converting a pre-existing (and conventional) account into an ABDS account are set forth in FIGS. 5a and 5b.

i. Establishing a New ABDS Account

Figure 4A:
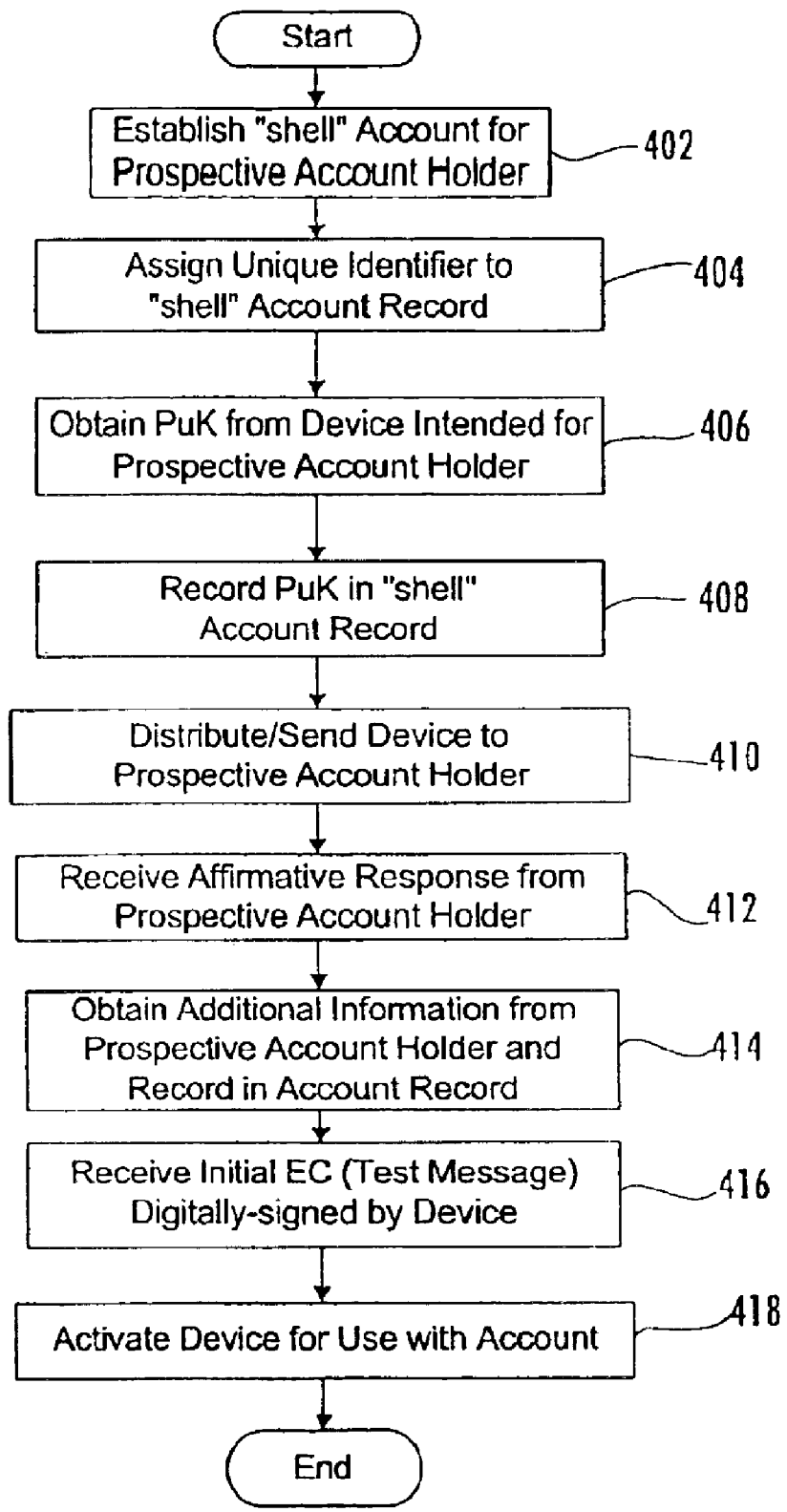
FIG. 4a illustrates a flowchart of one embodiment of preferred steps for establishing a new ABDS account in accordance with the first aspect of the present invention.

Referring first to FIG. 4a, one exemplary process of establishing a new account within the ABDS system is illustrated. In this particular embodiment, the process is initiated by an account authority. For example, the account authority first establishes (Step 402) a "shell" account for a prospective account holder using publicly available information about the prospective account holder, such as name and address. The account authority next assigns (Step 404) a unique account identifier to the "shell" account and associates it therewith. The account authority then obtains (Step 406) the public key from a device of the present invention and records (Step 408) the public key in the account database and associates it with the "shell" account or with the unique identifier. In some embodiments of the present invention, the unique identifier may actually be the public key from the device or a hashed version of the public key. The account authority then distributes or sends (Step 410) the device that retains the private key corresponding with the public key associated with the "shell" account to the prospective account holder with an offer to "open" an account on behalf of the prospective account holder with the account authority and with instructions for doing so. The account authority then waits for a response from the prospective account holder.

If a response is received (Step 412), the account authority uses conventional authentication techniques to confirm that it is communicating with the prospective account holder. The account authority then obtains (Step 414) additional information, as needed, to populate the account record. The account authority then requires (Step 416) the prospective account holder to transmit a test message that is digitally signed using the device. Such test message confirms that the prospective account holder possesses the correct device. If the test message confirms, then the device is "activated" (Step 418) for use with the associated account.

Figure 4B:
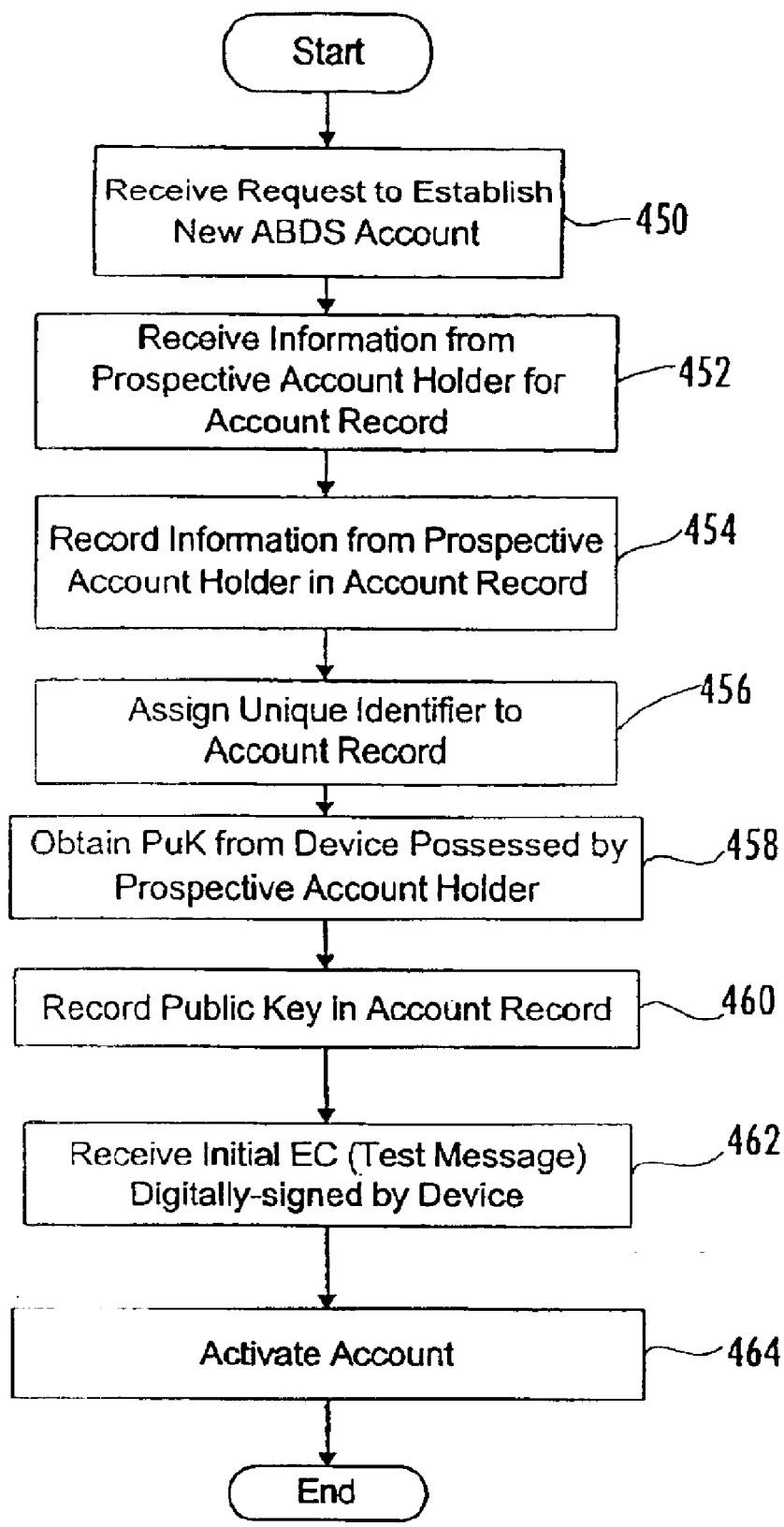
FIG. 4b illustrates a flowchart of another embodiment of preferred steps for establishing a new ABDS account In accordance with the first aspect of the present invention.

In an alternative embodiment, setup of a new ABDS account may be initiated by a prospective account holder who already possesses a device of the present invention, as illustrated in FIG. 4b. For example, an account authority may receive (Step 450) a request to establish a new ABDS account from such a prospective account holder. If the account authority is willing to accept such a prospective account holder who already possesses such a device, the account authority receives (Step 452) sufficient information from the prospective account holder to establish such an account. In some business applications, it is not necessary for the prospective account holder to divulge any "identity" information in order to establish such an account. The account authority then records (Step 454) whatever information is provided by the prospective account holder in a record of the account database of the account authority and assigns (Step 456) a unique identifier, such as an account number, to the account.

Next and preferably contemporaneously, the account authority obtains (Step 458) the public key that corresponds with the private key that is securely retained on the device. In some business applications, the public key is obtained directly from the device in response to a suitable request submitted to the device. In other business applications, the public key is obtained from a database maintained by a third party, such as a Central Key Authority (as discussed below with reference to FIGS. 71–72), device manufacturer, device distributor, or the like. The account authority then records (Step 460) the public key in such a manner that the public key is suitably bound to or associated with the account record of the prospective account holder. Preferably, the public key is associated particularly with the unique identifier of the account. In some embodiments, the public key itself (or a hashed value of the public key) is used as the unique identifier assigned to the account.

Finally, It also is preferable for the account authority to confirm proper binding of the public key to the account and to confirm that the device retains the private key, which corresponds with the public key bound to the account, by having the account holder submit (Step 462) a "test" EC for authentication, which may contain the corresponding public key being registered. Once the account authority is satisfied that the account has been established properly and that the account holder possesses the device retaining the appropriate private key corresponding with the public key being registered, the account is activated (Step 464) so that transactions that are digitally signed using the device will be deemed to have come from the legitimate account holder according to Factor A Entity Authentication.

in the above embodiment, the account authority may desire to confirm that the integrity level of the device, as confirmed by the Security Profile of the device obtained from the Central Key Authority or other reliable source or as confirmed by a physical inspection of the device, meets or exceeds its business standards or requirements for use with the respective account.

ii. Converting a Pre-existing Account Into an ABDS Account

Referring now to FIG. 5a, an exemplary process of converting a pre-existing, conventional account into an ABDS account, when initiated by an account authority, is set forth. First, it is assumed that the account authority already maintains a conventional account setup for the account holder in a record of an account database. Further, such record contains personal and other pertinent account information of the account holder. It is also assumed that the existing account already has its own unique identifier.

First, the account authority obtains (Step 502) the public key from a device of the present invention and records (Step 504) the public key in the account database and associates it with the existing account or with the unique identifier of the account. The account authority then distributes or sends (Step 506) the device that retains the private key corresponding with the public key associated with the existing account to its account holder with an offer to "convert" the existing conventional account to an ABDS account. The account authority then waits for a response from its account holder.

If a response is received (Step 508), the account authority uses conventional authentication techniques to confirm that it is communicating with its expected account holder. The account authority then requires (Step 510) the account holder to transmit a test message that is digitally signed using the device. Such test message confirms that the account holder possesses the correct device. If the test message confirms, then the device is "activated" (Step 512) for use with the newly converted ABDS account.

In an alternative embodiment, conversion of a conventional account to an ABDS account may be initiated by an existing account holder who already possesses a device of the present invention. For example, the account authority receives (Step 550) a request to convert a conventional account into an ABDS account, which enables the account holder to transact business on the account using electronic messages digitally signed using the account holder's specified device. If the account authority is willing to accept such a conversion and is willing to allow the account holder to use such a device, the account authority first confirms (Step 552), using conventional entity authentication techniques, that it is communicating or otherwise dealing with the expected account holder. Next and preferably contemporaneously, the account authority obtains (Step 554) the public key that corresponds with the private key that is securely retained on the device. In some business applications, the public key is obtained directly from the device in response to a suitable request submitted to the device. In other business applications, the public key is obtained from a database maintained by a third party, such as a Central Key Authority (as discussed below with reference to FIGS. 71–72, device manufacturer, device distributor, or the like. The account authority then records (Step 556) the public key in such a manner that the public key is suitably bound to or associated with the existing account record of its account holder. Preferably, the public key is associated particularly with the unique identifier of the account. In some embodiments, the public key itself (or a hashed value of the public key) is used as the unique identifier assigned to the account.

Finally, it also is preferable for the account authority to confirm proper binding of the public key to the account and to confirm that the device retains the private key, which corresponds with the public key bound to the account, by having the account holder submit (Step 558) a "test" EC for authentication, which may contain the corresponding public key being registered. Once the account authority Is satisfied that the account has been established properly and that the account holder possesses the device retaining the appropriate private key corresponding with the public key being registered, the account is activated (Step 560) so that transactions that are digitally signed using the device will be deemed to have come from the legitimate account holder according to Factor A Entity Authentication.

e. Devices Useful With ABDS Systems

In accordance with all of the aspects of the present invention, the device comprises hardware, software, and/or firmware, and specifically comprises a computer chip, an integrated circuit, a computer-readable medium having suitable software therein, or a combination thereof. The device further may comprise a physical object such as a hardware token or an embedded token, the token containing such a computer chip, integrated circuitry, or software, or combination thereof. If the device is a hardware token, it preferably takes the form of a ring or other jewelry; a dongle; an electronic key; a card, such as an IC card, smart card, debit card, credit card, ID badge, security badge, parking card, or transit card; or the like. If the device is an embedded token, it preferably takes the form of a cell phone: a telephone; a television; a personal digital assistant (PDA); a watch; a computer; computer hardware; or the like. The device preferably includes a device interface comprising a port including a wireless communications port, a serial port, a USB port, a parallel port, or an infrared port-or some other physical interface for communicating with an external electronic apparatus, whether contact or contactless. The device also may include a trusted platform module (TPM) comprising hardware and software components providing increased trust in a platform, as set forth and described in Trusted Platform Module (TPM) Security Policy Version 0.45, TRUSTED COMPUTING PLATFORM ALLIANCE, October 2000, and TCPA PC Implementations Specification Version 0.95, TRUSTED COMPUTING PLATFORM ALLIANCE, Jul. 4, 2001, both which are incorporated herein by reference (collectively "TCPA Documents").

Preferably, the device is capable of receiving an electronic message and then originating a digital signature for the electronic message utilizing the private key stored therein. The device preferably also performs a hash function on the message received by the device prior to encryption with the private key.

Additionally, it is preferred that the device include a device interface, such as, for example, an alphanumeric keypad, an electrical contact, a touch screen display, a standard electronic interface with a computer bus, or an antenna, so that the device not only may receive a message, but also compose a message. The device Interface may also comprise a port, such as a wireless communications port, a serial port, a USB port, a parallel port, or an infrared port.

Some of the above devices require use of an I/O support element to enable the device to receive messages or other input. Some of the devices require use of an I/O support element to transmit information, including digital signatures and messages to recipients of the ECs. Some of the devices are self-contained, which means that they can generate and transmit messages, digital signatures, and other information without the use of external apparatuses; some devices, although self-contained, are capable of interacting with such external apparatuses, such as an I/O support element, if desired. An I/O support element may take the form of any number of different apparatuses, depending upon the particular application in which it is used and depending upon the form factor of device with which it interacts. One example of an I/O support element includes a card reader comprising hardware and software components designed in accordance with the technical specifications published by CEN/ISSS as a result of their Financial Transactional IC Card Reader Project (known commonly as "FINREAD").

With regard to the security of the device used in each aspect of the present invention, preferably during the manufacture of the device, a unique and random public-private key pair is generated directly within the device (using a random number generator), preferably on a computer chip, integrated circuit, or other cryptographic module embedded therein, using known manufacturing techniques. Because of the size of the private key and because the key is generated using a random number generator, the likelihood that a duplicate private key might exist in a different device is very low. The private key then is securely stored within a memory location in the device and, preferably, made inaccessible throughout the life of the device (other than for the purpose of generating a digital signature internally within the device). Furthermore, the device preferably includes the following additional characteristics: it is tempested (i.e., designed in such a way to minimize electromagnetic emanations from the device and, thus, minimize its vulnerability to electronic eavesdropping); the device is immune to known electronic attacks; the device is tamper-resistant with zeroization capability (i.e., physical tampering or intrusion of the device should destroy the functionality of the digital signature component of the device and/or erase the private key); the device maintains the private key securely such that the private key is never divulged outside of the device; and the device allows export of the public key when necessary.

Furthermore, the device preferably originates digital signatures in accordance with an elliptical curve digital signature algorithm (ECDSA) as specified in Federal Information Processing Standards Publication 186-2, Digital Signature Standard, US DOC/NBS, Jan. 11, 1994 (hereinafter "FIPS PUB 186-2"), which is incorporated herein by reference. Accordingly, the device originates digital signatures using a random number generator, and the hash function is performed using the secure hash algorithm ("SHA-1"), which generates a 20-byte output regardless of the size of the message that is input into the device. The SHA-1 itself is specified in Federal Information Processing Standards Publication 180-1, Secure Hash Standard, US DOC/NBS, Apr. 17, 1995 (hereinafter "FIPS PUB 180-1"), which is hereby incorporated by reference.

In the aspects of the invention, the device preferably is personalized to its authorized user(s). Personalization of the device includes the establishment of a personal identification number (PIN), password, or passphrase (hereinafter "Secret"). Conventionally, such a Secret is prestored within the device and must be input into the device before it will operate to generate digital signatures. Alternatively, but also conventionally, the Secret is shared with the recipient beforehand and, when the EC later is sent to the recipient, the Secret also is sent to the recipient in association with the message. In the first case, verification of the Secret authenticates the user of the device (hereinafter "User Authentication"), and in the second case, verification of the Secret authenticates the sender of the EC (hereinafter "Sender Authentication"). If the Secret is shared and transmitted between the sender of an EC and the recipient, it typically must be encrypted or otherwise protected to maintain its secrecy from others. In either case, confirmation of the Secret represents entity authentication based on what the user or sender "knows" (hereinafter "Factor B Entity Authentication").

Other security measures against fraudulent use of the device through physical theft include the verification of a biometric characteristic—like a fingerprint, retina scan, DNA, voice print, and the like—of the user of the device or sender of the EC. This type of authentication is based on what the user or sender "is" (hereinafter "Factor C Entity Authentication"). As with the Secret, a biometric value is conventionally either maintained within the device for User Authentication, or is shared with the recipient beforehand for Sender Authentication by the recipient. If the biometric value is shared and transmitted between the sender of an EC and the recipient, even greater precautions must be taken to protect such biometric value from interception and discovery by others.

In contrast with both of the above methods of providing Factor B and Factor C Entity Authentication information to the recipient of the EC, an alternative method of providing Entity Authentication status from the account holder to the account authority in which the Secret and/or biometric value(s) is provided to the device and an indicator representing the results of the comparison of such Secret and/or biometric value(s) with data prestored in the device is provided to the recipient of the EC without communicating or compromising the Secret and/or biometric value(s) may also be used with the present invention. Such a methodology is described in greater detail in the VS Applications.

f. Types of and Uses for ECs in an ABDS System

As stated previously with regard to both FIGS. 2 and 3, an EC from an account holder to an account authority preferably includes both a message (M) and a digital signature of the message (DS(M)). The message preferably includes the unique account identifier (acctID) and an instruction (i1) for the account authority to perform in relation to the account. In many circumstances, however, it is not necessary for the message to contain the unique account identifier. For example, the account authority may have already obtained the unique account identifier from a previous message from the account holder and retransmission of the account identifier is unnecessary for a follow-up message from the same account holder—as long as the account authority knows that it is communicating with the same account holder (e.g., by means of a session key or identifier or during a continuous, uninterrupted electronic connection between the two). Further, it is not always necessary for the message to contain an instruction (i1), such as, for example, when the instruction (i1) is implicit in the mere communication between the account holder and the account authority (e.g., an instruction (i1) in an EC sent to a parking gate controller obviously implies an instruction to "open the parking gate").

ECs, and the ability to authenticate the sender of an EC, are useful for at least three different business purposes within the present invention. These three different purposes are described generally hereinafter as "session authentication," "transaction authentication," and "transaction confirmation." Session authentication and transaction authentication are similar to each other since both typically involve situations in which the account holder must "prove" (at least to the extent possible based on the strength of the entity authentication) to the account authority that he is the legitimate account holder. In contrast, transaction confirmation typically involves situations in which the account holder has already proven to the account authority that he is the legitimate account holder; however, the account authority requires confirmation of a specific digitally-signed message from the account holder before the account authority will perform a requested action (typically, upon the account itself) in response to a specific instruction (i1) contained within the message.

Session authentication and transaction authentication are generally necessary before the account authority will grant the account holder with access to the account of the account holder or to another resource to which the account holder has rights. Such authentication is also generally necessary before the account authority will perform a requested action on the account or resource. A resource is, for example, a physical space, database, computer file, data record, checking account, computer system, computer program, web site, or the like. A main distinction between session authentication and transaction authentication is what the account authority does as a result of such authentication. For example, once the account holder is authenticated for session authentication purposes, the account authority provides the account holder with access (by means of a session key, entity identifier, and the like) to the requested account or resource for the duration of the "session." The meaning of a session varies depending upon the type of account or resource being accessed and depending upon the business rules of the particular account authority protecting the account or resource; however, a session typically means some period of time during which the account holder is allowed to perform actions on or within the account or resource without providing additional authentication to the account authority. In addition, the amount of access to the account or resource an account holder is granted is also governed by the business rules of the particular account authority and may vary from account authority to account authority and from account to account.

In contrast, transaction authentication is typically only useful for the particular transaction with which it is associated. Transaction authentication associated with a particular transaction is not "carried over" for use with another transaction. Such a transaction may be a request for the account authority to perform a specific action on the account or resource (e.g., a request for the account authority to "provide checking account balance" or "open the door"). In contrast with transaction confirmation (described in the next paragraph), however, transaction authentication is useful when the account authority does not specifically need to know the "intent" of the account holder before performing the requested action.

Transaction confirmation, on the other hand, is useful when the value or risk associated with a particular transaction rises to the level that the account authority will not act unless it receives sufficient assurance that the account holder intended to send and digitally sign the message and, corresponding, intended for the account authority to act in reliance thereupon. Since a digital signature is capable of being generated by a device, potentially without the desire or even knowledge of the owner or user of the device, intent cannot be presumed from the mere receipt of a digital signature from a device of the account holder. For this reason, some means of confirming the account holder's intent with respect to a specific transaction is needed. Such transaction confirmation is preferably obtained by a physical, overt act performed by the account holder that is determinable within the message received by the account authority. For example, in some instances, the contemporaneous provision of Factor B or C entity authentication information by the account holder in conjunction with the message that is digitally signed can imply confirmation or intention. Another method of obtaining such transaction confirmation is through the deliberate and recognizable modification by the account holder of a "proposed" message generated by the account authority, which is then digitally signed by the account holder.

In light of the above, it should be understood that in many circumstances, even if the account holder has already provided entity authentication information for the purpose of session authentication, it may be necessary for the account holder to provide additional and/or stronger entity authentication information (still for session authentication purposes) before the account authority will provide the account holder, for example, with access to a more restricted portion of the particular account or resource or to another more restricted account or resource. Further, it should also be understood that even during a particular session, it may be necessary for the account holder to provide entity authentication information to the account authority either for transaction authentication purposes (when the transaction requires a stronger level of entity authentication than the particular session required) or for transaction confirmation purposes (when the account authority desires specific assurance of the account holder's intent before performing the requested action). In addition, it should also be understood that a single EC communicated from an account holder to an account authority may be used simultaneously for both transaction authentication and for transaction confirmation purposes in many circumstances.

Figure 74:
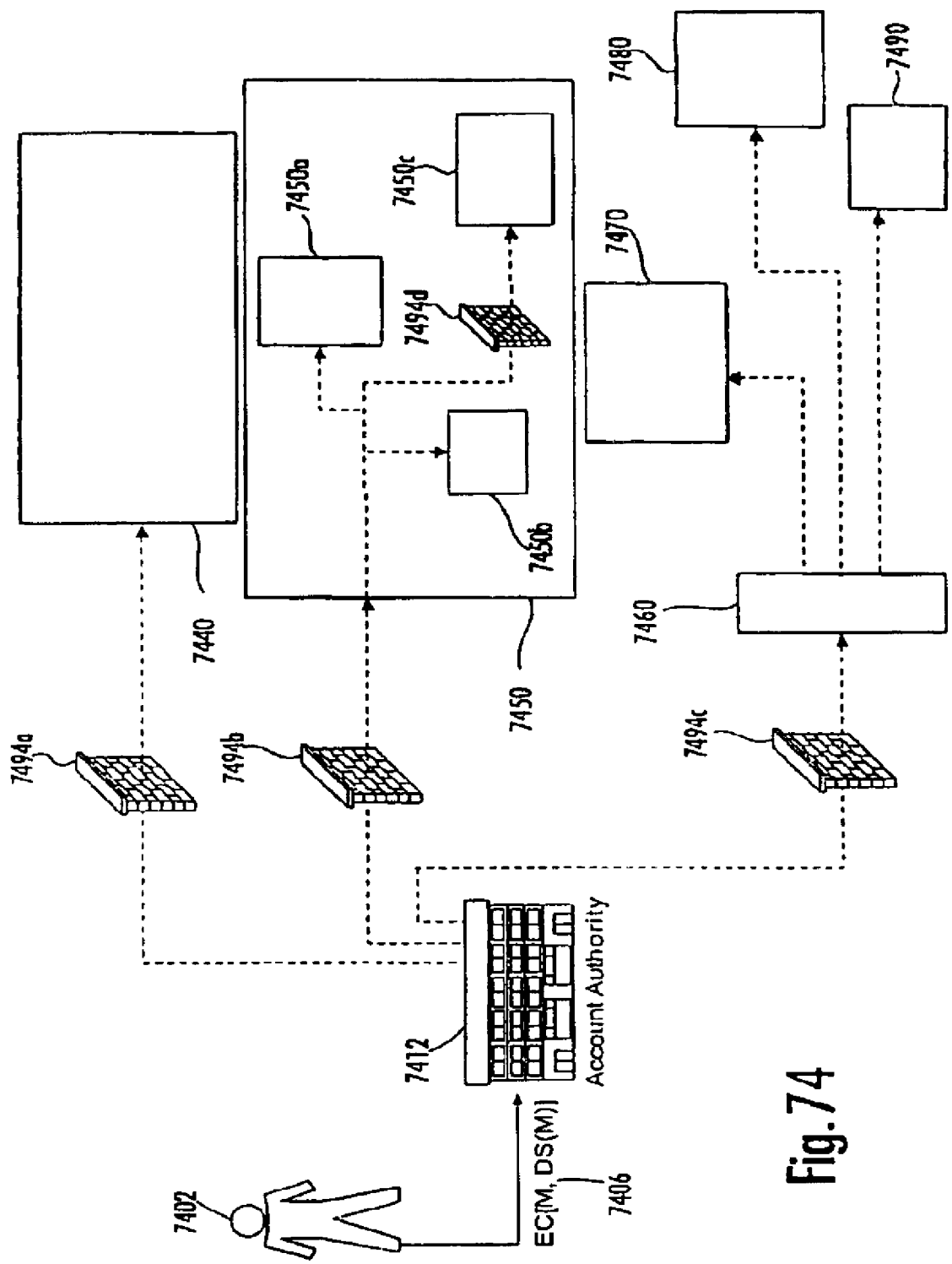
FIG. 74 illustrates use of an EC for session authentication and transaction authentication purposes in accordance with the first aspect of the present invention.

Turning now to FIG. 74, an example of an EC 7406 used for session authentication purposes is illustrated. As shown, an account authority 7412 acts as a type of "gate-keeper" for three resources 7440, 7450, 7460, one of which the account holder 7402 desires to access as requested in the EC 7406. Although only one account authority 7412 is illustrated in this example for ease of reference, it should be understood that each resource 7440, 7450, 7460 could, in fact, have its own separate account authority (not shown) associated therewith.

Continuing with FIG. 74, the account authority 7412 restricts access to the resources 7440, 7450, 7460, directly or indirectly, by preventing the account holder 7402 from proceeding through gates 7494a, 7494b, or 7494c until the account holder 7402 has provided the account authority 7412 with a "sufficient" level of entity authentication—at least to the extent required by the particular gate 7494a, 7494b, 7494c. For reasons that should be readily apparent, the level of entity authentication required by each gate varies depending upon what the specific resource is that is being protected. For example, if the resource is a parking deck, only a minimal level of entity authentication is necessary; if the resource is a corporate checking account, stronger entity authentication is likely required; if the resource is the control system for launching nuclear warheads, even stronger entity authentication is required.

In some circumstances, providing a sufficient level of entity authentication is all that is needed to obtain access to the resource. For example, gate 7494a provides the only session authentication hurdle to account holder 7402 for accessing resource 7440 (although, of course, the amount of access provided to the account holder 7402 and the process by which the account holder 7440 is able to access the resource may be further restricted by permissions and access rights, which are not discussed in detail herein). Alternatively, as illustrated by resource 7450, providing a sufficient level of entity authentication to pass through gate 7494b enables the account holder 7402 to access resource 7450 generally and to access sub-resources 7450a, 7450b (nested within the confines of resource 7450) specifically. Notably, stronger entity authentication is necessary before account holder 7402 is given access to sub-resource 7450c, as indicated by gate 7494d. In another alternative arrangement, providing a sufficient level of entity authentication to pass through gate 7494c enables the account holder 7402 to access not only resource 7460 but also independent resources 7470, 7480, 7490, which are not within the protective confines of resource 7460 but which allow the account holder 7402 with access therein when the account holder 7402 has provided sufficient entity authentication to pass through gate 7494c.

As stated previously, in some circumstances, the particular resource 7440, 7450, 7460 is not only protected but also maintained by the account authority 7412 (for example, if the account authority 7412 is a financial institution and the resource is a bank account of the account holder 7402). In other circumstances, the particular resource 7440, 7450, 7460 is merely protected by the account authority 7412, which is in communication and coordination with another entity, such as a resource manager, access controller, or authorization controller (not shown), that actually maintains the resource (for example, if the account authority 7412 is merely an entity authentication system and the resource is a secure network server, to which access and permissions are controlled by a separate access control server).

The illustration of FIG. 74 is equally applicable to an EC used for transaction authentication purposes. For example, if EC 7406 contains a specific request for information from one of the resources 7440, 7450, 7460 or a request for the account authority 7412 to perform a specific action on or in one of the resources 7440, 7450, 7460, then the EC 7406 is used for entity authentication solely for that particular request; however, no on-going or session access to the particular resource 7440, 7450, 7460 is granted as a result.

Figure 75:
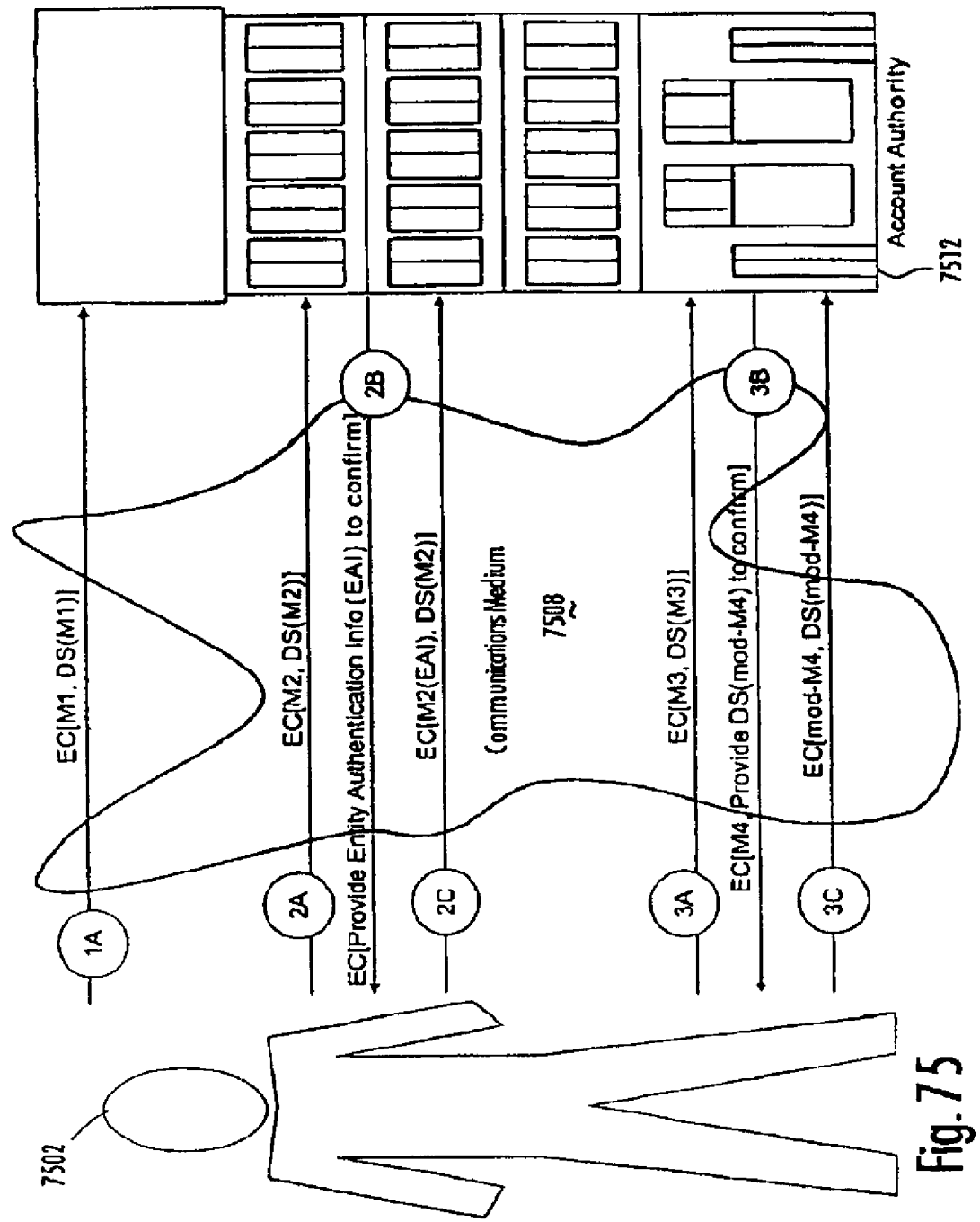
FIG. 75 illustrates use of an EC for transaction confirmation purposes In accordance with the first aspect of the present invention.

Turning now to FIG. 75, three different examples of ECs between an account holder 7502 and an account authority 7512 over communications medium 7508 are illustrated. In all three examples, the last EC from the account holder 7502 to the account authority 7512 is used for a transaction confirmation purpose.

In the first interchange, designated by EC 1A in FIG. 75, the account holder 7502 transmits an EC, which contains a message (M1) and a digital signature for the message (DS(M1)). In this interchange, the account holder 7502 provides sufficient proof of intent and Factor B or C Entity Authentication such that the account authority 7512 requires no follow-up EC requesting confirmation.

In the second interchange, designated by ECs 2A, 2B, and 2C and still with reference to FIG. 75, the account holder 7502 transmits an EC, which contains a message (M2) and a digital signature for the message (DS(M2)). In this interchange, the account authority 7512 is not satisfied that it has received sufficient proof of the account holder's intent as applied to the message (M2). For this reason, the account authority 7512 sends EC 2B to the account holder 7502; EC 2B requests that the account holder 7502 send a new EC with the same message (M2) and digital signature therefor (DS(M2)) but with the additional performance of Factor B or C Entity Authentication, an indicator (EAI) of which is included therewith as "proof" that the account holder 7502 did intend to send EC 2A. As shown, the message of EC 2C is essentially the same as the message of original EC 2A with the addition of the Entity Authentication indicator (EAI). Such Entity Authentication indicator (EAI), preferably, is included within the message (M2) that is digitally signed.

In the third interchange, designated by ECs 3A, 3B, and 3C and still with reference to FIG. 75, the account holder 7502 transmits an EC, which contains a message (M3) and a digital signature therefor (DS(M3)). In this interchange, the account authority 7512 is not satisfied that it has received sufficient proof of the account holder's intent as applied to the message (M3). For this reason, in this example, the account authority 7512 sends EC 3B to the account holder 7502; EC 3B contains a proposed new message (M4) for review and digital signing by the account holder 7502. Message (M4) is composed by the account authority 7512 and preferably contains most, if not all, of the information that was contained in message (M3). Message (M4) may also contain additional information not contained in message (M3). Further, EC 3B requests that, if the account holder 7502 agrees with and accepts the contents of message (M4), that the account holder 7502 modify the message (M4) in a specified manner (indicated in EC 3B or based on a known protocol) to create a modified message (mod-M4) and then digitally sign the same (DS(mod-M4)). It is possible to perform Factor B or C Entity Authentication and include an indicator (EAI) thereof within EC 3C; however, it is not required since account authority 7512 did not request it in EC 3B.

g. Data Structure and Formats for ECs in an ABDS System

Referring now to FIG. 76, an electronic communication (EC) 7601 in accordance with various aspects of the inventions described herein includes various data fields, elements, or portions, generally speaking, a message (M) 7603 and a digital signature (DS) 7605. These components generally form a data structure that may be stored, communicated, or otherwise manipulated with computing and communications apparatuses, according to the methods described herein. The EC 7601 may be included with, and/or form a part of, a financial transaction in accordance with ISO Standard 8583, which is incorporated herein by reference, or an X9.59 transaction.

In accordance with known data communication formats and/or data structure conventions, the EC 7601 typically includes a header portion 7607, a body 7609, and a trailer portion 7611. The header portion 7607 and trailer portion 7611 are conventional in nature and are provided for conventional purposes, such as identification of the EC, routing, error correction, packet counting and sequencing, and other purposes, as will be known to those skilled in the art.

According to a first arrangement of this aspect of the invention, the body portion 7609 comprises a message 7603 and the digital signature 7605 therefor (separated by a hashed line in the illustration). The message 7603 preferably includes an account identifier 7616 and message content 7618. The message content can include various types of information such as a further identifier, a command or instruction (i1) relating to the account, the public key (PuK) associated with the account, time/date stamp, encrypted message, and the like. The digital signature 7605 comprises information from the message 7603 (for example, a hash of the message, the message itself, or a compressed), signed with the sender's private key.

According to a second arrangement, the body portion 7609 comprises the account identifier 7616 and a message content portion 7618, which incorporates the digital signature 7605 (ignoring the hashed line). The account identifier 7616 may be considered a separate component from the message content 7618. Similar to the first arrangement, the digital signature 7605 portion of the message content 7618 comprises other information from the message content 7618, signed with the sender's private key.

Under either of the above arrangements, the EC 7601 includes the account identifier 7616 and the digital signature 7605 as significant components thereof.

It will be appreciated that the digital signature 7605 of any arrangement of data elements may constitute information such as the account identifier, a further identifier, an instruction or command relating to the account, the public key (PuK) of the sender of the EC, and/or other information, depending upon the particular application contemplated by the user of the invention. AS stated previously, the message 7603 need not contain the account identifier 7616, e.g. the account identifier is implied or inferred, or obtained from, the message. For example, the recipient of the EC may have already obtained the account identifier 7616 from a previous message from the sender of the EC and retransmission of the account identifier 7616 is not needed. Further, it is not necessary for the message 7603 or message content 7618 to contain an instruction or command, for example, when the instruction is implicit in the communication between the sender of the EC and the recipient thereof.

Finally, it should be noted that these electronic communication and data structure formats of the present invention are not limited to the file format, structure, and contents described above. Other formats, structures, and contents can be used that include different components and arrangements.

h. Specific Implementations of 2-Party ABDS Systems

The preferred ABDS systems 200,300 of FIGS. 2 and 3 may be implemented in a vast number of wide-ranging business applications. Because the specific applications are so numerous, the following specific examples are described in detail herein only to illustrate the scope and breadth of possible implementations and are not intended to be limitations on the type of business applications in which the ABDS systems 200,300 may be implemented. In addition, the specific device used with each particular business application is chosen merely for illustrative purposes and is not intended to imply or suggest that other devices shown (or not shown) in any other figure cannot be used therewith. To the contrary, any device, regardless of form, can be used in most, if not all, business applications utilizing the ABDS systems 200,300 of FIGS. 2 and 3, limited only by the available infrastructure within which such device is capable of operating.

In all of the following examples, it is presumed that the account holder has already established an ABDS account with the relevant account authority; thus, the account maintained by the account authority has associated therewith the public key that corresponds with the private key, which is securely protected in the device, which is in the possession of the account holder. In all of the following examples, it is also presumed that there is no need to encrypt the contents of the particular communications between the various entities, including the account holders and the account authorities; however, if any of the entities desires to protect the contents of the information contained within the various ECs between them for privacy, confidentiality, or any similar reasons, such ECs may be encrypted by the sender of the particular EC in conventional manner, for example, using the public key of the intended recipient(s) of the particular EC for PGP-type encryption, using secure socket layering (SSL), or other similar encryption techniques; however, encrypting the contents of the various ECs is not necessary for the functioning of the present invention.

In addition, in many of the specific business applications described hereinafter, the account holder is prompted or asked to perform Factor B or Factor C Entity Authentication as part of the process of composing and transmitting an EC to the account authority. It should be understood that mere use of the device is sufficient for providing Factor A Entity Authentication (since authenticating the message inherently confirms that the sender of the EC possessed the private key corresponding to the public key used successfully to authenticate the message), which, in many circumstances, is sufficient entity authentication for the account authority to act upon the message or instruction (i1) contained in the EC from the account holder. Performance of Factor B and/or Factor C Entity Authentication, while not necessary for the present invention, does strengthen the entity authentication provided by the account holder and, correspondingly, increases the amount of trust the account authority has in the system and in the fact that it is dealing with the legitimate account holder.

Further, the methodology by which Factor B and/or Factor C entity authentication is managed between the account holder, the device, the account authority, and other entities within the ABDS systems described herein is not specifically set forth in these implementations. It should be assumed that such User or Sender Authentication is handled in conventional manner (as described above) or as described in the VS Applications.

i. Financial Institution Account

Figure 6:
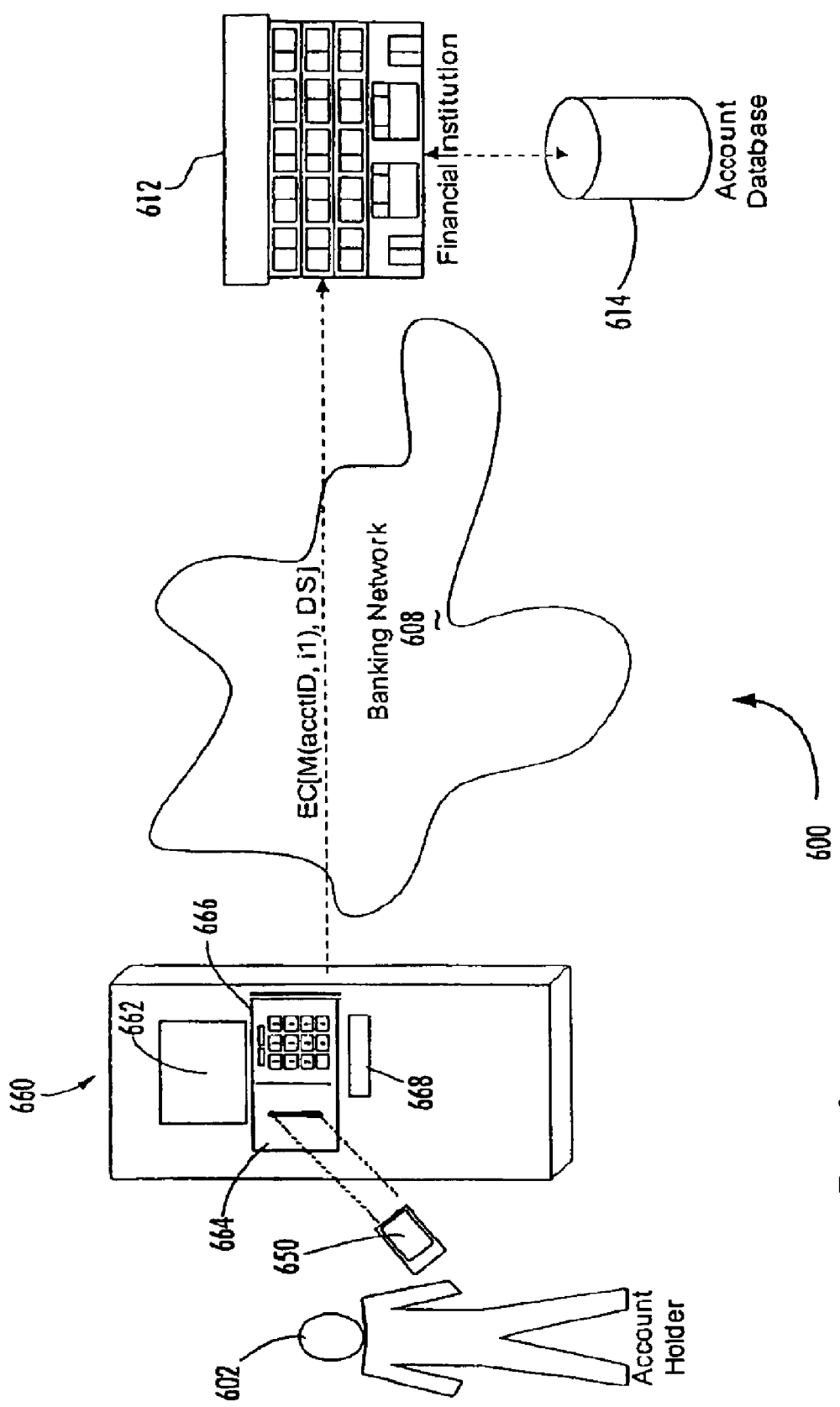
FIG. 6 illustrates a first business application in accordance with the first aspect of the present invention.

A first business application 600 implementing the two-party ABDS system 200 of FIG. 2 is illustrated in FIG. 6. In this example, an account holder 602 comprising a person possesses a device in the form of a card 650, such as an IC card, credit card, or ATM card, which is capable of being used at an ATM machine 660 or the like. The card 650 securely protects therein a private key of a public-private key pair. The ATM machine 660 includes a display 662, a card reader 664, an alphanumeric keypad 666, and a cash dispenser 668. The card 650 is associated with a debit or credit account maintained with an account authority comprising a financial institution 612. The account may be a checking account, savings account, money market account, credit card account, or the like, and the financial institution may be a bank, savings and loan, credit card company, or the like. In this example, the ATM machine 660 communicates electronically with the financial institution 612 over a secure, internal banking network 608.

Accounts maintained with the financial institution 612 are associated with account records maintained in one or more account databases, collectively referred to and illustrated in FIG. 6 by account database 614. With reference to FIG. 7, each account includes a unique account identifier comprising an account number 716. Each account number 716 identifies within the account database 614 account information 740, including customer-specific information 742 and account-specific information 744. In accordance with the present invention, the account number 716 also identifies public key information 718, which includes at least a public key of an account holder of the respective account. Also in accordance with a feature of the present invention, the account number 716 identifies device profile information 770 for the device that retains the private key corresponding with the public key associated with the account.

In the example of FIG. 6, the customer-specific information 742 includes, for example, the name, address, social security number and/or tax-ID number of the account holder. The account-specific information 744 includes, for example, the current account balance, available credit, closing date and balance of current statement, and associated account identifiers. The public key information 718 of the account of the account holder 602 includes the public key corresponding to the private key retained within the card 650. The device profile information 770 includes information specific to the card 650.

As stated previously, an EC from the account holder 602 to the financial institution 612 may be used for three different purposes: session authentication, transaction authentication, and transaction confirmation. In this business application, the most common type of EC is used merely for session authentication, which occurs when the account holder 602 initially attempts to login to or otherwise access the ATM machine 660.

Figure 8:
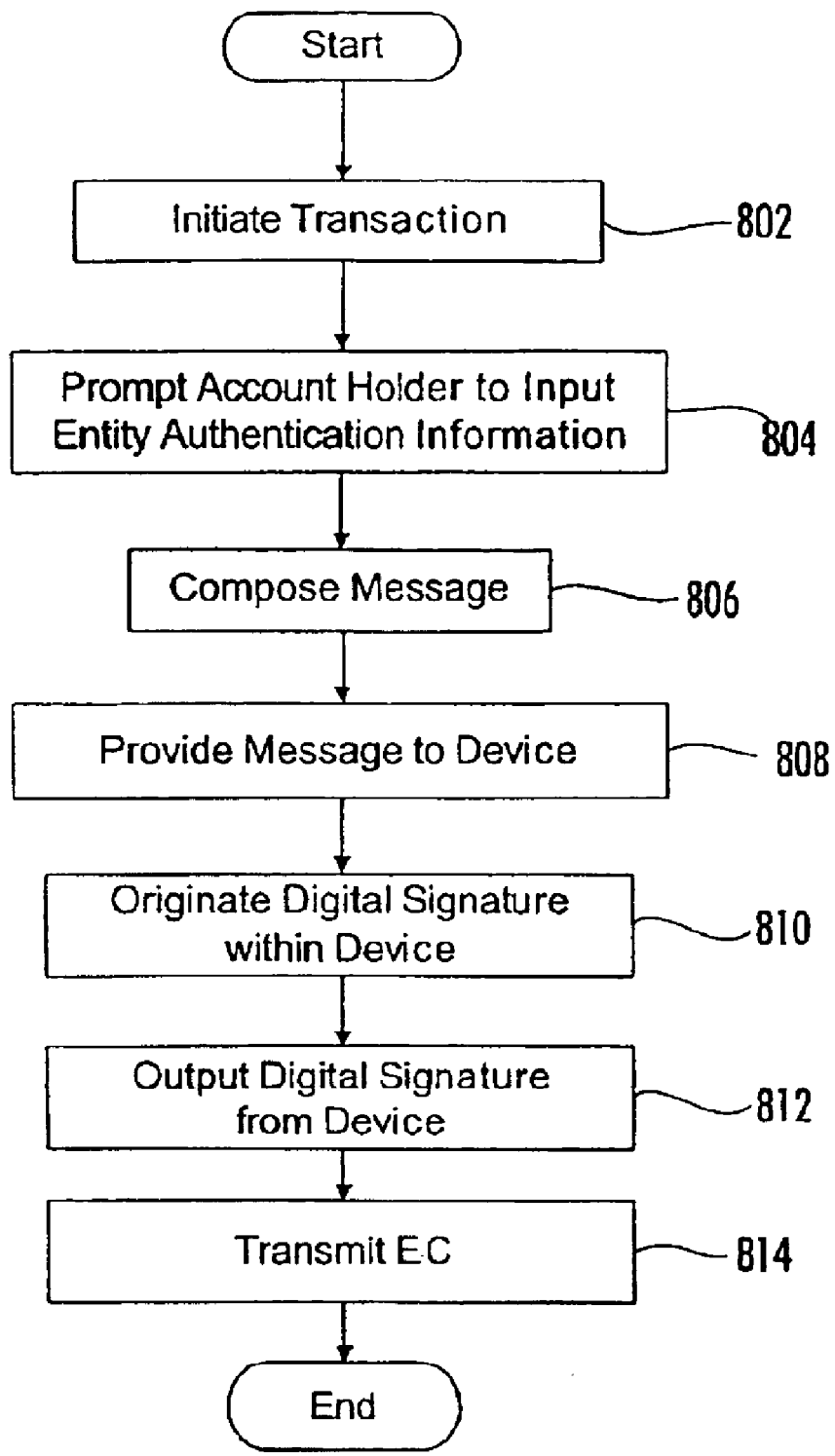
FIG. 8 illustrates a flowchart of steps performed by an account holder in the business application of FIG. 6.

Regardless of which type of EC is communicated from the account holder 602 to the financial institution 612, the basic methodology for composing and digitally signing the message (on the account holder end) and for authenticating the message and authenticating the entity (on the account authority end) is essentially the same. For example, turning now to FIG. 8, a transaction in accordance with the present invention is initiated (Step 802) in the implementation illustrated in FIGS. 6 and 7 when the account holder 602 inserts the card 650 into the card reader 664 of the ATM machine 660. The insertion of the card 650 initializes the ATM machine 660, which, using display 662, prompts (Step 804) the account holder 602 to perform entity authentication, such as providing a PIN, using the alphanumeric keypad 666. Once the PIN is input, an electronic message is composed (Step 806) for sending to the financial institution 612.

The ATM machine 660 displays a menu of available accounts upon which the account holder 602 may perform an action. The available accounts are stored within memory on the card 650 and retrieved by the ATM machine 660 for display to the account holder 602. Of course, if only one account is available in memory on the card 650, then that account is selected by default without requiring specific selection by the account holder 602.

Upon selection of an account, the ATM machine 660 displays a menu of operations that can be performed on the selected account. Such operations include, for example, money withdrawal, balance inquiry, statement request, money transfer, money deposit, bill payment, and the like. Upon selection of the desired operation by the account holder 602, and after any additional information relating thereto is obtained from the account holder 602, such as a withdrawal or transfer amount and the like, the ATM machine 660 composes an electronic message that includes an instruction to the financial institution 612 corresponding to the desired operation of the account holder 602. The electronic message also includes the account number 716 corresponding to the account selected by the account holder 602.

The message then is transmitted (Step 808) to the card 650 for digital signing by the account holder 602. In this regard, upon receipt of data representing the message, the card 650 originates (Step 810) a digital signature for the message by first calculating a hash value for the data and then encrypting the hash value using the private key retained within the card 650. The card 650 then outputs (Step 812) the digital signature to the ATM machine 660, which then transmits (Step 814) the message and the digital signature therefor in an EC to the financial institution 612.

Figure 9:
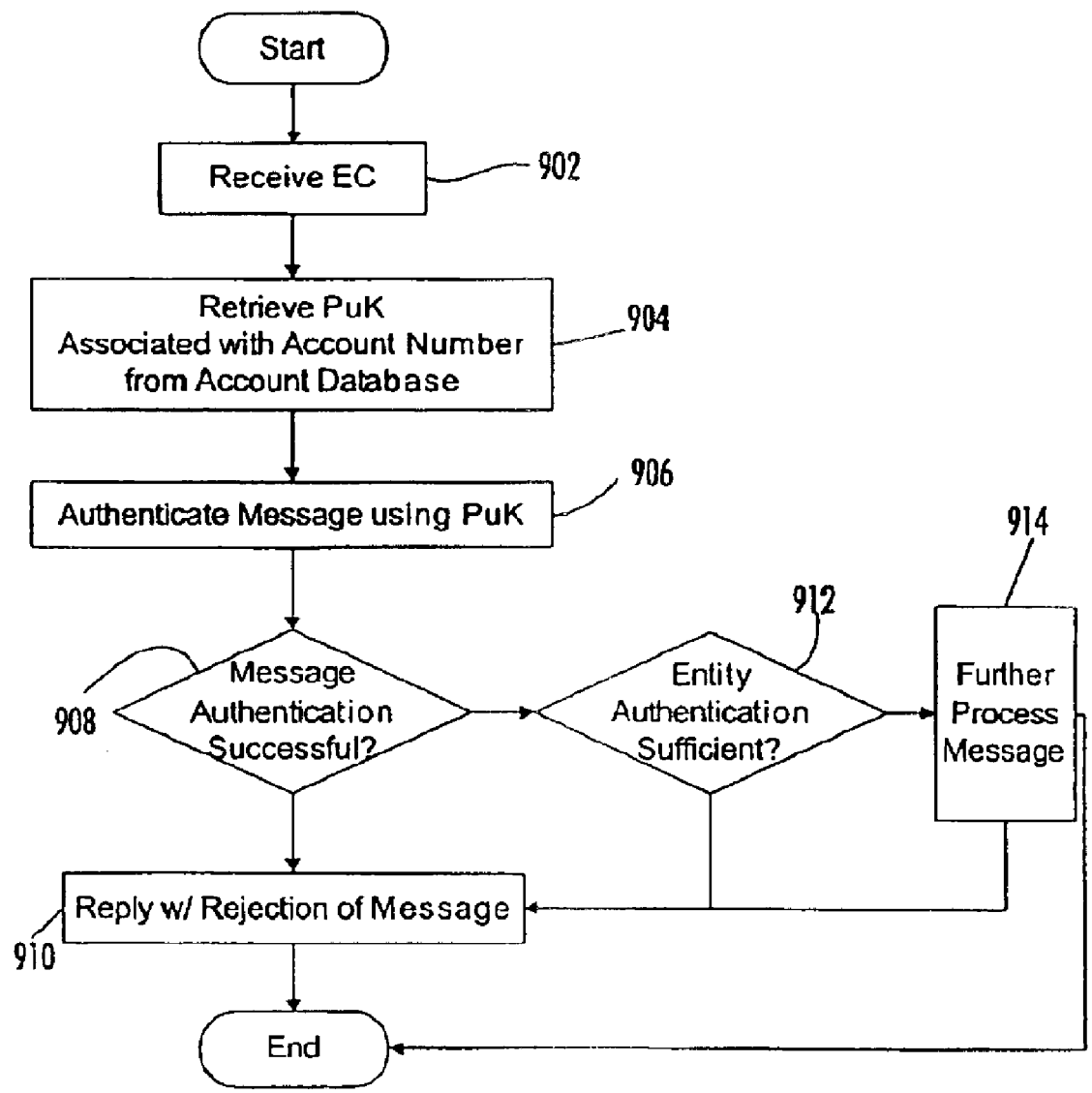
FIG. 9 illustrates a flowchart of steps performed by an account authority in the business application of FIG. 6.

With reference to FIG. 9, the EC is received (Step 902) by the financial institution 612 from the ATM machine 660. The financial institution 612 then retrieves (Step 904) from the account database 614 the public key that is identified by the account number 716. Using this public key, the financial institution 612 attempts to authenticate (Step 906) the message. If the message does not authenticate (in Step 908) using the public key, then the financial institution 612 responds (Step 910) with a rejection of the message (i.e., refusal to grant access to the account or to perform the requested action). If the message authenticates (Step 908), then the financial institution 612 concludes that the message, in fact, came from the person possessing the correct card 650 associated with the identified account number 716—(i.e., Factor A Entity Authentication is obtained). The financial institution 612 then determines (Step 912) whether or not the Factor B entity authentication information or status (e.g., PIN) provided is sufficient for further processing of the specific message. If not, then the financial institution 612 responds (Step 910) with a rejection of the message (i.e., refusal to grant access to the account or to perform the requested action). If the entity authentication provided is sufficient (in Step 912), then the financial institution 612 further processes (Step 914) the message.

In this case, further processing (Step 914) of the message includes executing the instruction of the message, if possible, and updating the account based on the executed instruction. If it is not possible to execute the instruction, then the financial institution 612 responds (Step 910) with a rejection of the message. For example, if the account holder 602 instructs the financial institution 612 to provide an account balance, then the financial institution 612 transmits the account balance to the ATM machine 660 for presentation to the account holder 602. If the account holder 602 instructs the financial institution 612 to withdraw money from the account, then the financial institution 612 first confirms that the funds are available and, if so, sends an authorization to the ATM machine 660 to dispense the requested amount of funds (up to the limit allowed and/or available on the particular account) to the account holder 602 and updates the account record to reflect the withdrawal. If the account holder 602 instructs the financial institution 612 to transfer funds to another account, then the financial institution 612 first confirms that the funds are available and, if so, initiates the electronic fund transfer to the other account and updates the account records accordingly. If the account holder 602 instructs the financial institution 612 to receive a payment on a bill owed to the financial institution 612, such as a credit line payment, credit card payment, mortgage payment, or the like, then the financial institution 612 first confirms that the funds are available and, if so, initiates transfer from the account and updates the account records accordingly.

As will be appreciated by those skilled in the art, if the account holder 602 requests an "unusual" transaction, such as the withdrawal or transfer of a large amount of money or closure of the account, the financial institution 612 may request that the account holder 602 digitally sign an EC for transaction confirmation purposes for the specified request. The financial institution 612 may also require that the account holder 602 provide additional entity authentication information or status prior to the digital signature being generated by the card 650. The ATM machine 660 may be used to advantage to sequence the events properly so that the account holder 602 first sees the proposed confirmation message displayed on the display 662 of the ATM machine 660, then is prompted to input a Secret or biometric value, after which the ATM machine 660 provides the confirmation message to the card 650 for digital signature. The remaining method of generating and processing such transaction confirmation EC is similar to that described above for the session authentication.

ii. Brokerage Account

Figure 10:
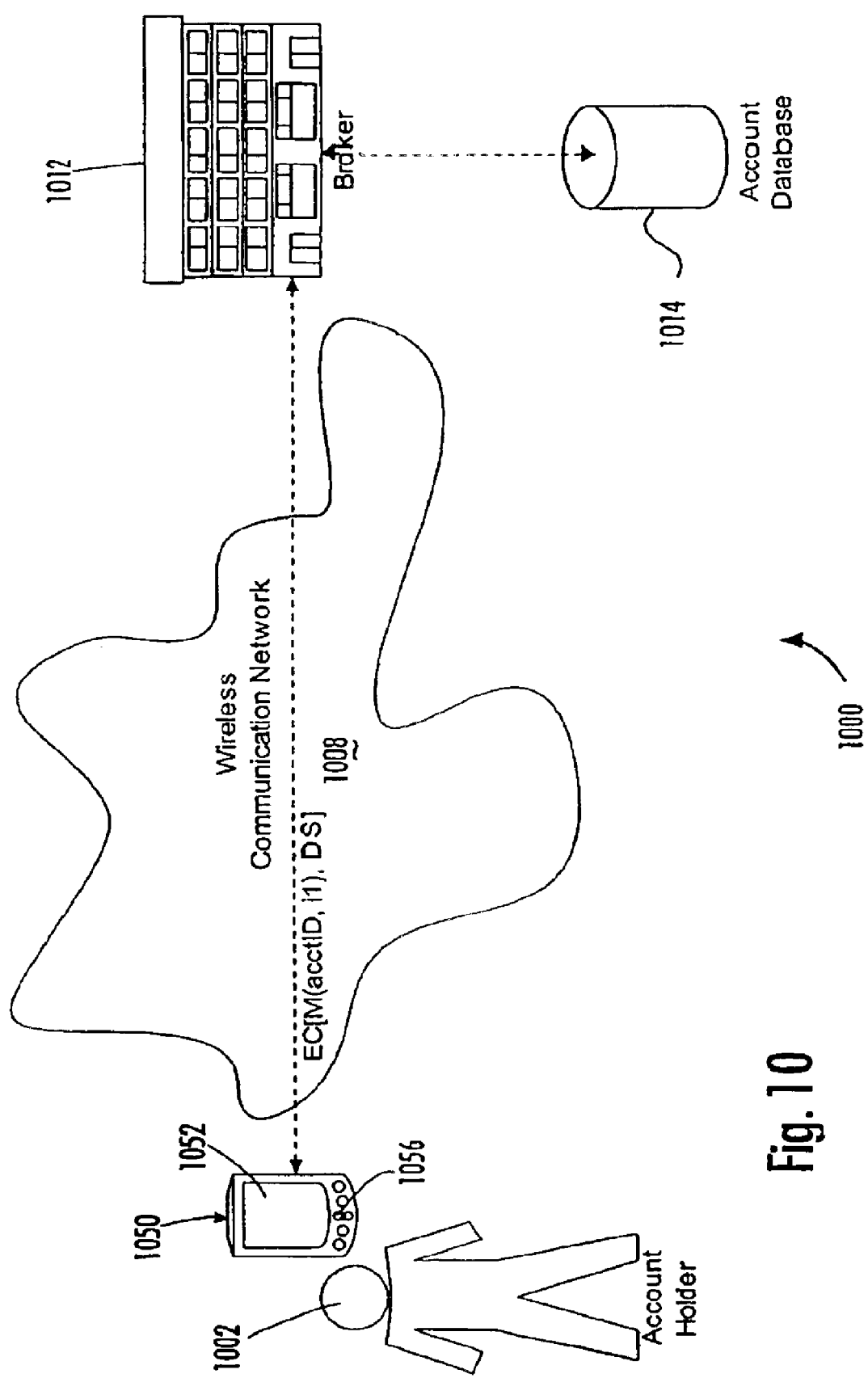
FIG. 10 illustrates a second business application in accordance with the first aspect of the present invention.

A second business application 1000 implementing the two-party ABDS system 200 of FIG. 2 is illustrated in FIG. 10. In this example, an account holder 1002 comprising a person possesses a device in the form of a personal digital assistant (PDA) 1050. The PDA 1050 securely protects therein a private key of a public-private key pair. The PDA 1050 includes an interactive display screen 1052 and user input keys 1056. Further, the PDA 1050 has been suitably equipped with a wireless modem for digital communications over a wireless communications network 1008. The PDA 1050 is associated with a brokerage trading, asset management, and credit account maintained with an account authority represented by a brokerage firm 1012, which is licensed to buy and sell securities on behalf of the account holder 1002 and which is equipped to received wireless communications over network 1008.

Accounts maintained with the brokerage firm 1012 are associated with account records maintained in one or more account databases, collectively referred to and illustrated in FIG. 10 by account database 1014. With reference to FIG. 11, each account includes a unique account identifier comprising an account number 1116. Each account number 1116 identifies within the account database 1014 account information 1140, including customer-specific information 1142 and account-specific information 1144. In accordance with the present invention, the account number 1116 also identifies public key information 1118, which includes at least a public key of an account holder of the respective account. Also in accordance with a feature of the present invention, the account number 1116 identifies device profile information 1170 for the device that retains the private key corresponding with the public key associated with the account.

In the example of FIG. 10, the customer-specific information 1142 includes, for example, the name, address, social security number and/or tax-ID number of the account holder. The account-specific information 1144 includes, for example, the account status, account balance, available credit, if any, asset holdings, pending transactions, capital gains for the year, associated account identifiers, and the like. The public key information 1118 of the account of the account holder 1002 includes the public key corresponding to the private key retained within the PDA 1050. The device profile information 1170 includes information specific to the PDA 1050.

As stated previously, an EC from the account holder 1002 to the brokerage firm 1012 may be used for three different purposes: session authentication, transaction authentication, and transaction confirmation. In this business application, an EC used for session authentication typically occurs when the account holder 1002 initially attempts to login to or otherwise access the online site of the brokerage firm 1012. Transaction confirmation occurs in this business application when, for example, the account holder 1002 specifically requests the brokerage firm 1012 to buy or sell a specific security—in which case the brokerage firm 1012 requires the account holder 1002 to confirm such a request by digitally signing the request with the PDA 1050 (and, preferably, with reentry of a Secret or biometric value).

Figure 12:
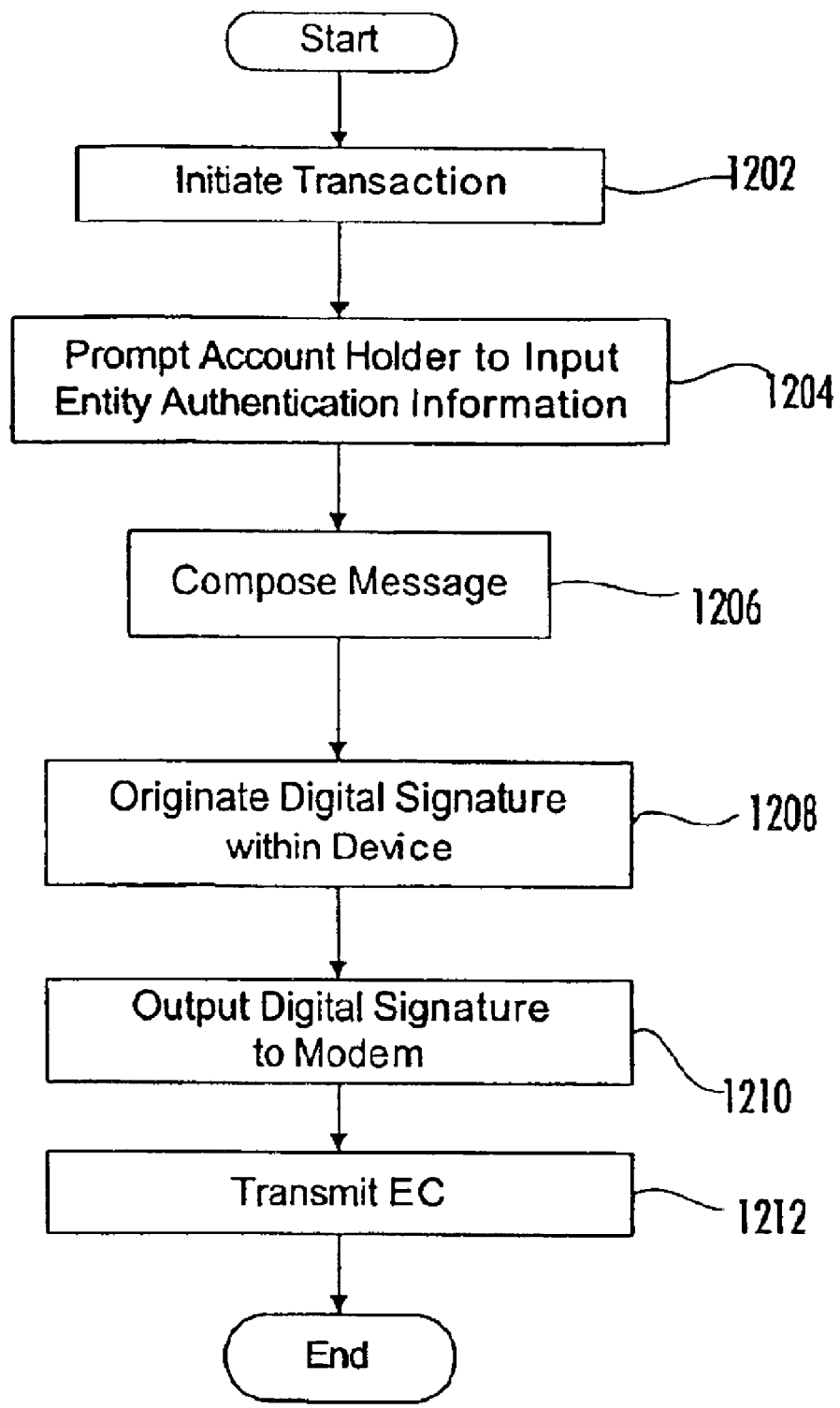
FIG. 12 illustrates a flowchart of steps performed by an account holder in the business application of FIG. 10.

Regardless of which type of EC is communicated from the account holder 1002 to the brokerage firm 1012, the basic methodology for composing and digitally signing the message (on the account holder end) and for authenticating the message and authenticating the entity (on the account authority end) is essentially the same. For example, turning now to FIG. 12, a transaction is initiated (Step 1202) when the account holder 1002 first establishes a wireless connection to the online site of the brokerage firm 1012 or, after such connection has already been established, when the account holder 1002 requests information regarding his account or requests that the brokerage firm 1012 perform an action with regard to the account. Next, the online site causes the PDA 1050 to prompt (Step 1204) the account holder 1002 to provide Factor B entity authentication information, such as a PIN, if necessary, using the interactive display 1052.

Once the PIN is input, an electronic message is composed (Step 1206) for sending to the brokerage firm 1012. For initial login, the message is simply the relevant account number. For other transactions, the message includes an instruction (i1) from the account holder 1002 to the brokerage firm 1012. For initial login, the PDA 1050 displays a menu of available accounts. Such accounts are displayed in response to communications received from the brokerage firm 1012 or from software pre-installed on the PDA 1050 for this purpose. Preferably, the available accounts are stored within a memory on the PDA 1050 and presented on display 1052 to the account holder 1002 for selection. Of course, if only one account is available in memory on the PDA 1050, then that account is selected by default without requiring specific selection by the account holder 1002. For post-login transactions, the PDA 1050 displays a menu of operations that can be performed on the selected account. Again, this menu of options may be preprogrammed into the PDA 1050 or downloaded from the brokerage firm 1012 when the electronic connection is made between the PDA 1050 and the brokerage firm 1012. Such operations include, for example, a request for an account status, an account balance, available credit, a list of current asset holdings, or a list of pending transactions, or a request to purchase or sell a security. Upon selection of the desired operation by the account holder 1002, and after any additional information relating thereto is obtained from the account holder 1002, such as a purchase or sale amount and selection of a particular security, the PDA 1050 composes an electronic message that includes an instruction to the brokerage firm 1012 corresponding to the desired operation of the account holder 1002. The electronic message also includes the account number 1116 corresponding to the account selected by the account holder 1002.

The PDA 1050 then originates (Step 1208) a digital signature for the message by first calculating a hash value for the data and then encrypting the hash value using the private key retained within the PDA 1050. The PDA 1050 then outputs (Step 1210) the message and digital signature therefor to the wireless modem of the PDA 1050, which then transmits (Step 1212) the message and the digital signature in an EC to the brokerage firm 1012.

Figure 13:
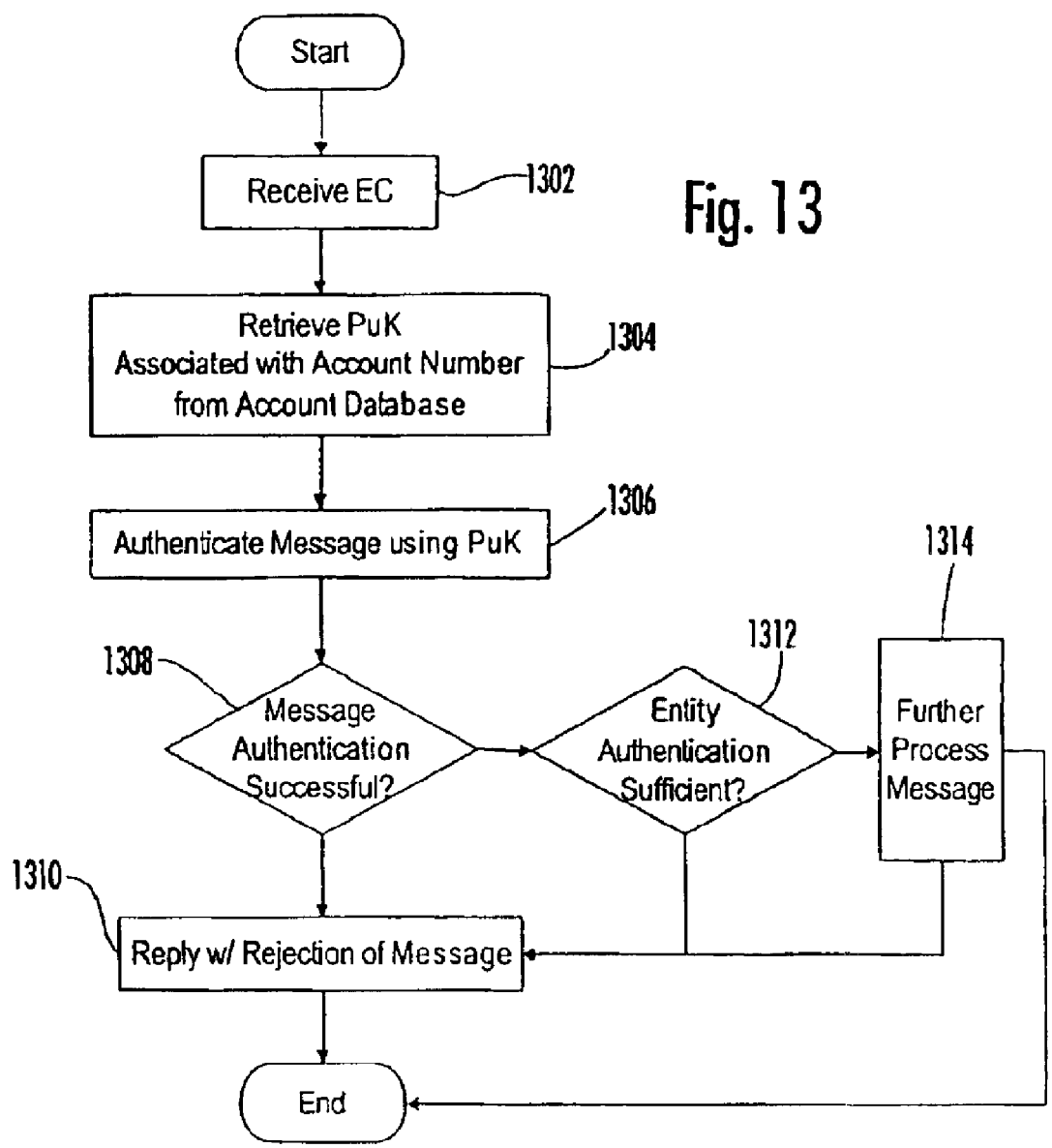
FIG. 13 illustrates a flowchart of steps performed by an account authority in the business application of FIG. 10.

With reference to FIG. 13, the EC is received (Step 1302) by brokerage firm 1012 from the PDA 1050. The brokerage firm 1012 then retrieves (Step 1304) from the account database 1014 the public key that is identified by the account number 1116. Using this public key, the brokerage firm 1012 attempts to authenticate (Step 1306) the message. If the message does not authenticate (in Step 1308) using the public key, then the brokerage firm 1012 responds (Step 1310) with a rejection of the message (i.e., refusal to grant access to the account or to perform the requested action). If the message authenticates (Step 1308), then the brokerage firm 1012 concludes that the message, in fact, came from the person possessing the correct PDA 1050 associated with the identified account number 1116—(i.e., Factor A Entity Authentication is obtained). The brokerage firm 1012 then determines (Step 1312) whether or not the Factor B entity authentication (e.g., PIN) provided is sufficient for further processing of the specific message. If not, then the brokerage firm 1012 responds (Step 1310) with a rejection of the message (e.g., refusal to grant access to the account or perform the requested action). If the entity authentication is sufficient (in Step 1312), then the brokerage firm 1012 further processes (Step 1314) the message.

In the present example, further processing (Step 1314) of the message after initial session authentication includes accessing the relevant portion(s) of the account record and displaying the welcome web site screen on the PDA personalized to the account holder 1002. Further processing of the message after initial login includes executing the instruction (if possible) and updating the account record based on the executed instruction. If it is not possible to execute the instruction, then the brokerage firm 1012 responds (Step 1310) with a rejection of the message. For example, if the account holder 1002 instructs the brokerage firm 1012 to provide an account status, an account balance, amount of available credit, a list of current asset holdings, a list of pending transactions, or information regarding a particular security, then the brokerage firm 1012 obtains the requested information and transmits it to the PDA 1050 over the wireless communication network 1008 for display to the account holder 1002 on the display screen 1052 of the PDA 1050. If the account holder 1002 instructs the brokerage firm 1012 to purchase a specified number of shares of a particular security at a specified price, then the brokerage firm 1012 first confirms that the funds for the purchase are available and, if so, places an appropriate "buy" order in the securities market in conventional manner. If and when the purchase of the securities closes, the account records are updated accordingly (i.e., the shares purchased are added to the list of asset holdings and the purchase price (plus commissions) is debited or charged to the account). If the account holder 1002 instructs the brokerage firm 1012 to sell a specified number of shares of a particular security at a specified price, then the brokerage firm 1012 first confirms that the number of shares of the particular security are owned by the account holder 1002 and capable of being sold and, if so, places an appropriate "sell" order in the securities market in conventional manner. If and when the sale of the securities closes, the account records are updated accordingly (i.e., the shares sold are removed from the list of asset holdings and the sales price (minus commissions) is credited to the account). For instructions to buy or sell securities, it is preferable for the brokerage firm 1012 to obtain a confirmation transaction, as described above, from the account holder 1002 before executing the requested instruction.

iii. Bill Payment Services Account

Figure 14:
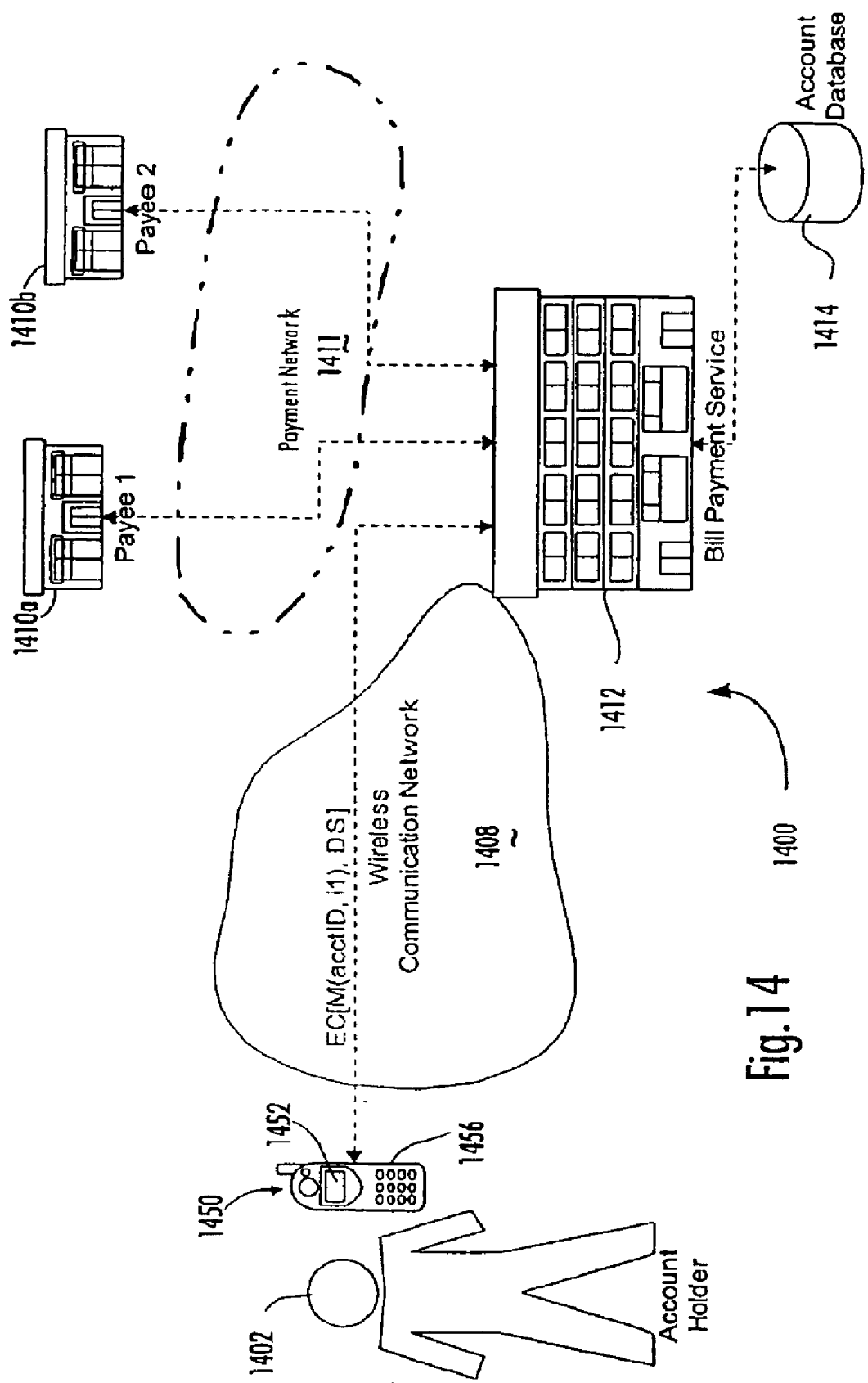
FIG. 14 illustrates a third business application in accordance with the first aspect of the present invention.

A third business application 1400 implementing the two-party ABDS system 200 of FIG. 2 is illustrated in FIG. 14. In this example, an account holder 1402 comprising a person possesses a device in the form of a cell phone 1450. The cell phone 1450 securely protects therein a private key of a public-private key pair. The cell phone 1450 includes a display screen 1452 and a number pad 1456. Further, the cell phone 1450 has been suitably equipped for wireless voice and data communications over a wireless communications network 1408. The cell phone 1450 is associated with a bill payment account (which may include one or more checking accounts, credit card accounts, etc.) maintained with an account authority represented by a bill payment service 1412, which is authorized to pay bills to third parties on behalf of the account holder 1402 and which has an automated call center equipped to received wireless voice and data communications over network 1408.

Various payees 1410a, 1410b to which the account holder 1402 owes money are also illustrated in FIG. 14. Preferably, the payees 1410a, 1410b are third parties to which the account holder 1402 is obligated to pay periodically and on a recurring basis. Payees 1410a, 1410b may be, for example, mortgage companies, utility companies, credit card companies, retail merchants, department stores, doctors' offices, and other goods and/or service providers that typically bill on a monthly basis for charges incurred by the account holder 1402 during the previous month. In this particular business application 1400, it is contemplated that the account holder 1402 will provide the bill payment service 1412 with the billing information, such as statement date, bill due date, and bill amount owed to each payee 1410a, 1410b. In an alternative embodiment, the payees 1410a, 1410b can be authorized by the account holder 1402 to provide billing information directly to the bill payment service 1412. Such billing information may be transmitted by any suitable means, including via dedicated payment network 1411.

Accounts maintained with the bill payment service 1412 are associated with account records maintained in one or more account databases, collectively referred to and illustrated in FIG. 14 by account database 1414. With reference to FIG. 15, each account includes a unique account identifier comprising an account number 1516. Each account number 1516 identifies within the account database 1414 account information 1540, including customer-specific information 1542 and account-specific information 1544. In accordance with the present invention, the account number 1516 also identifies public key information 1518, which includes at least a public key of an account holder of the respective account. Also in accordance with a feature of the present invention, the account number 1516 identifies device profile information 1570 for the device that retains the private key corresponding with the public key associated with the account.

In the example of FIG. 14, the customer-specific information 1542 includes, for example, the name, address, social security number and/or tax-ID number of the account holder. The account-specific information 1544 includes, for example, a list of available payment accounts, account balances for each such payment account, authorized credit card number(s), available credit, if any, with the bill payment service 1412, current statement, current status report, list of payees registered by the account holder 1402, customer account number and billing address for each registered payee, and current billing information for each registered payee (if available), and the like. The public key information 1518 of the account of the account holder 1402 includes the public key corresponding to the private key retained within the cell phone 1450. The device profile information 1570 includes information specific to the cell phone 1450.

As stated previously, an EC from the account holder 1402 to the bill payment service 1412 may be used for three different purposes: session authentication, transaction authentication, and transaction confirmation. In this business application, an EC used for session authentication typically occurs when the account holder 1402 initially attempts to login to or otherwise access the automated call center of the bill payment service 1412. Transaction confirmation occurs in this business application when, for example, the account holder 1402 specifically requests the bill payment service 1412 to pay a certain bill—in which case the bill payment service 1412 requires the account holder 1402 to confirm such a request by digitally signing the request with the cell phone 1450 (and, potentially, providing additional entity authentication information or status).

Figure 16:
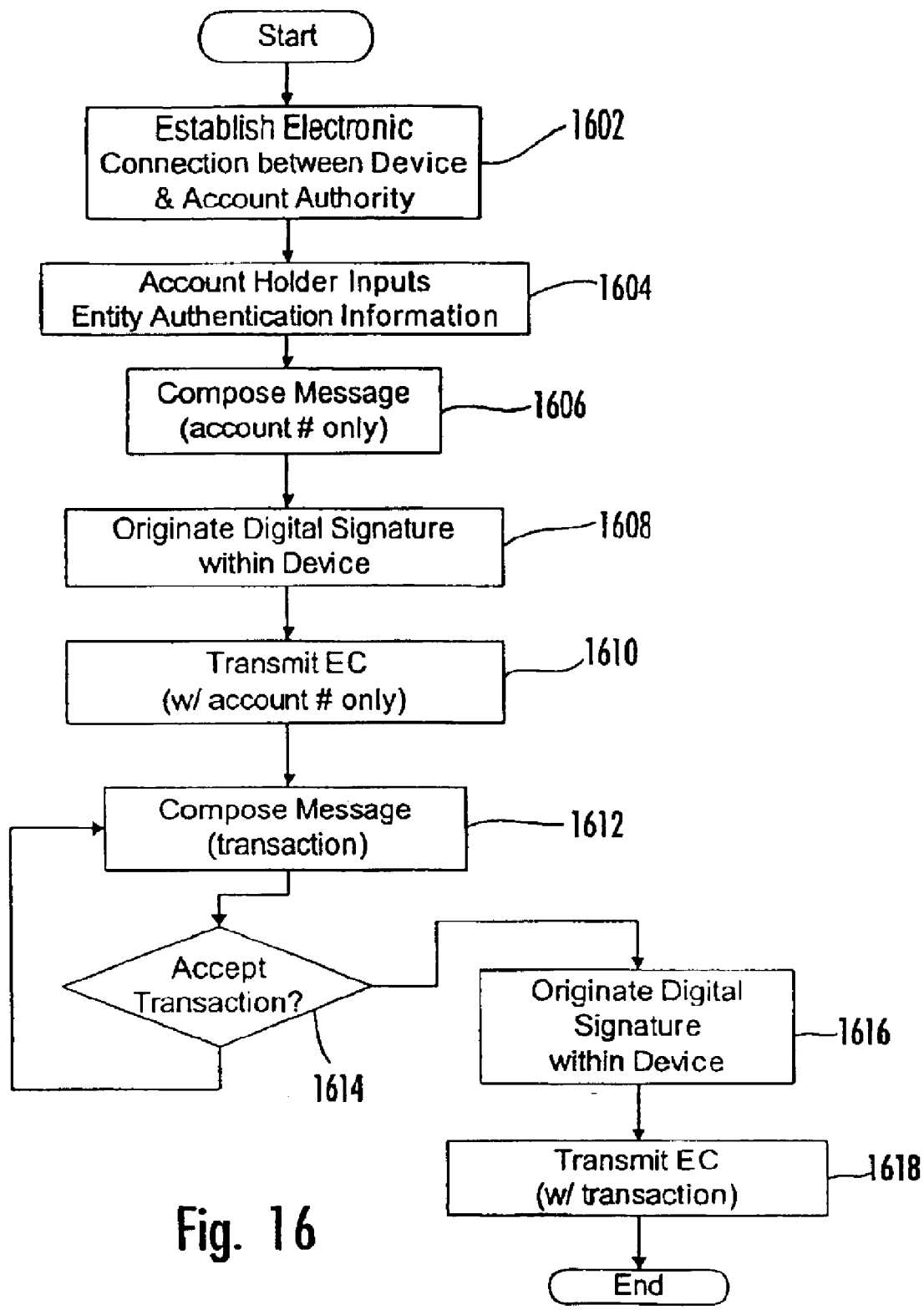
FIG. 16 illustrates a flowchart of steps performed by an account holder in the business application of FIG. 14.

Regardless of which type of EC is communicated from the account holder 1402 to the bill payment service 1412, the basic methodology for composing and digitally signing the message (on the account holder end) and for authenticating the message and authenticating the entity (on the account authority end) is essentially the same. For example, turning now to FIG. 16, a transaction is initiated (Step 1602) when the account holder 1402 uses the cell phone 1450 to establish a wireless phone call to the automated call center of the bill payment service 1412 or, after such connection has already been established, when the account holder 1402 requests information regarding his account or requests that the bill payment service 1412 perform an action with regard to the account. For initial login or for confirmation of a specifically requested transaction, the account holder 1402 next inputs (Step 1604) Factor B entity authentication information, such as a PIN, using the number pad 1456 of the cell phone 1450.

Once the PIN is input, an electronic message is composed (Step 1606) for sending to the bill payment service 1412. The first message (containing only the account number) is composed by the account holder 1402 depressing keys on the number pad 1456 of the cell phone 1450 followed by a designated key (or series of keys), such as the "#" key, which indicates that the first message is complete. Preferably, depressing the designated key (or series of keys) not only notifies the cell phone 1450 that the first message is complete, but also causes the cell phone 1450 to originate (Step 1608) a digital signature for this first message. Next, the cell phone 1450 transmits (Step 1610) the message and digital signature in an EC to the bill payment service 1412 over the wireless communications network 1408.

Figure 17:
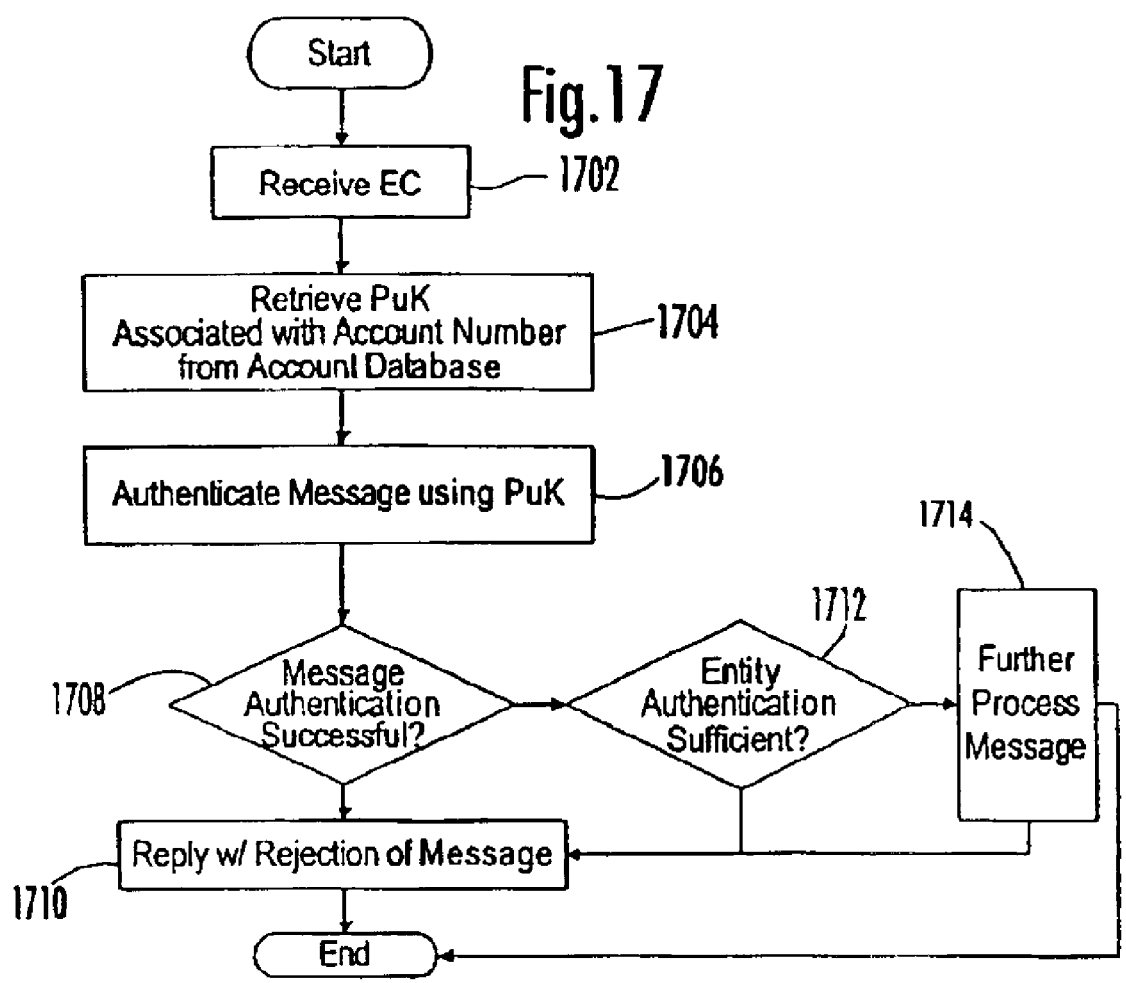
FIG. 17 illustrates a flowchart of steps performed by an account authority in the business application of FIG. 14.

Now referring to FIG. 17, this initial EC is received (Step 1702) by the bill payment service 1412 from the cell phone 1450. The bill payment service 1412 retrieves (Step 1704) from the account database 1414 the public key that is identified by the account number 1516. Using this public key, the bill payment service 1412 attempts to authenticate (Step 1706) the message. If the message does not authenticate (in Step 1708), then the bill payment service 1412 responds (Step 1710) to the sender of the EC with a rejection of the EC. Such a response may indicate the reason for the rejection, if desired by the bill payment service 1412. On the other hand, if the message authenticates (in Step 1708), the bill payment service 1412 concludes that the message, in fact, came from the person possessing the correct cell phone 1450 associated with the identified account number 1516— (i.e., Factor A Entity Authentication is obtained). The bill payment service 1412 then determines (Step 1712) whether or not the Factor B entity authentication (e.g., PIN) provided is sufficient for further processing of the specific message. If not, then the bill payment service 1412 responds (Step 1710) with a rejection of the message (e.g., refusal to grant access to the account or perform the requested action) and, again, such response may indicate the reason for the rejection. If the entity authentication (in Step 1712) is sufficient, then the bill payment service 1412 further processes (Step 1714) the message.

In the present example, further processing (Step 1714) of the message, which, in response to the message containing only the account number 1516, is an automated telephonic response to the account holder 1402 with a menu of options that can be performed on the now-identified account 1516.

Referring back to FIG. 16, the presentation of the automated telephonic response initiates the process of generating (Step 1612) a bill payment message. In this specific illustration, the automated telephonic response presents the account holder 1402 with the following: "Press 1 to pay a bill, Press 2 to schedule a payment due date for a new bill for a registered payee, Press 3 to register a new payee." The account holder 1402 is then lead through a hierarchy of menu options over the cell phone 1450 until a complete bill payment transaction can be formulated by the bill payment service 1412. Preferably, no digital signatures need to be generated or sent during the menu selection/message generation process. Upon completion of the menu selections, the bill payment service 1412 audibly presents the account holder 1402 with a proposed payment transaction. The number (#) key is used in the following example merely for illustrative purposes; however, it should be understood that any other key, sequence of keys, or operation of the phone could alternatively be used. For example, if the account holder 1402 initially selected option 1 (to pay a bill), a proposed instruction could be: "You have requested that we pay [Payee 1] in the amount of $51.00 on Nov. 4, 1998, for a bill dated Oct. 22, 1998, with reference to [Payee 1] customer account number 012-00009-003, using your payment account # 01-009000-010. If this is correct, please depress the number (#) key on your phone." If the account holder 1402 had initially selected option 2 (to input a new bill for a registered payee), a proposed instruction could be: "You have requested that we schedule a payment due to [Payee 1] in the amount of $51.00 due on or before Nov. 22, 1998, for a bill dated Oct. 22, 1998, with reference to [Payee 1] customer account number 012-00009-003. If this is correct, please depress the number (#) key on your phone." If the account holder 1402 had initially selected option 3 (to register a new payee), a proposed instruction could be: "You have requested that we add [Payee 1] to your list of registered payees. You have indicated that your customer account number with [Payee 1] is 012-00009-003 and that [Payee 1]'s billing address is 123 Main St, AnyTown, AnyState 01234. If this is correct, please depress the number (#) key on your phone." If the account holder 1402 presses any key other than the number (#) key after this audio prompt, the proposed instruction is not accepted (in Step 1614) and the process of composing a message (Step 1612) through selection of menu items continues. On the other hand, if the account holder 1402 presses the number (#) key on the cell phone 1450 after one of the above audio prompts, the proposed payment transaction is accepted (Step 1614) and the cell phone 1450 originates (Step 1616) a digital signature for the proposed payment transaction. The message that is digitally signed can either be the digital audio file of the proposed payment transaction as accepted, which can be temporarily stored in RAM on the cell phone 1450, or the bill payment service 1412 can transmit a message to the cell phone 1450 for digital signature in response to the number (#) key being depressed in response to the last menu selection. In either case, the cell phone 1450 then transmits (Step 1618) the message and digital signature in an EC to the bill payment service 1412 over the wireless communications network 1408.

As described immediately above, the message that is digitally signed can be a digital audio file of the proposed instruction as accepted by the account holder 1402 by pressing the number (#) key. In an alternate embodiment of this aspect of the invention, rather than pressing the number (#) key to accept the proposed instruction, the account holder 1402 verbally accepts the proposed instruction or verbally composes an instruction, which is temporarily stored in RAM on the cell phone 1450 as a digital file and for which a digital signature is then originated by the cell phone 1450.

Referring again to FIG. 17, the steps performed by the bill payment service 1412 in response to a payment transaction EC received from the account holder 1402 are essentially the same as those performed in response to an account-only EC. The main difference, however, is in Step 1714, during which the bill payment service 1412 further processes the payment transaction message by performing or attempting to perform the payment instruction. Performing the instruction typically involves accessing the relevant portion(s) of the account record, executing the instruction (if possible), and updating the account record based on the executed instruction. If it is not possible to execute the instruction, then the bill payment service 1412 responds (Step 1710) with a rejection of the message. For example, if the account holder 1402 instructs the bill payment service 1412 to pay a bill, then the bill payment service 1412 schedules payment to be made (by mail or electronic transfer through payment network 1411) on the scheduled payment date and confirms that the funds are currently available from the payment account 1516 specified by the account holder 1402. Either the funds may be set aside at that time or the bill payment service 1412 may re-confirm availability of funds from the specified payment account 1516 on the scheduled payment date. On the scheduled payment date, if the funds are available, then the bill payment services 1412 mails or electronically transfers the funds to the designated payee and updates the account records accordingly. If the account holder 1402 merely instructs the bill payment service 1412 to schedule a new bill that is due to be paid to a registered payee, then the bill payment service 1412 merely updates the account records accordingly. Likewise, if the account holder 1402 merely instructs the bill payment service 1412 to add a new payee to the account holder's list of registered payees, then the bill payment service 1412 merely updates the account records accordingly.

iv. Credit Bureau Account

Figure 18:
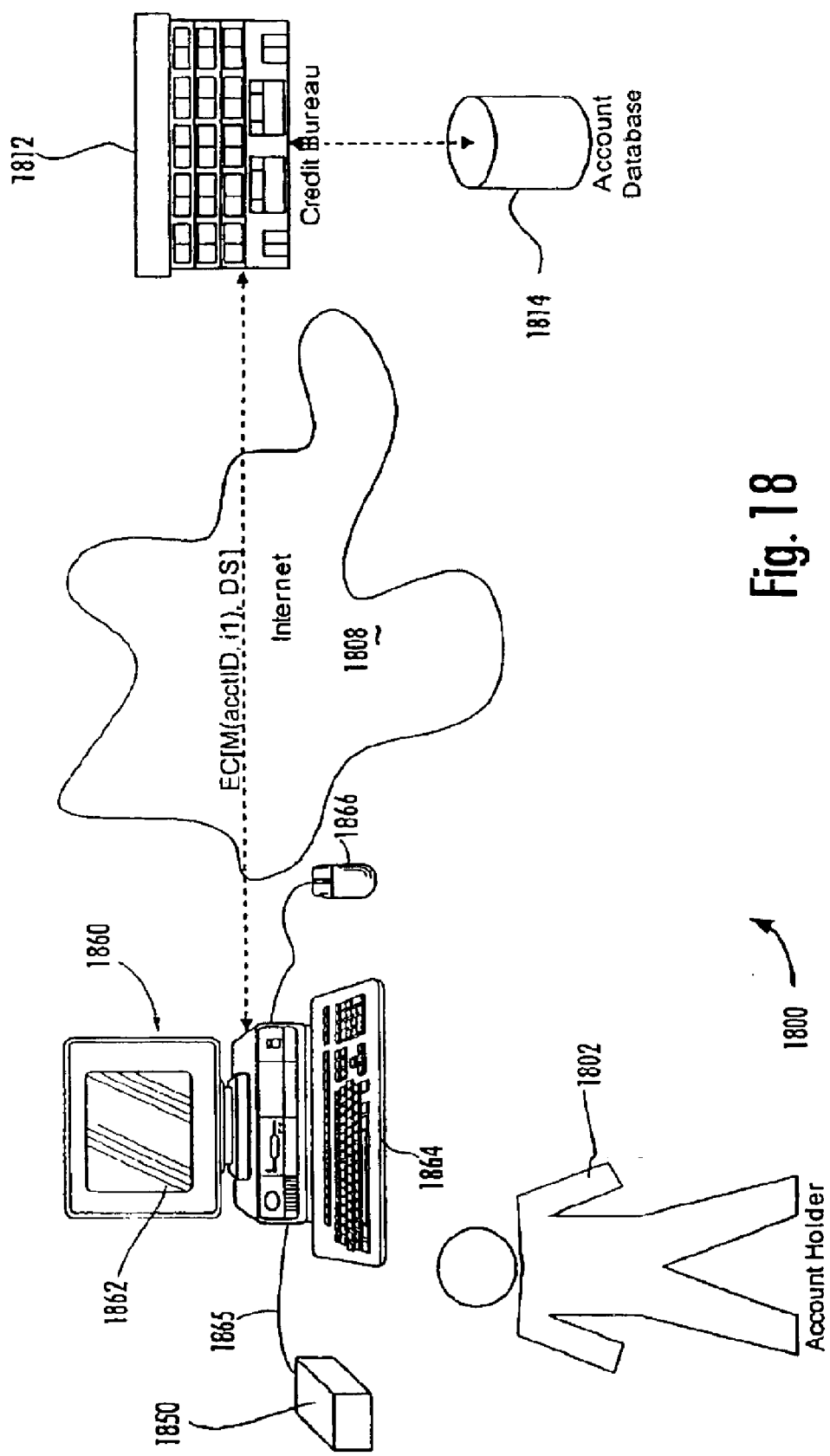
FIG. 18 illustrates a fourth business application in accordance with the first aspect of the present invention.

A fourth business application 1800 implementing the two-party ABDS system 200 of FIG. 2 is illustrated in FIG. 18. In this example, an account holder 1802 comprising a person possesses a device in the form of a dongle 1850 connected via cable 1865 into a suitable port (USB, serial, parallel, etc.) of a personal computer 1860. The dongle 1850 securely protects therein a private key of a public-private key pair. The personal computer 1860 is conventional in that it includes a monitor 1862, a keyboard 1864, and a mouse 1866. The dongle 1850 is associated, among other accounts, with a personal credit report account maintained by an account authority represented by a credit bureau 1812. The computer 1860 has suitable web browser software installed thereon to enable it to communicate over the Internet 1808, in conventional manner, such as via a modem, LAN line, etc., with a secure web site hosted by credit bureau 1812.

Accounts maintained with the credit bureau 1812 are associated with account records maintained in one or more account databases, collectively referred to and illustrated in FIG. 18 by account database 1814. With reference to FIG. 19, each account includes a unique account identifier comprising an account number 1916. Each account number 1916 identifies within the account database 1814 account information 1940, including customer-specific information 1942 and account-specific information 1944. In accordance with the present invention, the account number 1916 also identifies public key information 1918, which includes at least a public key of an account holder of the respective account. Also in accordance with a feature of the present invention, the account number 1916 identifies device profile information 1970 for the device that retains the private key corresponding with the public key associated with the account.

In the example of FIG. 18, the customer-specific information 1942 includes, for example, the name, address, social security number and/or tax-ID number of the account holder. The account-specific information 1944 includes, for example, a list of accounts, payment history on each account, past due amount on each account, if any, total debt, credit score, overall credit status report, and the like. The public key information 1918 of the account of the account holder 1802 includes the public key corresponding to the private key retained within the dongle 1850. The device profile information 1970 includes information specific to the dongle 1850.

As stated previously, an EC from the account holder 1802 to the credit bureau 1812 may be used for three different purposes: session authentication, transaction authentication, and transaction confirmation. For example, a common type of session authentication occurs in this business application when the account holder 1802 initially attempts to login to or otherwise access the secure web site maintained by the credit bureau 1812. A further type of session entity authentication occurs when the account holder 1802 requests access to specific records or pieces of information that are very sensitive, secure, confidential, or private for the account holder 1802, in which case, the credit bureau 1812 may require a stronger level of entity authentication than is required merely to access the secure web site. Transaction confirmation is applicable in this business application when, for example, the account holder 1802 requests the credit bureau 1812 to add or change information in the account maintained by the credit bureau 1812, in which case the credit bureau 1812 requires the account holder 1802 to confirm such a transaction by digitally signing the request with the dongle 1850.

Figure 20:
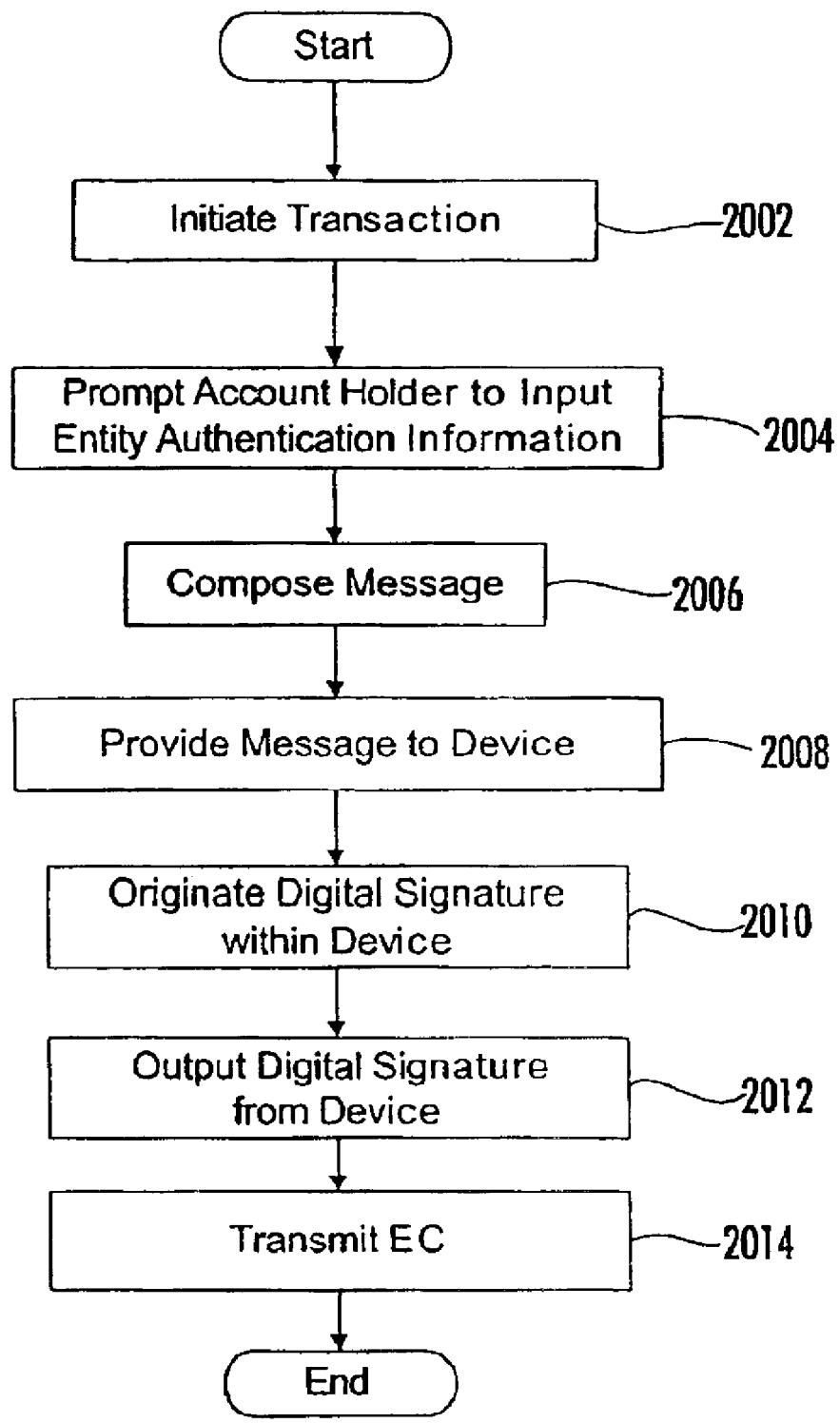
FIG. 20 illustrates a flowchart of steps performed by an account holder in the business application of FIG. 18.

Regardless of which type of EC is communicated from the account holder 1802 to the credit bureau 1812, the basic methodology for composing and digitally signing the message (on the account holder end) and for authenticating the message and authenticating the entity (on the account authority end) is essentially the same. For example, turning now to FIG. 20, a transaction is initiated (Step 2002) when the account holder 1802 first accesses the secure web site of the credit bureau 1812 over the Internet 1808 using computer 1860 or, after such access has already been established, when the account holder 1802 requests access to specific information or requests that the credit bureau 1812 perform an action on the account. Next, the web site causes the computer 1860 to prompt (Step 2004) the account holder 1802 to input Factor B entity authentication information, such as a PIN, using the keyboard 1864.

Once the PIN is input, an electronic message is composed (Step 2006) for sending to the credit bureau 1812. For initial login, the message is simply the relevant account number. For subsequent transactions, the message includes an instruction (II) from the account holder 1802 to the credit bureau 1812. For initial login, the computer 1860 displays on monitor 1862 a data input screen that contains an account number data entry field. For subsequent transactions, the computer 1860 displays on monitor 1862 a data input screen that contains additional data entry or "product" selection buttons with which the account holder 1802 is able to select the type of transaction he would like to initiate, such as, "provide credit report," "provide credit score," "provide total debt," "submit additional information," or "report error." Once any necessary data fields have been filled in and an instruction selected (if applicable), the account holder 1802 activates the "digital signature" button also displayed on the data entry screen using the mouse 1866.

Selecting this button causes the computer 1860 to bundle the data entered into the data entry fields and pull down menus into a single message. This message then is transmitted (Step 2008) via cable 1865 from the computer 1860 to the dongle 1850 for digital signing by the account holder 1802. In this regard, upon receipt of data representing the message, the dongle 1850 originates (Step 2010) a digital signature for the message by first calculating a hash value for the data and then encrypting the hash value using the private key retained within the dongle 1850. The dongle 1850 then outputs (Step 2012) the digital signature, which is received by the computer 1860. The computer 1860 then transmits (Step 2014) the message and the digital signature therefor in an EC to the credit bureau 1812.

Figure 21:
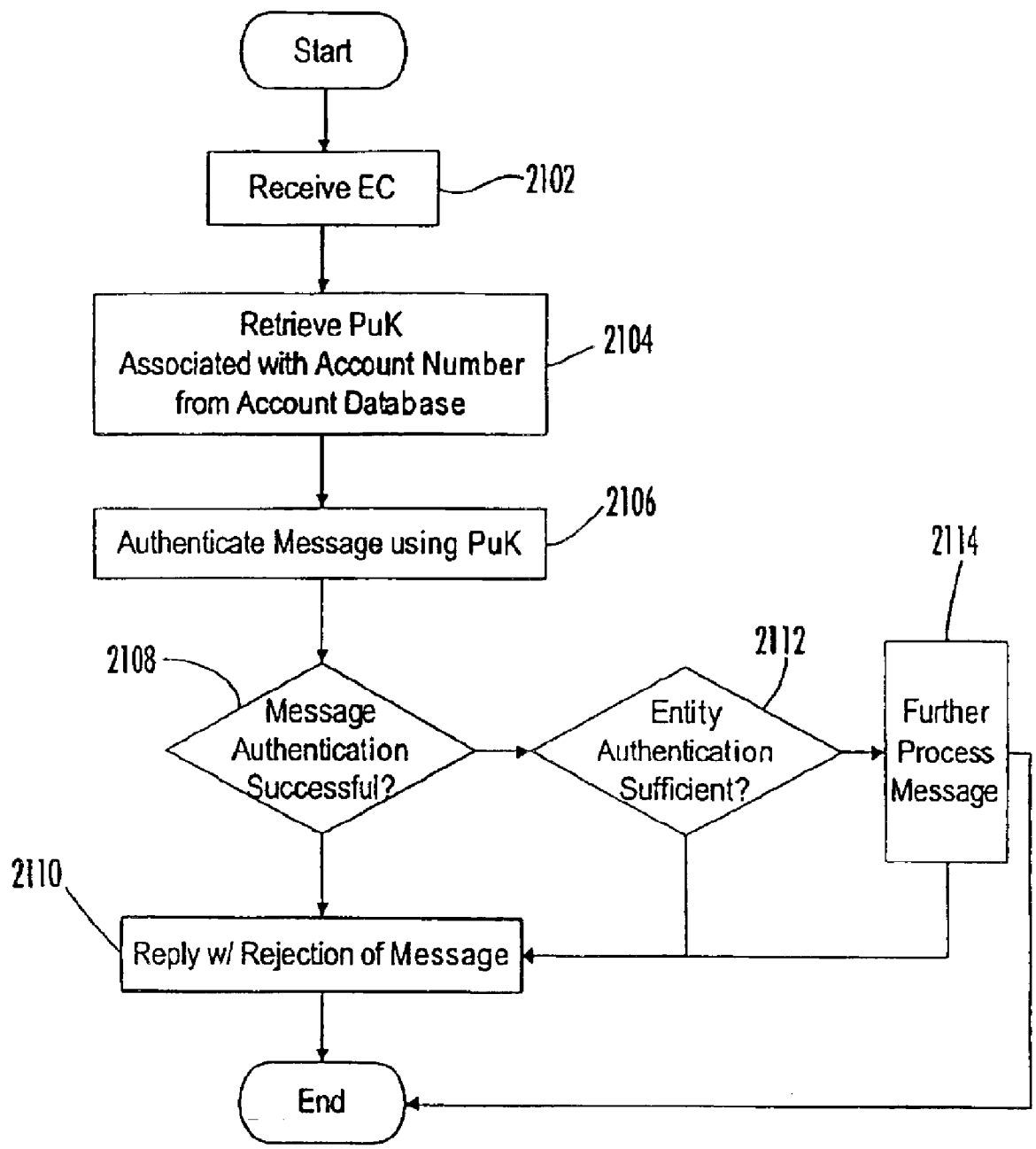
FIG. 21 illustrates a flowchart of steps performed by an account authority in the business application of FIG. 18.

With reference to FIG. 21, the EC is received (Step 2102) by the credit bureau 1812 from the computer 1860. The credit bureau 1812 then retrieves (Step 2104) from the account database 1814 the public key that is identified by the account number 1916 (or other unique identifier such as name or social security number). Using this public key, the credit bureau 1812 attempts to authenticate (Step 2106) the message. if the message does not authenticate (in Step 2108) using the public key, then the credit bureau 1812 responds (Step 2110) with a rejection of the message (i.e., refusal to grant access to the account or to perform the requested action). If the message authenticates (Step 2108), then the credit bureau 1812 concludes that the message in fact, came from the person possessing the correct dongle 1850 associated with the identified account number 1916—(i.e., Factor A Entity Authentication is obtained). The credit bureau, 1812 then determines (Step 2112) whether or not the Factor B entity authentication (e.g., PIN) provided is sufficient for further processing of the specific message. If not, then the credit bureau 1812 responds (Step 2110) with a rejection of the message (e.g., refusal to grant access to the account or to perform the request action on the account) and, again, such response may indicate the reason for the rejection. If the entity authentication is sufficient (in Step 2112), then the credit bureau 1812 further processes (Step 2114) the message.

In the present example, further processing (Step 2114) of the message after initial session authentication includes accessing the relevant portion(s) of the account record and displaying the welcome web site screen on the computer 1860 personalized to the account holder 1802. Further processing of the message after initial login includes accessing the relevant portion(s) of the account record, executing the instruction (if possible), and updating the account record based on the executed instruction. If it is not possible to execute the instruction, then the credit bureau 1812 responds (Step 2110) with a rejection of the message. For example, if the account holder 1802 instructs the credit bureau 1812 to provide a full credit report, a credit score, or a total debt calculation, then the credit bureau 1812 accesses the account database 1814 to obtain the relevant information, which is then transmitted to the computer 1860 for display on monitor 1862 to the account holder 1802. If the account holder 1802 instructs the credit bureau 1812 that it desires to submit additional information for inclusion in the account database 1814, then the credit bureau 1812 presents a new data entry page into which the account holder 1802 can submit new information. This new data entry page constitutes a new message that is digitally signed using the dongle 1850 and transmitted to the credit bureau 1812 in the same manner described above. Likewise, if the account holder 1802 instructs the credit bureau 1812 that it desires to report an error in the credit report or account database, then the credit bureau 1812 presents a new data entry page to the account holder 1802 into which the account holder 1802 can report the alleged error. This new data entry page constitutes a new message that is digitally signed using the dongle 1850 and transmitted to the credit bureau 1812 in the same manner described above. Once the credit bureau 1812 receives new information or an alleged error notice from the account holder 1802, then it initiates an investigation into the matter. If the information appears to be accurate, then the appropriate record(s) in the account database 1814 is updated accordingly. For some of the above instructions, it is preferably for the credit bureau 1812 to obtain a confirmation transaction, as described above, from the account holder 1802 before executing the requested instruction.

v. Patient/Personal Medical Records Account

Figure 22:
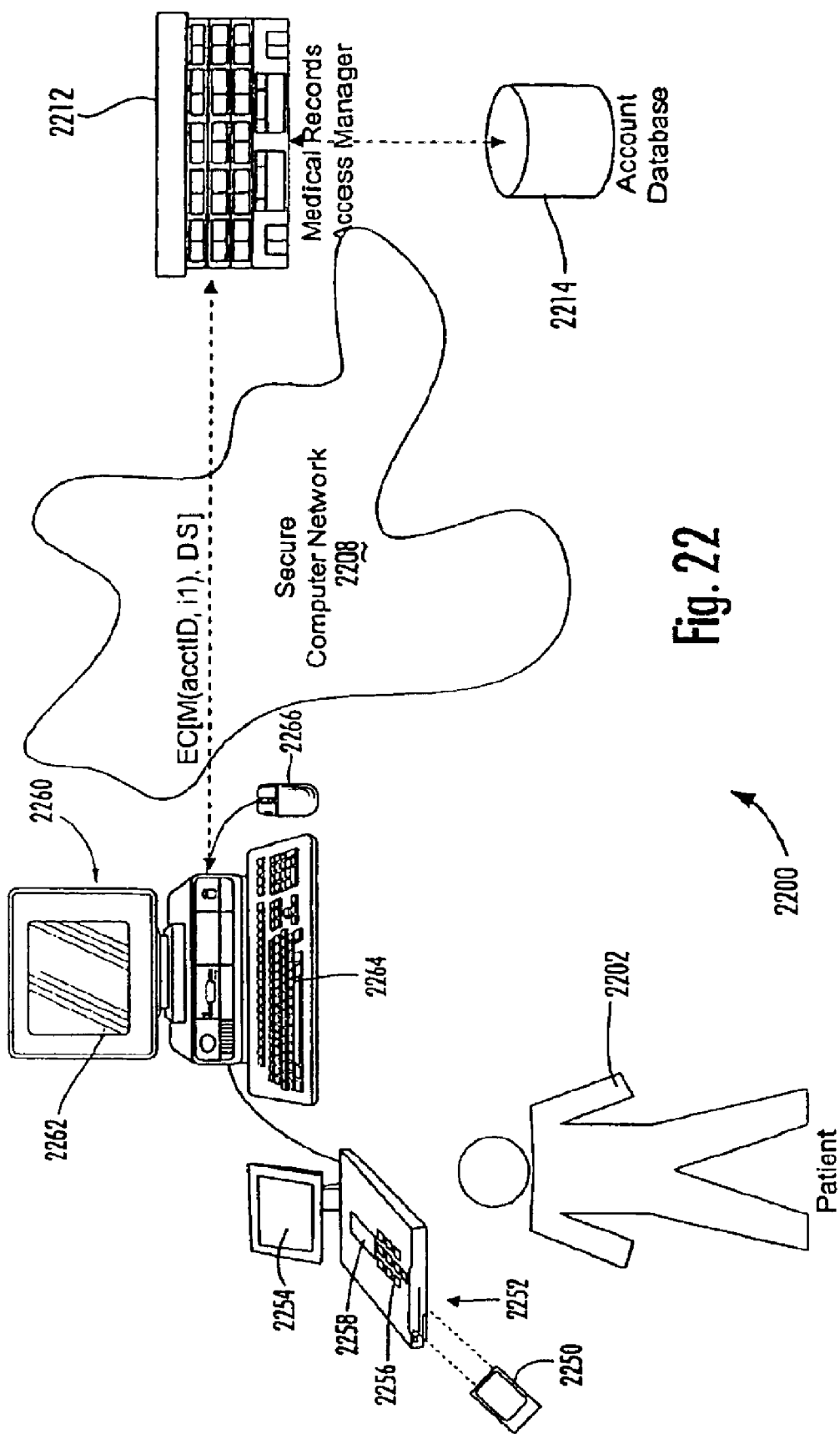
FIG. 22 illustrates a fifth business application in accordance with the first aspect of the present invention.

A fifth business application 2200 implementing the two-party ABDS system 200 of FIG. 2 is illustrated in FIG. 22. In this example, an account holder comprising a patient 2202 possesses a device in the form of a card 2250, such as an IC card. The card 2250 securely protects therein a private key of a public-private key pair and is capable of being used in a card reader 2252. The card reader 2252 includes an alphanumeric keypad 2256, a display 2254, and a thumbprint reader 2258. The card reader 2252 is connected via cable 2265 into a suitable port (USB, serial, parallel, etc.) of a personal computer 2260. The personal computer 2260 is conventional in that it includes a monitor 2262, a keyboard 2264, and a mouse 2266. As will be appreciated by those skilled in the art, using the display 2254 of the card reader 2252 for displaying messages to be digitally signed and using the keypad 2256 and thumbprint reader 2258 on the card reader 2252 for receiving entity authentication information from the patient 2202 provides greater security and less potential for fraud than if the same information was displayed and input on the computer 2260 using monitor 2262 and keyboard 2264.

The card 2250 is associated, among other accounts, with a medical records' account associated specifically with the patient 2202 and maintained by an account authority represented by a medical records access manager 2212. The computer 2260 is connected directly with the medical records access manager 2212 and has custom software installed therein for enabling patients registered with the medical records access manager 2212 to access and view selected portions of their personal medical records as maintained by the medical records access manager 2212.

Accounts maintained with the medical records access manager 2212 are associated with account records maintained in one or more account databases, collectively referred to and illustrated in FIG. 22 by account database 2214. With reference to FIG. 23, each account includes a unique account identifier comprising an account number 2316. Each account number 2316 identifies within the account database 2214 account information 2340, including customer-specific information 2342 and account-specific information 2344. In accordance with the present invention, the account number 2316 also identifies public key information 2318, which includes at least a public-key of an account-holder of the respective account. Also in accordance with a feature of the present invention, the account number 2316 identifies device profile information 2370 for the device that retains the private key corresponding with the public key associated with the account.

In the example of FIG. 22, the customer-specific information 2342 illustrated in FIG. 23 includes, for example, the name, address, social security number and/or tax-ID number of the patient 2202. The account-specific information 2344 includes, for example, current list of doctors, current insurance information, medical profile and history, known allergies, major medical conditions, organ donor information, and the like. The public key information 2318 of the account of the patient 2202 includes the public key corresponding to the private key retained within the card 2250. The device profile information 2370 includes information specific to the card 2250.

As stated previously, an EC from the patient 2202 to the medical records access manager 2212 may be used for three different purposes: session authentication, transaction authentication, and transaction confirmation. For example, a common type of session authentication occurs in this business application when the patient 2202 initially attempts to login to or otherwise access the medical record access software maintained on the computer 2260. Further session authentication occurs when the patient 2202 requests access to specific records or pieces of information that are very sensitive, secure, confidential, or private for the patient 2202, in which case, the medical records access manager 2212 may require a stronger level of entity authentication (e.g. Factor C using the thumbprint reader 2258) than is required merely to access the relevant software. Transaction confirmation is applicable in this business application (during either of the sessions described above) when, for example, the patient 2202 requests the medical records access manager 2212 to perform an action upon the patient's information contained within the medical records database (e.g., updating, adding, deleting, or forwarding such information) and the medical records access manager 2212 requires the patient 2202 to confirm such a request by digitally signing the request with the card 2250 (and, potentially, also providing additional Factor B or C entity authentication information or status).

Figure 24:
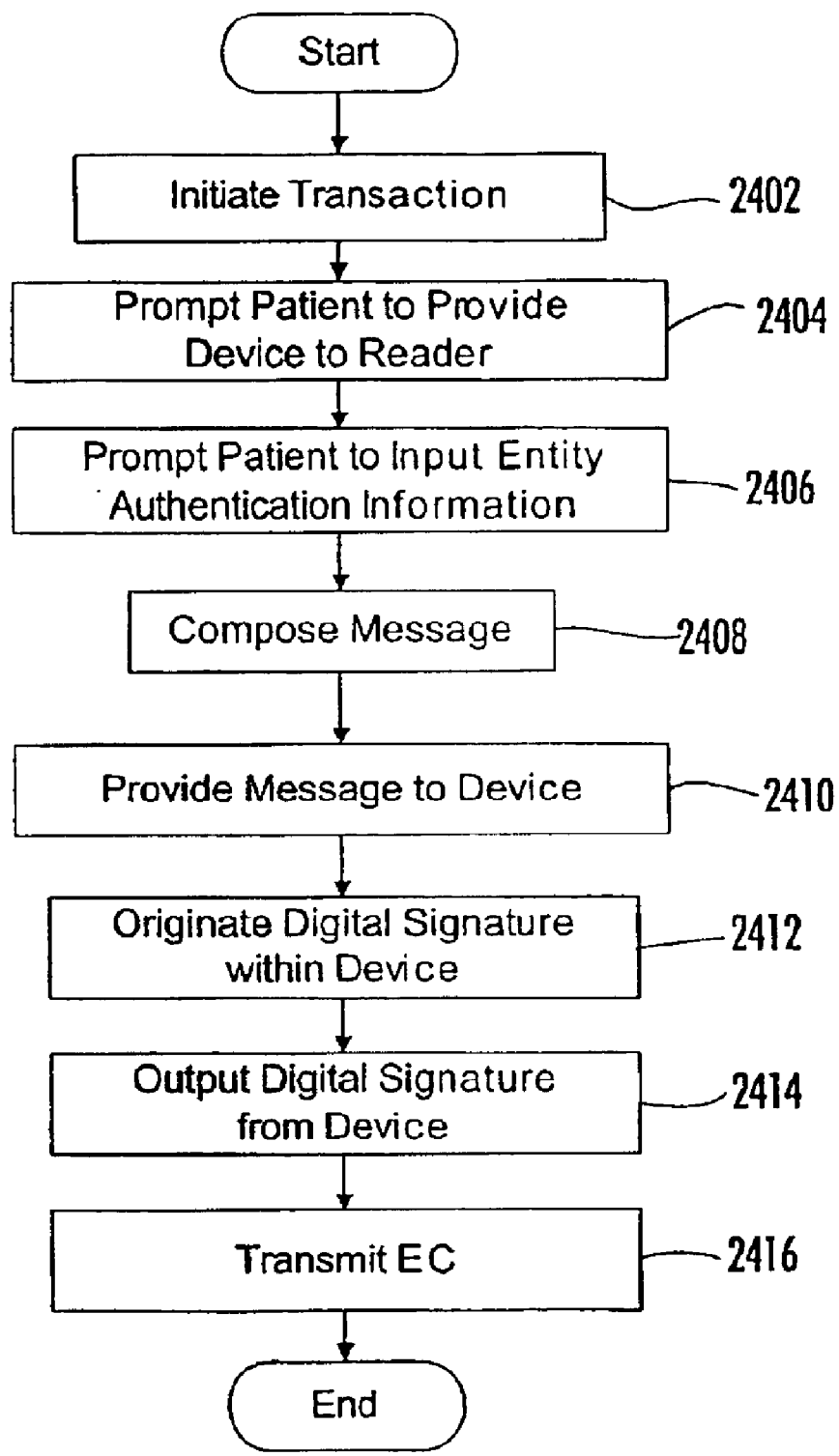
FIG. 24 illustrates a flowchart of steps performed by an account holder in the business application of FIG. 22.

Regardless of which type of EC is communicated from the patient 2202 to the medical records access manager 2212, the basic methodology for composing and digitally signing the message (on the patient end) and for authenticating the message and authenticating the entity (on the medical records access manager end) is essentially the same. For example, turning now to FIG. 24, an EC in accordance with the present invention is initiated (Step 2402) when the patient 2202 first attempts to login to the computer 2260 for accessing the medical records' software or, after such login has already been completed successfully, when the patient 2202 requests sensitive patient information or requests that the medical records access manager 2212 perform an action with regard to the patient's account. In either case, the computer 2260 prompts (Step 2404) the patient 2202 to provide the card 2250 to the card reader 2252 (e.g., by inserting the card 2250 if the reader 2252 is a "contact" type reader or by bringing the card 2250 into close proximity to the reader 2252 if it is a "contactless" type reader) if it has not already been so provided. The computer 2260 then prompts (Step 2406) the patient 2202 to provide Factor B and/or C entity authentication information using the alphanumeric keypad 2256 and/or the thumbprint reader 2258.

Once such entity authentication information is provided, an electronic message is composed (Step 2408) for sending to the medical records access manager 2212. In this case, with an initial EC that merely requests access to the system, the message is merely the account number 2316 associated with the account maintained by the medical records access manager 2212. Preferably, the reader 2252 displays on display 2254 a menu of available accounts from which the patient 2202 can select. Preferably, such available accounts are stored within memory on the card 2250 and retrieved by the reader 2252 for selection by the patient 2202. Of course, if only one account is available in memory on the card 2250, then that account is selected by default without requiring specific selection by the patient 2202. For subsequent transactions, the patient 2202 is able to select (on the computer 2260) what information she wants to view or what action she wants the medical records-access manager 2212 to perform.

In either case, once the computer 2260 has composed the message, it is transmitted (Step 2410) to the card reader 2252 for display on display 2254 and for forwarding to the card 2250 for digital signing by the patient 2202. In this regard, upon receipt of data representing the message, the card 2250 originates (Step 2412) a digital signature for the message by first calculating a hash value for the data and then encrypting the hash value using the private key retained within the card 2250. The card 2250 then outputs (Step 2414) the digital signature, which is received initially by the reader 2252. The reader 2252 then transmits (Step 2416) the digital signature along with the message as an EC to the computer 2260, which forwards the same to the medical records access manager 2212 for authentication.

Figure 25:
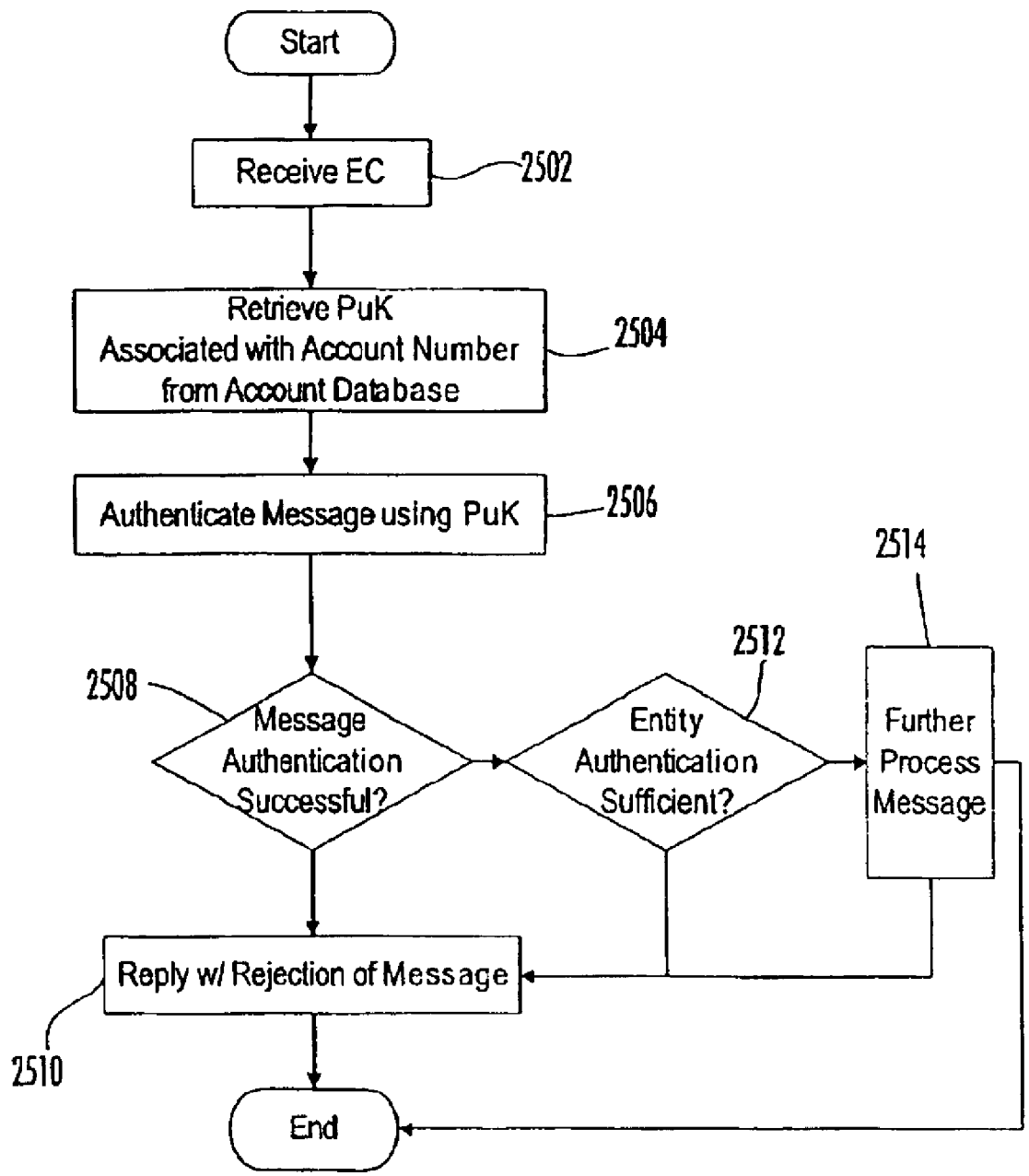
FIG. 25 illustrates a flowchart of steps performed by an account authority in the business application of FIG. 22.

With reference to FIG. 25, the EC is received (Step 2502) by the medical records access manager 2212 from the computer 2260. The medical records access manager 2212 then retrieves (Step 2504) from the account database 2214 the public key that is identified by the account number 2316. Using this public key, the medical records access manager 2212 attempts to authenticate (Step 2506) the message. If the message does not authenticate (in Step 2508), then the medical records access manager 2212 responds (Step 2510) with a rejection of the message (i.e., refusal to grant access to the web site or refusal to perform the requested action). Such a response may indicate the reason for the rejection. If the message does authenticate (in Step 2508), then the medical records access manager 2212 concludes that the message, in fact, came from the person possessing the correct card 2250 associated with the identified account number 2316—(i.e., Factor A Entity Authentication is obtained). The medical records access manager 2212 then determines (Step 2512) whether or not the Factor B and/or C entity authentication (e.g., PIN and/or thumbprint) provided is sufficient for further processing of the specific message. If not, then the medical records access manager 2212 responds (Step 2510) with a rejection of the message and, again, such response may indicate the reason for the rejection. If the entity authentication Is sufficient (in Step 2512), then the medical records access manager 2212 further processes (Step 2514) the message.

For initial login, further processing of the message merely means providing the patient 2202 with access to the records access program on the computer 2260 and with rights to view private but not sensitive information pertaining to the patient 2202 as maintained in the database 2214 and displayed in response to suitable inquiries using the custom software on the computer 2260. If the message is an request by the patient 2202 for access to sensitive information pertaining to the patient 2202, the medical records access manager 2212 may require stronger entity authentication information from the patient 2202 (due to the increased risks and potential liability for displaying such sensitive information to unauthorized persons). Thus, in this situation, the computer 2260 prompts (in Step 2406) the patient 2202 to provide both a PIN and thumbprint. If the determination (in Step 2512) is positive in this situation, then further processing (Step 2514) includes providing the patient 2202 with access to the requested, sensitive information. If the EC contains a request by the patient 2202 for the medical records access manager 2212 to perform an action on the account or on information contained within the account, such as, for example, a request to forward a specific medical record, report, or piece of information to a third party, such as a hospital, insurance company, or medical practitioner, such an EC can be processed as generally described in FIGS. 24 and 25. In contrast with the above two ECs, however, the purpose of obtaining a digital signature from the patient 2202 is not only for entity authentication but primarily for "confirmation" of the requested action. In this scenario, if the entity authentication information or status provided is sufficient (as determined in Step 2512), then further processing (Step 2514) of the message includes performance of the requested action.

vi. (Medical) Practice Management Account

Figure 26:
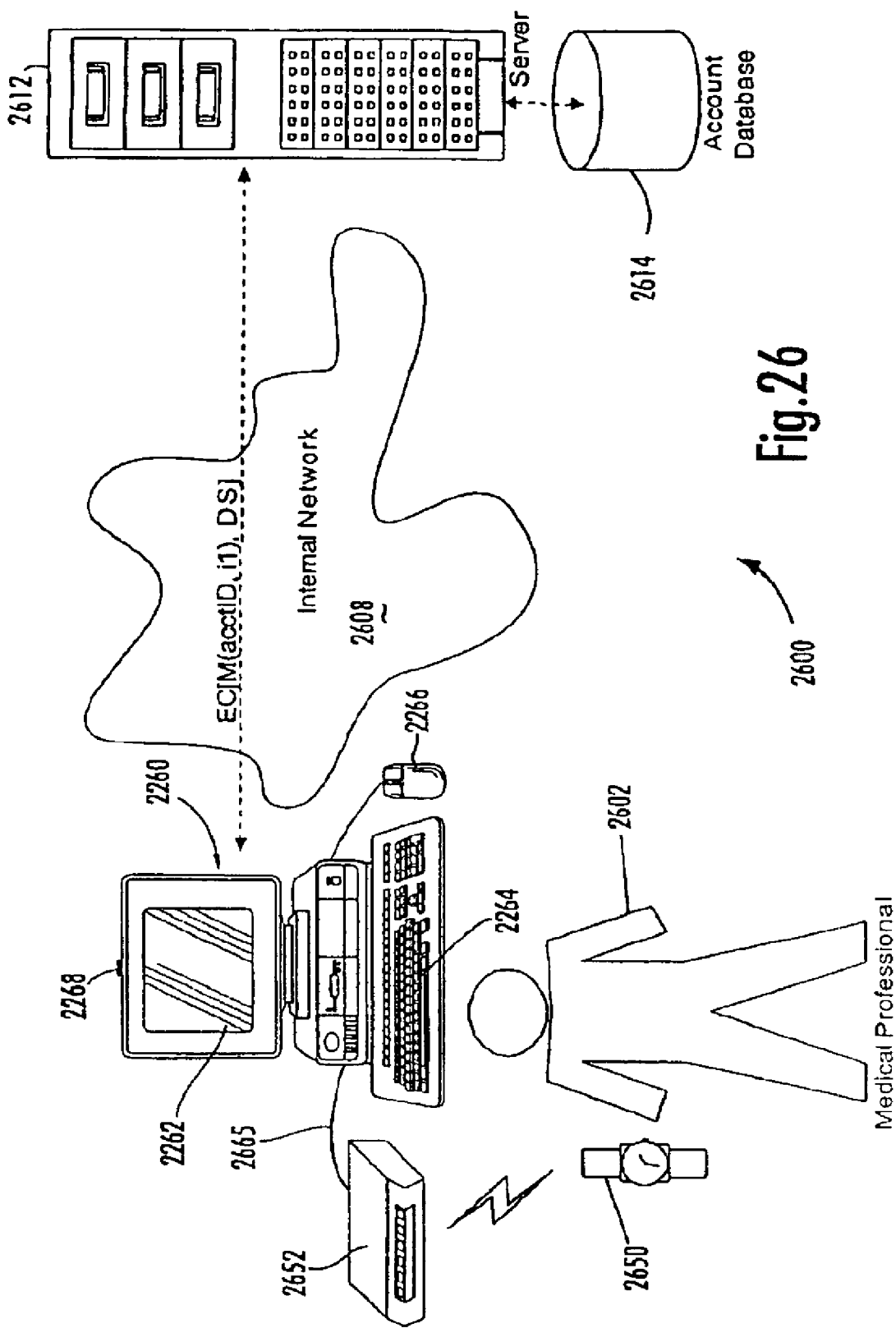
FIG. 26 illustrates a sixth business application in accordance with the first aspect of the present invention.

A sixth business application 2600 implementing the two-party ABDS system 200 of FIG. 2 is illustrated In FIG. 26. In this example, an account holder comprising a medical professional 2602 possesses a device In the form of a personal item 2650, such as a watch (as shown), jewelry, key ring, or the like, which is capable of receiving and transmitting radio-frequency (RF) data transmissions to and from an RF receiver/transmitter 2652. The personal item 2650 securely protects therein a private key of a public-private key pair. In this example, the RF receiver/transmitter 2652 is connected via cable 2665 into a suitable port (USB, serial, parallel, etc.) of a personal computer 2660. The personal computer 2660 is conventional in that it includes a monitor 2662, a keyboard 2664, and a mouse 2666. In the present example, the computer 2660 also includes a microphone 2668 for receipt of audio input, such as the voice of the medical professional 2602, for entity authentication purposes.

The personal item 2650 is associated, among other accounts, with a medical practice management account maintained by an account authority represented by a medical practice management server 2612. The computer 2660 has installed thereon suitable database management and access software to enable it to interact, for example, over an internal or external network 2608 (in this case, it is an internal network) with information contained within an account database maintained by server 2612.

Accounts maintained by the server 2612 are associated with account records maintained in one or more account databases, collectively referred to and illustrated in FIG. 26 by account database 2614. With reference to FIG. 27, each authorized user of the account database 2614 is identified by a unique account identifier comprising an account number 2716. Each account number 2716 identifies within the account database 2614 account information 2740, including entity-specific information 2742 and accessible databases 2744. In accordance with the present invention, the account number 2716 also identifies public key information 2718, which includes at least the public key of the user of the respective account. Also in accordance with a feature of the present invention, the account number 2716 identifies device profile information 2770 for the device that retains the private key corresponding with the public key associated with the account.

In the example of FIG. 26, the entity-specific information 2742 includes, for example, the name, position, field of practice, and a listing of the groups to which the account holder belongs (for a determination of access rights to other database records and sub-records (not shown)). The list of accessible databases 2744 includes, for example, group calendar, personal calendar, group contact list, personal contact list, group patient list, personal contact list, list of accepted insurance policies/carriers, and the like. The public key information 2718 of the account of the medical professional 2602 includes the public key corresponding to the private key retained within the personal item 2650. The device profile information 2770 includes information specific to the personal item 2650.

As stated previously, an EC from the medical professional 2602 to the server 2612 may be used for three different purposes: session authentication, transaction authentication, and transaction confirmation. For example, a common type of session authentication occurs in this business application when the medical professional 2602 initially attempts to login to or otherwise access the database management and access software maintained on the computer 2660. Transaction confirmation is applicable in this business application when, for example, the medical professional 2602 requests the server 2612 to perform an action upon a record of one of the patients contained within the database (e.g., updating or adding information) and the server 2612 requires the medical professional 2602 to confirm such a request by digitally signing the request with the personal item 2650 (and, potentially, also providing additional entity authentication information or status).

Figure 28:
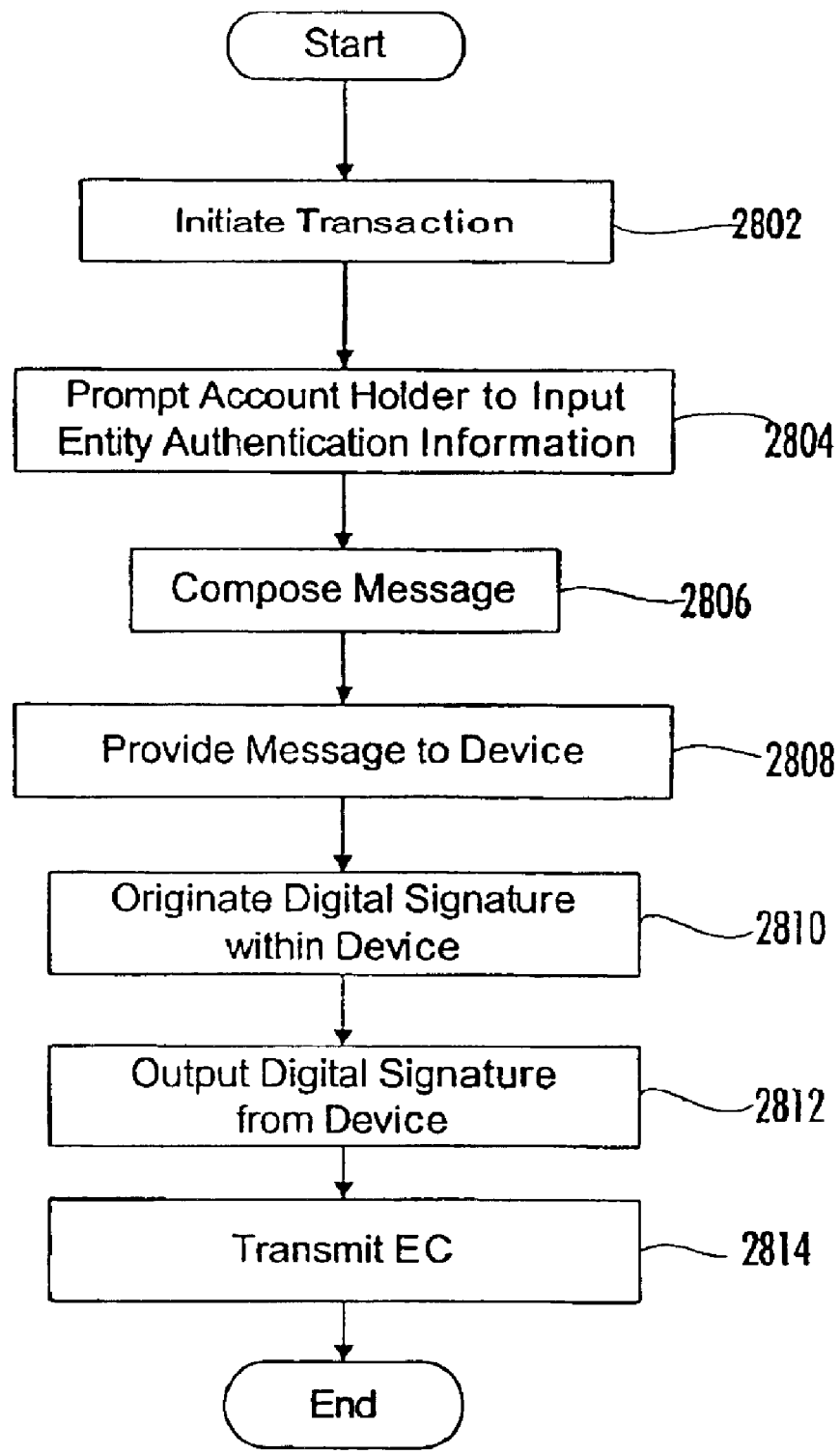
FIG. 28 illustrates a flowchart of steps performed by an account holder in the business application of FIG. 26.

Regardless of which type of EC is communicated from the medical professional 2602 to the server 2612, the basic methodology for composing and digitally signing the message (on the medical professional end) and for authenticating the message and authenticating the entity (on the server end) is essentially the same. For example, turning now to FIG. 28, a transaction is initiated (Step 2802) when the medical professional 2602 accesses the login screen for access to the various medical practice records maintained on server 2612 by connecting over the internal network 2608 using computer 2660 or, after such login has already occurred, when the medical professional 2602 requests information from the database or requests the server 2612 to perform an action on information in the database. Next, the server 2612 causes the computer 2660 to prompt (Step 2804) the medical professional 2602 to input Factor C entity authentication information, such as a voiceprint, by speaking into the microphone 2668.

Once the computer 2660 has obtained a suitable voiceprint, an electronic message is composed (Step 2806) for sending to the server 2612 for authentication and access to database records. For initial login, the computer 2660 displays a menu of available accounts from which the medical professional 2602 can select. Preferably, such available accounts are stored within a memory on the personal item 2650 and retrieved by the computer 2660 for selection by the medical professional 2602. Of course, if only one account is available in a memory on the personal item 2650, then that account is selected by default without requiring specific selection by the medical professional 2602. Alternatively, the list of available accounts may be maintained in memory on the computer 2660 itself and displayed for selection by the medical professional 2602. For post-login communications, the computer 2660 displays, for example. A menu of available patient records that the medical professional 2602 is allowed to review and actions that can be performed with respect to each such patient record. The computer 2660 also displays, for example, group and personal calendars, address books, and electronic mailboxes to which the medical professional has access rights.

Once the computer 2660 composes the message, it is transmitted (Step 2808) via cable 2665 to the RF receiver/transmitter 2652, which then sends an RF signal (containing the message) to the personal item 2650 for digital signing by the medical professional 2602. In this regard, upon receipt of an RF signal containing data representing the message, the personal item 2650 originates (Step 2810) a digital signature for the message by first calculating a hash value for the data and then encrypting the hash value using the private key retained within the personal item 2650. The personal item 2650 then outputs (Step 2812) the digital signature, which is received by the RF receiver/transmitter 2652, which forwards the same to the computer 2660. The computer 2660 then transmits (Step 2814) the message and the digital signature therefor in an EC to the server 2612.

Figure 29:
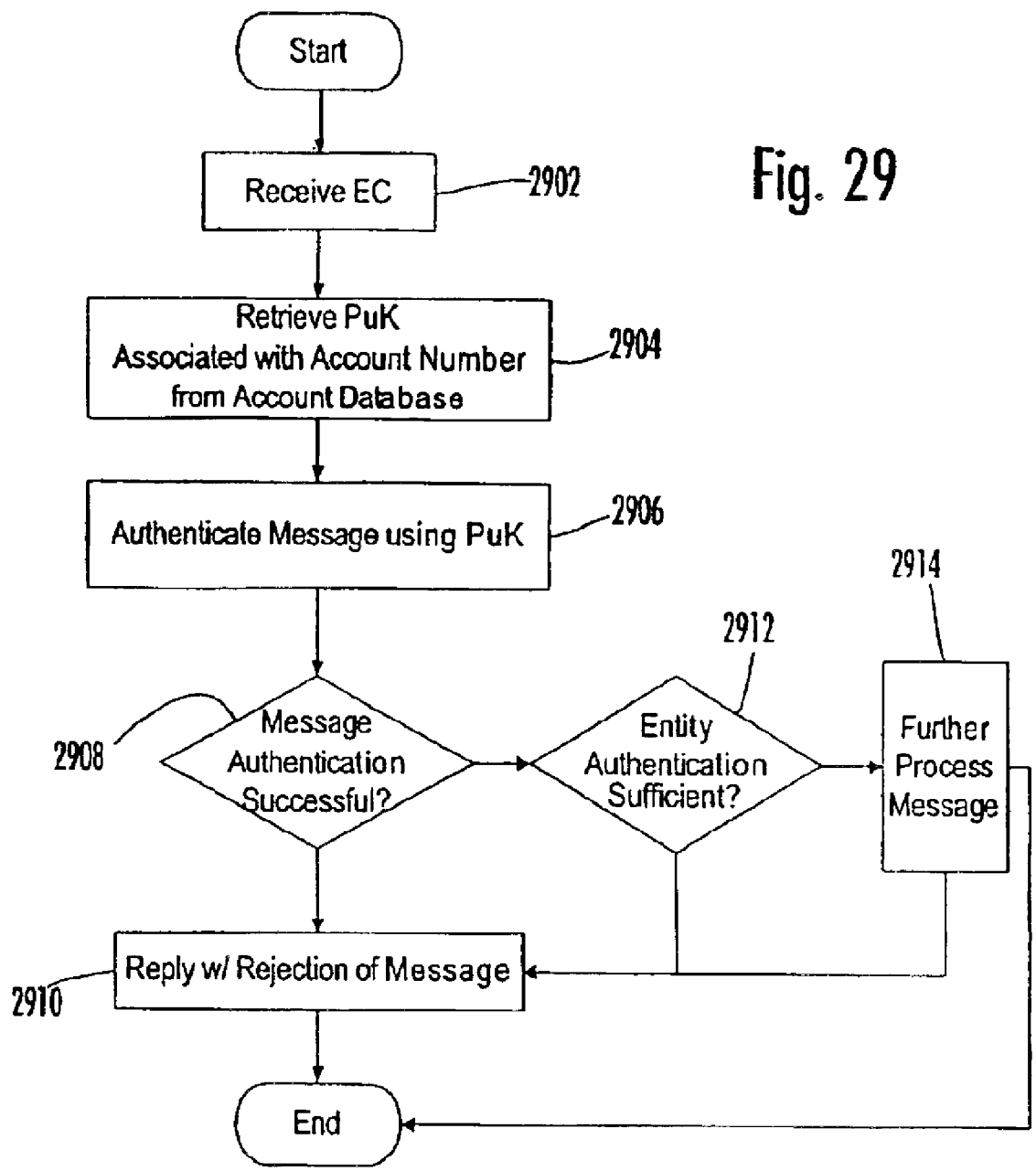
FIG. 29 illustrates a flowchart of steps performed by an account authority in the business application of FIG. 26.

With reference to FIG. 29, the EC is received (Step 2902) by the server 2612 from the computer 2660. The server 2612 then retrieves (Step 2904) from the account database 2614 the public key that is identified by the account number 2716. Using this public key, the server 2612 attempts to authenticate (Step 2906) the message. If the message does not authenticate (in Step 2908) using the public key, then the server 2612 responds (Step 2910) with a rejection of the message (i.e., refusal to grant access to the account or to perform the requested action). If the message authenticates (in Step 2908), then the server 2612 concludes that the message, in fact, came from the person possessing the correct personal item 2650 associated with the identified account number 2716—(i.e., Factor A Entity Authentication is obtained). The server 2612 then determines (Step 2912) whether or not the Factor C entity authentication information or status (e.g., voiceprint) provided is sufficient for further processing of the specific message. If not, then the server 2612 responds (Step 2910) with a rejection of the message and, again, such response may indicate the reason for the rejection. If the entity authentication is sufficient (in Step 2912), then the server 2612 further processes (Step 2914) the message.

For initial login, further processing of the message merely means providing the—medical professional 2602 with access to the main user screen displayed by the computer 2660. For subsequent communications, further processing often means displaying information obtained from the database 2614 in response to suitable inquiries made by the medical professional using the computer 2660. In some circumstances, for example, if the message is a request by the medical professional 2602 for access to sensitive information pertaining to one of his patients, the server 2612 may require stronger entity authentication information from the medical professional 2602 (due to the increased risks and potential liability for displaying such sensitive information to unauthorized persons). Thus, in this situation, the computer 2660 prompts (in Step 2806) the medical professional 2602 to provide both a PIN (using the computer keyboard 3064) and voiceprint. If the determination (in Step 2912) is positive in this situation, then further processing (Step 2914) includes providing the medical professional 2602 with access to the requested, sensitive information. If the EC contains a request by the medical professional 2602 for the server 2612 to perform an action on the account or on information contained within the account. Such as, for example, a request to add or change information on a patient record to which the medical professional 2602 has rights to modify or append, such an EC can be processed as generally described in FIGS. 28 and 29. In contrast with the above two ECs, however, the server 2612 may require a digital signature for this EC primarily for "confirmation" of the requested action. In this scenario, if the entity authentication information or status provided is sufficient (as determined in Step 2912), then further processing (Step 2914) of the message includes performance of the requested action.

vii. Government Benefits Account

Figure 30:
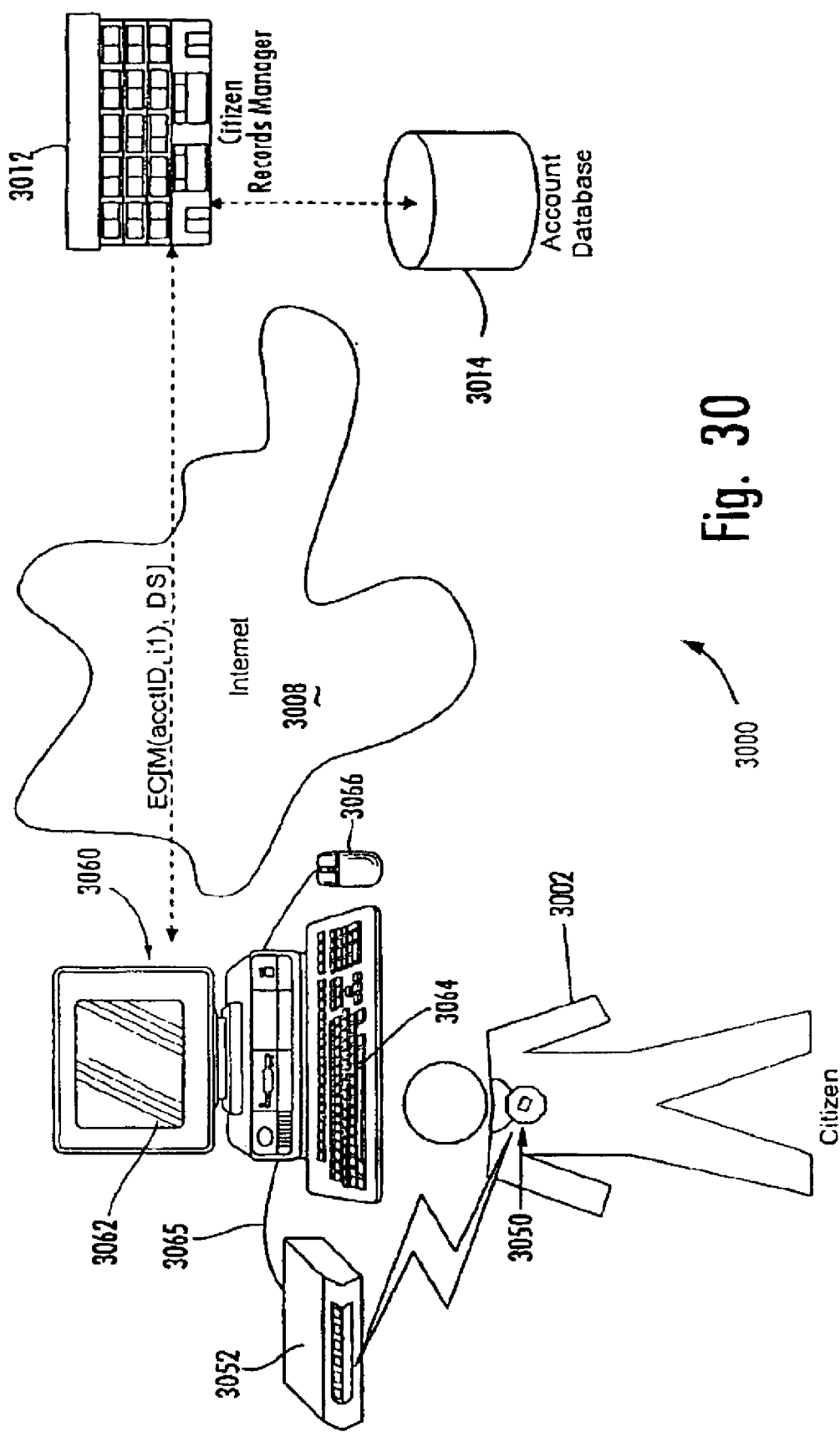
FIG. 30 illustrates a seventh business application in accordance with the first aspect of the present invention.

A seventh business application 3000 implementing the two-party ABDS system 200 of FIG. 2 is illustrated in FIG. 30. In this example, an account holder comprising a citizen 3002 possesses a device in the form of a personal item 3050, such as a watch, necklace or dog-tag (as shown), other jewelry, key ring, or the like, which is capable of receiving and transmitting radio-frequency (RF) data transmissions to and from an RF receiver/transmitter 3052. The necklace 3050 securely protects therein a private key of a public-private key pair. In this example, the RF receiver/transmitter 3052 is connected via cable 3065 into a suitable port (USB, serial, parallel, etc.) of a personal computer 3060. The personal computer 3060 is conventional in that it includes a monitor 3062, a keyboard 3064, and a mouse 3066. The necklace 3050 is associated, among other accounts, with a governmental records account maintained by an account authority represented by a citizen records manager 3012. The computer 3060 has suitable web browser software installed thereon to enable it to communicate over the Internet 3008, in conventional manner, such as via a modem, LAN line, etc., with a secure web site hosted by citizen records manager 3012.

Accounts maintained by the citizen records manager 3012 are associated with account records maintained in one or more account databases, collectively referred to and illustrated in FIG. 30 by account database 3014. With reference to FIG. 31, each authorized user of the account database 3014 is identified by a unique account identifier comprising an account number 3116. Each account number 3116 identifies within the account database 3014 account information 3140, including citizen-specific information 3142 and account-specific information 3144. In accordance with the present invention, the account number 3116 also identifies public key information 3118, which includes at least the public key of the citizen associated with a respective account. Also in accordance with a feature of the present invention, the account number 3116 identifies device profile information 3170 for the device that retains the private key corresponding with the public key associated with the account.

In the example of FIG. 30, the citizen-specific information 3142 includes, for example, the name, address, social security number, tax-ID number, occupation, place of birth, age, and the like, of each citizen. The account-specific information 3144 includes, for example, Social Security benefits, welfare benefits, Medicare/Medicaid benefits, Universal Prescription Drug benefits, Universal Healthcare benefits, tax returns (electronic format for previous five years), bank account Information, and the like. The public key information 3118 of the account of the citizen 3002 includes the public key corresponding to the private key retained within the necklace 3050. The device profile information 3170 includes information specific to the necklace 3050.

In this business application, an EC from the citizen 3002 to the citizen records manager 3012 is generally only used for the purpose of session authentication. For example, a first session authentication occurs when the citizen 3002 initially attempts to login to or otherwise access the secure web site maintained by the citizen records manager 3012. A further session authentication occurs when the citizen 3002 requests access to specific records or pieces of information that are very sensitive, secure, confidential, or private for the citizen 3002, in which case, the citizen records manager 3012 requires a stronger level of entity authentication than is required merely to access the entry level of the secure web site.

Figure 32:
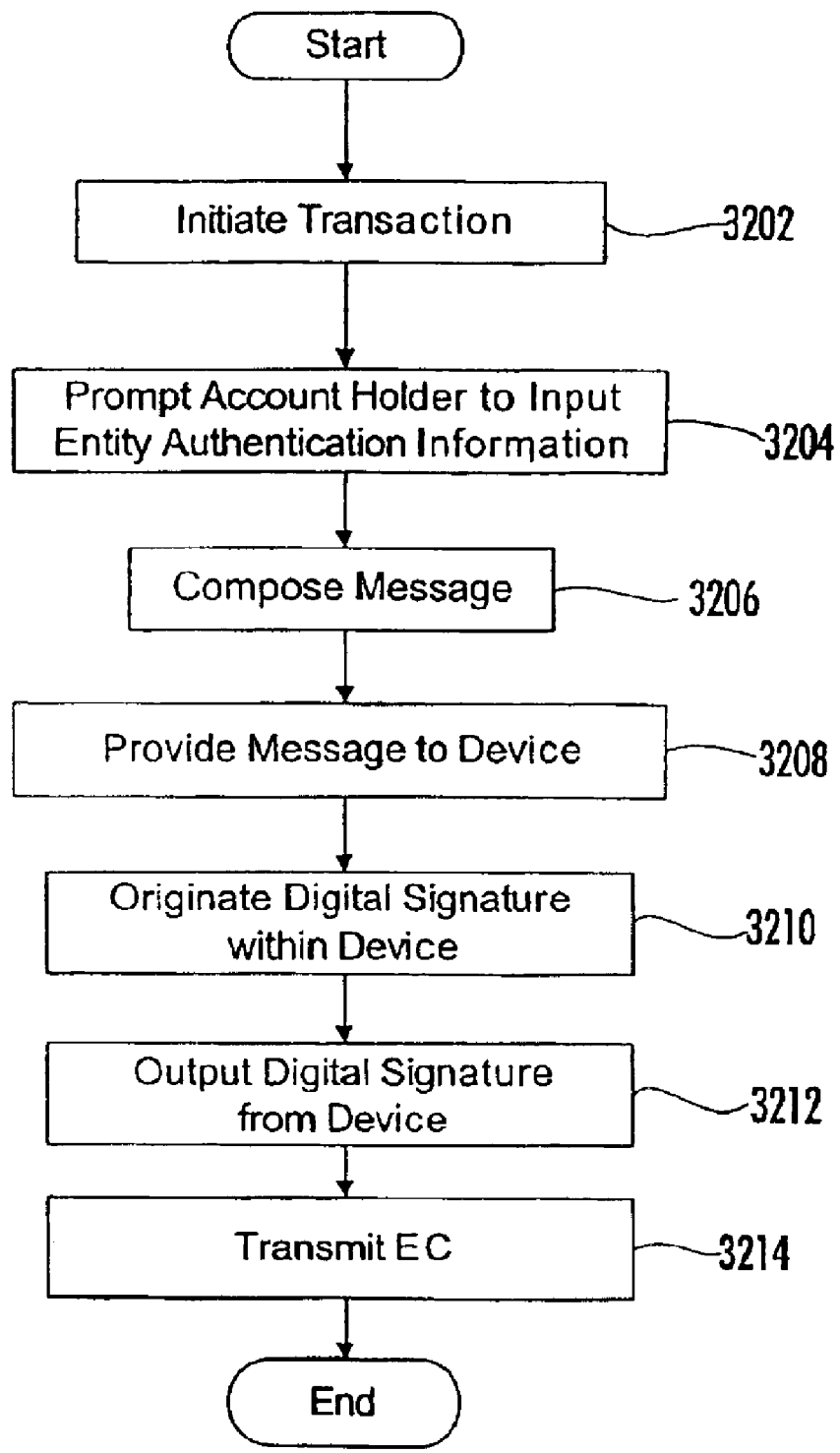
FIG. 32 illustrates a flowchart of steps performed by an account holder in the business application of FIG. 30.

Regardless of which session authentication EC is communicated from the citizen 3002 to the citizen records manager 3012, the basic methodology for composing and digitally signing the message (on the citizen end) and for authenticating the message and authenticating the entity (on the citizen records manager end) is essentially the same. For example, turning now to FIG. 32, a transaction in accordance with the present invention is initiated (Step 3202) in the implementation illustrated in FIGS. 30 and 31 when the citizen 3002 initially accesses the login screen for access to the secure web site maintained by citizen records manager 3012 by connecting over the Internet 3008 using computer 3060 or, after such secure web site has been successfully accessed, when the citizen 3002 requests access to very sensitive, secure, confidential, or private information, as stated above. Next, the secure web site causes the computer 3060 to prompt (Step 3204) the citizen 3002 to provide Factor B or C entity authentication information, such as a PIN or biometric information, by typing the PIN into the computer 3060 using keyboard 3064 or by providing a biometric sample to a suitable biometric reader (not shown) attached to or otherwise in electronic communication with the computer 3060.

In this case, once the PIN has been input, an electronic message is composed (Step 3206) for sending to the citizen records manager 3012 for authentication and access to the citizen's personal records. For login purposes, the message need only contain the relevant account number. For subsequent transaction authentication communications or requests for access to information, the message includes an instruction (11) from the citizen 3002 to the citizen records manager 3012. For initial login, the computer 3060 displays a menu of available accounts from which the citizen 3002 can select. Preferably, such available accounts are stored within memory on the necklace 3050 and retrieved by the RF receiver/transmitter 3052 (as commanded by the computer 3060) for selection by the citizen 3002. Of course, if only one account is available in memory on the necklace 3050, then that account is selected by default without requiring specific selection by the citizen 3002. Alternatively, the list of available accounts may be maintained in memory on the computer 3060 itself and displayed for selection by the citizen 3002. For post-login communications, the computer 3060 displays, for example, a menu of available citizen records and governmental benefit accounts that the citizen 3002 is allowed to view.

Once the appropriate account number or menu item is selected, the computer 3060 converts the information into a message, which is transmitted (Step 3208) via cable 3065 from the computer 3060 to the RF receiver/transmitter 3052, which then sends an RF signal (containing the message) to the necklace 3050 for digital signing by the citizen 3002. In this regard, upon receipt of an RF signal containing data representing the message, the necklace 3050 originates (Step 3210) a digital signature for the message by first calculating a hash value for the data and then encrypting the hash value using the private key retained within the necklace 3050. The necklace 3050 then outputs (Step 3212) the digital signature, which is received by the RF receiver/transmitter 3052, which forwards the same to the computer 3060. The computer 3060 then transmits (Step 3214) the message and the digital signature therefor in an EC to the citizen records manager 3012.

Figure 33:
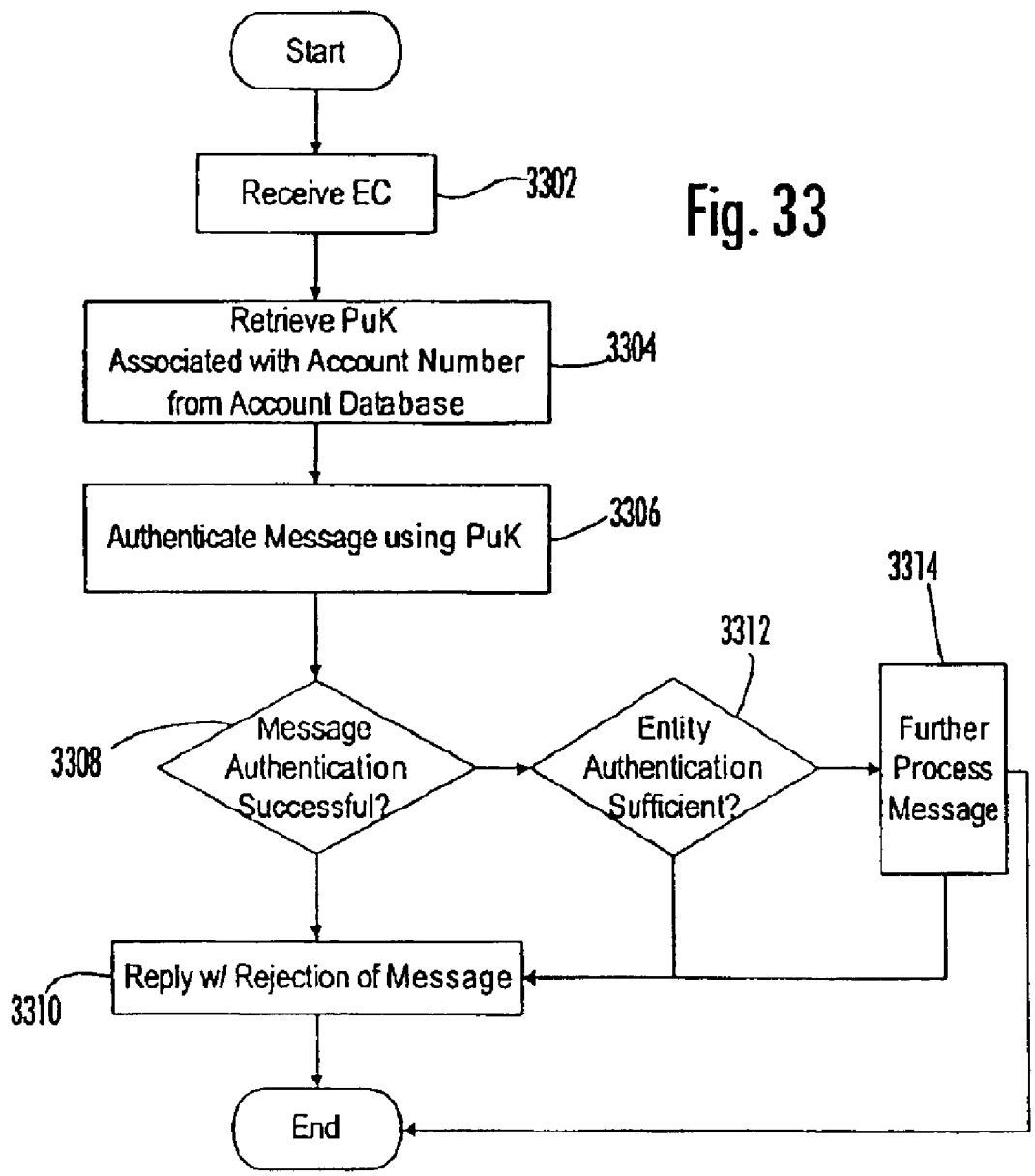
FIG. 33 illustrates a flowchart of steps performed by an account authority in the business application of FIG. 30.

With reference to FIG. 33, the EC is received (Step 3302) by the citizen records manager 3012 from the computer 3060. The citizen records manager 3012 then retrieves (Step 3304) from the account database 3014 the public key that is identified by the account number 3116. Using this public key, the citizen records manager 3012 attempts to authenticate (Step 3306) the message. If the message does not authenticate (in Step 3308) using the public key, then the citizen records manager 3012 responds (Step 3310) with a rejection of the message (i.e., refusal to grant access to the account or to perform the requested action). If the message authenticates (in Step 3308), then the citizen records manager 3012 concludes that the message, in fact, came from the person possessing the correct necklace 3050 associated with the identified account number 3116—(i.e., Factor A Entity Authentication is obtained). The citizen records manager 3012 then determines (Step 3312) whether or not the Factor B or C entity authentication information or status (e.g., PIN and/or biometric information) provided is sufficient for further processing of the specific message. If not, then the citizen records manager 3012 responds (Step 3310) with a rejection of the message and, again, such response may indicate the reason for the rejection. If the entity authentication is sufficient (in Step 3312), then the citizen records manager 3012 further processes (Step 3314) the message.

For initial login, further processing of the message merely means providing the citizen 3002 with access to the main user screen of the secure web site displayed by the computer 3060. For subsequent communications, further processing means displaying for the citizen 3002 the requested citizen record or governmental benefit information. As stated previously, for added security, the citizens records manager 3012 may require additional digital signatures for some instructions and requests made on the web site (e.g., transactional confirmation or further session authentication). If necessary, messages are generated when the citizen 3002 selects particular options or menu items on the web site. When such an option or item is selected, the citizens records manager 3012 transmits a data packet of information to the computer 3060 along with an instruction to request a digital signature. The computer 3060, in response, transmits the information to the necklace 3050 via RF receiver/transmitter 3052. This information constitutes a new message. To prevent unauthorized or unintentional digital signatures being generated in response to unwanted RF signals transmitted to the necklace 3050, it is preferable that the citizen records manager 3012 not trust an EC received from the necklace 3050 unless Factor B or C Entity Authentication is performed.

viii. Internet Service Provider

Figure 34:
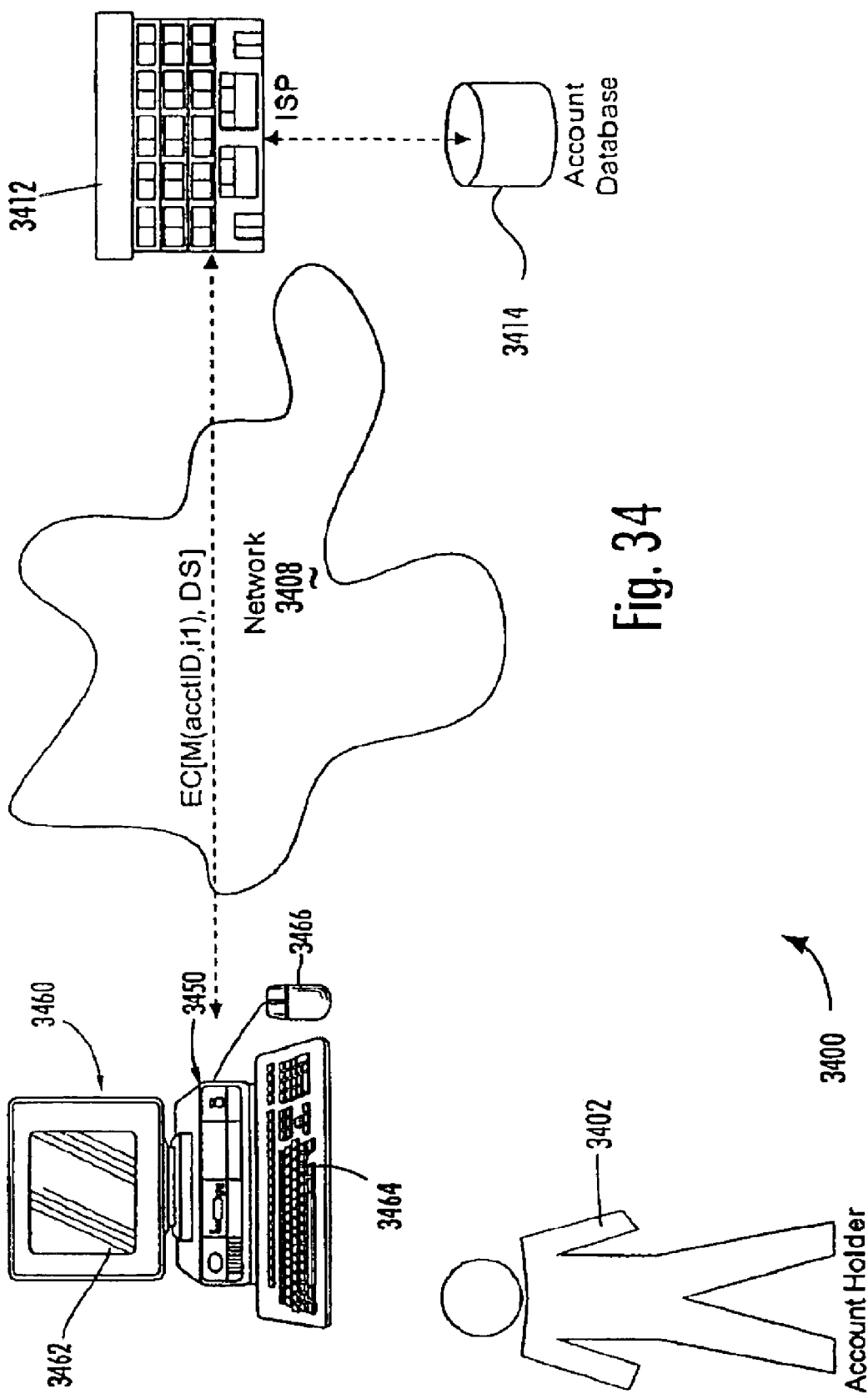
FIG. 34 illustrates an eighth business application in accordance with the first aspect of the present invention.

An eighth business application 3400 implementing the two-party ABDS system 200 of FIG. 2 is illustrated in FIG. 34. In this example, an account holder 3402 comprising a person possesses a device in the form of a dongle 3450, which is directly plugged into a suitable port (USB, serial, parallel, etc.) on the back side of a personal computer 3460. The dongle 3450 securely protects therein a private key of a public-private key pair. The personal computer 3460 is conventional in that it includes a monitor 3462, a keyboard 3464, and a mouse 3466. The dongle 3450 is associated specifically with an Internet Service Provider account maintained by an account authority represented by an Internet Service Provider 3412. The computer 3460 has suitable web browser software installed thereon to enable it to communicate over network 3408, in conventional manner, such as via a modem, LAN line, etc., with the Internet Service Provider 3412. The computer also has software installed that enables the computer 3460 to communicate with the attached dongle 3450.

Accounts maintained with the Internet Service Provider 3412 are associated with account records maintained in one or more account databases, collectively referred to and illustrated in FIG. 34 by account database 3414. With reference to FIG. 35, each account includes a unique account identifier comprising an account number 3516. Each account number 3516 identifies within the account database 3414 account information 3540, including customer-specific information 3542 and account-specific information 3544. In accordance with the present invention, the account number 3516 also identifies public key information 3518, which includes at least a public key of an account holder of the respective account. Also in accordance with a feature of the present invention, the account number 3516 identifies device profile information 3570 for the device that retains the private key corresponding with the public key associated with the account.

In the example of FIG. 34, the customer-specific information 3542 includes, for example, the name, billing address, email address, credit card information, and the like of the account holder. The account-specific information 3544 includes, for example, ISP connection means (e.g., telephone modem, cable modem, ISDN, T1 connection, etc.) and speed, Internet hours used and available, email accounts and aliases, web page address(es), and the like. The public key information 3518 of the account of the account holder 3402 includes the public key corresponding to the private key retained within the dongle 3450. The device profile information 3570 includes information specific to the dongle 3450.

In this business application, an EC from the account holder 3402 to the Internet Service Provider 3412 is generally only used for the purpose of session authentication (i.e., for initially logging-in to or otherwise accessing the Internet access portal of the Internet Service Provider 3412 for the purpose of accessing the Internet. For this reason, the only message that generally needs to be communicated from the account holder 3402 to the Internet Service Provider 3412 is one that includes the account number 3516 for the relevant account. The instruction (i1) (i.e., "give me access to the Internet") is implicit in the mere communication of the EC containing the account number.

Figure 36:
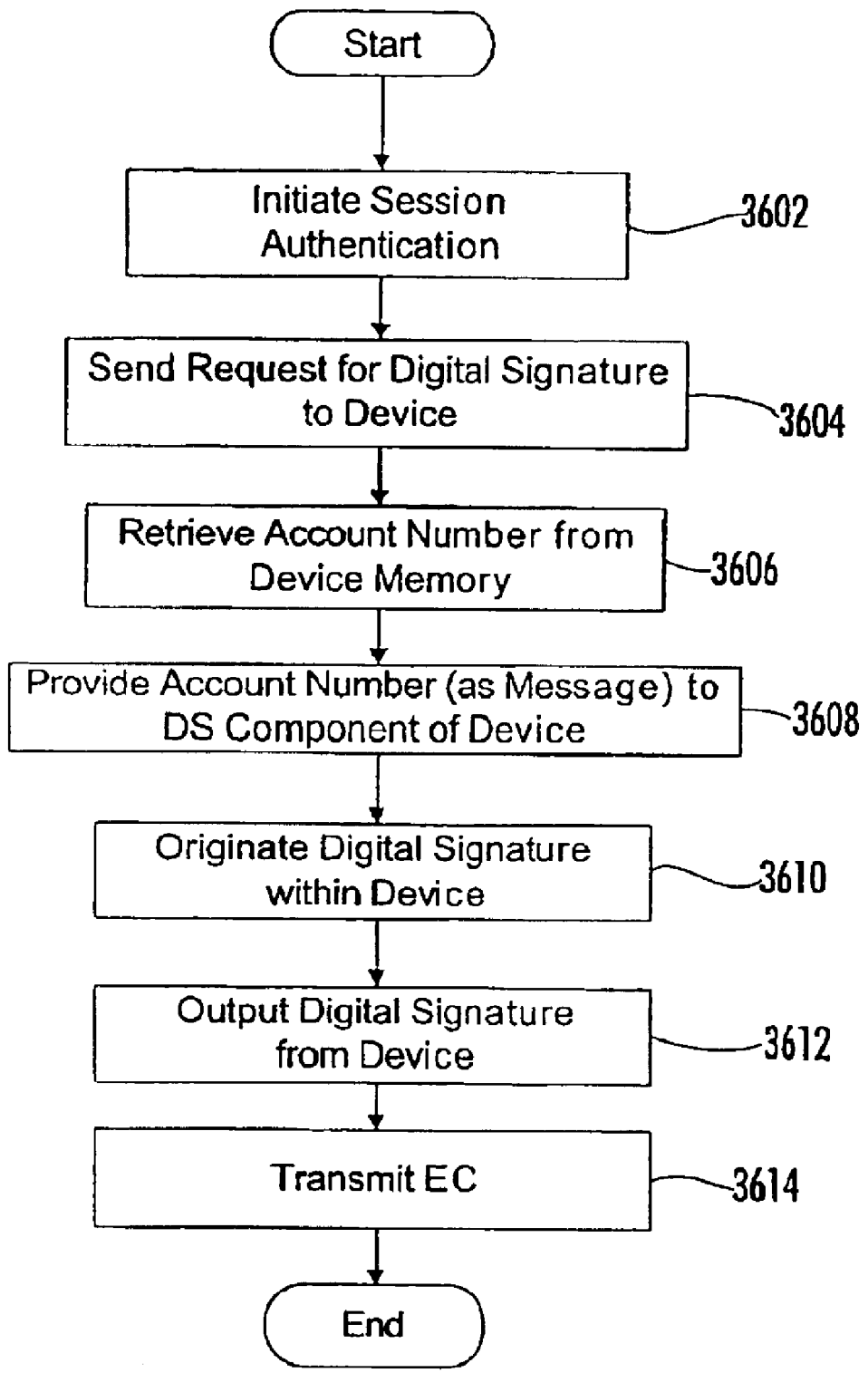
FIG. 36 illustrates a flowchart of steps performed by an account holder in the business application of FIG. 34.

As illustrated in FIG. 36, session authentication is initiated (Step 3602) when the account holder 3402 activates the automated login software installed on the computer 3460 by "double-clicking" the Internet access icon on his computer desktop in conventional manner. The automated login software sends (Step 3604) a request for digital signature message from the computer 3460 to the dongle 3450 connected thereto. In response, the dongle 3450 retrieves (Step 3606) the account number from its internal memory and provides (Step 3608) the account number, as the message, to the digital signing component of the dongle 3450. Next, the dongle 3450 originates (Step 3610) a digital signature for the message by first calculating a hash value for the data and then encrypting the hash value using the private key retained within the dongle 3450. The dongle 3450 then outputs (Step 3612) the digital signature, which is received by the computer 3460. The computer 3460 then transmits (Step 3614) the message and the digital signature therefor in an EC to the Internet Service Provider 3412 in conventional manner.

Figure 37:
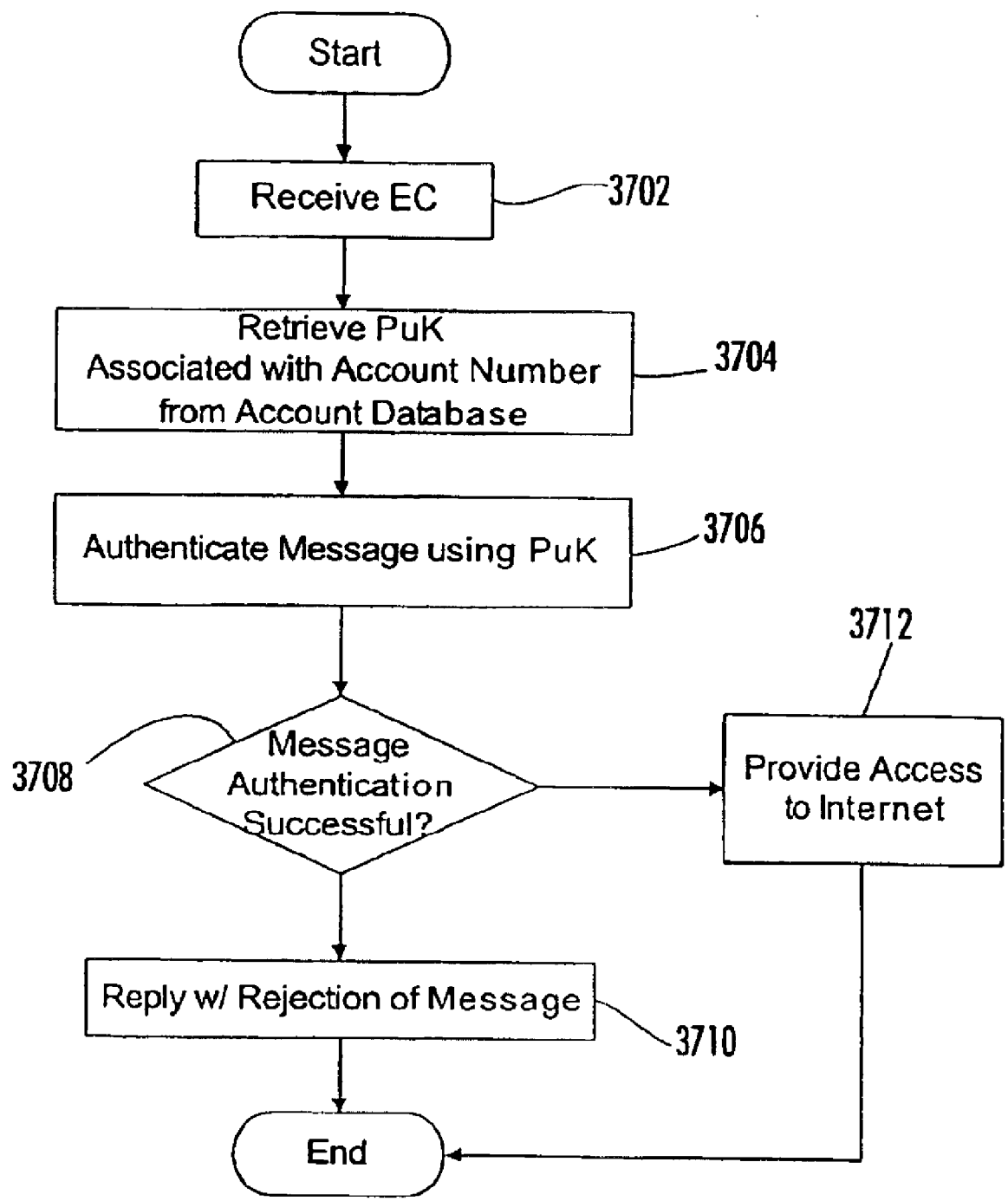
FIG. 37 illustrates a flowchart of steps performed by an account authority in the business application of FIG. 34.

With reference to FIG. 37, the EC is received (Step 3702) by the Internet Service Provider 3412 from the computer 3460. The Internet Service Provider 3412 then retrieves (Step 3704) from the account database 3414 the public key that is identified by the account number 3516. Using this public key, the Internet Service Provider 3412 attempts to authenticate (Step 3706) the message. If the message authenticates (Step 3708), then the Internet Service Provider 3412 concludes that the message is, in fact, from the computer 3460 having the legitimate dongle 3450 connected thereto (which is presumably the computer 3460 of the account holder 3402) and provides (Step 3712) the computer 3460 with access to the Internet 3408. On the other hand, if the message does not authenticate (in Step 3708), then the Internet Service Provider 3412 responds (Step 3710) with a rejection of the message. Such a response may indicate the reason for the rejection.

Obviously, the above process does not provide very strong entity authentication since any computer having the appropriate dongle 3450 attached thereto is able to obtain access to the Internet (per Step 3712). Should stronger entity authentication be desired, the above process can be modified to be more similar to the previous business applications, which require the account holder 3402 to provide Factor B and/or C entity authentication information. In this case, for example, the account holder 3402 may be required to input Factor B entity authentication information, such as a PIN, which is transmitted by the computer 3460 to the dongle 3450 along with the above-mentioned "request for digital signature" message. The Internet Service Provider 3412 then determines (in a step not shown) whether the entity authentication information or status provided by the account holder 3402 is sufficient enough for the Internet Service Provider 3412 to determine that the account holder 3402 is the entity sitting at the computer 3460. In this case, the EC is still used for session authentication.

ix. Employee Database Authorization Account

Figure 38:
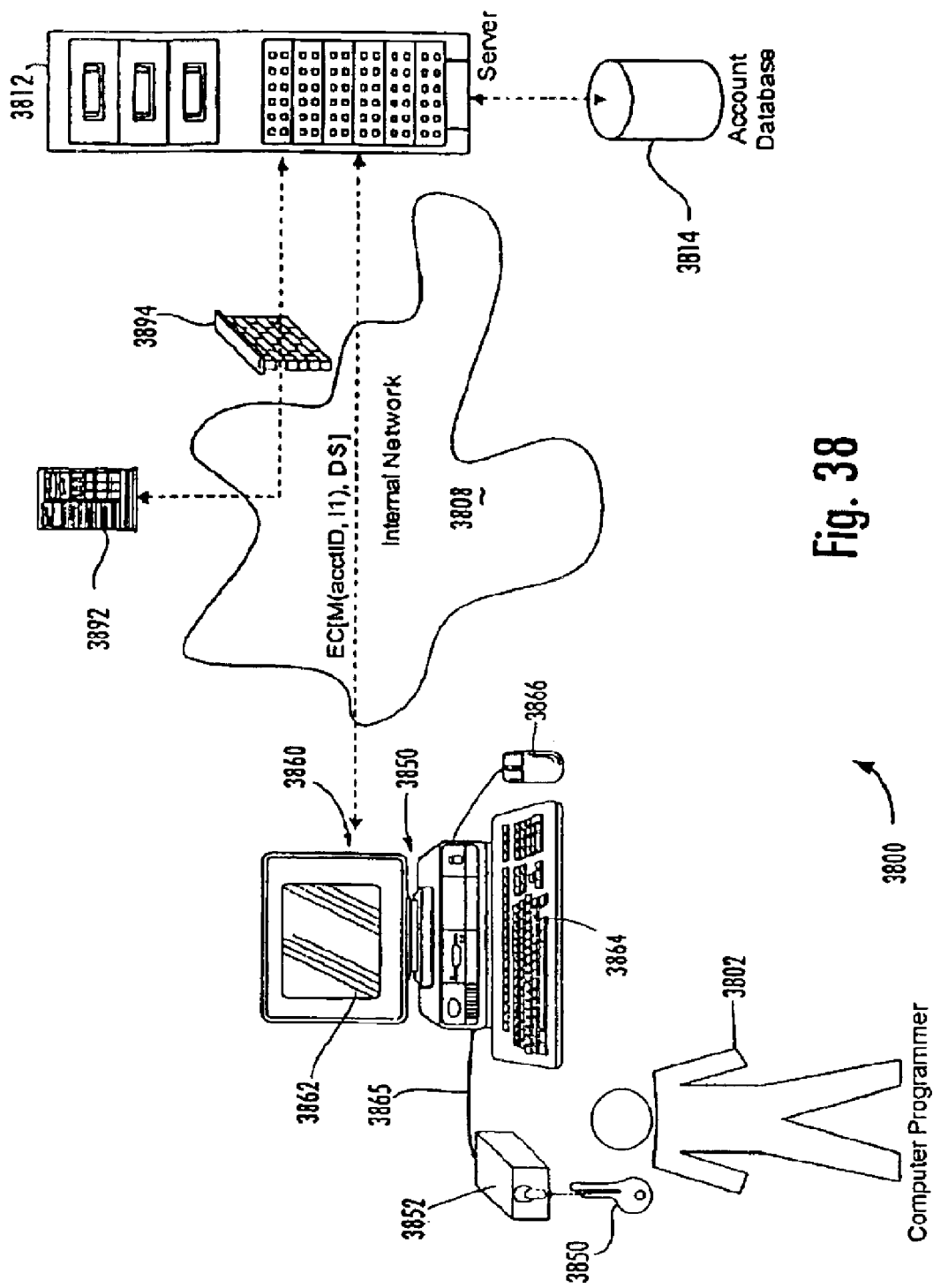
FIG. 38 Illustrates a ninth business application in accordance with the first aspect of the present invention.

A ninth business application 3800 implementing the two-party ABDS system 200 of FIG. 2 is illustrated in FIG. 38. In this example, an account holder comprising a computer programmer 3802 possesses a device in the form of an electronic key 3850, which is designed to interface with an electronic lock 3852, which is connected via cable 3865 into a suitable port (USB, serial, parallel. etc.) of a computer terminal 3860. The electronic key 3850 securely protects therein a private key of a public-private key pair. The personal computer 3860 is conventional in that it includes a monitor 3862, a keyboard 3864, and a mouse 3866. The electronic key 3850 is associated with an employee's database authorization account maintained by an account authority represented, in this example, by an authentication server 3812 operated by the employer (not shown) of the computer programmer 3802; the employer being engaged in the business of creating, designing, and writing computer programs and code. The computer 3860 has direct access over an internal computer network 3808 to the authentication server 3812, and indirect access through server 3812 and through internal firewall 3894 to secure server 3892, upon which is stored source code of a computer program upon which the legitimate computer programmer 3802 is authorized to work and needs access. Each time the-computer programmer 3802 wants to access the secure server 3892, however, the computer programmer 3802 must first be authenticated and approved by the authentication server 3812.

Accounts maintained by the authentication server 3812 are associated with account records maintained in one or more account databases, collectively referred to and illustrated in FIG. 38 by account database 3814. With reference to FIG. 39, each authorized user identified in the account database 3814 is identified by a unique account identifier (such as an employee ID) comprising an account number 3916. Each account number 3916 identifies within the account database 3814 account information 3940, including employee-specific information 3942 and accessible databases 3944. In accordance with the present invention, the account number 3916 also identifies public key information 3918, which includes at least the public key of the user of the respective account. Also in accordance with a feature of the present invention, the account number 3916 identifies device profile information 3970 for the device that retains the private key corresponding with the public key associated with the account.

In the example of FIG. 38, the employee-specific information 3942 includes, for example, the name, email address, department, supervisor name, authorized project (s) names, building location, room location, computer serial number, and the like. The list of accessible databases 3944 includes, for example, a plurality of projects, identified herein by project 1, project 2, project 3 up to project n. The public key information 3918 of the account of the computer programmer 3802 includes the public key corresponding to the private key retained within the electronic key 3850. The device profile information 3970 includes information specific to the electronic key 3850. In this context, the message from the computer programmer 3802 includes the account number 3916 for the relevant account and an instruction to the authentication server 3812, for example, to provide access to the secure server 3892.

In this business application, an EC from the computer programmer 3802 to the authentication server 3812 is generally only used for the purpose of session authentication (i.e., for initially obtaining access to the protected computer program or source code maintained on secure server 3892). For this reason, the only message that generally needs to be communicated from the computer programmer 3802 to the authentication server 3812 is one that includes the account number 3916 for the relevant account and the name of the project, program, or source code file upon which the computer programmer 3802 is authorized to work.

Figure 40:
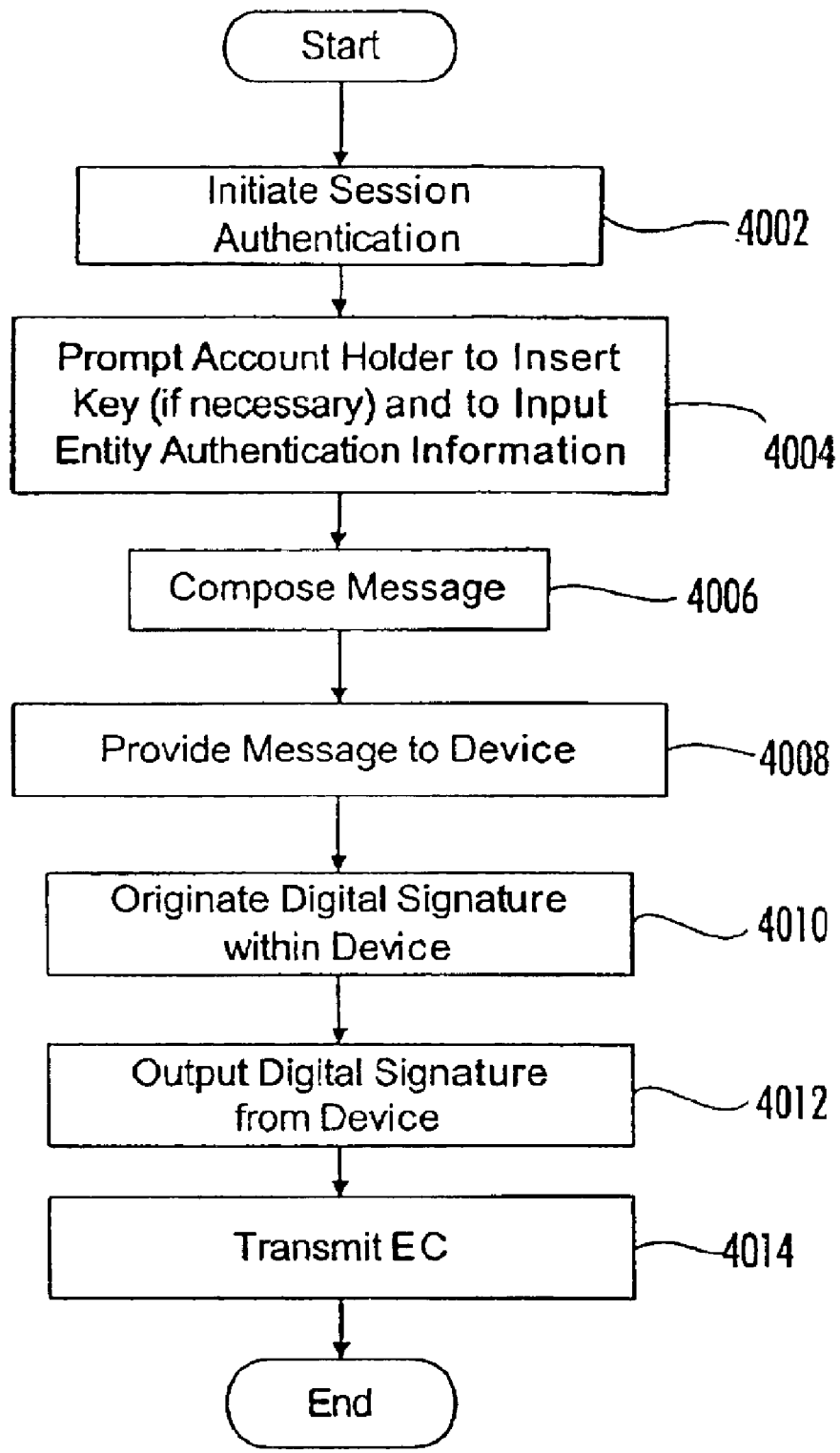
FIG. 40 illustrates a flowchart of steps performed by an account holder in the business application of FIG. 38.

As illustrated in FIG. 40, session authentication is initiated (Step 4002) when the computer programmer 3802 requests access to secure server 3892. Such request is formulated using suitable operating system computer commands on computer 3864 and presented to authentication server 3812. In response to the request, authentication server 3812 causes the computer 3860 to prompt (Step 4004) the computer programmer 3802 to insert the electronic key 3850 into electronic lock 3852 (if not already done) and to provide Factor B entity authentication information, such as a PIN, by inputting the PIN into the computer 3860 using keyboard 3864. Once the key 3850 has been inserted into the lock 3852 and once the PIN has been input, an electronic message is composed (Step 4006) for sending to the authentication server 3812 for authentication and approval for access to secure server 3892. The message is composed, for example, in the following manner.

The computer 3860 prompts the computer programmer 3802 to specify a "project name" for requested access. Once a project name is input, the computer 3860 combines the project name and account number 3916 into a message for digital signing. The message is then transmitted (Step 4008)

via cable 3865 from the computer 3860 to the lock 3852 and then into the key 3850. Once the message is received by the key 3850, it originates (Step 4010) a digital signature for the message by first calculating a hash value for the data and then encrypting the hash value using the private key retained within the key 3850. The key 3850 then outputs (Step 4012) the digital signature, which is received by the lock 3852, which forwards the same to the computer 3860. The computer 3860 then transmits (Step 4014) the message and the digital signature therefor in an EC to the authentication server 3812.

Figure 41:
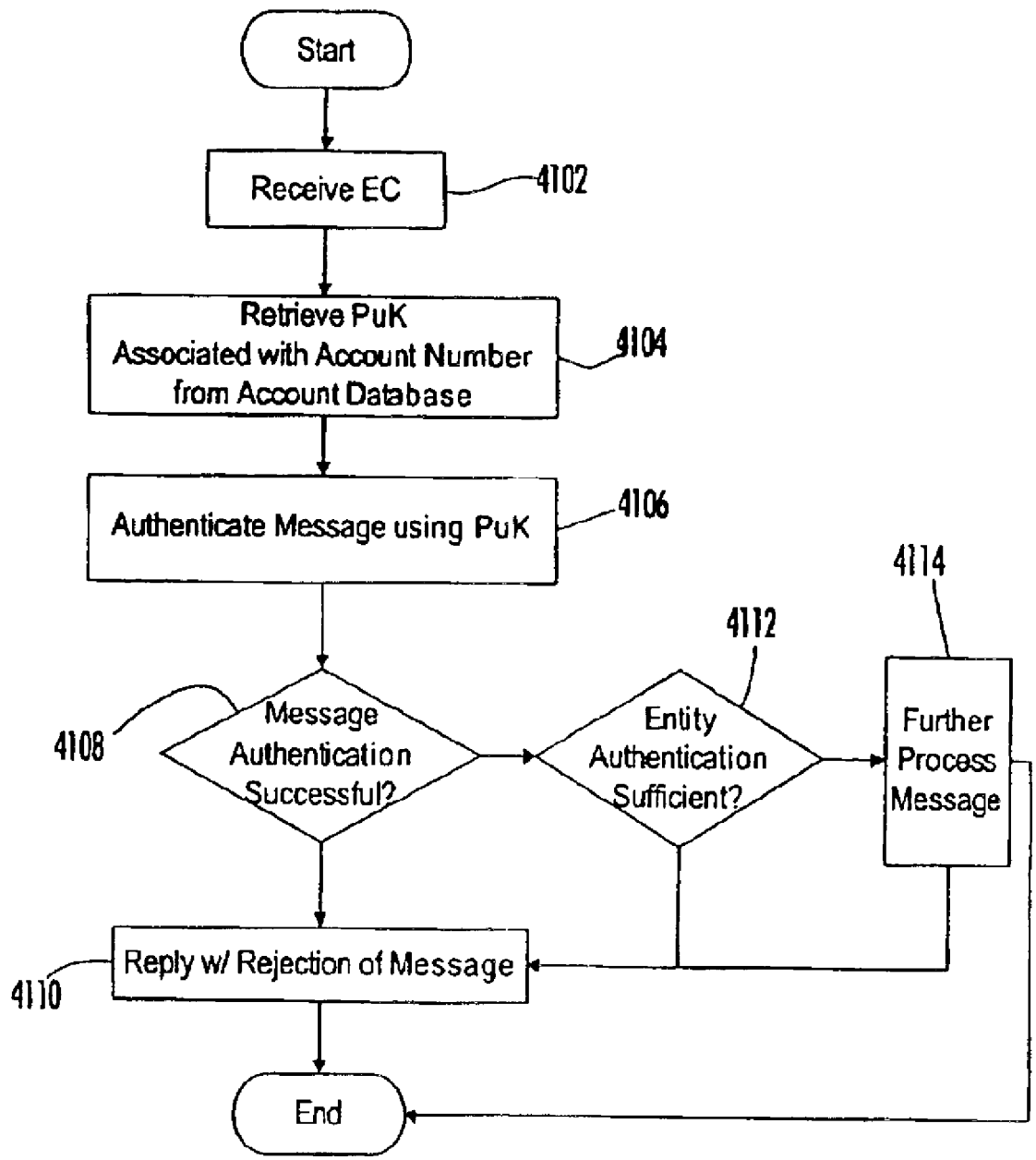
FIG. 41 illustrates a flowchart of steps performed by an account authority in the business application of FIG. 38.

With reference to FIG. 41, the EC is received (Step 4102) by the server 3812 from the computer 3860. The authentication server 3812 then retrieves (Step 4104) from the account database 3814 the public key that is identified by the account number 3916. Using this public key, the authentication server 3812 attempts to authenticate (Step 4106) the-message. If the message does not authenticate-(in-Step 4108), then the server 3812 responds (Step 4110) with a rejection of the message (i.e., refusal to grant access to the secure server 3892). Such a response may indicate the reason for the rejection. If the message authenticates (In Step 4108), then the authentication server 3812 concludes that the message, In fact, came from the person possessing the correct electronic key 3850 associated with the identified account number 3916 (i.e., Factor A Entity Authentication is obtained). The authentication server 3812 then determines (Step 4112) whether or not the Factor B entity authentication information or status (e.g., PIN) provided is sufficient for further processing of the specific message. If not, then the authentication server 3812 responds (Step 4110) with a rejection of the message and, again, such response may indicate the reason for the rejection. If the entity authentication is sufficient (In Step 4112), then the authentication server 3812 further processes (Step 4114) the message. In this case, further processing includes a separate determination as to whether the computer programmer 3802 has any rights or permissions associated with the requested program or file. If not, then the authentication server 3812 responds (Step 4110) with a rejection of the message and, again, such response may indicate the reason for the rejection. If the computer programmer 3802 does have some rights or permissions with respect to the requested program or file, then the computer programmer 3802 is given access, as limited by those rights and permissions.

x. Secure Area Authorization Account

Figure 42:
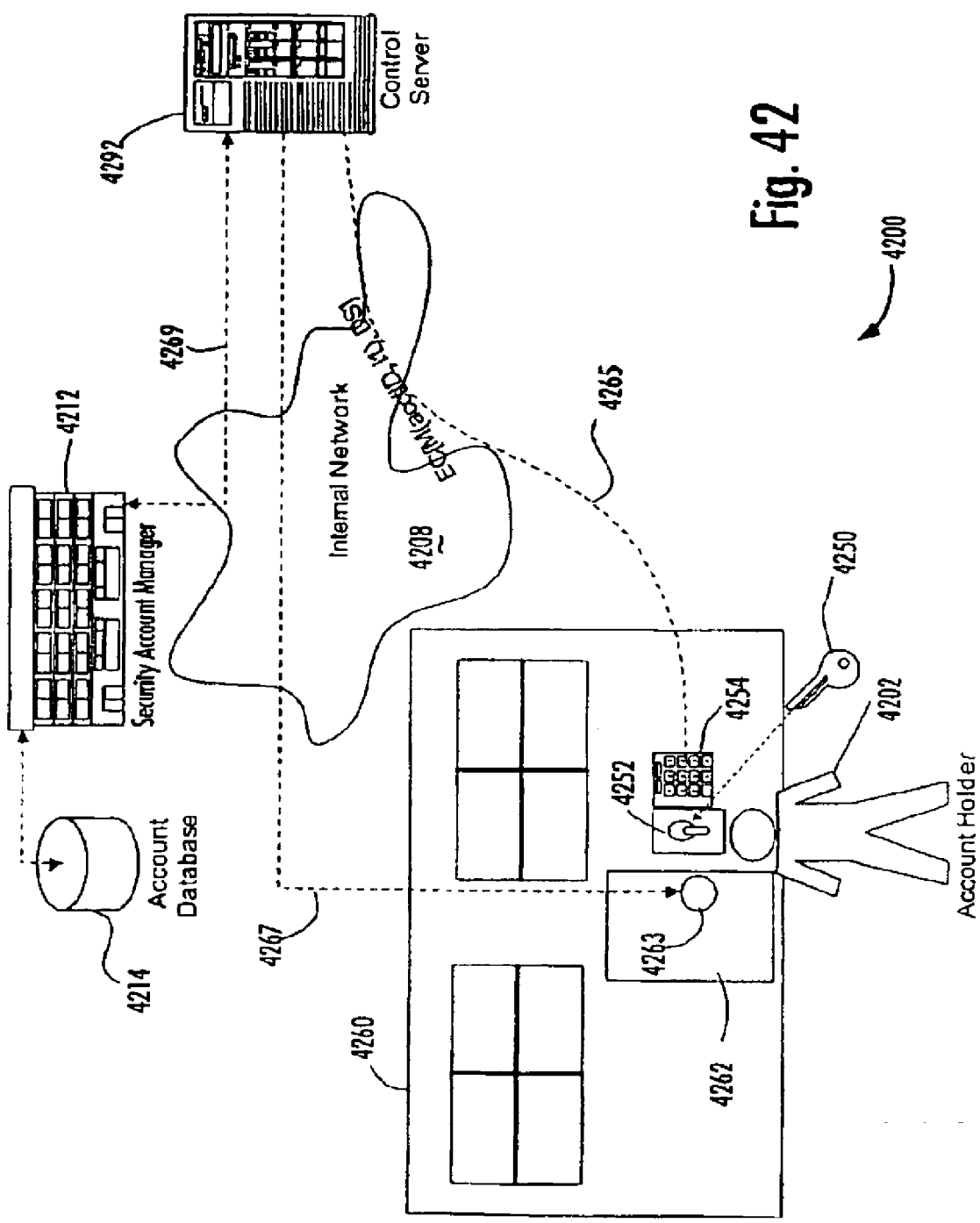
FIG. 42 illustrates a tenth business application in accordance with the first aspect of the present invention.

A tenth business application 4200 implementing the two-party ABDS system 200 of FIG. 2 is illustrated in FIG. 42. In this example, an account holder 4202 comprising an employee possesses a device in the form of an electronic key 4250, which is designed to interface with an electronic lock 4252, which is connected via cable 4265 into a suitable port of a control server 4292. The electronic lock 4252 also has associated therewith an alphanumeric keypad 4254 for input, for example, of a PIN, if necessary or desired. The electronic key 4250 securely protects therein a private key of a public-private key pair. The control server 4292 electronically controls via line 4267 the locking and unlocking mechanism 4263 associated with secure door 4262 into building 4260. The electronic key 4250 is associated with a secure area authorization account maintained by an account authority represented by a security account manager 4212. operated by the-employer (not shown) of the employee 4202. Each time the employee 4202 wants access to the building (or other secure areas that are not shown in this example), the employee 4202 must first be authenticated and approved for access to the requested area by the security account manager 4212, which communicates with the control server via line 4269.

Accounts maintained by the security account manager 4212 are associated with account records maintained in one or more account databases, collectively referred to and illustrated in FIG. 42 by account database 4214. With reference to FIG. 43, each authorized user identified in the account database 4214 is identified by a unique account identifier comprising an account number 4316. Each account number 4316 identifies within the account database 4214 account information 4340, including employee-specific information 4342, secured spaces or areas 4344, and access requirements 4346 associated with each secured space. In accordance with the present invention, the account number 4316 also identifies public key information 4318, which includes at least the public key of the user of each respective account. Also in accordance with a feature of the present invention, the account number 4316 identifies device profile information 4370 for the device that retains the private key corresponding with the public key associated with the account.

In the example of FIG. 42, the employee-specific information 4342 includes, for example, the name, email address, department, supervisor name, project(s) assignments, building location, room location, computer serial number, and the like. The list of secured spaces or areas 4344 includes, for example, the parking lot, main building entrance, floors 1–6, floors 7–10, room 610, other secure rooms, and other unspecified but secured areas. The list of access requirements 4346 identifies what "type" of entity authentication is required for access to the corresponding secured space 4344 (e.g., none—meaning that even a digital signature does not grant access to the corresponding space; device—meaning that presentation of a digital signature by the device is sufficient for access; device+PIN—meaning that a digital signature from the device plus a correct PIN is required for access to the corresponding space; device+BIO—meaning that a digital signature from the device plus a sufficient biometric specimen is required for access to the corresponding space; and device+PIN+BIO—meaning that a digital signature from the device plus a correct PIN plus a sufficient biometric specimen is required for access to the corresponding space). Additional business rules implemented by the security account manager 4212 determine how strong the entity authentication must actually be in order to grant access to a requested area in the building 4260. The public key information 4318 of the account of the employee 4202 includes the public key corresponding to the private key retained within the electronic key 4250. The device profile information 4370 includes information specific to the electronic key 4250. In this context, the message from the employee 4202 includes the account (employee) number 4316 for the relevant account and an instruction to the security account manager 4212, for example, to provide access to a specified space or area 4344.

In this business application, an EC from the employee 4202 to the security account manager 4212 is generally only used for the purpose of transaction authentication (i.e., for obtaining access to the requested secure area or resource). For this reason, the only message that generally needs to be communicated from the employee 4202 to the security account manager 4212 is one that includes the account number 4316 for the relevant account. The instruction (il) (i.e., "give me access to the area protected by this lock 4252") is implicit in the mere communication of the EC containing the account number 4316.

Figure 44:
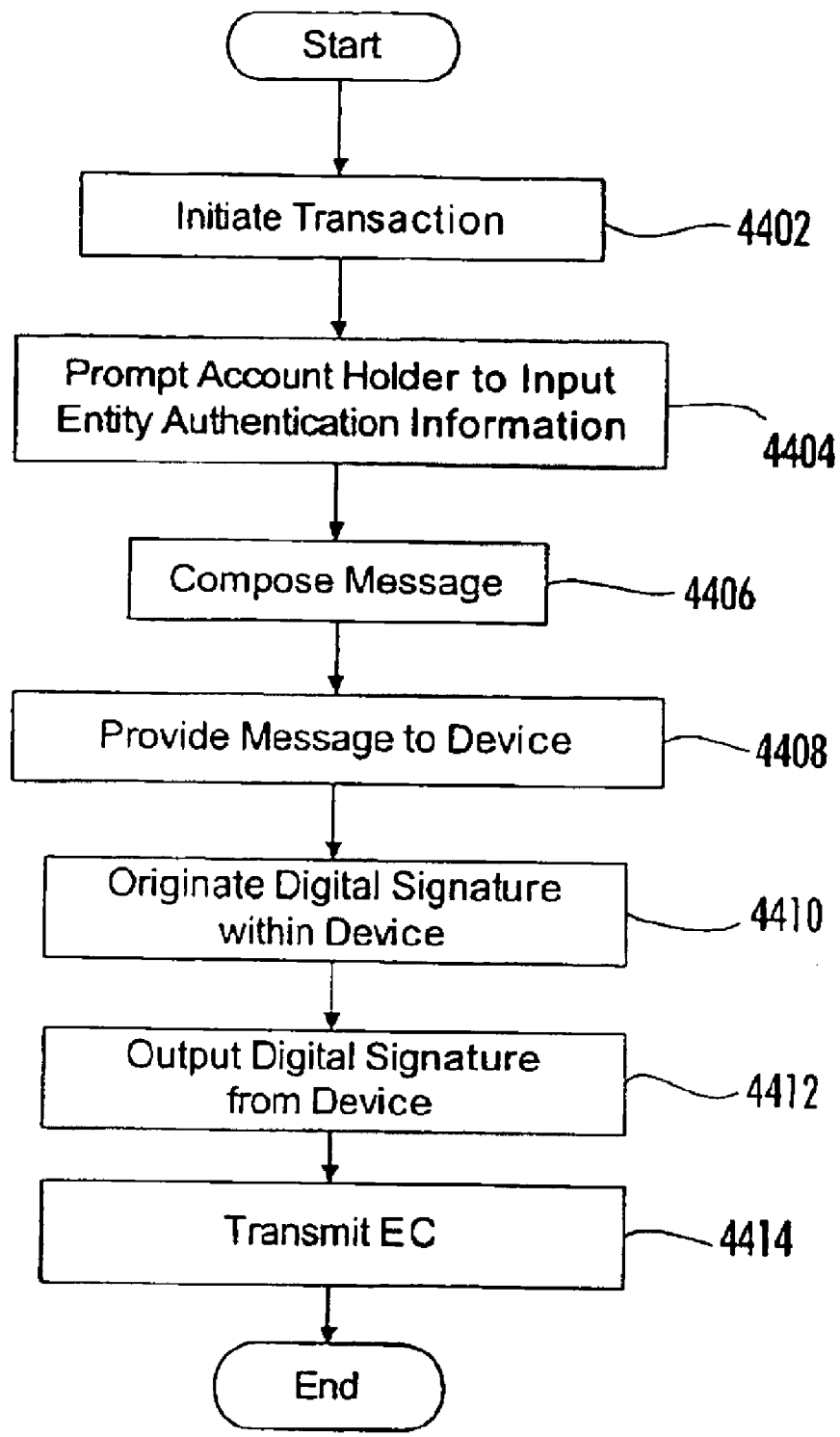
FIG. 44 illustrates a flowchart of steps performed by an account holder in the business application of FIG. 42.

As illustrated in FIG. 44, transaction authentication is initiated (Step 4402) when the employee 4202 attempts to access a secure space or area, such as main building entrance 4262 of main building 4260. This occurs when the employee 4202 physically inserts the electronic key 4250 into electronic lock 4252 (since this particular lock 4252 is of the "contact" variety rather than of the "contactless" variety). The control server 4292 prompts (Step 4404), using an audible message that is output from a speaker (not shown) near the secure door 4262, the employee 4202 to input a PIN for Factor B entity authentication purposes by typing the PIN into the keypad 4254. With the key 4250 still inserted and after the PIN has been entered, an electronic message is composed (Step 4406) for sending to the server 4212 (via control server 4292) for authentication and approval for access to the main building 4260. The message is composed, for example, by the control server 4292, which retrieves the account number 4316 from the key 4250 and combines it with the name (or computer identification number) of the secured door 4262 the employee 4202 is trying to enter. Preferably, the control server 4292 also includes a unique session key within the message to prevent the possibility of a "replay attack" (i.e. reuse of a previous digital signature originated from the key 4250).

The message composed by the control server 4292 is then transmitted (Step 4408) via cable 4265 back to the key 4250 for the origination of a digital signature. Once the message is received by the key 4250, it originates (Step 4410) a digital signature for the message by first calculating a hash value for the data and then encrypting the hash value using the private key retained within the key 4250. The key 4250 then outputs (Step 4412) the digital signature to the lock 4252, which forwards the same on to the control server 4292. The control server 4292 then transmits (Step 4414) the message and the digital signature therefor in an EC to the security account manager 4212.

Figure 45:
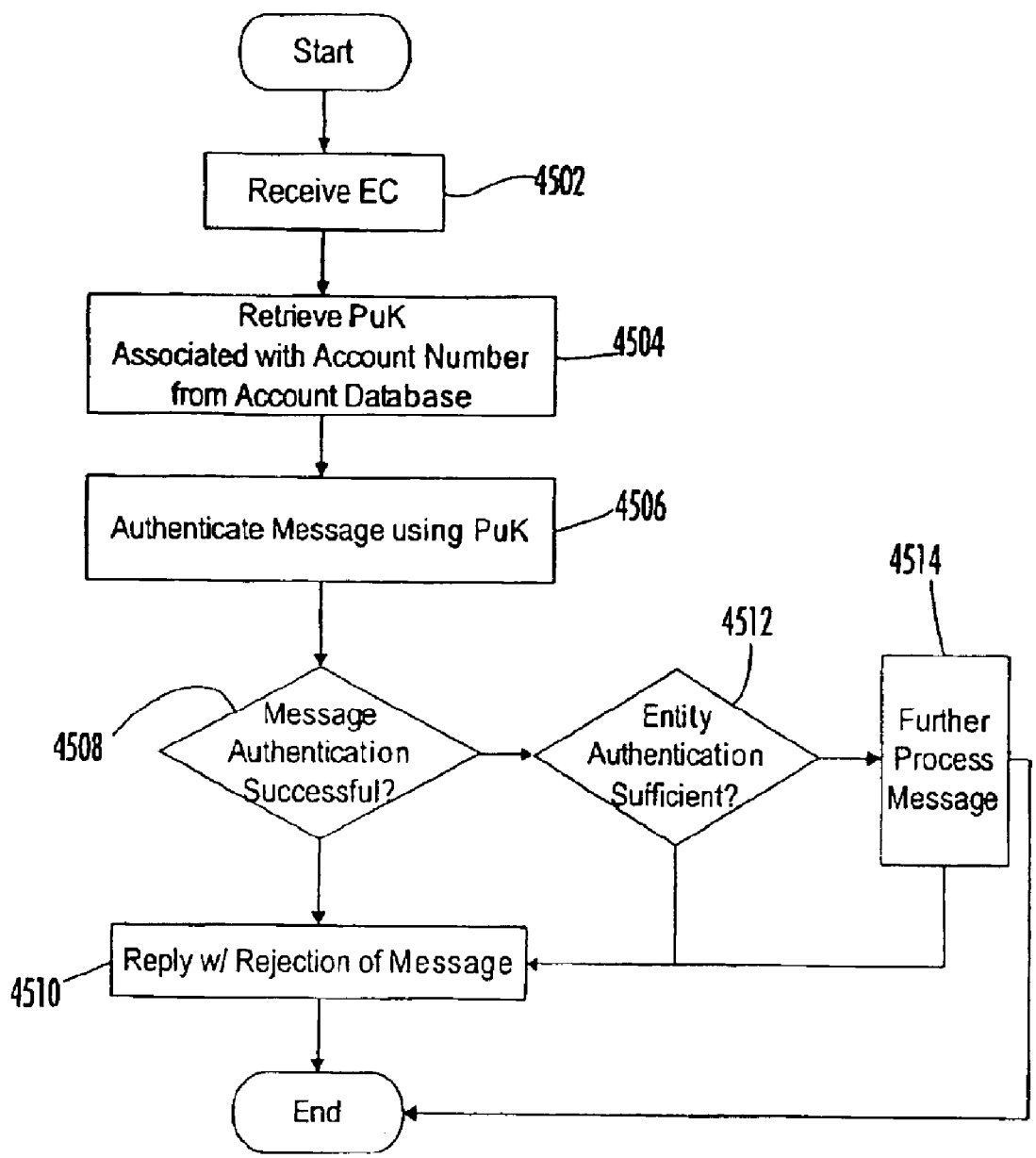
FIG. 45 illustrates a flowchart of steps performed by an account authority in the business application of FIG. 42.

With reference to FIG. 45, the EC is received (Step 4502) by the security account manager 4212 from the control server 4292. The security account manager 4212 then retrieves (Step 4504) from the account database 4214 the public key that is identified by the account number 4316. Using this public key, the security account manager 4212 attempts to authenticate (Step 4506) the message. If the message does not authenticate (in Step 4508), then the security account manager 4212 responds (Step 4510) with a rejection of the message (i.e., refusal to grant access to the building 4260). Such a response may indicate the reason for the rejection. If the message authenticates (in Step 4508), then the security account manager 4212 concludes that the message, in fact, came from the person possessing the correct electronic key 4250 associated with the identified account number 4316—(i.e., Factor A Entity Authentication is obtained). The security account manager 4212 then determines (Step 4512) whether or not the Factor B entity authentication (e.g., PIN) provided is sufficient (based on the type of entity authentication required for-the particular door 4262 and based on the above-mentioned business rules) for further processing of the specific message. If not, then the security account manager 4212 responds (Step 4510) with a rejection of the message and, again, such response may indicate the reason for the rejection. If the entity authentication is sufficient (in Step 4512), then the security account manager 4212 further processes (Step 4514) the message.

In this case, further processing includes a separate determination as to whether the employee 4202 has any right or permission to obtain access to the requested secure area through secure door 4262. If not, then (and even though the employee 4202 provided sufficient entity authentication) the security account manager 4212 responds (Step 4510) with a rejection of the message (refusal to grant access to the requested area) and, again, such response may indicate the reason for the rejection. If the employee 4202 does have rights or permissions to enter the requested area, then the security account manager 4212 provides the employee 4202 with access to the requested area. More specifically, the security account manager 4212 sends an appropriate signal to the control server 4292, which, in turn, sends a signal via line 4267 to unlock and/or open the entrance 4262.

xi. Electronic Data Interchange with Multiple Purchasing Agents

Figure 46:
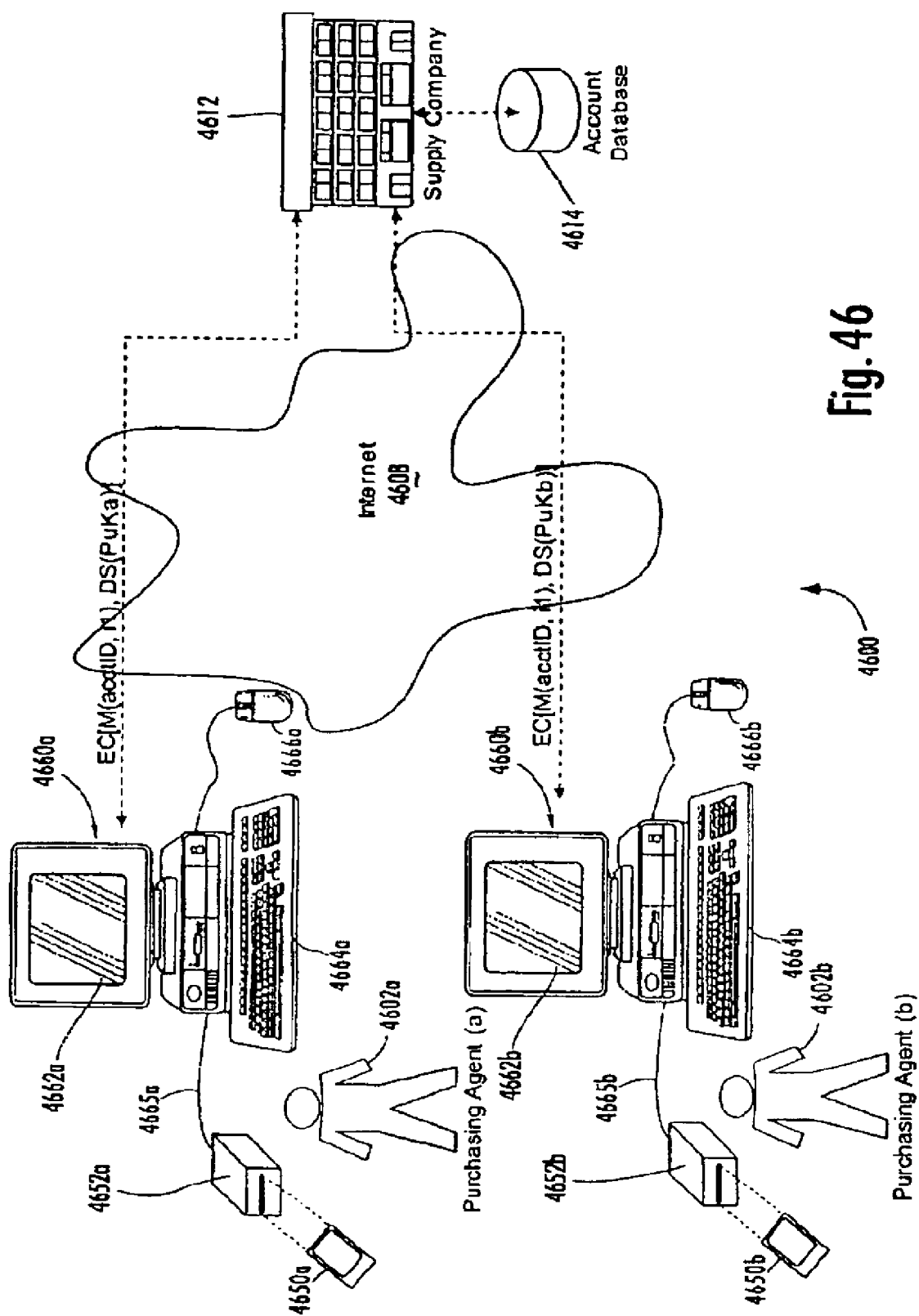
FIG. 46 illustrates an eleventh business application in accordance with the first aspect of the present invention.
Figure 48:
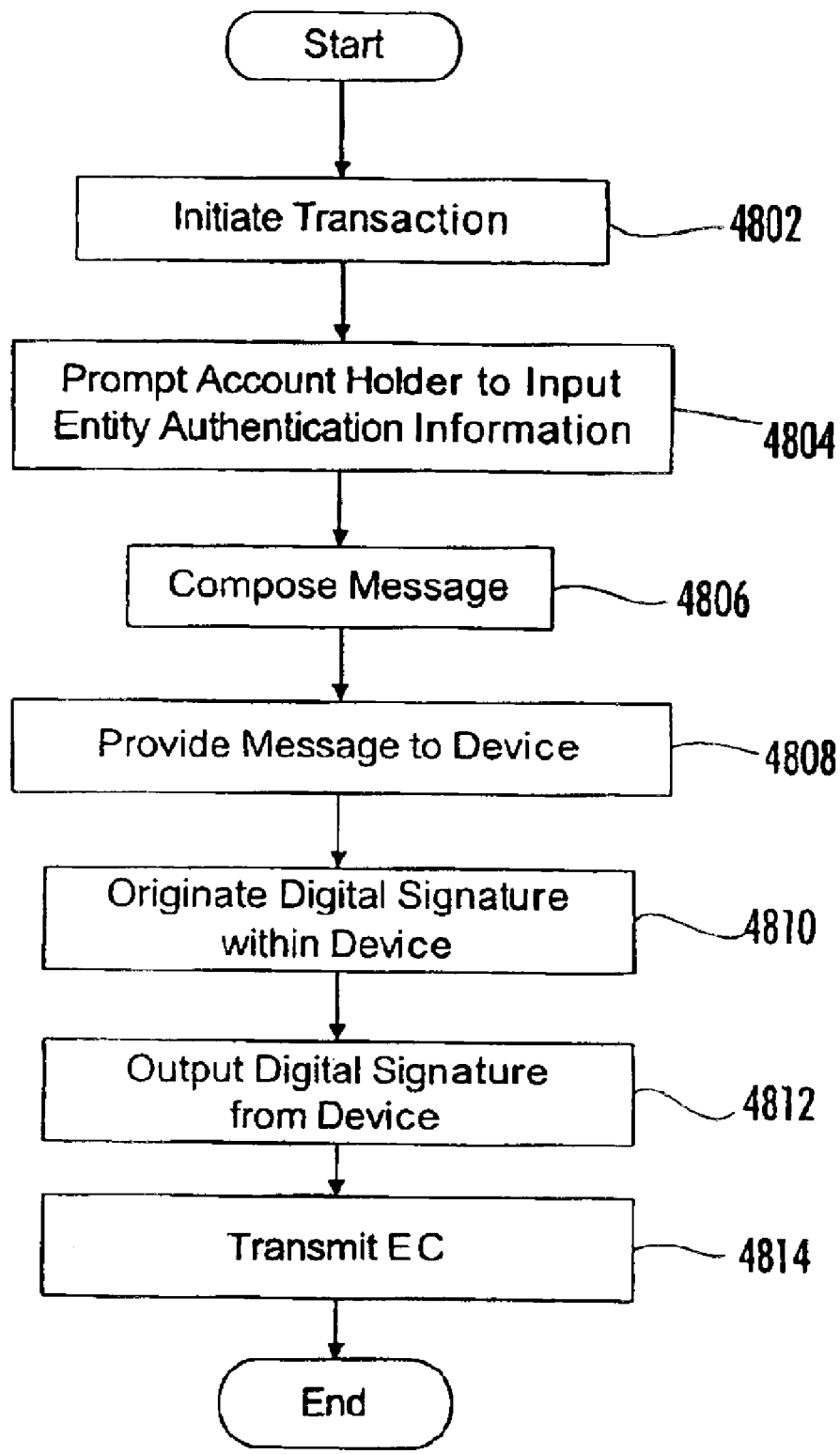
FIG. 48 illustrates a flowchart of steps performed by an account holder in the business application of FIG. 46.

An eleventh business application 4600 implementing the two-party ABDS system 200 of FIG.2 is illustrated in FIG. 46. In this example, two account holders comprising purchasing agents 4602a,4602b each possess a device in the form of a card 4650a,4650b, respectively, such as an IC card, which is capable of being used in a card reader 4652a,4652b. Each card 4650a,4650b securely protects therein a private key of a public-private key pair. In this example, each card reader 4652a,4652b is connected via cable 4665a,4665b into a suitable port (USB, serial, parallel, etc.) of a personal computer 4660a,4660b. Both personal computers 4660a,4660b are conventional in that they each include a monitor 4662a,4662b, a keyboard 4664a,4664b, and a mouse 4666a,4666b. Both cards 4650a,4650b are associated with a corporate purchasing account maintained by an account authority represented by a supply company 4612. Both computers 4660a,4660b have installed thereon suitable web browser software to enable them to communicate over the Internet 4608, in conventional manner, such as via a modem, LAN line, etc., with a web site hosted by the supply company 4612.

Accounts maintained with the supply company 4612 are associated with account records maintained in one or more account databases, collectively referred to and illustrated in FIG. 46 by account database 4614. With reference to FIG. 47, each account includes a unique account identifier comprising an account number 4716. Each account number 4716 identifies within the account database 4614 account information 4740, including account-specific information 4742 and purchasing agent-specific information 4744. In accordance with the present invention, the account number 4716 also identifies public key information 4718, which includes at least a public key of each purchasing agent of each respective account. Also in accordance with a feature of the present invention, the account number 4716 identifies device profile information 4770 for each device that retains a private key corresponding with the public key associated with the account.

In the example of FIG. 46, the account-specific information 4742 includes, for example, company name, primary company contact, email address, billing address, billing information, and list of authorized purchasing agents for the account. The purchasing agent-specific information 4744 includes, for example, agent name, purchasing agent identification number, contact information for the purchasing agent, purchasing restrictions, if any, imposed by the company on the purchasing agent, and the like. The public key information 4718 of the account of the company includes each public key corresponding to the private key retained within the cards 4650a,4650b of each purchasing agent. The device profile information 4770 includes information specific to each card 4650a,4650b. Although FIG. 46 illustrates only two purchasing agents, FIG. 47 illustrates the fact that many more purchasing agents (n) may also be associated with this particular company account.

As stated previously, an EC from the purchasing agent 4602a,4602b to the supply company 4612 may be used for three different purposes: session authentication, transaction authentication, and transaction confirmation. For example, a common type of session authentication occurs in this business application when the purchasing agent 4602a,4602b initially attempts to login to or otherwise access the secure web site operated by the supply company 4612. Transaction confirmation is applicable in this business application when, for example, the purchasing agent 4602a,4602b requests the purchase of a high ticket item and/or when the purchasing agent 4602a,4602b is ready to "check out" and pay for the list of items purchased. In such case, the supply company 4612 requires the purchasing agent 4602a,4602b to confirm such request by digitally signing the request with the card 4650a,4650b (and, potentially, also providing additional entity authentication information or status).

Regardless of which type of EC is communicated from the purchasing agent 4602a,4602b to the supply company 4612, the basic methodology for composing and digitally signing the message (on the purchasing agent end) and for authenticating the message and authenticating the entity (on the supply company end) is essentially the same. For example, turning now to FIG. 48, a transaction (in this case, session authentication) is initiated (Step 4802) when either purchasing agent 4602a,4602b accesses the web site of the supply company 4612 over the Internet 4608 using computer 4660a,4660b, respectively. For the remainder of this example, we will assume that this transaction is initiated and carried out by the first purchasing agent 4602a. First, the web site of the supply company causes the computer 4660a to prompt (Step 4804) the purchasing agent 4602a to input Factor B entity authentication information, such as a PIN, into the login screen. Once the PIN has been input into the login screen, an electronic message is composed (Step 4806) for sending to the supply company 4612.

The message in this example is merely the account number 4716 associated with the corporate account maintained by the supply company 4612 on behalf of the employer of both purchasing agents 4602a,4602b. The computer 4660a displays a menu of available accounts from which the purchasing agent 4602a can select. Preferably, such available accounts are stored within memory on the card 4650a and retrieved by the computer 4660a for selection by the purchasing agent 4602a. Of course, if only one account is available in memory on the card 4650a, then that account is selected by default without requiring specific selection by the purchasing agent 4602a. Alternatively, the list of available accounts may be maintained in memory on the computer 4660a itself and displayed for selection by the purchasing agent 4602a.

Once the appropriate account number is selected, it is transmitted (Step 4808), as the message, via cable 4665a from the computer 4660a to the card 4650a for digital signing by the purchasing agent 4602a. In this regard, upon receipt of data representing the message, the card 4650a originates (Step 4810) a digital signature for the message by first calculating a hash value for the data and then encrypting the hash value using the private key retained within the card 4650a. The card 4650a then outputs (Step 4812) the digital signature, which is received by the computer 4660a. The computer 4660a then transmits (Step 4814) the message and the digital signature therefor in an EC to the supply company 4812.

Figure 49:
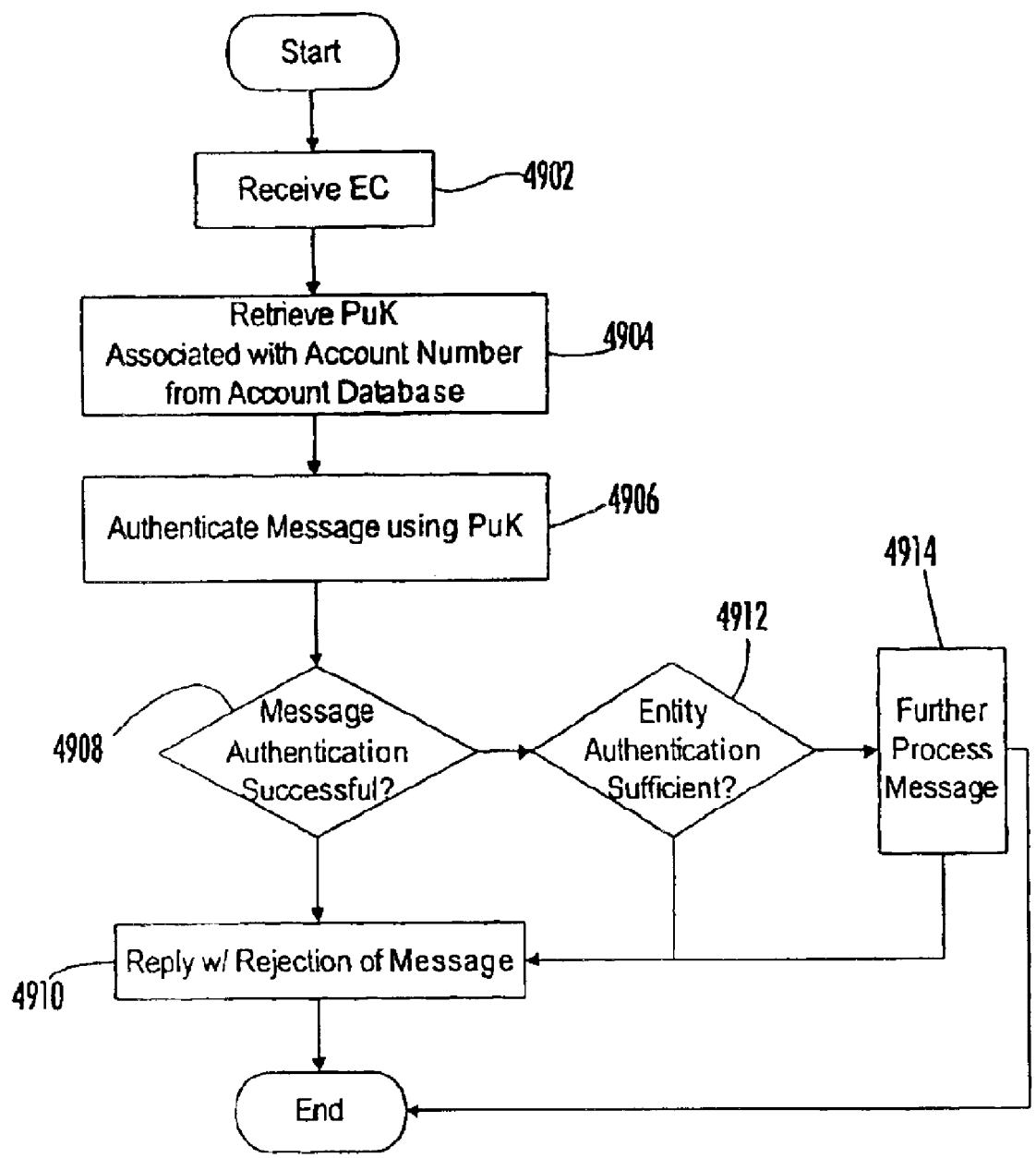
FIG. 49 illustrates a flowchart of steps performed by an account authority in the business application of FIG. 46.

With reference to FIG. 49, the EC is received (Step 4902) by the supply company 4612 from the computer 4660a. The supply company 4612 then retrieves (Step 4904) from the account database 4614 all of the public keys that are identified by the account number 4716. Using each of these public keys, the supply company 4612 sequentially attempts to authenticate (Step 4906) the message. Alternatively, the message may actually set forth the public key 4718 of the relevant purchasing agent 4602a (or an appropriate purchasing agent ID which acts as a sub-account identifier) so that the supply company 4612 does not have to "guess" which public key 4718 from its database 4614 to use; however, the supply company 4612 would still need to confirm that such public key 4718 corresponds with the specified account number 4716. If the message does not authenticate (in Step 4908) with any of the public keys associated with the identified account 4716, then the supply company 4612 responds (Step 4910) with a rejection of the message (i.e., refusal to grant access to the web site for purchasing). Such a response may indicate the reason for the rejection. Once the message authenticates (Step 4908), then the supply company 4612 concludes that the message, in fact, came from the person possessing the correct card 4650a associated with the identified account number 4716—(i.e., Factor A Entity Authentication is obtained). The supply company 4612 then determines (Step 4912) whether or not the Factor B entity authentication information or status (e.g.. PIN) provided is sufficient for further processing of the specific message. If not, then the supply company 4612 responds (Step 4910) with a rejection of the message and, again, such response may indicate the reason for the rejection. If the entity authentication is sufficient (in Step 4912), then the supply company 4612 further processes (Step 4914) the message.

In this case, further processing includes providing the purchasing agent 4602a with access to the web site for purchasing supplies on behalf of the employer of the purchasing agent 4602a. Further processing also includes limiting display (or selection for purchase) of items that are not within the purchasing authority of the purchasing agent 4602a based on the purchasing restrictions imposed on the particular purchasing agent 4602a as set forth in the purchasing restrictions from the purchasing agent-specific information 4744 in account database 4614.

Once in the web site, the purchasing agent 4602a is allowed to navigate freely around the web site (except as set forth above) and make purchases on behalf of his employer. If desired, the supply company 4612 may require additional entity authentication by the purchasing agent 4602a using the card 4650a for "high-ticket" or specified items on the web site. In such a case, preferably, the web site transmits a confirmation message back to the computer 4660a for transmission to the card 4650a for origination of a confirmation digital signature by the card 4660a. The process of originating such a digital signature will mirror the procedure as set forth above and may include re-entry of Factor B entity authentication information or providing status of the same prior to the generation of the digital signature.

i. Specific Implementations of 3-Party ABDS Systems

As with the two-party ABDS system 200 of FIG. 2, the three-party ABDS system 300 of FIG. 3 can be implemented in a vast number of business applications. The specific examples set forth herein, therefore, represent only a sampling of such wide-ranging possibilities.

i. eBusiness Transaction Using Financial Institution Account

Figure 50:
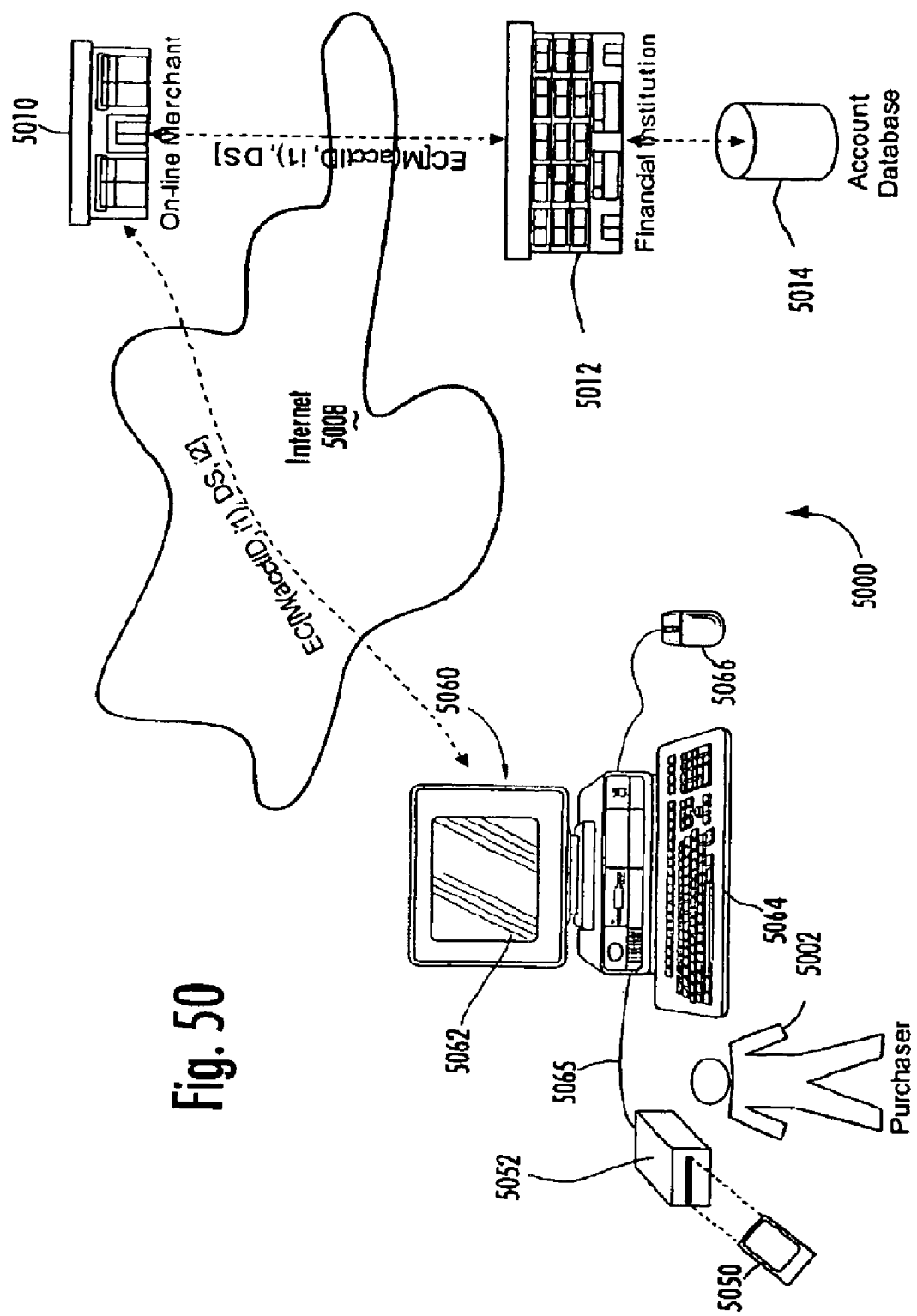
FIG. 50 illustrates a first business application in accordance with another preferred embodiment of the first aspect of the present invention.

A first business application 5000 implementing the three-party ABDS system 300 of FIG. 3 is illustrated in FIG. 50. In this example, an account holder comprising a purchaser 5002 possesses a device in the form of a card 5050, such as an IC card, which is capable of being used in a card reader 5052. The card 5050 securely protects therein a private key of a public-private key pair. In this example, the card reader 5052 is connected via cable 5065 into a suitable port (USB, serial, parallel, etc.) of a personal computer 5060. The personal computer 5060 is conventional in that it includes a monitor 5062, a keyboard 5064, and a mouse 5066. The card 5050 is associated, among other accounts, with a debit or credit account maintained with an account authority comprising a financial institution 5012. The account may be a checking account, savings account, money market account, credit card account, or the like, and the financial institution 5012 may be a bank, savings and loan, credit card company, or the like. The computer 5060 has installed thereon suitable web browser software to enable it to communicate over the Internet 5008, in conventional manner, such as via a modem, LAN line, etc., with an intermediate party comprising an on-line merchant 5010.

Accounts maintained with the financial institution 5012 are associated with account records maintained in one or more account databases, collectively referred to and illustrated in FIG. 50 by account database 5014. With reference to FIG. 51, each account includes a unique account identifier comprising an account number 5116. Each account number 5116 identifies, within the account database 5014, account information 5140, including customer-specific information 5142 and account-specific information 5144. In accordance with the present invention, the account number 5116 also identifies public key information 5118, which includes at least a public key of an account holder of each respective account. Also in accordance with a feature of the present invention, the account number 5116 identifies device profile information 5170 for the device that retains the private key corresponding with the public key associated with the account.

In the example of FIG. 50, the customer-specific information 5142 includes, for example, the name, address, social security number and/or tax-ID number of the account holder. The account-specific information 5144 includes, for example, the current account balance, available credit, closing date and balance of current statement, and associated account identifiers. The public key information 5118 of the account of the purchaser 5002 includes the public key corresponding to the private key retained within the card 5050. The device profile information 5170 includes information specific to the card 5050.

Figure 52:
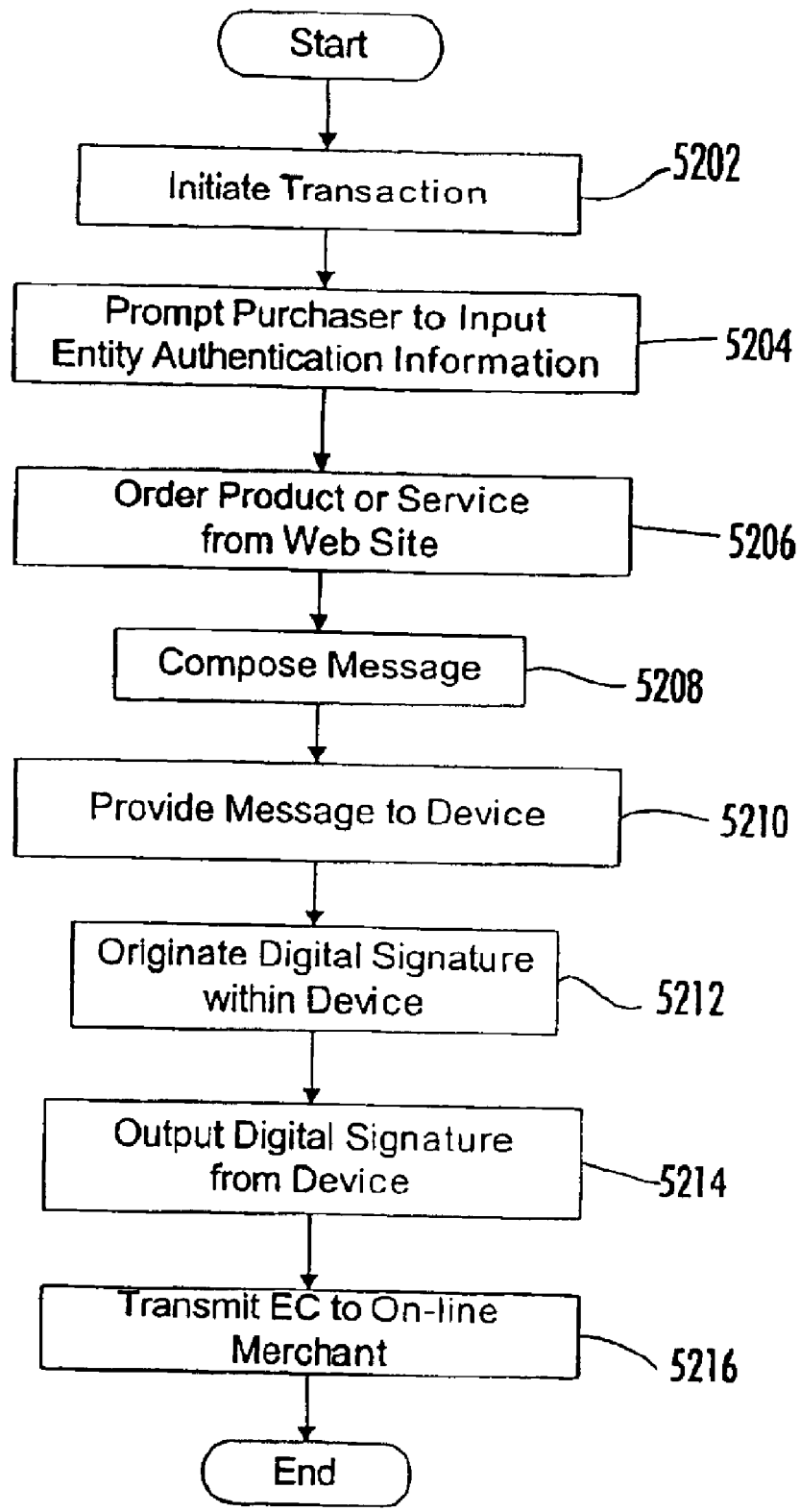
FIG. 52 illustrates a flowchart of steps performed by an account holder in the business application of FIG. 50.

With particular regard to FIG. 52, the purchaser 5002 initiates (Step 5202) a transaction with on-line merchant 5010 by accessing the web site of the on-line merchant 5010 using the web browsing software installed on the computer 5060 in conventional manner. While viewing the web site on the computer 5060, the purchaser 5002 orders (Step 5206) a product, such as a book, from the on-line merchant 5010 by selecting the book for purchase in conventional manner on the web site. Preferably, the purchaser 5002 previously input (in Step 5204) Factor B or C entity authentication information into the computer 5060 when the card 5050 was inserted into the card reader 5052. If the card 5050 had not been previously inserted into the card reader 5052, the computer 5060 now prompts (Step 5204) the purchaser 5002 to do so and to input his relevant entity authentication information.

The step of generating a message (Step 5208), which will be digitally signed, occurs as follows. As part of the ordering process, the web site displays to the purchaser 5002 on monitor 5062 a payment selection screen, which, preferably, identifies the product being order and includes the price of the product plus shipping and handling. The purchaser 5002 completes the required data entry field and/or makes selections from pull-down menus on the screen of monitor 5062 in conventional manner (e.g., such fields/menus could be automatically filled in by the computer 5060 using information stored in "cookies" in known manner) in order to specify payment method (i.e. account number 5116 and type of account). Generally, it is not necessary to identify the name of the financial institution 5012 since the financial industry uses conventions by which the identity can be derived solely from the account number 5116 (such as, for example, the use of issuer identification numbers (IIN) as defined in ISO Standard 7812, which is incorporated herein by reference). No other payment information need be entered in the payment selection screen. Rather than having to submit the information to the on-line merchant 5010 in encrypted fashion, such as with Secure Socket Layering (SSL), which is conventional, the purchaser 5002 merely requests the option (on the payment method screen) of "digitally signing" the order in an "ABDS manner." In response to this selection, the computer 5060 generates a message, using the information displayed and/or input by the purchaser 5002 into the payment selection screen(s).

This message is then transmitted (Step 5210) via cable 5065 from the computer 5060 to the card 5050 for digital signing by the purchaser 5002. In this regard, upon receipt of data representing the message, the card 5050 originates (Step 5212) a digital signature for the message by first calculating a hash value for the data and then encrypting the hash value using the private key retained within the card 5050. The card 5050 then outputs (Step 5214) the digital signature, which is received by the computer 5060. The computer 5060 then transmits (Step 5216) the message and the digital signature therefor in an EC to the on-line merchant 5010.

In this particular example, the instructions (i2) from the purchaser 5002 to the on-line merchant 5010 include the purchase order for the product using the payment method and account 5116 specified in the message, with delivery going to the address, if any, provided by the purchaser 5002; thus, portions of the instruction (i2) may have been included in an electronic communication prior to the EC containing the message and digital signature and additional portions of the instruction (i2) are included within the EC containing the message and digital signature. On the other hand, the message from the purchaser 5002, which is intended ultimately for the financial institution 5012, includes the account number 5116 for the specified account and an instruction (i1) to the financial institution 5012 to make a payment from the account 5116 to the on-line merchant 5010 in the amount specified.

Figure 53:
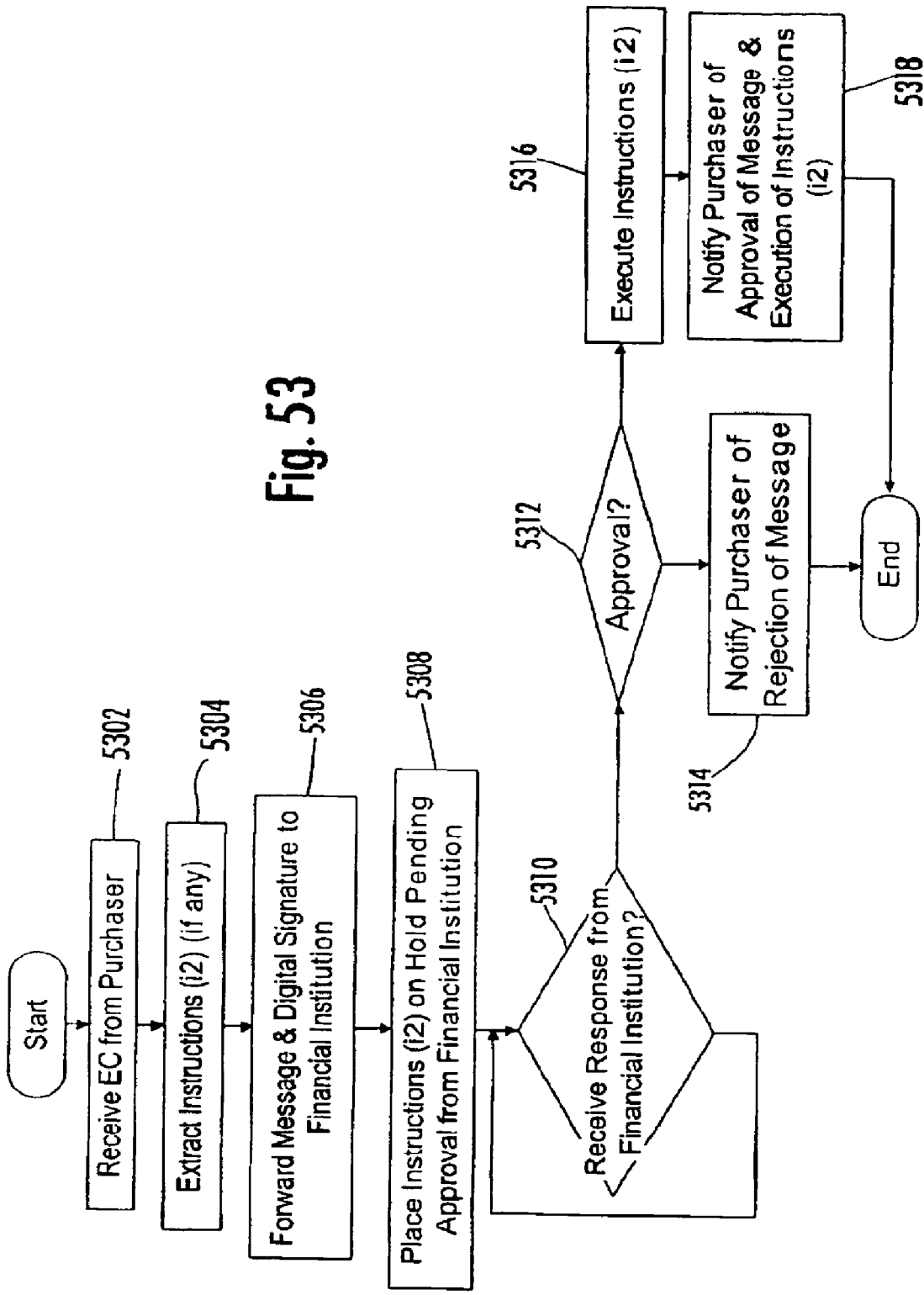
FIG. 53 illustrates a flowchart of steps performed by an intermediate party in the business application of FIG. 50.

Unlike the two-party ABDS system 200, the EC containing the message and digital signature (in this case used for transaction authentication purposes) is not sent directly to the financial institution 5012 but rather to the on-line merchant 5010. As illustrated in FIG. 53, the on-line merchant 5010 receives (Step 5302) the EC from the purchaser 5002, extracts (Step 5304) any additional instructions (i2) from the purchaser 5002 to the on-line merchant 5010 included within the EC containing the message and digital signature. The on-line merchant 5010 then forwards (Step 5306) the EC containing the message and digital signature to the financial institution 5012 for authentication and authorization of payment. The on-line merchant 5010 then places (Step 5308) these instructions (i2) (i.e., the purchase request) "on hold" pending approval of payment from the financial institution 5012, while it waits (Step 5310) for a response from the financial institution 5012.

Figure 54:
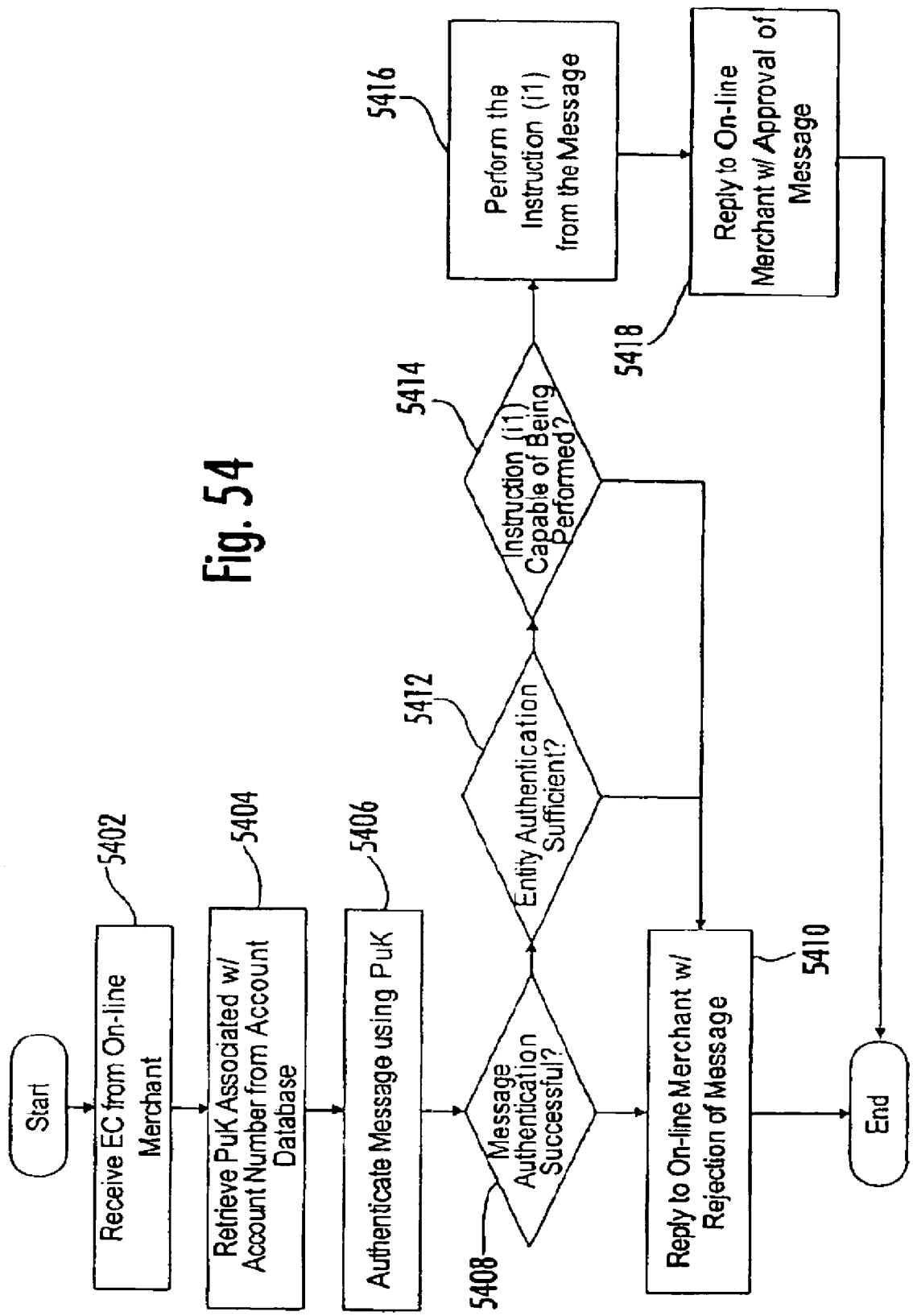
FIG. 54 illustrates a flowchart of steps performed by an account authority in the business application of FIG. 50.

With reference to FIG. 54, the EC is received (Step 5402) by the financial institution 5012 from the on-line merchant

5010. The financial institution 5012 then retrieves (Step 5404) from the account database 5014 the public key that is identified by the account number 5116. Using this public key, the financial institution 5012 attempts to authenticate (Step 5406) the message. If the message does not authenticate (in Step 5408), then the financial institution 5012 responds (Step 5410) to the on-line merchant 5010 with a rejection of the message. Such a response may indicate the reason for the rejection. If the message authenticates (in Step 5408), then the financial institution 5012 concludes that the message, in fact, came from the person possessing the correct card 5050 associated with the identified account number 5116—(i.e., Factor A Entity Authentication is obtained). The financial institution 5012 then determines (Step 5412) whether or not the Factor B or C entity authentication information or status provided is sufficient for further processing of the specific message. If not, then the financial institution 5012 responds (Step 5410) with a rejection of the message and, again, such response may indicate the reason for the rejection. If the entity authentication is sufficient (in Step 5412), then the financial institution 5012 proceeds with further processing (discussed below) of the message.

In the present example, further processing of the message includes a determination (Step 5414) as to whether the instruction (i1) is capable of being performed. For example, even though the message authenticated, the purchaser may not have enough money or credit associated with the account for the financial institution 5012 to approve the transaction. Thus, making such a determination typically involves accessing the relevant portion(s) of the account record and confirming that the funds are available. If the determination (in Step 5414) is negative, then the financial institution 5012 responds (Step 5410) to the on-line merchant 5010 with a rejection of the message. Again, such a response may indicate the reason for the rejection. If the determination in Step 5414 is positive, then the financial institution 5012 performs (Step 5416) the instruction (i1). In this example, the instruction (i1) from the purchaser 5002 is to pay the on-line merchant 5010 the specified amount of funds from the account for the purchase of the product. Thus, performing (Step 5416) the instruction typically involves accessing the relevant portion(s) of the account record, initiating transfer of the specified amount of funds from the account of the purchaser 5002 to the on-line merchant 5010, and debiting/updating the account record accordingly. (It should be noted that the steps of transferring the funds and debiting the account may not occur contemporaneously with the other steps). The financial institution 5012 also notifies (Step 5418) the on-line merchant 5010 of the approval of the message and the initiation of the payment.

Referring back to FIG. 53, once the on-line merchant 5010 receives the response from the financial institution 5012, the determination in Step 5310 is positive. The on-line merchant 5010 next determines (Step 5312) whether the response is an approval or rejection of the transaction. If the transaction is not approved by the financial institution 5012, then the on-line merchant 5010 notifies (Step 5314) the purchaser 5002 that the message was rejected (i.e., payment was not approved) and that the instructions (i2) are not being executed (i.e., that the product is not being shipped because of the payment rejection). On the other hand, if the determination in Step 5312 is positive, then the on-line merchant 5010 executes (Step 5316) the instructions (i2) that had previously been put on hold. In this case, the on-line merchant 5010 initiates shipment of the product purchased by the purchaser 5002. Next, the on-line merchant 5010 notifies (Step 5318) the purchaser 5002 that the transaction (i.e. payment) was approved and that the instructions (i2) are being or have been executed (i.e., that the product is being shipped to the address as requested).

ii. Digital Gift Check Using Financial Institution Account

Figure 55:
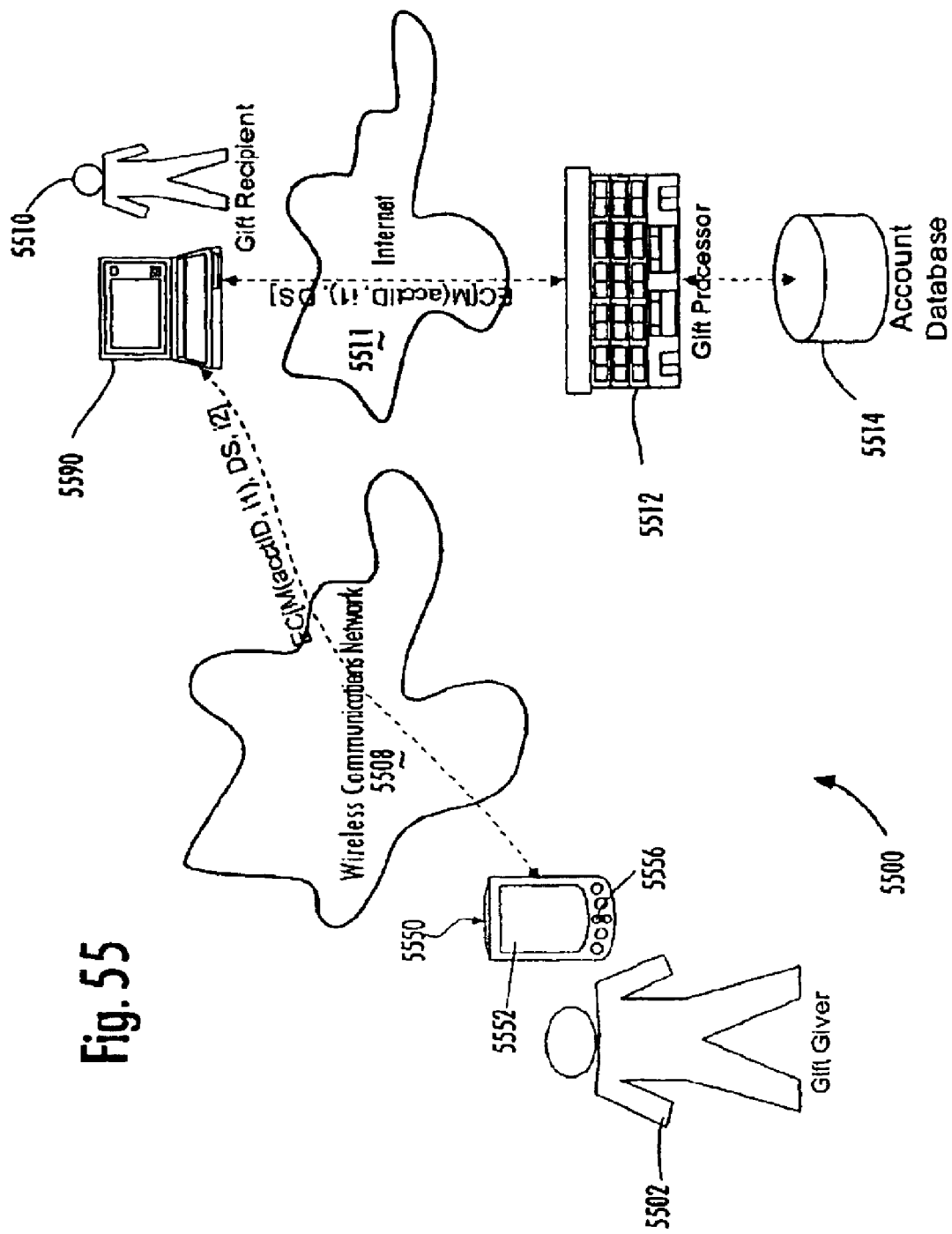
FIG. 55 illustrates a second business/consumer application in accordance with another preferred embodiment of the first aspect of the present invention.

A second business application 5500 implementing the three-party ABDS system 300 of FIG. 3 is illustrated in FIG. 55. In this example, the account holder comprises a gift giver 5502, who possesses a device in the form of a personal digital assistant (PDA) 5550. The PDA 5550 securely protects therein a private key of a public-private key pair. The PDA 5550 includes an interactive display screen 5552 and user input keys 5556. Further, the PDA 5550 has been suitably equipped with a wireless modem for digital communications over a wireless communications network 5508. The PDA 5550 is associated with a debit or credit account maintained with an account authority comprising a gift clearing house or gift processor 5512. The account may be a checking account, savings account, money market account, credit card account, or the like, and the gift processor 5512 may be a financial institution, such as bank, savings and loan, credit card company, or the like, or a company or business unit specifically established for the purpose of enabling digital checks or monetary gifts to be transmitted electronically within an ABDS system. The PDA 5550 has installed thereon suitable software to enable it to generate and transmit an email over the network 5508, in conventional manner, to a gift recipient 5510, who has a computer 5590, which is capable of receiving and forwarding emails received over, for example, the network 5508 and/or the Internet 5511. Alternatively, the PDA 5550 has installed thereon software provided by the gift processor 5512 specifically for the purpose of composing, generating, and sending such an email (or other electronic communication readable by email or standard web browser software).

Accounts maintained with the gift processor 5512 are associated with account records maintained in one or more account databases, collectively referred to and illustrated in FIG. 55 by account database 5514. With reference to FIG. 56, each account includes a unique account identifier comprising an account number 5616. Each account number 5616 identifies, within the account database 5514, account information 5640, including customer-specific information 5642 and account-specific information 5644. In accordance with the present invention, the account number 5616 also identifies public key information 5618, which includes at least a public key of an account holder of each respective account. Also in accordance with a feature of the present invention, the account number 5616 identifies device profile information 5670 for the device that retains the private key corresponding with the public key associated with the account.

In the example of FIG. 55, the customer-specific information 5642 includes, for example, the name, address, social security number and/or tax-ID number of the account holder. The account-specific information 5644 includes, for example, the current account balance, available credit, current statement of the account holder, and payment account alternatives. The public key information 5618 of the account of the gift giver 5502 includes the public key corresponding to the private key retained within the PDA 5550. The device profile information 5670 includes information specific to the PDA 5550.

Figure 57:
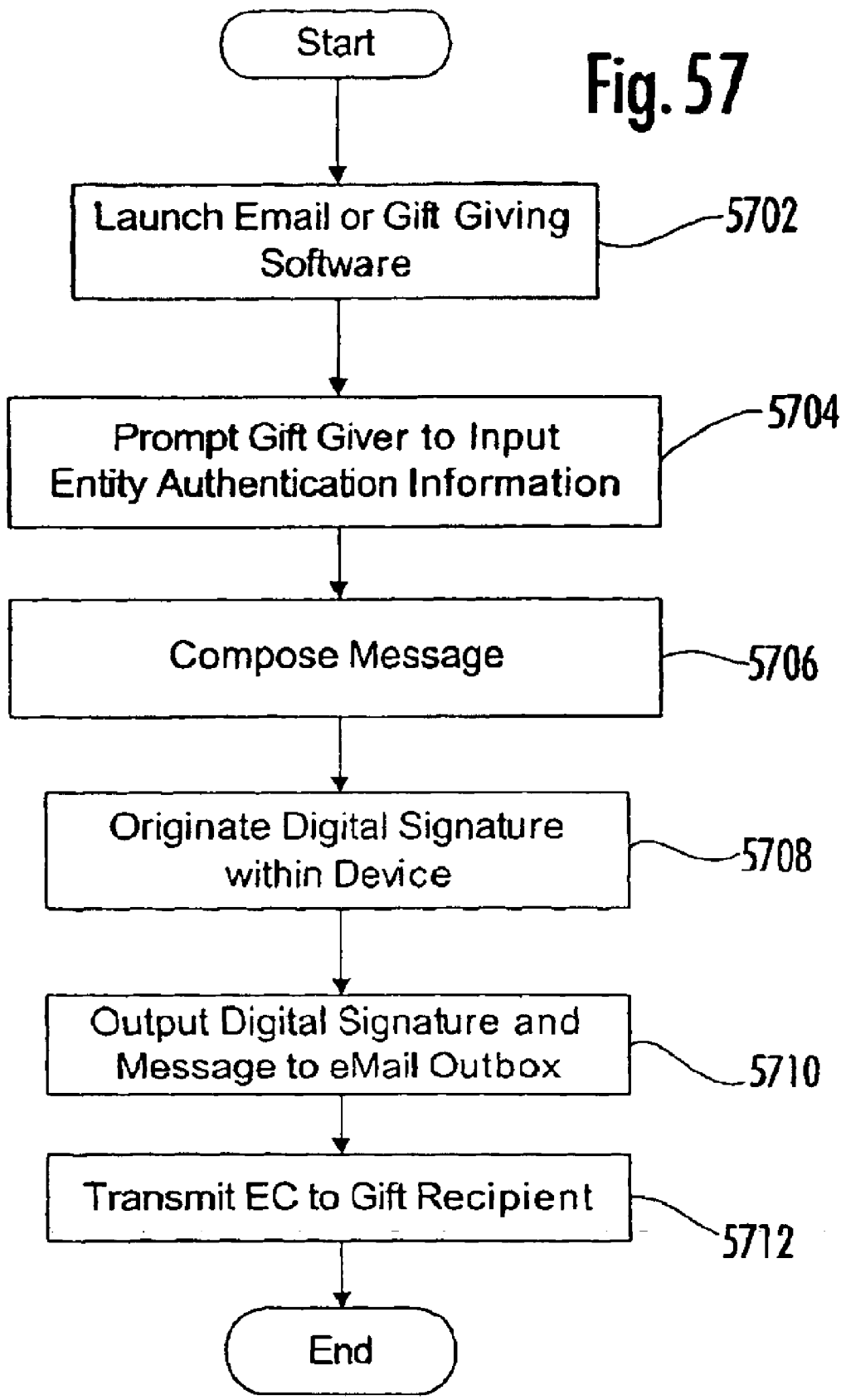
FIG. 57 illustrates a flowchart of steps performed by an account holder in the business application of FIG. 55.

With particular regard to FIG. 57, the purchaser 5002 initiates the giving of a digital check or monetary gift to the gift recipient 5510 by launching (Step 5702) the appropriate email or gift giving software (provided by the gift processor 5512) on the PDA 5550. If Factor B or C entity authentication information, such as a PIN or biometric information, had not already been input into the PDA 5550 by the gift giver 5502, the PDA 5550 prompts (Step 5704) the gift giver 5502 to do so now.

Once such Factor B or C entity authentication information has been input, the gift giver 5502 generates (Step 5706) a message. This is done either by composing an email or composing a suitable "digital check" using the pre-installed software. Regardless, the message must contain the following information: name and email address of the gift recipient 5510, amount of the gift, and the account number 5616 of the account upon which the gift will be drawn. If the gift giver 5502 uses a standard email program, the appropriate email address or web address for the gift processor 5512 must be included in the message composed, so that the gift recipient 5510 knows where to go to claim the electronic gift or digital check. If the gift giver 5502 uses the preinstalled software from the gift processor 5512, such software will automatically append such appropriate contact information for the gift processor 5512 into the message after the gift giver 5502 has composed it. Once such message is completed, the gift giver 5502 digitally signs the message using the PDA 5550.

The PDA 5550 originates (Step 5708) a digital signature for the message by first calculating a hash value for the data and then encrypting the hash value using the private key retained within the PDA 5550. The PDA 5550 then outputs (Step 5710) the digital signature and message to the "outbox" within its email program. The PDA 5550 establishes a wireless connection with its email service provider over the network 5508 and transmits (Step 5712) the message and the digital signature therefor in an EC in the form of an email to the gift recipient 5510—using the email address for the gift recipient 5510 provided by the gift giver 5502 when generating the message.

As illustrated in FIG. 58, the gift recipient 5510 receives (Step 5802) the EC containing the message and digital signature (again, used in this case for transaction authentication purposes) using the standard email software the gift recipient 5510 has on computer 5590. Upon receipt of the EC, the gift recipient 5510 merely needs to forward (Step 5804) the EC containing the message and digital signature to the gift processor 5512 for authentication and payment using the identified email or web address contained within the EC. Presumably, such email from the gift recipient 5510 to the gift processor 5512 is transmitted via the Internet 5511 or other conventional communications network. The gift recipient 5510 then merely waits for instructions from the gift processor 5512 for how to obtain the gift or for notification that the gift has been deposited in an account of the gift recipient 5510—if arrangements between the gift recipient 5510 and gift processor 5512 are already in place for such a deposit.

With reference to FIG. 59, the EC is received (Step 5902) by the gift processor 5512 from the gift recipient 5510. The gift processor 5512 then retrieves (Step 5904) from the account database 5514 the public key that is identified by the account number 5616. Using this public key, the gift processor 5512 attempts to authenticate (Step 5906) the message. If the message does not authenticate (in Step 5908), then the gift processor 5512 responds (Step 5910) to the gift recipient 5510 with a rejection of the message. Such a response may indicate the reason for the rejection. If the message authenticates (in Step 5908), then the gift processor 5512 concludes that the message, in fact, came from the person possessing the correct PDA 5550 associated with the identified account number 5616—(i.e., Factor A Entity Authentication is obtained). The gift processor 5512 then determines (Step 5912) whether or not the Factor B or C entity authentication information or status provided is sufficient for further processing of the specific message. If not, then the gift processor 5512 responds (Step 5910) with a rejection of the message and, again, such response may indicate the reason for the rejection, if desired. If the Factor B or C entity authentication information or status is sufficient (in Step 5912), then the gift processor 5512 proceeds with further processing (discussed below) of the message.

In the present example, further processing of the message includes a determination (Step 5914) as to whether the instruction (i1) is capable of being performed. For example, even though the message authenticated, the gift giver 5502 may not have enough money or credit associated with the account for the gift processor 5512 to approve the transaction. Thus, making such a determination typically involves accessing the relevant portion(s) of the account record and confirming that the funds are available. If the determination (in Step 5914) is negative, then the gift processor 5512 responds (Step 5910) to the gift recipient 5510 with a rejection of the message. Again, such a response may indicate the reason for the rejection. If the determination in Step 5914 is positive, then the gift processor 5512 performs (Step 5916) the instruction (i1). In this example, the instruction (i1) from the gift giver 5502 is to pay the gift recipient 5510 the specified amount of funds from the account as a gift or donation, as the case may be. Thus, performing (Step 5916) the instruction typically involves accessing the relevant portion(s) of the account record, conditionally debiting the specified amount of funds from the account of the gift giver 5502 and updating the account record accordingly. The gift processor 5512 then notifies (Step 5918) the gift recipient 5510 of the approval of the message and, if necessary, provides the gift recipient 5510 with instructions for obtaining the monetary amount of the gift.

Referring back to FIG. 58, the gift recipient 5510 then receives (Step 5806) the response from the gift processor 5512 (which includes instructions for obtaining the gift if the gift recipient 5510 does not already have an account setup with the gift processor 5512 for receiving such gift amount).

iii. Point of Sale Transaction Using Financial Institution Account

A third business application 6000 implementing the three-party ABDS system 300 of FIG. 3 is illustrated in FIG. 60. In this example, an account holder comprising a purchaser 6002 possesses a device in the form of a card 6050, such as an IC card, which is capable of being used at a point of sale location. A point of sale card reader 6052 includes an alphanumeric keypad 6056, a display 6054, and, in this case, a thumbprint reader 6058. The point of sale card reader 6052 is in communication via data connector 6064 with a merchant cash register/terminal 6060, which has its own display 6062. The point of sale card reader 6052 is also in communication with a standard financial network 6008, which is in communication with and has the capability of correctly routing communications between merchants and various financial institutions represented, in this example, by financial institutions 6012,6022,6032. Each financial institution 6012,6022,6032 is, for example, a bank, savings and loan, credit card company, and the like. Accounts maintained with the financial institutions 6012,6022,6032 are associated with account records maintained in one or more account databases, collectively referred to and illustrated in FIG. 60 by account databases 6014,6024,6034, respectively. In this example, financial institution 6012 maintains a banking or credit card account on behalf of the authorized user of the card 6050. It is also assumed, in this example, that the card 6050 is associated with the account of the authorized user of the card 6050 in account database 6014.

With reference to FIG. 61, each account in database 6014 includes a unique account identifier comprising an account number 6116. Each account number 6116 identifies, within the account database 6014, account information 6140, including customer-specific information 6142 and account-specific information 6144. In accordance with the present invention, the account number 6116 also identifies public key information 6118, which includes at least a public key of an account holder of each respective account. Also in accordance with a feature of the present invention, the account number 6116 identifies device profile information 6170 for the device that retains the private key corresponding with the public key associated with the account.

In the example of FIG. 60, the customer-specific information 6142 includes, for example, the name, address, social security number and/or tax-ID number of each account holder. The account-specific information 6144 includes, for example, the current account balance, available credit, closing date and balance of current statement, and associated account identifiers. The public key information 6118 of the account of the purchaser 6002 includes the public key corresponding to the private key retained within the card 6050. The device profile information 6170 includes information specific to the card 6050.

Figure 62:
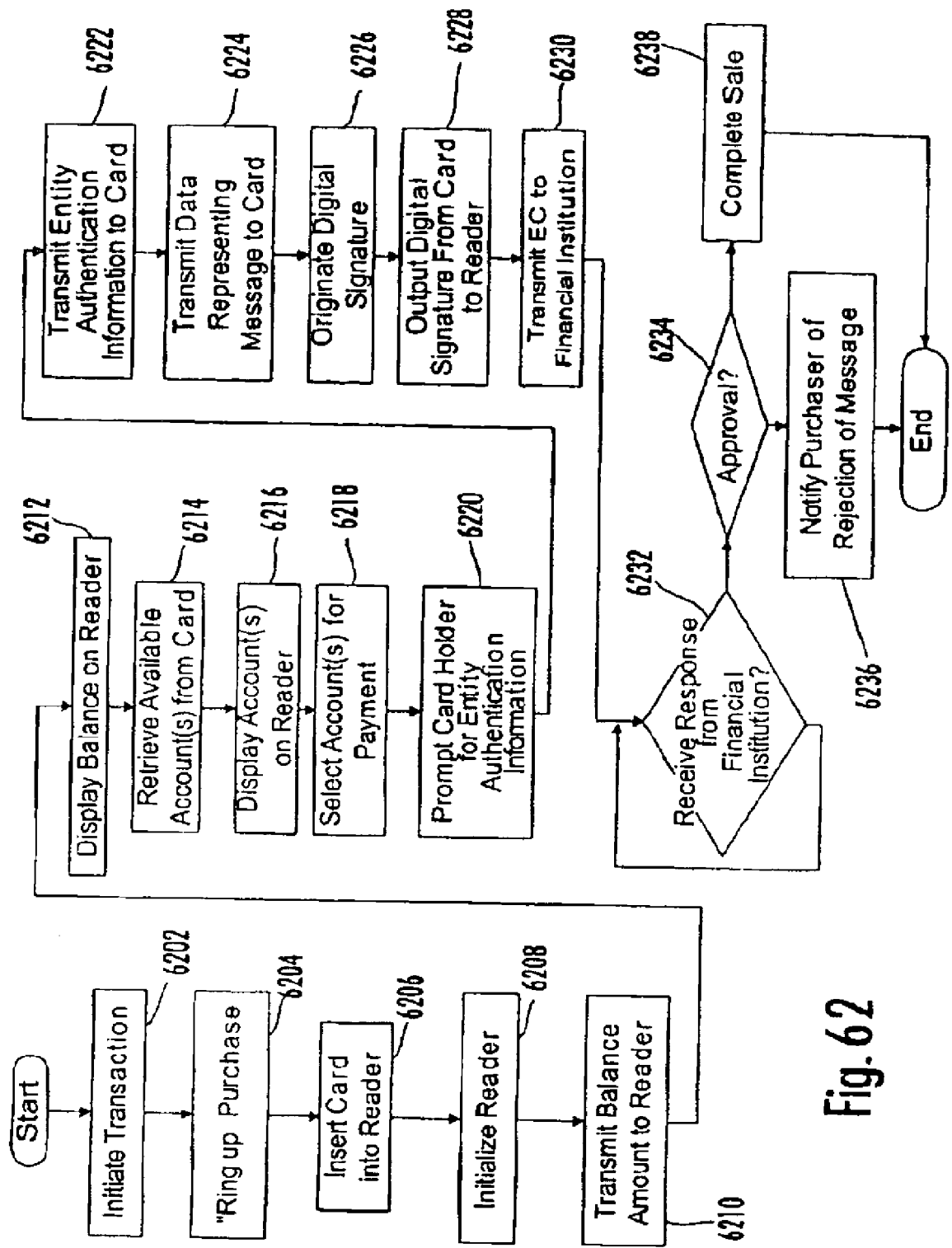
FIG. 62 Illustrates a flowchart of steps performed by both an account holder and merchant (intermediate party) in the business application of FIG. 60.

With particular regard to FIG. 62, the purchaser 6002 initiates (Step 6202) a transaction with a merchant when the purchaser 6002 requests to pay for an item at the merchant cash register/terminal 6060. The merchant "rings up" (Step 6204) the item on the merchant cash register/terminal 6060 and the total balance due is displayed to the purchaser 6002 on the display 6062. To pay, the purchaser 6002 inserts (Step 6206) the card 6050 into the point of sale card reader 6052 (or brings the card 6050 into proximity to the card reader 6052 if both the card reader 6052 and the card 6050 are equipped for contactless proximity communications in accordance with ISO/IEC Standard 14443, which is incorporated herein by reference). Upon insertion (or approach), the point of sale card reader 6052 is initialized (Step 6208), which, at a minimum, provides power from the point of sale card reader 6052 to the card 6050.

Next, the merchant cash register/terminal 6060 transmits (Step 6210) the balance due to the point of sale card reader 6052 via data connector 6064. The point of sale card reader 6052 displays (Step 6212) the balance due on display 6054. Preferably, the point of sale card reader 6052 retrieves (Step 6214) a list of all available (or at least the two to five primary) payment accounts maintained in memory on the card 6050 and displays (Step 6216) them for selection by the purchaser 6002. If there is more than one account from which to choose, the purchaser 6002 then selects (Step 6218) one of the listed accounts (or a plurality of accounts if the amount of the purchase is going to be split between or among more than one account). The display 6054 prompts (Step 6220) the purchaser 6002 to provide Factor B and C entity authentication information, such as a PIN and right thumbprint, using the alphanumeric keypad 6056 and thumbprint scanner 6058—but only if he approves of the proposed transaction (including amount of the purchase and the use of the selected account(s) for payment). Once the PIN and thumbprint have been input, the point of sale card reader 6052 transmits (Step 6222) the PIN and digitized version of the thumbprint to the card 6050. The card reader 6052 next transmits (Step 6224) data representing the message to the card 6050 for digital signature.

In this regard, upon receipt of data representing the message, the card 6050 originates (Step 6226) a digital signature for the message by first calculating a hash value for the data and then encrypting the hash value using the private key retained within the card 6050. The card 6050 then outputs (Step 6228) the digital signature, which is received by the point of sale card reader 6052. The point of sale card reader 6052 then transmits (Step 6230) the message and the digital signature therefor in an EC to the financial institution 6012 (via financial network 6008) and waits (Step 6232) for a response from the financial institution 6012. In this case, the EC is used for transaction authentication purposes.

Figure 63:
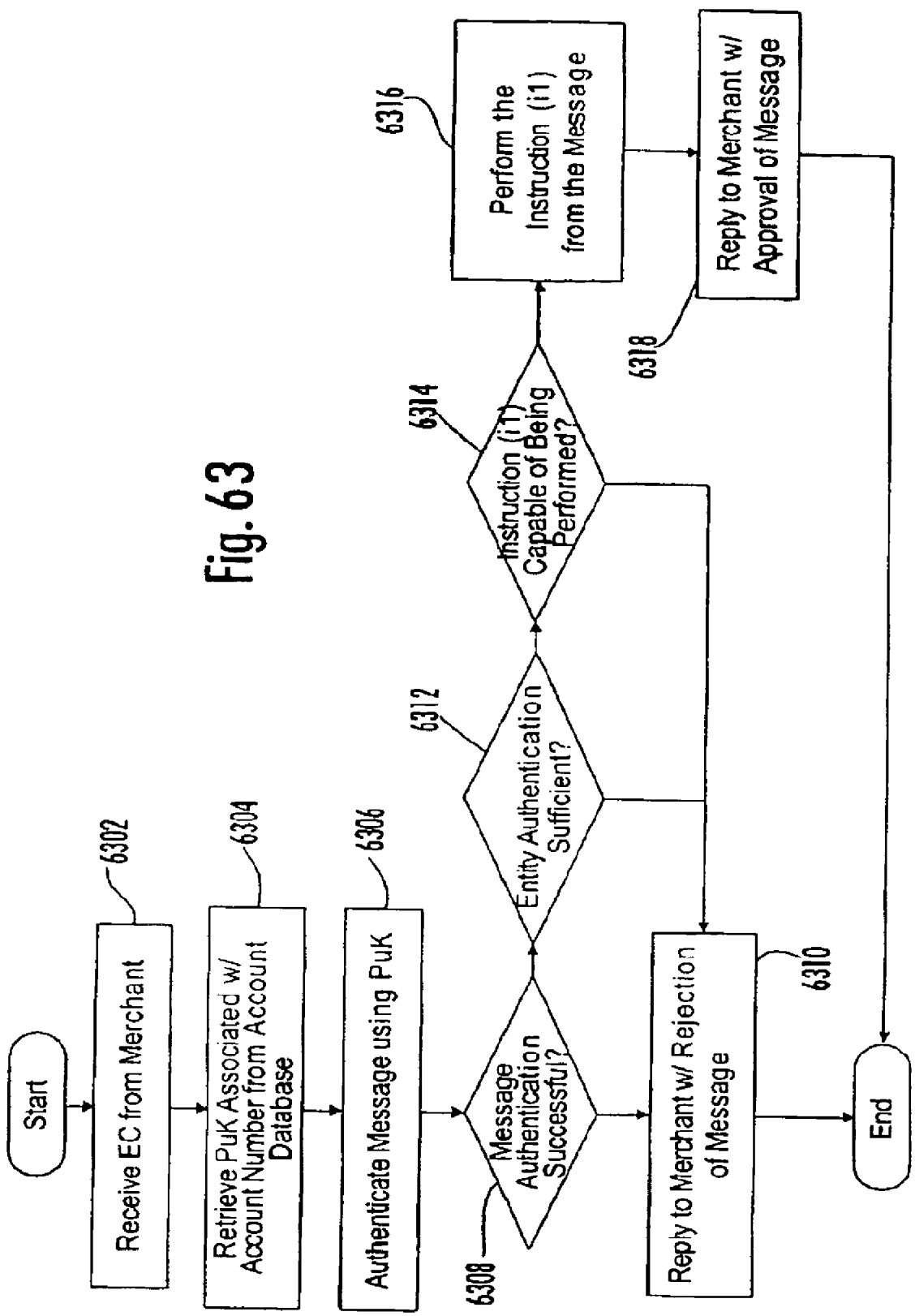
FIG. 63 illustrates a flowchart of steps performed by an account authority in the business application of FIG. 60.

With reference to FIG. 63, after the financial network 6008 has correctly routed the EC, it is received (Step 6302) by the financial Institution 6012 from the point of sale card reader 6052. The financial institution 6012 then retrieves (Step 6304) from the account database 6014 the public key that is identified by the account number 6116. Using this public key, the financial institution 6012 attempts to authenticate (Step 6306) the message. If the message does not authenticate (in Step 6308), then the financial institution 6012 responds (Step 6310) to the merchant (via financial network 6008 and point of sale card reader 6052) with a rejection of the message. Such a response may indicate the reason for the rejection. If the message authenticates (in Step 6308), then the financial institution 6012 concludes that the message, in fact, came from the person possessing the correct card 6050 associated with the identified account number 6116—(i.e., Factor A Entity Authentication is obtained). The financial institution 6012 then determines (Step 6312) whether or not the Factor B and C entity authentication information (e.g., PIN and thumbprint) provided is sufficient for further processing of the specific message. If not, then the financial institution 6012 responds (Step 6310) to the merchant (via financial network 6008 and point of sale card reader 6052) with a rejection of the message. Such a response may indicate the reason for the rejection, if desired. If the entity authentication is sufficient (in Step 6312) then the financial institution 6012 proceeds with further processing (discussed below) of the message.

In the present example, further processing of the message includes a determination (Step 6314) as to whether the instruction (i1) is capable of being performed. If it is not possible to execute the instruction (i1), then the financial institution 6012 responds (Step 6310) with a rejection of the message. For example, even though the message authenticated, the purchaser 6050 may not have enough money or credit associated with the account for the financial institution 6012 to approve the transaction. Thus, making such a determination typically involves accessing the relevant portion(s) of the account record and confirming that the funds are available. If the determination (in Step 6314) is negative, then the financial institution 6012 responds (Step 6310) to the merchant (via financial network 6008 and point of sale card reader 6052) with a rejection of the message. Again, such a response may indicate the reason for the rejection. If the determination in Step 6314 is positive, then the financial institution 6012 performs (Step 6316) the instruction (i1). In this example, the instruction (i1) from the purchaser 6002 is to pay the merchant the specified amount of funds from the specified account for the purchase of the product. Thus, performing (Step 6316) the instruction typically involves accessing the relevant portion(s) of the account record, initiating transfer of the specified amount of funds from the account of the purchaser 6002 to the merchant (in known manner), and debiting/updating the account record accordingly. (As stated in a previous business application, the above processing of the instruction does not necessarily take place contemporaneously with the other steps described herein). The financial institution 6012 also notifies (Step 6318) the merchant (via financial network 6008 and point of sale card reader 6052) of the approval of the transaction.

Referring back to FIG. 62, once the merchant receives the response from the financial institution 6012, the determination in Step 6232 is positive. The merchant next determines (Step 6234) whether the response is an approval or rejection of the transaction. If the financial institution 6012 does not approve the transaction, then the merchant notifies (Step 6236) the purchaser 6002 that the transaction was not approved. On the other hand, if the determination in Step 6234 is positive, then the merchant completes the sale (Step 6238) by giving the purchaser 6002 the merchandise and a receipt.

As can be seen from the above example, the EC from the purchaser 6002 acts as a transaction authentication for the requested purchase and payment method even though it may, in fact, pass through many "hands" (via the financial network 6008) before it finally reaches the financial institution 6012 for processing and authentication.

2. The "Person-Centric Device"

The second aspect of the present invention incorporates the ABDS system of the first aspect of the present invention, and includes, in addition thereto, the association of the public key (PuK) of a device of an account holder with multiple accounts rather than a single account. Furthermore, of the multiple accounts, some accounts may be maintained by the same account authority (as shown by the third potential setup described in association with FIG. 2*a*) and some accounts may be maintained by separate account authorities. Since the same device is associated with multiple accounts and is not representative of any single account, but rather, is representative of the account holder, such a device is referred to herein as a "person-centric device." It will be immediately apparent that the person-centric device enables the account holder to register the single device for use with multiple accounts, thereby eliminating the need to have a multitude of credit cards, IC cards, ID cards, and the like. For example, a person-centric device can be associated with one or more bank accounts, credit card accounts, frequent flyer accounts, frequent diner accounts, gas card accounts, calling card accounts, building ID accounts, parking deck accounts, and the like.

When used, the person-centric device originates a digital signature for a message just like the devices as described with regard to the first aspect of the present invention. Specifically, the person-centric device generates a digital signature by encrypting a hash value of message using the private key retained in the person-centric device. Also, in some embodiments of the device, the person-centric device calculates the hash value of the message by applying the appropriate hashing algorithm. Further, in some embodiments, the person-centric device also composes the message.

The message itself is the same as described with regard to the first aspect of the invention; namely, it includes an instruction and a unique identifier corresponding to an account. However, in the ABDS system utilizing the person-centric device, the unique identifier in a particular message must correspond to an account maintained by the account authority that receives the message. In order to insure delivery of the electronic communication over the communications medium to the proper account authority, the electronic communication is sent over a closed communications medium that is dedicated to the particular account authority or, if the communications medium is an open network such as the Internet, the electronic communication needs to include enough information to identify the account authority that needs to receive the electronic communication for authentication and approval of the message. Identification of the appropriate account authority may be accomplished in many different ways. For example, the account number itself may provide any intermediate or routing entities with sufficient information to know which account authority should receive the electronic communication. In another example, such information may be directly input into the message by the account holder during the composition of a message or by the device or I/O support element during the message composition or as part of the transmission of the electronic communication.

a. Two-Party ABDS System Using Person-Centric Device

Figure 64:
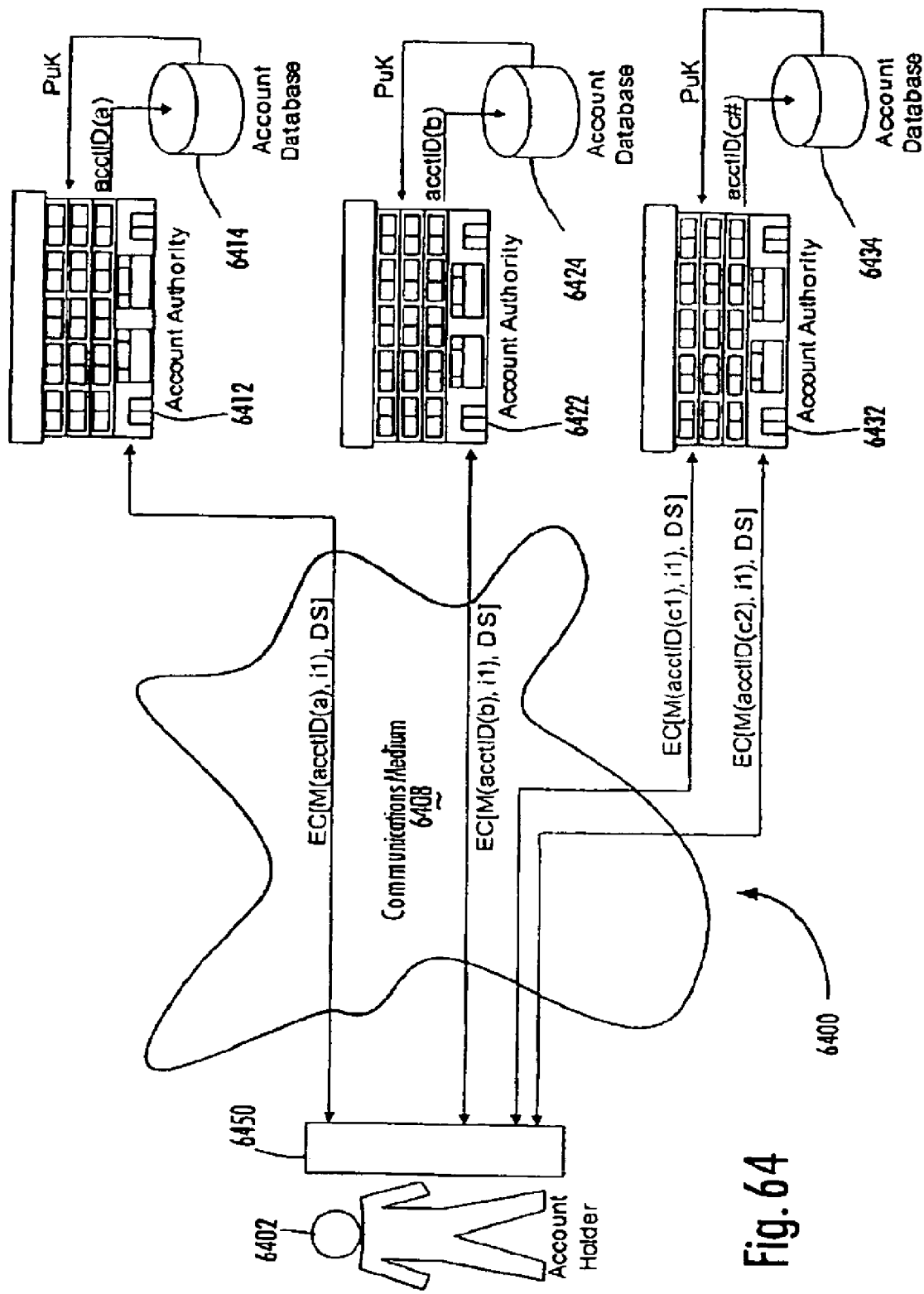
FIG. 64 illustrates a preferred ABDS system in accordance with a second aspect of the present invention.

Referring now to FIG. 64, a first preferred implementation of an ABDS system 6400 utilizing a "generic" person-centric device 6450 is illustrated. The person-centric device 6450 can be similar or identical to any of the devices previously described with regard to the first aspect of the invention. Thus, the person-centric device 6450 securely protects a private key of a public/private key pair therein. Further, the person-centric device 6450 is able to communicate over the communications medium 6408, which includes the Internet, in the same manner in which any of the previously described devices communicate.

The ABDS system 6400 also includes a device user who becomes an account holder 6402 once at least one account has been established with one of the account authorities 6412,6422,6432. Each of the account authorities 6412, 6422, 6432 maintains one or more account databases, collectively referred to and illustrated in FIG. 64 by account database 6414,6424,6434, respectively. As in the first aspect of the present invention, each of these account databases 6414,6424,6434 maintains records of account holders, and the database records are indexed by unique identifiers, preferably represented by unique account numbers.

In the present illustration, the account holder 6402 has established one account with account authority 6412, the account having a unique identifier designated by "acctID(a)." The account holder 6402 has also established one account with account authority 6422, this account having a unique identifier designated by "acctID(b)." Additionally, the account holder 6402 has established two accounts with account authority 6432, one account having a unique identifier designated by "acctID(c1)" and the other account designated by "acctID(c2)." It should be noted that even though the account holder 6402 has four different accounts with three different account authorities, each account database record includes therein the same public key (PuK) as shown in FIGS. 64*a*,64*b*,64*c*. The process by which account holder 6402 registers the person-centric device 6450 and, correspondingly, the public key of the person-centric device 6450 with each respective account authority 6412,6422, 6432 is comparable to the registration process described for the first aspect of the present invention.

Figure 65:
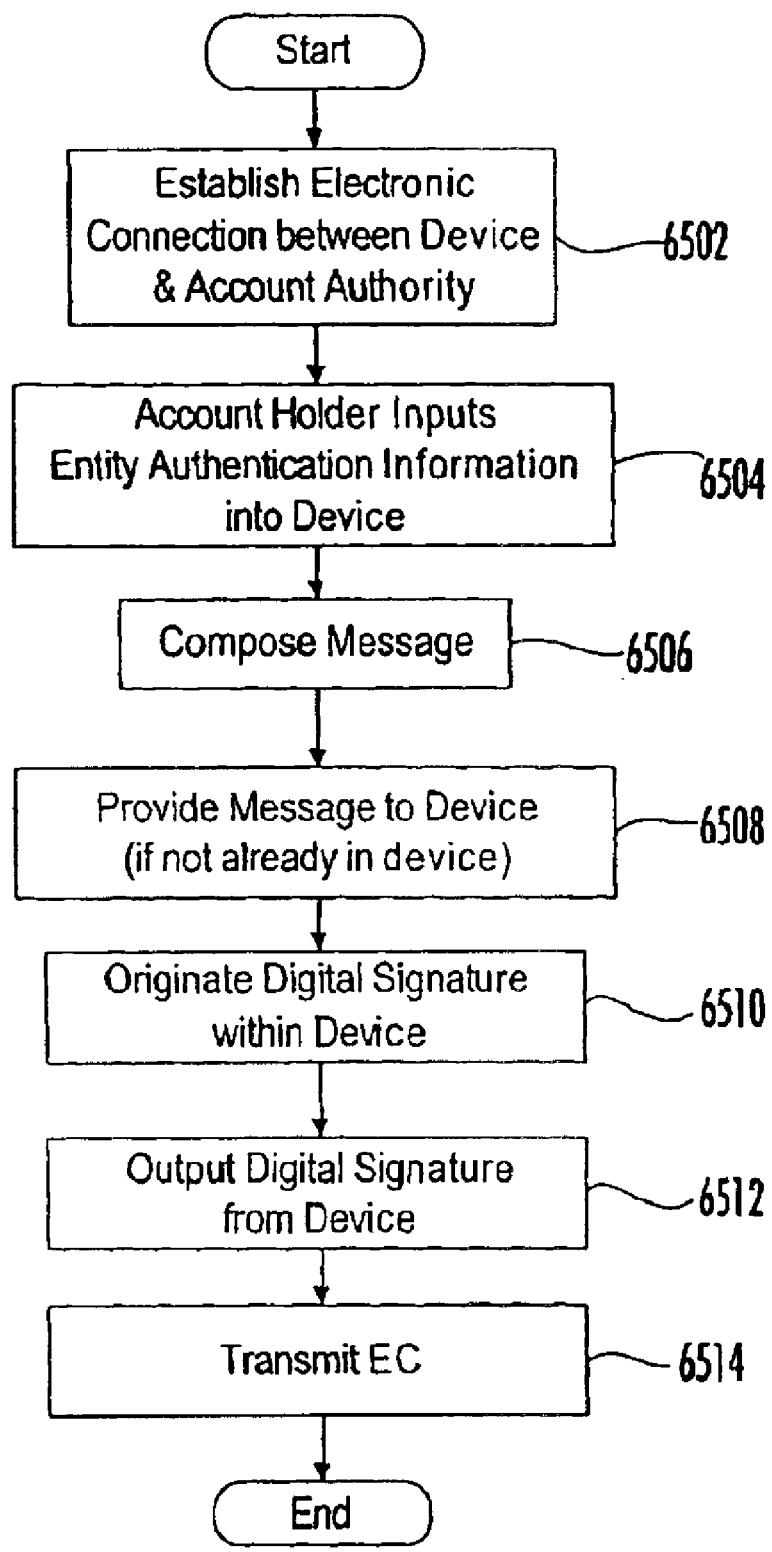
FIG. 65 illustrates a flowchart of steps performed by an account holder in the system of FIG. 64.
Figure 66:
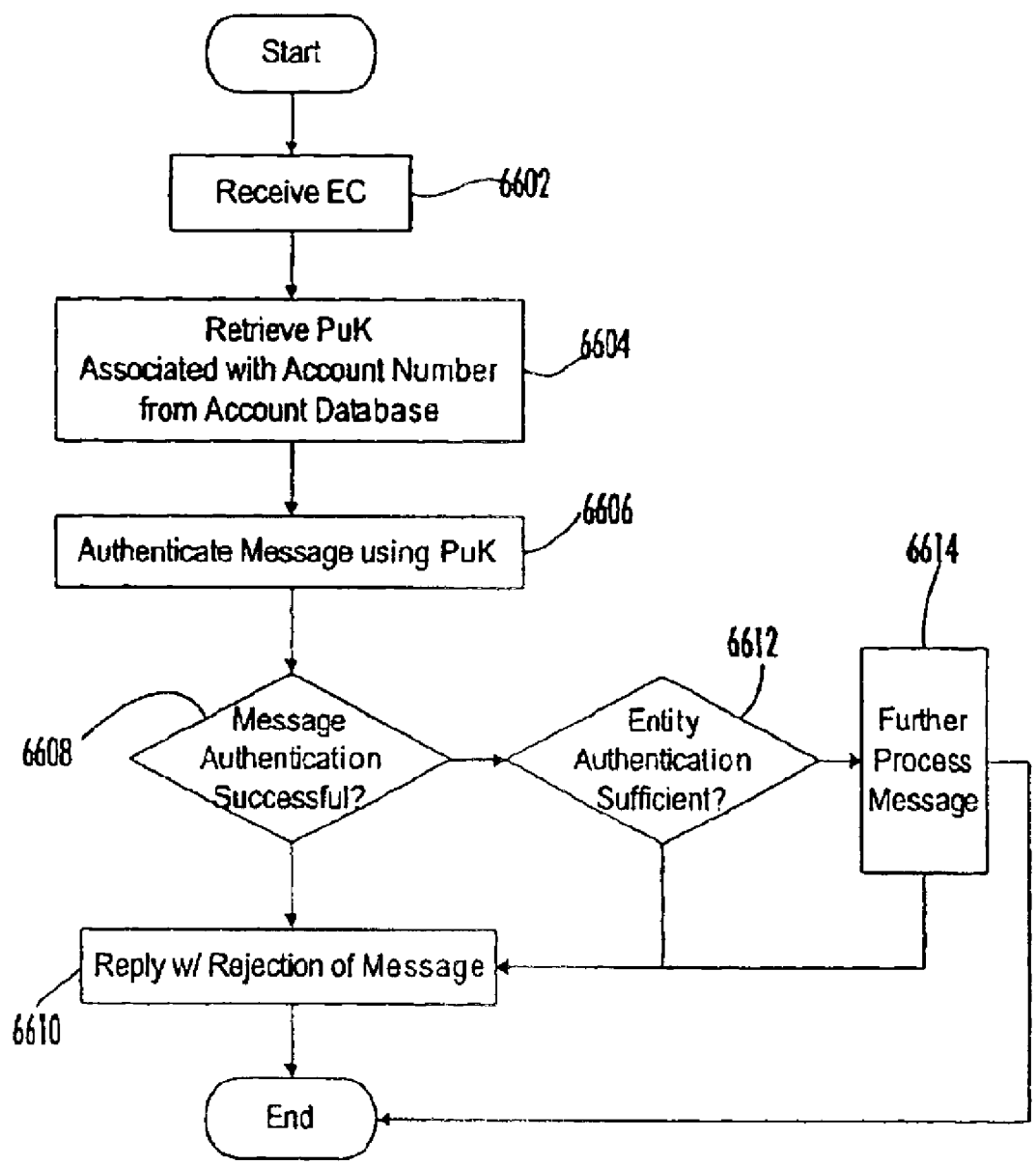
FIG. 66 illustrates a flowchart of steps performed by an account authority in the system of FIG. 64.

The process by which the account holder 6402 communicates directly with any one of the account authorities 6412,6422,6432 is also the same as or similar to any one of the processes described with regard to the two-party ABDS system 200 of FIG. 2 and any of the specific two-party ABDS business applications described in FIGS. 6–49. For example, as shown in FIG. 65, the account holder 6402 initiates a communication with any specific one of the account authorities 6412,6422,6432 first by establishing (Step 6502) an electronic connection with the desired account authority. Next, the account holder 6402 inputs (Step 6504) entity authentication information, such as a PIN, password, passphrase, or biometric information, associated with the device 6450 into the device 6450. Next the account holder 6402 generates (Step 6506) a message. If not already in the device 6450, the message is then imported/transmitted (Step 6508) into the person-centric device 6450, which originates (Step 6510) a digital signature for the message by first calculating a hash value for the data and then encrypting the hash value using the private key retained within the device 6450. In an alternative and less preferred embodiment, the hash value of the message is calculated outside of the device and then provided to the device merely for the purpose of encryption of such hash value for the digital signature. The device 6450 then outputs (Step 6512) the digital signature from the digital signature component of the device. The message and digital signature therefore are then transmitted (Step 6514) to the appropriate account authority.

It should be noted that the exact process of generating a message and the process of generating a digital signature for the message will vary depending upon the specific form of the person-centric device 6450 and the particular environment in which it is used (e.g. use with an I/O support element). For example, if the person-centric device 6450 is a cell phone or PDA, the message and the hash value of the message is preferably generated and calculated, respectively, directly on the person-centric device 6450 and then digitally-signed. If the person-centric device 6450 is a dongle, an electronic key used in combination with an electronic lock, or a card used in combination with a card reader, all of which are preferably used in conjunction with the account holder's computer, then the message is generated on or received by the computer, the hash value is either generated by the computer and transmitted to the person-centric device 6450 or the person-centric device 6450 receives the message and generates the hash value itself, and then the person-centric device 6450 originates the digital signature for the message. If the person-centric device is a subcutaneous implant, a personal item, or a card capable of being used at a public interface location, such as an ATM machine, a card reader, an RF receiver/transmitter, or point of sale reader, then the message and hash value of the message are preferably generated external from the person-centric device 6450, the hash value is transmitted to the person-centric device 6450, and then the person-centric device 6450 originates the digital signature for the message.

Preferably, regardless of the particular type of person-centric device 6450 used, each account number (or associated unique account identifier) is stored in memory within the person-centric device 6450.

Finally, the person-centric device 6450, with or without assistance from an I/O support element or other external apparatus, transmits the message and digital signature in an electronic communication over the communications medium 6408 to the particular account authority with which the person-centric device 6450 has already established an electronic connection. Regardless of how the message is generated above, it preferably includes the unique account identifier and the instruction (i1) to be executed by the account authority. In addition, as long as the person-centric device 6450 is communicating with an account authority with which he has only one registered account associated with the public key, the unique account identifier can actually be the public key itself. Thus, the public key is usable as the unique account identifier for direct two party communications between the account holder 6402 and account authorities 6412 and 6422, but not for communications with account authority 6432, which maintains two separate accounts for the account holder 6402, both of which are associated with the same public key.

The steps performed by the account authority 6412,6422, 6432 in response to an electronic communication received from the account holder 6402 are essentially the same as the steps performed by the particular account authority in any of the specific two-party ABDS business applications of FIGS. 6–49 with the only variation arising from the contents of the instruction (i1) and the type of business in which the account authority is engaged or the type of account which is maintained by the account authority. The generic steps performed are set forth in FIG. 66 and include the steps of: receiving the electronic communication (Step 6602), retrieving the public key from the associated record in the account database (Step 6604), and attempting to authenticate (Step 6606) the message using the public key so obtained. If the message authenticates (in Step 6608), the account authority then determines (Step 6612) whether sufficient entity authentication has been provided. If there has been sufficient entity authentication, then the account authority further processes (Step 6614) the message, which includes performing (or at least attempting to perform) the instruction (i1). If the message does not authenticate (in Step 6608), if there is not sufficient entity authentication (in Step 6612), or if it is not possible to execute the instruction (i1) (in Step 6614), then the account authority responds (Step 6610) to the sender of the electronic communication with a rejection of the message and, potentially, with a basis or reason for the rejection.

b. Three-Party ABDS System Using Person-Centric Device

Figure 67:
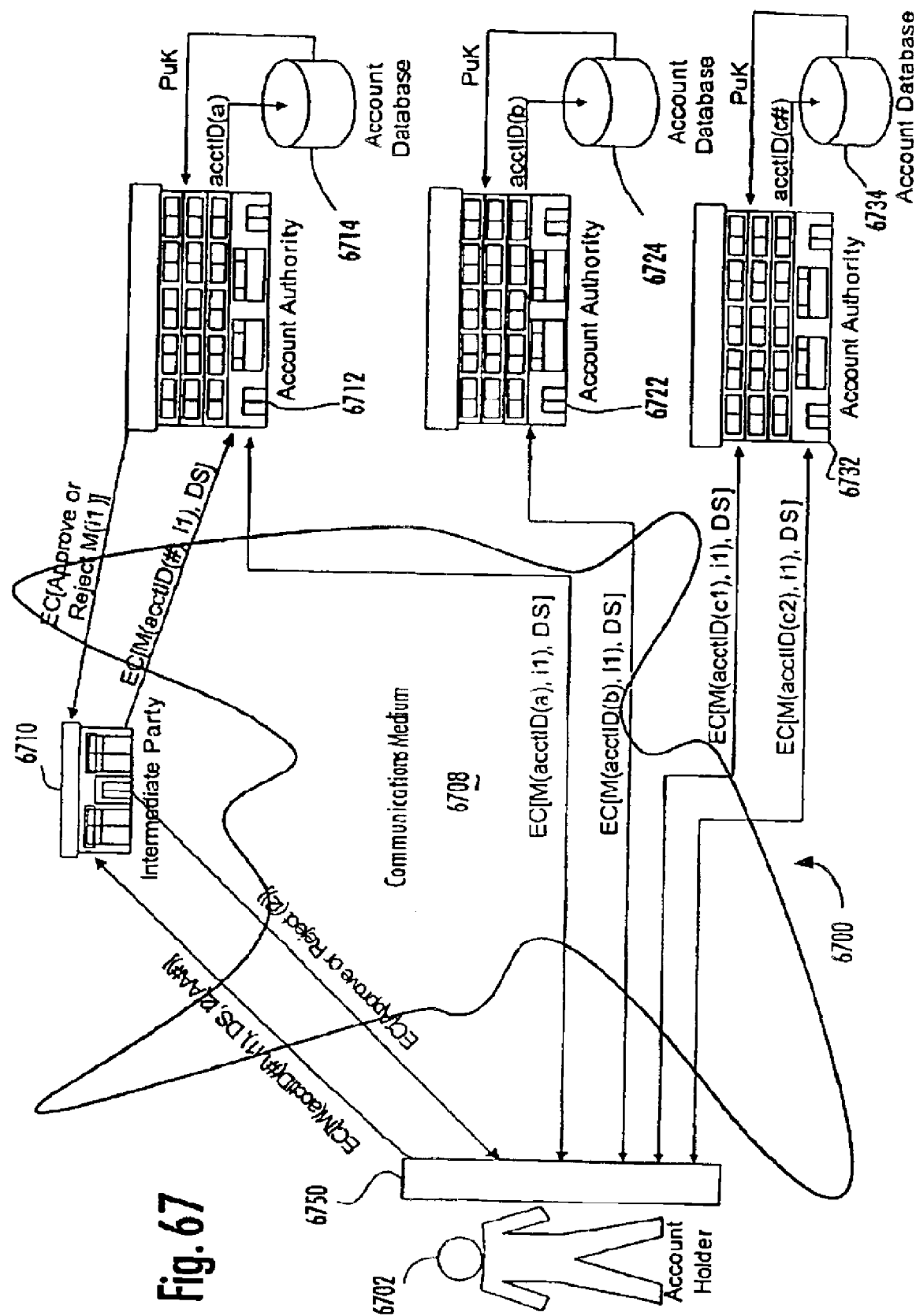
FIG. 67 illustrates another preferred ABDS system in accordance with a second aspect of the present invention.

Referring now to FIG. 67, a second preferred implementation of an ABDS system 6700 utilizing a person-centric device 6750 is illustrated. The only significant differences between this second preferred implementation of FIG. 67 and the first preferred implementation of FIG. 64 are the addition of intermediate party 6710 and the fact that an electronic communication from the account holder 6702 to one of the account authorities 6712,6722,6732 is communicated to the intermediate party 6710, which then forwards an electronic communication to the appropriate account authority 6712,6722, or 6732 designated by the account holder 6702. The methodology of a three-party ABDS transaction with a person-centric device 6750 is quite similar to the methodology of a three-party ABDS transaction previously described with reference to FIGS. 50–63.

Figure 68:
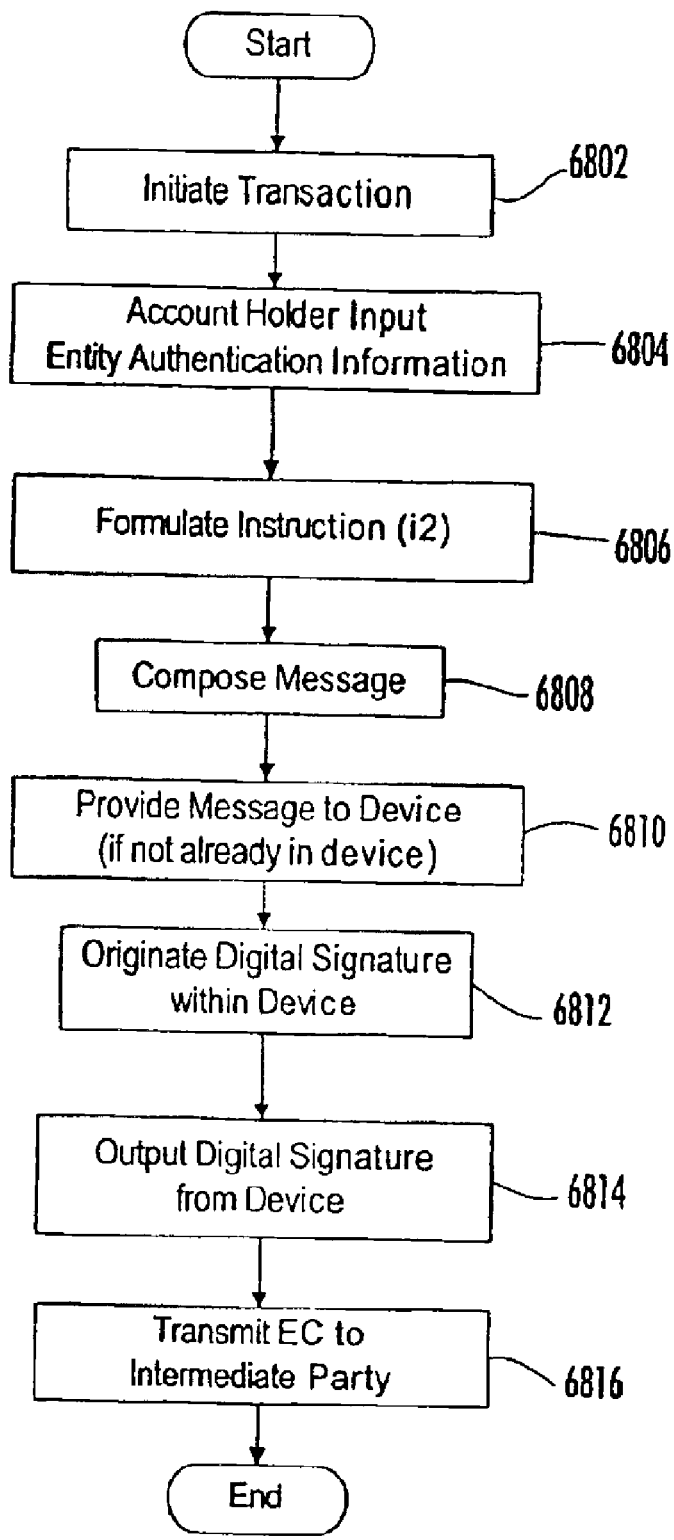
FIG. 68 illustrates a flowchart of steps performed by an account holder in the system of FIG. 67.

With particular regard to FIG. 68, the account holder 6702 initiates a transaction (Step 6802) with intermediate party 6710 first by establishing an electronic connection over communications medium 6708 with the intermediate party 6710 using the person-centric device 6750. Again, the exact form of the person-centric device 6750 may vary but is similar or identical to any of the devices described with regard to the first aspect of the invention. Preferably, the account holder 6702 next inputs (Step 6804) entity authentication information, such as a PIN, password, passphrase, or biometric information, associated with the device 6750 into the device 6750. By means of the electronic connection, the account holder 6702 formulates (Step 6806) an instruction (i2) that the account holder 6702 wants the intermediate party 6710 to perform. In order for the intermediate party 6710 to perform the instruction (i2), the intermediate party 6710 needs authorization and approval from one of the account holder's account authorities 6712,6722,6732. For this reason, the account holder 6702 generates (Step 6808)

a message for the purpose of obtaining such authorization and approval from the appropriate account authority.

In order for the intermediate party 6710 to know which of the account holder's account authorities should receive the message, either the account number itself should identify the appropriate account authority or the electronic communication should indicate which account authority (AA#) needs to receive the electronic communication for authentication and approval of the transaction.

Once the message has been composed, it should be transmitted/provided (Step 6810) to the device 6750 (unless the message was actually composed by or within the device 6750). The device 6750 then originates (Step 6812) a digital signature for the message by first calculating a hash value for the data and then encrypting the hash value using the private key retained within the device 6750. In an alternative and less preferred embodiment, the hash value of the message is calculated outside of the device 6750 and then provided to the device 6750 merely for the purpose of encryption of such hash value for the digital signature. The device 6750 then outputs (Step 6814) the digital signature from the digital signature component of the device 6750. The message, digital signature therefore, and instruction (i2) are then transmitted (Step 6816) to the intermediate party 6710 via the communications medium 6708. As described in other places throughout this specification, the person-centric device 6750 may require the assistance of an I/O support element or other external device (not shown) in order to complete the step of transmitting the electronic communication to the intermediate party 6710.

Figure 69:
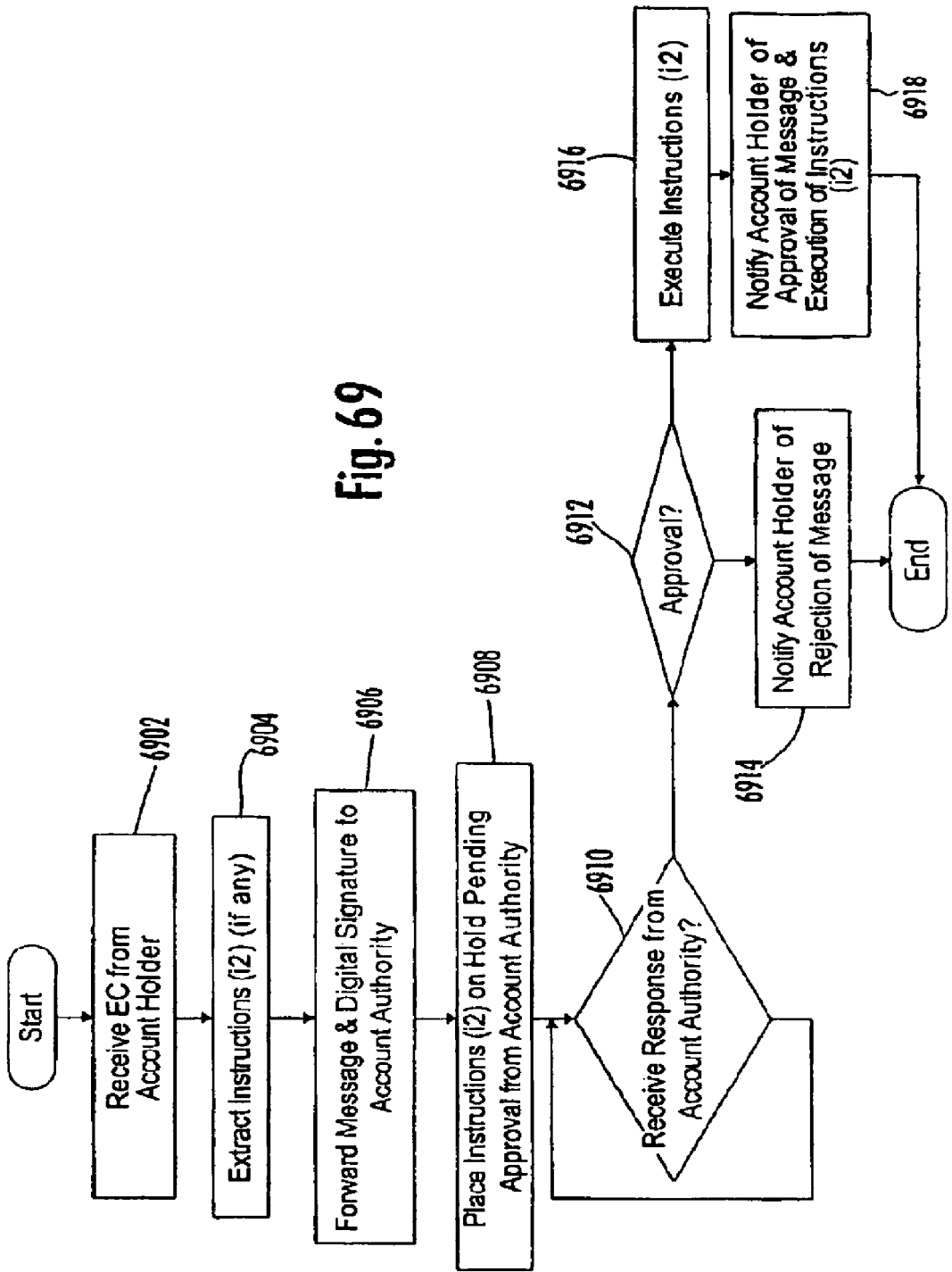
FIG. 69 illustrates a flowchart of steps performed by an intermediate party in the system of FIG. 67.

As illustrated in FIG. 69, the intermediate party receives (Step 6902) the electronic communication from the account holder 6702. The intermediate party 6710 extracts (Step 6904) any instructions (i2) from the account holder 6702 to the intermediate party 6710, including information (AA#) as to the identity of the account authority that needs to receive the forwarded electronic communication. As shown in FIG. 67, the instructions (i2) inform the intermediate party 6710 that account authority 6712 is the appropriate account authority for receiving the forwarded electronic communication. The intermediate party 6710 forwards (Step 6906) the electronic communication containing the message and digital signature to the account authority 6712 for authentication and approval of the instruction (i1). The intermediate party 6710 then places (Step 6908) these instructions (i2) (e.g., the purchase request) "on hold" pending approval of the message payment from the account authority 6712, while it waits (Step 6910) for a response from the account authority 6712.

Referring now to FIG. 70, the steps performed by the account authority 6712 in response to an electronic communication received from the account holder 6702 via the intermediate party 6710 will now be discussed in greater detail. First, the account authority 6712 receives (Step 7002) the electronic communication from the intermediate party 6710. Using the account number (acctID(#)) provided in the electronic communication, the account authority 6712 retrieves (Step 7004) the public key from the associated record in the account database 6714. Using this public key, the account authority 6712 attempts to authenticate (Step 7006) the message. If the message does not authenticate (in Step 7008), then the account authority 6712 responds (Step 7010) with a rejection of the message. Such a response may indicate the reason for the rejection. If the message authenticates (in Step 7008), then the account authority 6712 concludes that the message, in fact, came from the person possessing the correct device 6750 associated with the identified account number—(i.e., Factor A Entity Authentication is obtained). The account authority 6712 then determines (Step 7012) whether or not the entity authentication provided is sufficient for further processing of the specific message. If not, then the account authority 6712 responds (Step 7010) with a rejection of the message. Such a response may indicate the reason for the rejection. If the entity authentication is sufficient (in Step 7012), then the account authority 6712 proceeds with further processing (discussed below) of the message.

The further processing of the message includes a determination (Step 7014) as to whether the instruction (i1) is capable of being performed. For example, even though the message authenticates, the account of the account holder 6702 may not be authorized or capable of handling the instruction (i1) in such a manner for the account authority 6712 to approve the instruction (i1) or message. If the determination (in Step 7014) is negative, then the account authority 6712 responds (Step 7010) to the intermediate party 6710 with a rejection of the message. Again, such a response may indicate the reason for the rejection. If the determination in Step 7014 is positive, then the account authority 6712 performs (Step 7016) the instruction (i1). The account authority 6712 also notifies (Step 7018) the intermediate party 6710 of the approval of the message and the execution of instruction (i1).

Referring back to FIG. 69, once the intermediate party 6710 receives the response from the account authority 6712, the determination in Step 6910 is positive. The intermediate party 6710 next determines (Step 6912) whether the response is an approval or rejection of the transaction. If the account authority 6712 does not approve the transaction, then the intermediate party 6710 notifies (Step 6914) the account holder 6702 that the message was rejected and that the instructions (i2) are not being executed. On the other hand, if the determination in Step 6912 is positive, then the intermediate party 6710 executes (Step 6916) the instructions (i2) that had previously been put on hold. Next, the intermediate party 6710 notifies (Step 6918) the account holder 6702 that the transaction was approved and that the instructions (i2) are being or have been executed.

3. The Central Key Authority

The third aspect of the present invention incorporates the ABDS system of the first and second aspects of the present invention and includes, in addition thereto, the maintenance of a database of certain PuK-linked account information (herein "Registration Information") of a user of a device. In other words, the database identifies a plurality of accounts with which a public key is associated. The entity that maintains this database is referred to herein as a "Central Key Authority." The Registration Information includes the public key (PuK) and one or more of the following types of information relating to a particular device that generates digital signatures: the identity of third-parties with which the user of the device has PuK-linked accounts for the device and respective account identifiers that identify each PuK-linked account of the user to the respective third-party, information linked with the public key of the device in accordance with the other aspects of the present invention; user-specific information, such as the user's mailing address, credit card information, age; and, if applicable, the authentication techniques that were employed in verifying the user-specific information maintained by the Central Key Authority. Furthermore, the Central Key Authority preferably indexes the Registration Information of the user to the public key of the user such that the Registration Information may be retrieved based on the public key. In other words, the user of the device is an "account holder" of the Central Key Authority.

In accordance with this aspect of the present invention, the Central Key Authority disseminates some or all of the Registration Information, as appropriate or as requested, to a third-party. Registration Information is disseminated when the user has an ABDS account with a third-party or desires to establish a new ABDS account with a third-party-and desires to send ECs with messages containing an instruction that represents a transaction on the account, such message being digitally signed using the device. The dissemination of the Registration Information occurs, for example, when Registration Information maintained by a third-party has become outdated for a particular account.

The Registration Information maintained by the Central Key Authority is obtained in various ways. For example, the public key and information linked therewith preferably is obtained from the manufacturer of the device or other reliable entity possessing the public key and Security Profile of the device. The identity of the third-parties with which the user has PuK-linked accounts for the device, and the account identifier that identifies the PuK-linked account of the user to each such third-party, preferably is obtained from the user, and is obtained when the user registers with the Central Key Authority; when, at the instruction of the user, the Central Key Authority establishes an account on behalf of the user with a third-party; or when the third-party, at the instruction of the user, requests the Registration Information from the Central Key Authority.

An example of the convenience that may be provided by the Central Key Authority in accordance with this third aspect of the present invention comprises the updating of PuK-linked accounts of a user with a new device of the user in place of the user's old (and possibly outdated) device. Such an update preferably is accomplished by merely sending an EC to the Central Key Authority including the public key of the old device and a message including an instruction to associate an expressly identified public key of the new device with expressly identified third-party accounts that is digitally signed using the old device.

Upon receipt of such an EC, the Central Key Authority authenticates the message of the EC using the identified public key of the old device. Upon successful authentication, the Central Key Authority retrieves the Registration Information for the public key corresponding with the old device. The Central Key Authority then updates the Registration Information with the public key of the new device, and then transmits an EC to each of the third-parties expressly identified by the user, the EC requesting each third-party to associate their respective account records of the user with the public key of the new device in place of the previous public key of the user. The instruction preferably is digitally signed using a private key of the Central Key Authority and may include the original EC received by the Central Key Authority from the user.

Figure 71A:
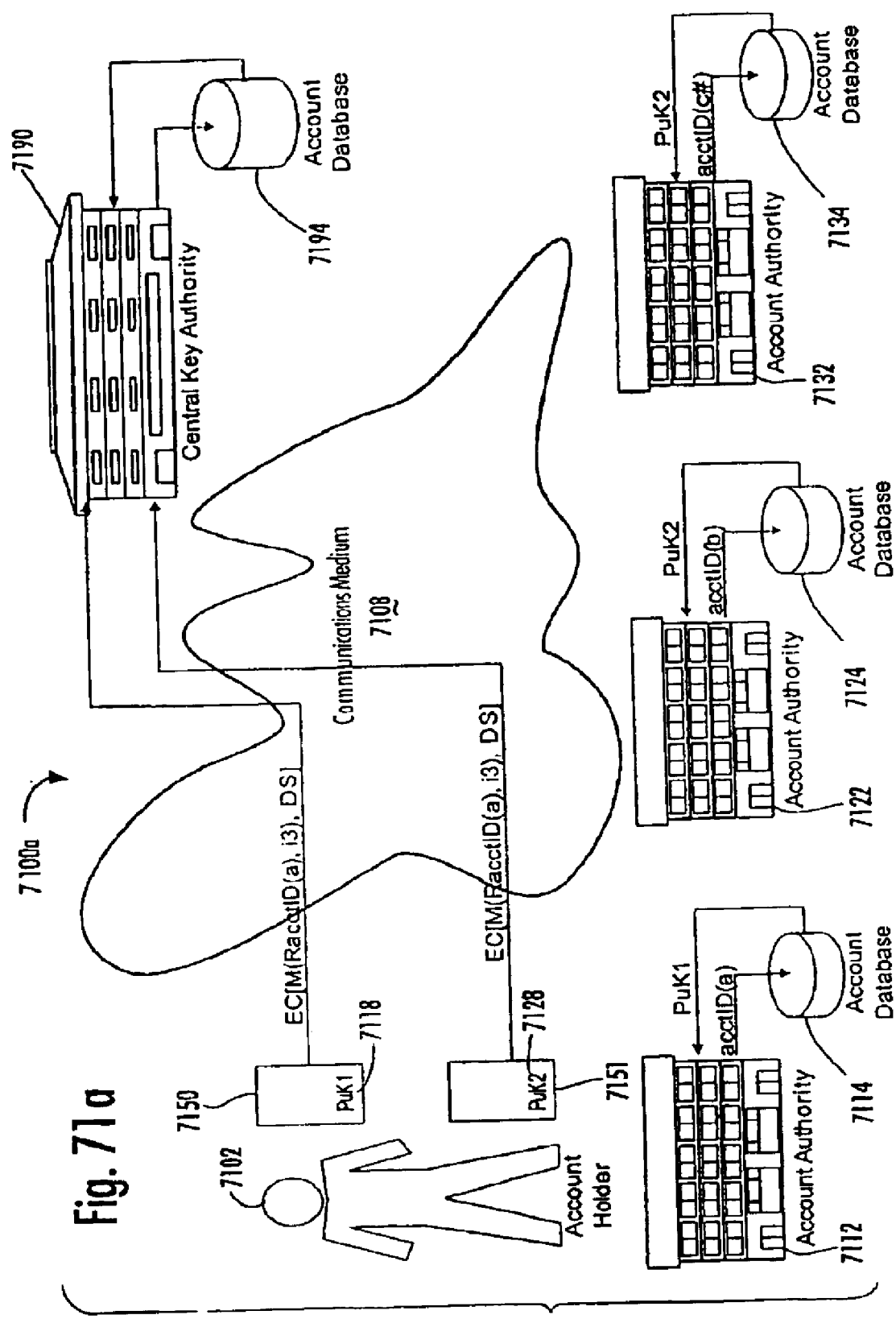
FIG. 71*a* illustrates a preferred ABDS system in accordance with a third aspect of the present invention.

The above generally-described systems are illustrated more specifically in the following FIGS. 71a–72. A system 7100a in accordance with the third aspect of the invention including a Central Key Authority 7190 and database 7194 of account records is illustrated in FIG. 71a. Once again, an account holder 7102 possesses a device 7150, which securely protects a unique private key of a public-private key pair. Preferably, the device also retains the public key (PuK1) 7118 therein, which is capable of being exported from the device 7150. As can be seen in FIG. 71a, the public key (PuK1) of the device 7150 has been previously registered with account authority 7112 and associated with an account having the unique account identifier "acctID(a)" and stored in an account record in account database 7114 (based on the public key (PuK1) that is retrievable from database 7114 in response to input of account number (acctID (a)).

The account holder 7102 also possesses another device 7151, which in this illustration is a person-centric device, as described with regard to the second aspect of the present invention. The person-centric device 7151 securely protects a different private key of a public-private key pair therein. Preferably, the device 7151 also retains the public key (PuK2) 7128 therein, which is capable of being exported from the device 7151. As can be seen from the illustration in FIG. 71a, the public key (PuK2) of the person-centric device 7151 has been registered with two different account authorities: with account authority 7122, the PuK2 is associated with an account having the unique account identifier "acctID(b)" and stored in an account record in account database 7124; and with account authority 7132, the PuK2 is associated with at least two separate accounts having the unique account identifiers "acctID(c1)" and "acctID(c2)." Both accounts acctID(c1) and acctID(c2) are stored in a respective account record in account database 7134.

In establishing a database account with the Central Key Authority 7190, with reference to FIGS. 71a and 72, the account holder 7102 preferably provides the Central Key Authority 7190 with the following information for each account to be tracked: the public key 7118,7128 of each respective device 7150,7151 that is associated with an account (recorded in column 7218 of FIG. 72); the unique identifier (e.g., acctID(a); acctID(b); acctID(c1); acctID(c2)) and other account-specific information, such as the identity of the account authority and the type of account, for each specific account (recorded in column 7244 of FIG. 72). The account holder 7102 also preferably provides customer-specific (i.e., personal) information to the Central Key Authority 7190 (recorded in column 7242 of FIG. 72) as well as device profile information regarding each device 7150,7151 associated with such accounts (recorded in column 7240 of FIG. 72). Other account attributes may also be recorded in the account database 7194 and obtained either from the account holder 7102 or directly from the respective account authority 7112,7122,7132. Preferably, the Central Key Authority 7190 assigns the account holder 7102 with a unique account identifier, such as a registration account number "RacctID(a)," (recorded in column 7230 of FIG. 72).

Still with reference to FIG. 71a, account holder 7102 is capable of communicating electronically with the Central Key Authority 7190 in a two-party ABDS manner (as described with respect the first aspect of the invention) over communications medium 7108. In other words, the account holder 7102 may register a device 7150 or new account associated with the person-centric device 7151 by sending the Central Key Authority 7190 an electronic communication that contains a message (M) that includes the accounts holder's Central Key Authority account number (RacctID (a)) and an instruction (i3), and digital signature (DS) of the message.

The actual steps performed by the account holder 7102 and the Central Key Authority 7190 to create, sign, send, and authenticate such a message will not be described in detail, since such steps closely follow the methodology of a two-party ABDS communication that has been discusses already at great lengths. Interestingly, since the account 7230 of the account holder 7102 maintained by the Central Key Authority 7190 may, in fact, be associated with multiple public keys 7218, the process of authenticating the message potentially requires the Central Key Authority 7190 to attempt authentication of a message using more than one public key.

Typical instructions (i3) that the account holder 7102 sends to the Central Key Authority 7190 include, for example, requests initially to setup a Central Key Authority account; to add a new device 7150 or 7151 (and corresponding public key) to the Registration Information; to add, update, or delete personal information in the Registration Information; to add, update, or modify an account identifier associated with a particular account; to add a new account authority (and account) to an existing public key; to add or modify information regarding an existing account authority, and the like.

Referring again to FIG. 72, an example of the account database 7194 maintained by the Central Key Authority 7190 is illustrated, wherein the database 7194 is organized by registration account ID numbers 7230 and has associated therewith: the corresponding customer-specific information 7242, for example, name, address, social security number and/or tax-ID number, credit card information; public key information 7218, including each public key of the particular customer; device profile information 7270 for each device that retains the private key corresponding with each respective public key, such device profile information including security characteristics, authentication capabilities of the device, manufacturing history, and transactional history; and a list of all the account(s) associated with the public key, including the account-specific information 7244, for example, name of the account authority, the unique account identifier (acctID) associated with the account, the address of the account authority, the type of account maintained by the account authority, and the like.

It will be immediately apparent that the Central Key Authority 7190 provides a convenient manner to keep track of a plurality of public keys associated with a particular account holder 7102, as well as a convenient manner of keeping track of each account associated with each public key. Easy and ready access to such information is important. For example, especially when a person-centric device 7151 of the account holder 7102 is lost or stolen, or the private key (Puk2) thereof compromised, the appropriate account authorities 7122,7132 need to be notified.

Figure 71B:
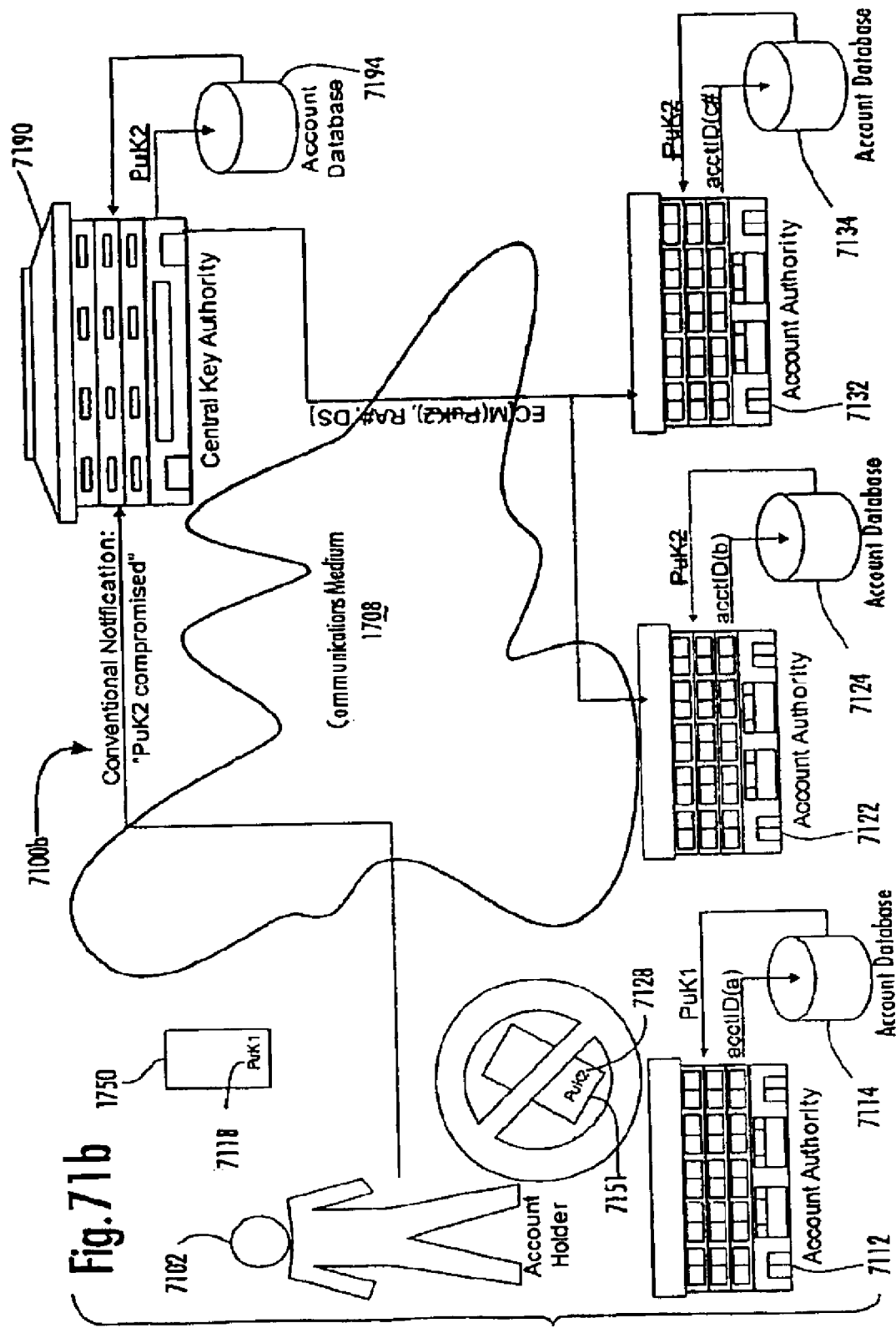
FIG. 71*b* illustrates another preferred ABDS system in accordance with the third aspect of the present invention.

In such a situation, as illustrated in FIG. 71*b*, the account holder 7102 notifies the Central Key Authority 7190 of such (obviously in a more conventional manner since, presumably, the device or private key (PrK2) is no longer available to originate a digital signature of the message). The Central Key Authority 7190, in turn, contacts each account authority 7122,7132. Each account authority 7122,7132 then deactivates the associated account [acctID(b): acctID(c1); acctID(c2)] (or at least deactivates the use of the account by means of the particular device 7151 and public key 7128) until the account holder 7102 associates a new public key (PuK2-new) therewith.

Furthermore, as shown in FIG. 71*c*, once the account holder 7102 has obtained a new device 7151*a* and corresponding new public key (PuK2-new) 7138, the account holder 7102 needs only to update the Central Key Authority 7190 with the new public key (PuK2-new) 7138. The Central Key Authority 7190 then preferably communicates the new public key (PuK2-new) 7138 to each of the appropriate account authorities 7122,7132 for association therewith and reactivation of the respective accounts [acctID(b); acctID(c1); acctID(c2)].

Figure 71D:
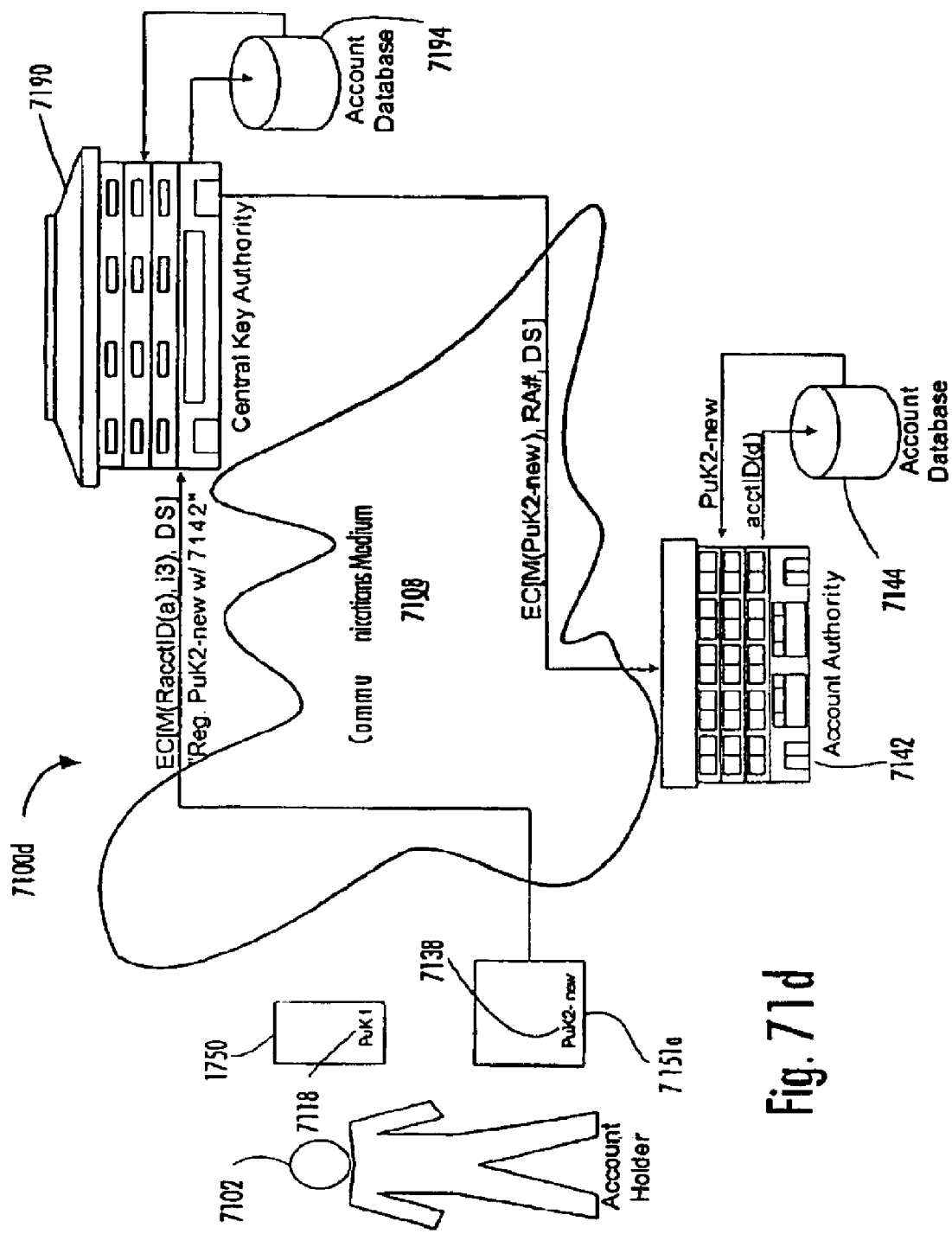
FIG. 71*d* illustrates a further preferred ABDS system in accordance with the third aspect of the present invention.

As illustrated in FIG. 71*d*, the Central Key Authority 7190 also is instrumental in establishing a new account with a new account authority 7142. In this regard, if a Central Key Authority 7190 maintains a record for an account holder 7102 desiring to establish an account with a new account authority 7142, the new account (acctID(d)) preferably is established by the Central Key Authority 7190 at the request of the account holder 7102. Specifically, the account holder 7102 instructs the Central Key Authority 7190 to transmit the relevant information from the account database 7194 for the account holder 7102 to the new account authority 7142. Among the relevant information is included the public key (PuK2-new) 7138 of the account holder 7102 to be associated with the new account (acctID(d)). Subsequently, the desired account authority 7142 establishes an initial record in its account database 7144 using the information received from the Central Key Authority 7190. Any additional information that may be required by the account authority 7142 then may be obtained from the new account holder 7102 and the new record in the account database 7144 updated.

Assuming that the Central Key Authority 7190 and account authorities 7112,7122,7132,7142 have registered their own public keys with each other, then the above communications between them can occur in an electronic communication, two-party ABDS manner as well.

4. Applying Dynamic Risk Analysis to a Transaction As will be appreciated, trust in the ABDS systems described above depends upon the legitimate possession and use of private keys. A fraudulent use of a private key to digitally sign a message contained in an EC cannot be detected merely through authentication of the message. Thus, the above ABDS systems are potentially susceptible to fraudulent uses if a private key of a device is stolen, either by physical theft of the device, or by discovery of the private key and subsequent copying and use in another device capable of originating digital signatures.

To guard against fraudulent use of a device through theft of the device itself, Factor B Entity Authentication and/or Factor C Entity Authentication techniques and requirements, described previously, are used. To guard against discovery of a private key and subsequent copying and use in another device, devices are manufactured with electronic shielding, zeroization, auditing, tamper evidence and tamper response, and other security features that safeguard the private key (and other protected data) contained therein. Such security features include hardware, software, and firmware and are well known in the art of manufacturing secure computer chips and other cryptographic modules.

The requirements for such security features are specified in Federal Information Processing Standards Publication 140-1, Security Requirements for Cryptographic Modules, US DOC/NBS, Jan. 11, 1994 (herein "FIPS PUB 140-1"), which is incorporated herein by reference; Federal Information Processing Standards Publication 140-2, Security Requirements for Cryptographic Modules, US DOC/NBS, May 25, 2001 (herein "FIPS PUB 140-2 "), which is incorporated herein by reference. FIPS PUB 140-1 and 140-2 also define security levels that may be met by a device based on the device's security features, with each of these defined security levels representing a various level of difficulty-in terms of time and money-that would be encountered in attempting to discern a private key of a device. Currently, four security levels are defined with security level 4 being the highest level of security available.

Specifications for such security features also are set forth in Trusted Platform Module (TPM) Security Policy Version 0.45, TRUSTED COMPUTING PLATFORM ALLIANCE, October 2000, and TCPA PC Implementations Specification Version 0.95, TRUSTED COMPUTING PLATFORM ALLIANCE, Jul. 4, 2001, both which are incorporated herein by reference (collectively "TCPA Documents"); and Common Criteria for Information Technology Security Evaluation, Smart Card Protection Profile, Draft Version 2.1d, SMART CARD SECURITY USER GROUP, Mar. 21, 2001, which is incorporated herein by reference (hereinafter "Smart Car Protection Profile").

The characteristics of a device that safeguard against discovery of a private key and other protected data are referred to herein as "security characteristics" of the device. The characteristics of a device that safeguard against unauthorized use of the device by authenticating the user are referred to herein as "authentication capabilities" of the device. The "security features" of a device (including a cryptographic module or TPM) comprise features such as the security characteristics and authentication capabilities, the requirements for which are specified in the above-cited references.

Unfortunately, while the aforementioned safeguards generally reduce the risk of fraud within the digital signature system overall, a recipient of any one particular EC including a message and corresponding digital signature may be unfamiliar with the device used to generate the digital signature and, therefore, be unable to gauge the risk of whether the digital signature was generated fraudulently, either through theft of the device or discovery of the private key. Furthermore, a recipient generally is unable to gauge the risk of whether a digital signature was generated fraudulently when no Secret or biometric value is shared between the sender and the recipient. In such a situation, a recipient currently must rely upon blind trust in accepting that the device used to generate the digital signature has not been stolen and in accepting that the device used to generate the digital signature has sufficient safeguards to protect its private key from discovery and use.

Accordingly, a fourth aspect of the present invention will now be described. The fourth aspect of the invention incorporates the ABDS system of the first aspect of the present invention and includes, in addition thereto, the identification and evaluation of numerous factors by an account authority for the purpose of gauging the risk or likelihood that a message that authenticates was fraudulently, inadvertently, or unknowingly signed and for the purpose of determining whether the instruction (i1) contained within the message should be performed. The factors evaluated and considered include the authentication capabilities of the device used to originate a digital signature for the message, the type and sufficiency of entity authentication, if any, obtained by the device or provided with the EC, security characteristics of the device, environmental factors associated with the creation and transmission of the message, transactional history associated with the device or relevant account associated with the message, and other account or business-specific factors, including whether the instruction (i1) is capable of being performed on the identified account (e.g., are there sufficient funds in the account to cover the requested withdrawal or transfer? Is the account holder authorized to view the requested information? Is the account holder authorized to enter the requested space? Is the account holder authorized to make the requested transaction? Is the account holder authorized to enter into the specified contract?).

Authentication capabilities of a device include those components that perform either or both of Factors B and C Entity Authentication with regard to authentication of the user of the device. Knowing the authentication capabilities of the device (or lack thereof) allows a recipient to gauge a likelihood of whether someone other than the authorized user utilized the device to generate a digital signature. It is also important to know the security characteristics of a device—rather than simply a stated security level of the device—as technologies are developed over time that reduce the effectiveness of such security characteristics and, consequently, result in the decrease of the actual security level of the device. Unless upgrades are made, the security characteristics of a device are permanent while the security level of the device eventually will decrease over time. By knowing the security characteristics, the appropriate security level of a device may be determined at any given time.

Further, it is also important to know the "manufacturing history" of the device used to generate the digital signature contained within an EC. "Manufacturing history" of the device preferably includes a recording of manufacturing attributes of the device, such as the manufacturer of the device; all specifications applicable to the device; manufacture date of the device; location of manufacture batch identifier of the device; serial number or part number of the device; security of the manufacturing facility; physical instantiation of the device regarding layout and process geometry; software identification and release date; operating parameters of the device, including voltage and frequency ranges; and identification of all enabled hardware and software security features of the device. The manufacturing history of the device also preferably includes the cryptographic characteristics, key generation characteristics, and random number generator characteristics of the device. By knowing the manufacturing history of a device, the security characteristics and authentication capabilities of the device may be revised as errors, omissions, flaws, security breaches, or possible improprieties and the like are discovered as having occurred during the manufacturing of the device. Accordingly, knowing the manufacturing history enables one to determine an assurance level of the device.

"Environmental factors" associated with the creation and transmission of an EC include knowing where in the world the EC originated, how the EC was communicated, whether and what type of I/O support element(s), if any, were involved in the creation and transmission of the EC, whether each such I/O support element originated its own digital signature for the EC, the security characteristics associated with the I/O support element, the overall digital signature environment in which the device operates, such as, for example, whether the entity authentication information can be eavesdropped on by the I/O support element or other external apparatuses, copied, and then replayed at a later time without the device user's knowledge, and the like. "Transactional history" of the device or the account associated with the EC involves identifying and tracking irregular or abnormal activity or instructions associated with the account (e.g., knowing the typical geographical usage of the device, typical transactional amounts or types, frequency of use, typical entity authentication provided, historical data regarding incorrect attempts to provide entity authentication, and the like), knowing whether a device has been reported lost or stolen, and the like. Other account factors and business considerations include all additional criteria evaluated by a recipient of an EC to determine whether an instruction (i1) within a message should be performed.

As described previously with regard to each of the various ABDS systems, it is preferable that the Device Profile Information of a device be recorded by an account authority in the account database record with which the public key of the device is associated. The Device Profile Information includes the Security Profile and transactional history of the device. The Security Profile includes the security features and manufacturing history of the device. The security features include the security characteristics and authentication capabilities of the device. The Security Profile is preferably, but not necessarily, obtained directly from the manufacturer of the device, which preferably is a trustworthy and reliable entity. If the Security Profile is not obtained directly from the manufacturer, then the Security Profile is obtained either indirectly from a trusted third party which obtained the Security Profile from the manufacturer or from a physical inspection of the device by the account authority (or by an entity trusted by the account authority). The Security Profile may also be provided by the account holder within the scope of the present invention. In view of the third aspect of the invention, the Security Profile also may be obtained from a Central Key Authority—such as when information is received from the Central Key Authority in establishing a new account for an account holder.

Equipped with this information in the Device Profile Information, an account authority, after authenticating a message contained within an EC, further processes the message, which includes making a calculated determination whether or not to execute the instruction (i1) contained in the authenticated message. Alternatively, further processing of the message includes a decision to execute a limited portion of the instruction based on an analysis of the current risk associated with the instruction (i1) or to require additional information from the sender of the EC in order to decrease the risk associated with the current instruction (i1).

As illustrated in FIG. 73, for example, when an account authority first receives (Step 7302) an EC from an alleged account holder, it retrieves (Step 7304) from the account database the PuK associated with the account number provided in the EC and attempts to authenticate (Step 7306) the message using the PuK. If the message does not authenticate (in Step 7308), then the account authority replies (Step 7310) with a rejection of the message and/or instruction (i1) contained in the message-all of which conforms with the first aspect of the present invention. If the message does authenticate (in Step 7308), then the account authority further processes (Step 7312) the message and instruction (i1) contained within the message.

Examples of further processing of the message by an account authority after successful authentication of the message in accordance with the first aspect of the present invention were previously described in association with FIGS. 6–63 for each of the specific implementations of the two-party and three-party ABDS systems. As shown in FIG. 73, however, further processing (Step 7312) in accordance with this fourth aspect of the present includes evaluation and consideration (Step 7314) of numerous factors that are used by the account authority, ultimately, to determine whether or not to perform the instruction (i1) contained within the message. The evaluation and consideration (Step 7314) includes an evaluation (Step 7316) of the authentication capabilities of the device and an analysis of entity authentication, if any, provided by the sender of the EC or user of the device, an evaluation (Step 7318) of the security characteristics associated with the device, an evaluation (Step 7320) of the environmental factors surrounding the EC, consideration (Step 7322) of the transactional history of the device and/or the account associated with the EC, and consideration (Step 7324) of other account or business-specific factors. Whether the account authority considers some or all of the above factors, how much weight or importance the account authority applies to any particular factor, and the order, if any, in which the account authority evaluates or considers the above factors varies from one account authority to the next according to each account authority's own particular business concerns, needs, objectives, purposes, and risks. Thus, each account authority uses its own business rules and judgment to determine (Step 7326), based on any or all of the factors considered (in Step 7314), whether the instruction (i1) from the message should be performed. If the determination (in Step 7326) is negative, then the account authority replies (Step 7310) with a rejection of the message and/or instruction (i1) contained in the message. If the determination (in Step 7326) is positive, then the account authority performs (Step 7328) the instruction (i1) from the message and updates (Step 7330) the account record accordingly.

Although not shown in FIG. 73, if the determination in Step 7326 is negative, the account authority may alternatively choose to execute only a limited portion of the instruction (i1), if possible, based on an analysis of the above factors. In another alternative embodiment (also not shown in FIG. 73), the account authority may require additional information from the sender of the EC prior to performing the instruction (i1)-in order to decrease the risk associated with the current instruction (i1).

From all of the above, it should be apparent that the devices described above with regard to the present invention encompass, for example, devices of merchants and other commercial entities that generate digital signatures, and are not limited to devices of individual consumers that generate digital signatures. For instance, a device in accordance with the present invention includes an I/O support element comprising, for example, an IC card reader used to read IC cards of individual consumers in establishing secure financial transactions if such IC card reader itself generates digital signatures. In this regard, such device may include a trusted platform module.

Accordingly, it readily will be understood by those persons skilled in the art that, in view of the above detailed description of preferred embodiments, devices, and methods of the present invention, the present invention is susceptible of broad utility and application. Many methods, embodiments, and adaptations of the present invention other than those herein described, as well as many variations, modifications, and equivalent arrangements, will be apparent from or reasonably suggested by the present invention and the following detailed description thereof, without departing from the substance or scope of the present invention. Furthermore, those of ordinary skill in the art will understand and appreciate that although steps of various processes may be shown and described in some instances as being carried out in a preferred sequence or temporal order, the steps of such processes are not necessarily to be limited to being carried out in such particular sequence or order. Rather, in many instances the steps of processes described herein may be carried out in various different sequences and orders, while still falling within the scope of the present invention. Accordingly, while the present invention is described herein in detail in relation to preferred methods and devices, it is to be understood that this detailed description only is illustrative and exemplary of the present invention and is made merely for purposes of providing a full and enabling disclosure of the invention. The detailed description set forth herein is not intended nor is to be construed to limit the present invention or otherwise to exclude any such other embodiments, adaptations, variations, modifications and equivalent arrangements of the present invention, the present invention being limited solely by the claims appended hereto and the equivalents thereof.

What is claimed is:

1. A method of managing a database by a first party for identification of security features of a device that generates digital signatures, the database existing outside of the device, comprising the steps of:

(a) recording in the database for each of a plurality of devices, (i) a public key of a public-private key pair of the device, the private key being stored only within the device, and (ii) information including security features of the device, the security features being associated with the public key in the database, the security features including security characteristics of the device that safeguard against discovery of the private key stored within the device and/or authentication capabilities of the device that safeguard against unauthorized use of the device in generating a digital signature; and (b) identifying by the first party, without use of a digital certificate, security features from the database to a second party recipient of an electronic message for which a digital signature was originated utilizing a private key of the public-private key pair of a particular one of the devices, the security features being for the particular device.

2. The method of claim 1, further comprising gauging the risk that the digital signature was fraudulently originated based on said identified security characteristics of the particular device in step (b).

3. The method of claim 1, wherein the public key used to authenticate the electronic message is received with the digital signature.

4. The method of claim 1, wherein the public key, with which the security features are associated in the database for the particular device in step (b), is included in the message.

5. The method of claim 1, wherein the information of the particular device in step (b) includes a name of a holder of an account, which account is managed by the recipient of the electronic message.

6. The method of claim 1, wherein the information of the particular device in step (b) includes an address of a holder of an account, which account is managed by the recipient of the electronic message.

7. The method of claim 1, wherein the information of the particular device in step (b) includes a social security number of a holder of an account, which account is managed by the recipient of the electronic message.

8. The method of claim 1, wherein the information of the particular device in step (b) includes a tax identification number of a holder of an account, which account is managed by the recipient of the electronic message.

9. The method of claim 1, wherein the information of the particular device in step (b) includes an account number of an account that is managed by the recipient of the electronic message.

10. The method of claim 1, wherein the information of the particular device in step (b) includes a list of accounts of an account holder, at least one of which is managed by the recipient of the electronic message.

11. The method of claim 1, wherein the security characteristics for each respective device are indexed in the database to that device's public key.

12. The method of claim 1, wherein the security characteristics for each respective device are indexed in the database to a unique identifier.

13. A method of managing a database for identification of security features of a device that generates digital signatures, the database existing outside of the device, comprising the steps of:
   (a) recording in the database for each of a plurality of devices,
      (i) a public key of a public-private key pair of the device, the private key being stored within the device and not accessible from the device, and
      (ii) information including security features of the device, the security features being associated with the public key in the database, the security features including security characteristics of the device that safeguard against discovery of the private key stored within the device and/or authentication capabilities of the device safeguard against unauthorized use of the device in generating a digital signature; and
   (b) identifying security features from the database by a recipient of an electronic message for which a digital signature was originated utilizing a private key of the public-private key pair of a particular one of the devices, the security features being for the particular device.

14. The method of claim 13, wherein the database is managed by the recipient of the electronic message in step (b).

15. The method of claim 14, further comprising managing an account database by the recipient of the electronic message in step (b), and wherein the electronic message pertains to one of the accounts recorded in the account database.

16. The method of claim 13, wherein the database comprises an account database that is managed by the recipient of the electronic message in step (b), and wherein the electronic message pertains to one of the accounts recorded in the account database.

17. The method of claim 13, wherein the information of the particular device in step (b) includes a current balance for the account.

18. The method of claim 13, wherein the information of the particular device in step (b) includes an available credit for the account.

19. A method of managing a database by a first party for identification of security features of devices that generate digital signatures, the database existing outside of the devices, comprising the steps of:
   (a) recording in the database for each of a plurality of devices,
      (i) a public key of a public-private key pair of the device, the private key being stored within the device, and
      (ii) information including security features of the device, the security features being associated with the public key in the database, the security features including security characteristics of the device that safeguard against discovery of the private key stored within the device and/or authentication capabilities of the device that safeguard against unauthorized use of the device in generating a digital signature; and
   (b) identifying security features, without use of a digital certificate, by,
      (i) identifying by the first party security features from the database to a second party recipient of an electronic message for which a digital signature was originated utilizing a private key of the public-private key pair of a particular one of the devices, the security features being for the particular one of the devices; and
      (ii) identifying by the first party security features from the database to a third party recipient of an electronic message for which a digital signature was originated utilizing a private key of the public-private key pair of another particular one of the devices, the security features being for this other particular one of the devices.

20. The method of claim 19, wherein the second party recipient manages an account to which pertains the electronic message received by the second party recipient, and wherein the third party recipient manages another account to which pertains the electronic message received by the third party recipient.

* * * * *